US010419907B2

(12) United States Patent
Redding et al.

(10) Patent No.: US 10,419,907 B2
(45) Date of Patent: Sep. 17, 2019

(54) PROXIMITY APPLICATION DISCOVERY AND PROVISIONING

(71) Applicant: QUALCOMM Incorporated, San Diego, CA (US)

(72) Inventors: Brian Redding, Urbana, IL (US); Joel Benjamin Linsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/474,367

(22) Filed: Sep. 2, 2014

(65) Prior Publication Data
US 2014/0370879 A1    Dec. 18, 2014

Related U.S. Application Data

(63) Continuation-in-part of application No. 13/833,291, filed on Mar. 15, 2013, which is a
(Continued)

(51) Int. Cl.
*H04W 4/00* (2009.01)
*H04W 4/50* (2018.01)
(Continued)

(52) U.S. Cl.
CPC ......... *H04W 4/50* (2018.02); *H04M 3/42178* (2013.01); *H04W 4/06* (2013.01); *H04W 4/80* (2018.02)

(58) Field of Classification Search
CPC ..... H04W 4/0001; H04W 4/06; H04W 4/008; H04W 4/80; H04W 48/10; H04W 84/18;
(Continued)

(56) References Cited

U.S. PATENT DOCUMENTS 5,241,598 A    8/1993 Raith
5,784,028 A    7/1998 Corman et al.
(Continued)

FOREIGN PATENT DOCUMENTS

CN       1589580 A     3/2005
CN     101127684 A     2/2008
(Continued)

OTHER PUBLICATIONS

Carman D.W., et al., "Constraints and Approaches for Distributed Sensor Network Security (FINAL)," NAI Labs Technical Report #00-010, Sep. 1, 2000, 139 pages.
(Continued)

*Primary Examiner* — Thanh C Le
(74) *Attorney, Agent, or Firm* — The Marbury Law Group/Qualcomm

(57) ABSTRACT

Methods, non-transitory processor-readable storage media, systems, and devices for provisioning devices associated with wireless identity transmitters. An embodiment method performed by a proximity broadcast receiver may include operations for receiving a broadcast message including a secure identifier from a wireless identity transmitter, transmitting to a central server a sighting message that includes the secure identifier and an identity of the proximity broadcast receiver, receiving from the central server a return message that includes identification information related to the received broadcast message and that is authorized to be distributed to the proximity broadcast receiver based on data stored on the central server, and provisioning a device associated with the received broadcast message based on the identification information from the received return message. The method may also include identifying a software source from the received return message, requesting the software
(Continued)

from the identified software source, and installing the received software.

29 Claims, 44 Drawing Sheets

Related U.S. Application Data continuation-in-part of application No. 13/773,379, filed on Feb. 21, 2013, now Pat. No. 9,544,075.

(60) Provisional application No. 61/601,620, filed on Feb. 22, 2012, provisional application No. 61/637,834, filed on Apr. 24, 2012, provisional application No. 61/693,169, filed on Aug. 24, 2012, provisional application No. 61/670,226, filed on Jul. 11, 2012, provisional application No. 61/701,457, filed on Sep. 14, 2012, provisional application No. 61/713,239, filed on Oct. 12, 2012, provisional application No. 61/716,373, filed on Oct. 19, 2012, provisional application No. 61/717,964, filed on Oct. 24, 2012, provisional application No. 61/728,677, filed on Nov. 20, 2012, provisional application No. 61/745,395, filed on Dec. 21, 2012, provisional application No. 61/745,308, filed on Dec. 21, 2012.

(51) Int. Cl.
*H04M 3/42* (2006.01)
*H04W 4/80* (2018.01)
*H04W 4/06* (2009.01)

(58) Field of Classification Search
CPC ... H04W 88/06; H04W 4/50; H04M 3/42178; G06Q 20/20; G06Q 20/24; G06Q 20/382; G06Q 20/3278; G06Q 20/18
See application file for complete search history.

(56) References Cited

U.S. PATENT DOCUMENTS

| | | | |
|---|---|---|---|
| 5,812,086 | A | 9/1998 | Bertiger et al. |
| 6,052,786 | A | 4/2000 | Tsuchida |
| 6,513,015 | B2 | 1/2003 | Ogasawara |
| 6,536,658 | B1 | 3/2003 | Rantze |
| 6,970,092 | B2 | 11/2005 | Hum et al. |
| 7,260,835 | B2 | 8/2007 | Bajikar |
| 7,376,583 | B1 | 5/2008 | Rolf |
| 7,413,121 | B2 | 8/2008 | Goel et al. |
| 7,616,942 | B2 | 11/2009 | Karl et al. |
| 7,649,440 | B2 | 1/2010 | Kang et al. |
| 7,658,327 | B2 | 2/2010 | Tuchman et al. |
| 7,729,709 | B1 | 6/2010 | Loeb et al. |
| 7,737,861 | B2 | 6/2010 | Lea et al. |
| 7,752,329 | B1 | 7/2010 | Meenan et al. |
| 7,791,455 | B1 | 9/2010 | MacLean, III et al. |
| 7,849,318 | B2 | 12/2010 | Zhang et al. |
| 7,880,616 | B2 | 2/2011 | Kanagala et al. |
| 7,936,736 | B2 | 5/2011 | Proctor, Jr. et al. |
| RE42,435 | E | 6/2011 | Katz |
| 7,962,361 | B2 | 6/2011 | Ramchandani et al. |
| 8,023,895 | B2 | 9/2011 | Smith |
| 8,050,984 | B2 | 11/2011 | Bonner et al. |
| 8,090,399 | B2 | 1/2012 | Howarter et al. |
| 8,145,125 | B2 | 3/2012 | Masoian et al. |
| 8,160,577 | B2 | 4/2012 | Bailin et al. |
| 8,224,248 | B2 | 7/2012 | Demirbasa et al. |
| 8,253,567 | B2 | 8/2012 | Butler et al. |
| 8,285,211 | B2 | 10/2012 | Wang et al. |
| 8,332,272 | B2 | 12/2012 | Fisher |
| 9,014,963 | B1 | 4/2015 | Kolton et al. |
| 9,213,675 | B1 | 12/2015 | Kolton et al. |
| 9,374,751 | B1 | 6/2016 | Mauer et al. |
| 2002/0062251 | A1 | 5/2002 | Anandan et al. |
| 2003/0100315 | A1 | 5/2003 | Rankin |
| 2003/0143978 | A1 | 7/2003 | Cooper et al. |
| 2004/0002897 | A1 | 1/2004 | Vishik |
| 2004/0082343 | A1 | 4/2004 | Kim et al. |
| 2004/0136527 | A1 | 7/2004 | Struik |
| 2004/0198221 | A1 | 10/2004 | Bin et al. |
| 2005/0122210 | A1 | 6/2005 | Huseth et al. |
| 2005/0143092 | A1 | 6/2005 | Tamaki et al. |
| 2006/0006876 | A1 | 1/2006 | Bertness et al. |
| 2006/0010321 | A1 | 1/2006 | Nakamura et al. |
| 2006/0032901 | A1 | 2/2006 | Sugiyama et al. |
| 2006/0036485 | A1 | 2/2006 | Duri et al. |
| 2006/0041345 | A1 | 2/2006 | Metcalf |
| 2006/0056368 | A1 | 3/2006 | Ratiu et al. |
| 2006/0080732 | A1 | 4/2006 | Ohkubo et al. |
| 2006/0178986 | A1 | 8/2006 | Giordano et al. |
| 2007/0011555 | A1 | 1/2007 | Kim et al. |
| 2007/0087682 | A1 | 4/2007 | Dacosta |
| 2007/0220545 | A1 | 9/2007 | Awano |
| 2007/0268360 | A1 | 11/2007 | Ahlgren et al. |
| 2007/0281689 | A1 | 12/2007 | Altman et al. |
| 2007/0281690 | A1 | 12/2007 | Altman et al. |
| 2007/0283141 | A1 | 12/2007 | Pollutro et al. |
| 2008/0055158 | A1 | 3/2008 | Smith et al. |
| 2008/0107274 | A1 | 5/2008 | Worthy |
| 2008/0123683 | A1 | 5/2008 | Cheng et al. |
| 2008/0187137 | A1 | 8/2008 | Nikander et al. |
| 2008/0281940 | A1 | 11/2008 | Coxhill |
| 2009/0052380 | A1 | 2/2009 | Espelien |
| 2009/0103722 | A1 | 4/2009 | Anderson et al. |
| 2009/0150194 | A1 | 6/2009 | Keohane et al. |
| 2009/0185677 | A1 | 7/2009 | Bugbee |
| 2009/0195370 | A1 | 8/2009 | Huffman et al. |
| 2009/0210932 | A1 | 8/2009 | Balakrishnan et al. |
| 2009/0240946 | A1 | 9/2009 | Yeap et al. |
| 2009/0254416 | A1 | 10/2009 | Nomula |
| 2009/0315672 | A1 | 12/2009 | Nantz et al. |
| 2009/0315704 | A1 | 12/2009 | Rosing et al. |
| 2010/0027783 | A1 | 2/2010 | Yup |
| 2010/0033299 | A1 | 2/2010 | Davis |
| 2010/0070369 | A1 | 3/2010 | Fenton et al. |
| 2010/0088510 | A1 | 4/2010 | Shon et al. |
| 2010/0132049 | A1 | 5/2010 | Vernal et al. |
| 2010/0174596 | A1 | 7/2010 | Gilman et al. |
| 2010/0174598 | A1 | 7/2010 | Khan et al. |
| 2010/0203833 | A1 | 8/2010 | Dorsey |
| 2010/0223120 | A1 | 9/2010 | Dragt |
| 2010/0267375 | A1 | 10/2010 | Lemmon et al. |
| 2010/0274859 | A1 | 10/2010 | Bucuk |
| 2010/0287250 | A1 | 11/2010 | Carlson et al. |
| 2011/0032916 | A1 | 2/2011 | Lee |
| 2011/0035284 | A1 | 2/2011 | Moshfeghi |
| 2011/0065375 | A1 | 3/2011 | Bradley |
| 2011/0138192 | A1 | 6/2011 | Kocher et al. |
| 2011/0151898 | A1 | 6/2011 | Chandra et al. |
| 2011/0153412 | A1 | 6/2011 | Novikov et al. |
| 2011/0159850 | A1 | 6/2011 | Faith et al. |
| 2011/0176465 | A1 | 7/2011 | Panta et al. |
| 2011/0178863 | A1 | 7/2011 | Daigle |
| 2011/0179064 | A1 | 7/2011 | Russo |
| 2011/0314539 | A1 | 12/2011 | Horton |
| 2012/0011566 | A1 | 1/2012 | Youm et al. |
| 2012/0029691 | A1 | 2/2012 | Mockus et al. |
| 2012/0047011 | A1 | 2/2012 | Rippetoe et al. |
| 2012/0077457 | A1 | 3/2012 | Howarter et al. |
| 2012/0088487 | A1* | 4/2012 | Khan ............... H04W 4/18 455/418 |
| 2012/0123858 | A1 | 5/2012 | Rosenthal |
| 2012/0201383 | A1 | 8/2012 | Matsuo |
| 2012/0207302 | A1 | 8/2012 | Alexander et al. |
| 2012/0209744 | A1 | 8/2012 | Mullen et al. |
| 2012/0220314 | A1 | 8/2012 | Altman et al. |
| 2012/0226537 | A1 | 9/2012 | Subbarao et al. |
| 2012/0239504 | A1 | 9/2012 | Curlander et al. |
| 2012/0260311 | A1 | 10/2012 | Kang |
| 2012/0278172 | A1 | 11/2012 | Mercuri et al. |
| 2012/0306622 | A1 | 12/2012 | Trinh et al. |

(56) References Cited

U.S. PATENT DOCUMENTS

| | | | |
|---|---|---|---|
| 2013/0091270 A1 | 4/2013 | Zhang et al. | |
| 2013/0136046 A1 | 5/2013 | Wurm et al. | |
| 2013/0159086 A1 | 6/2013 | Richard | |
| 2013/0178163 A1 | 7/2013 | Wang | |
| 2013/0179513 A1 | 7/2013 | Furukawa | |
| 2013/0185133 A1 | 7/2013 | Tong et al. | |
| 2013/0214909 A1 | 8/2013 | Meijers et al. | |
| 2013/0217332 A1 | 8/2013 | Altman et al. | |
| 2013/0217333 A1 | 8/2013 | Sprigg et al. | |
| 2013/0281110 A1 | 10/2013 | Zelinka et al. | |
| 2013/0282438 A1 | 10/2013 | Hunter et al. | |
| 2013/0297422 A1 | 11/2013 | Hunter et al. | |
| 2013/0308493 A1 | 11/2013 | Viswanathan et al. | |
| 2014/0039990 A1 | 2/2014 | Georgi | |
| 2014/0133656 A1 | 5/2014 | Wurster et al. | |
| 2014/0146727 A1 | 5/2014 | Segev et al. | |
| 2014/0162685 A1 | 6/2014 | Edge | |
| 2014/0188592 A1 | 7/2014 | Herberger et al. | |
| 2014/0254466 A1 | 9/2014 | Wurster et al. | |
| 2014/0256251 A1* | 9/2014 | Caceres | H04W 4/80 455/41.1 |
| 2014/0258113 A1* | 9/2014 | Gauthier | G06Q 20/24 705/41 |
| 2014/0258858 A1 | 9/2014 | Hwang | |
| 2014/0274150 A1 | 9/2014 | Marti et al. | |
| 2014/0291395 A1* | 10/2014 | Wankmueller | G06Q 20/18 235/381 |
| 2014/0341132 A1* | 11/2014 | Kim | H04W 8/005 370/329 |
| 2015/0254662 A1* | 9/2015 | Radu | G06Q 20/20 705/21 |
| 2015/0332258 A1* | 11/2015 | Kurabi | G06Q 20/382 705/71 |
| 2015/0356289 A1 | 12/2015 | Brown et al. | |
| 2017/0070847 A1 | 3/2017 | Altman et al. | |

FOREIGN PATENT DOCUMENTS

| | | |
|---|---|---|
| CN | 101371241 A | 2/2009 |
| CN | 101609602 A | 12/2009 |
| CN | 101894171 A | 11/2010 |
| CN | 102379510 A | 3/2012 |
| CN | 103199899 A | 7/2013 |
| EP | 1626363 A1 | 2/2006 |
| EP | 2200218 A1 | 6/2010 |
| EP | 2521082 A2 | 11/2012 |
| EP | 2693360 A2 | 2/2014 |
| JP | H1066136 A | 3/1998 |
| JP | 2000142925 A | 5/2000 |
| JP | 2001095060 A | 4/2001 |
| JP | 2001359147 A | 12/2001 |
| JP | 2005051348 A | 2/2005 |
| JP | 2005078267 A | 3/2005 |
| JP | 2005167670 A | 6/2005 |
| JP | 2005174106 A | 6/2005 |
| JP | 2005233812 A | 9/2005 |
| JP | 2006032997 A | 2/2006 |
| JP | 2006050466 A | 2/2006 |
| JP | 2006053800 A | 2/2006 |
| JP | 2006157790 A | 6/2006 |
| JP | 2006304157 A | 11/2006 |
| JP | 2007011539 A | 1/2007 |
| JP | 2007172399 A | 7/2007 |
| JP | 2007536841 A | 12/2007 |
| JP | 2009005118 A | 1/2009 |
| JP | 2009251959 A | 10/2009 |
| JP | 2010041410 A | 2/2010 |
| JP | 2010114740 A | 5/2010 |
| JP | 2011248562 A | 12/2011 |
| JP | 2012520514 A | 9/2012 |
| JP | 2013519335 A | 5/2013 |
| KR | 20090095869 A | 9/2009 |
| WO | 02073864 A2 | 9/2002 |
| WO | 2005025127 A1 | 3/2005 |
| WO | 2005031579 A1 | 4/2005 |
| WO | 2005109779 A1 | 11/2005 |
| WO | 2007059558 A1 | 5/2007 |
| WO | 2009130796 A1 | 10/2009 |
| WO | 2010104932 A1 | 9/2010 |
| WO | 2010117364 A1 | 10/2010 |
| WO | 2011001615 A1 | 1/2011 |
| WO | 2011100147 A1 | 8/2011 |
| WO | 2012035149 A1 | 3/2012 |
| WO | 2013009776 A2 | 1/2013 |
| WO | 2013034924 A1 | 3/2013 |
| WO | 2013109300 A1 | 7/2013 |
| WO | 2013126759 A2 | 8/2013 |
| WO | 2013163333 A2 | 10/2013 |
| WO | 2014015730 A1 | 1/2014 |

OTHER PUBLICATIONS

Agarwal A "Edit Hosts File with VB Script (VBS)" Tech Guides, Nov. 30, 2010, XP055191874, 2 Pages. Retrieved from the Internet: URL:http://www.labnol.org/tech/edit-hosts-with-vbs/18258/ [retrieved on May 28, 2015].

System and method of secure and convenient user authentication using associated mobile devices, IP.com Disclosure No. IPCOM000232532D, Nov. 15, 2013, 3 pages.

Anonymous: "Stream cipher", Feb. 6, 2012, XP55068934, [retrieved on Jul. 1, 2013].

Barahim, M.Z. "Low-Cost Bluetooth Mobile Positioning for Location-based Application," 3rd IEEE/IFIP International Conference in Central Asia on Internet, 2007. ICI 2007. pp. 1-4, Sep. 26-28, 2007, doi: 10.1109/CANET.2007.4401707.

Chaudhry M A, R., et al., "Protocols Stack and Connection Establishment in Bluetooth, radio", Students Conference, 2002. ISCON '02, 102-104,Proceedings, IEEE Aug. 2002, Piscataway, NJ, USA,IEEE, vol. 1, Aug. 16, 2002, pp. 48-55, XP010647264, ISBN: 978-0-7803-7505-5.

International Preliminary Report on Patentability—PCT/US2013/027392, The International Bureau of WIPO—Geneva, Switzerland, Jun. 6, 2014.

International Preliminary Report on Patentability—PCT/US2013/027409, The International Bureau of WIPO—Geneva, Switzerland, Sep. 4, 2014.

International Preliminary Report on Patentability—PCT/US2013/038050—The International Bureau of WIPO—Geneva, Switzerland, Jul. 29, 2014.

International Search Report and Written Opinion—PCT/US2013/027392—ISA/EPO—Sep. 13, 2013.

International Search Report and Written Opinion—PCT/US2013/027409—ISA/EPO—Aug. 27, 2013.

International Search Report and Written Opinion—PCT/US2013/038038—ISA/EPO—Oct. 10, 2013.

International Search Report and Written Opinion—PCT/US2013/038050—ISA/EPO—Nov. 13, 2013.

Kim, H.W., et al., "Symmetric Encryption in RFID Authentication Protocol for Strong Location Privacy and Forward-Security", Hybrid Information Technology, 2006. ICHIT '06, IEEE, Piscataway, NJ, USA, Nov. 9, 2006, pp. 718-723, XP032070247, DOI: 10.1109/ICHIT.2006.253688, ISBN: 978-0-7695-2674-4, the whole document.

Partial International Search Report—PCT/US2013/027392—ISA/EPO—Jul. 8, 2013.

Partial International Search Report—PCT/US2013/027409—ISA/EPO—Jul. 4, 2013.

Partial International Search Report—PCT/US2013/03803—ISA/EPO—Aug. 6, 2013.

Partial International Search Report—PCT/US2013/038050—ISA/EPO—Aug. 29, 2013.

Schneider M A., et al., "Efficient Commerce Protocols based on One-time Pads", Computer Security Applications, 2000 ACSAC '00. 16th Annual Conference E New Orleans, LA, USA Dec. 11-15, 2000, Los Alamitos, CA, USA, IEEE Comput. Soc, US, Dec. 11, 2000, pp. 317-326, XP010529829.

(56) References Cited

OTHER PUBLICATIONS

Tsudik G., "A Family of Dunces: Trivial RFID Identification and Authentication Protocols", Jun. 20, 2007, Privacy Enhancing Technologies; [Lecture Notes in Computer Science], Springer Berlin Heidelberg, Berlin, Heidelberg, pp. 45-61, XP019073083, ISBN: 978-3-540-75550-0.

Zuo, Y., "Secure and private search protocols for RFID systems", Information Systems Frontiers; A Journal of Research and Innovation, Kluwer Academic Publishers, BO, vol. 12, No. 5, Aug. 28, 2009, pp. 507-519, XP019863478, ISSN: 1572-9419, DOI: 10.1007/S10796-009-9208-6.

International Search Report and Written Opinion—PCT/US2015/042872—ISA/EPO—Oct. 23, 2015.

Huang et al., "Fast Authenticated Key Establishment Protocols for Self-Organizing Sensor Networks," NTR-2003-102 Feb. 2004, MERL-A Mitsubishi Electric Research Laboratory, pp. 1-13.

Weis S.A., et al., "Security and Privacy in Radio-frequency Identification Devices," Masters Thesis, Massachusetts Institute of Technology [online], May 9, 2003, [retrieved on Jul. 10, 2008]. Retrieved from the Internet, http://groups.csail.mit.edu/cis/theses/weis-masters.pdf, pp. 1-79.

Shorey R., Mobile, Wireless, and Sensor Networks Technology, Applications, and Future Directions, Translated by Lingfang Wang et al., China Machine Press, Jan. 2010, pp. 308-311.

\* cited by examiner

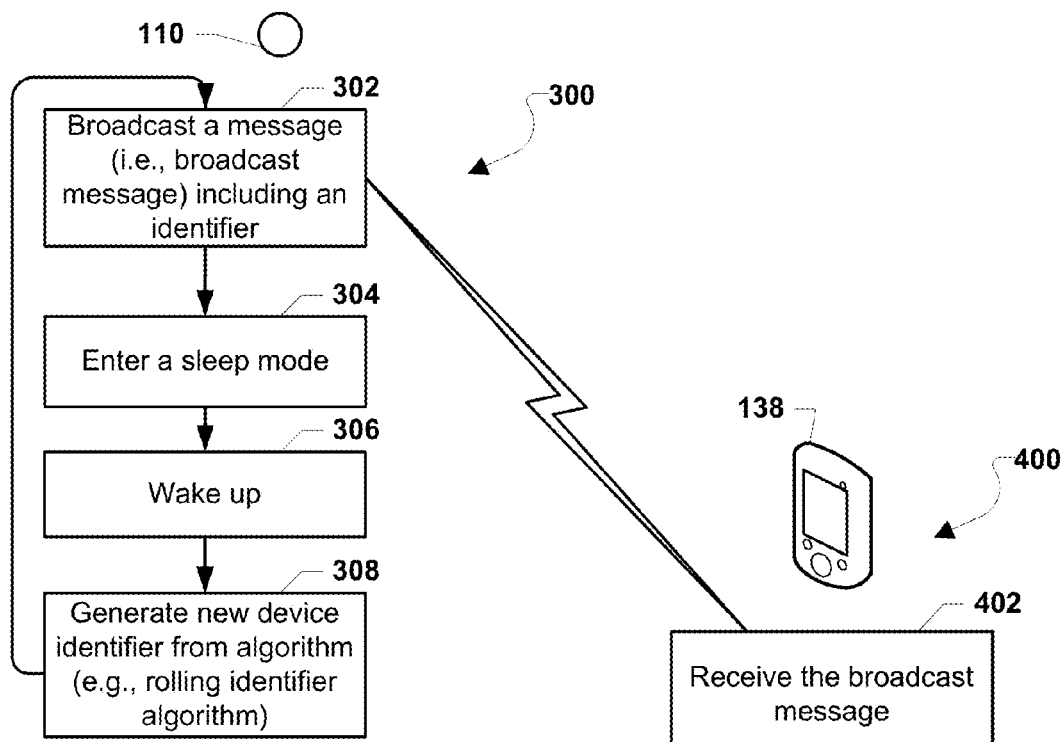
FIG. 3A
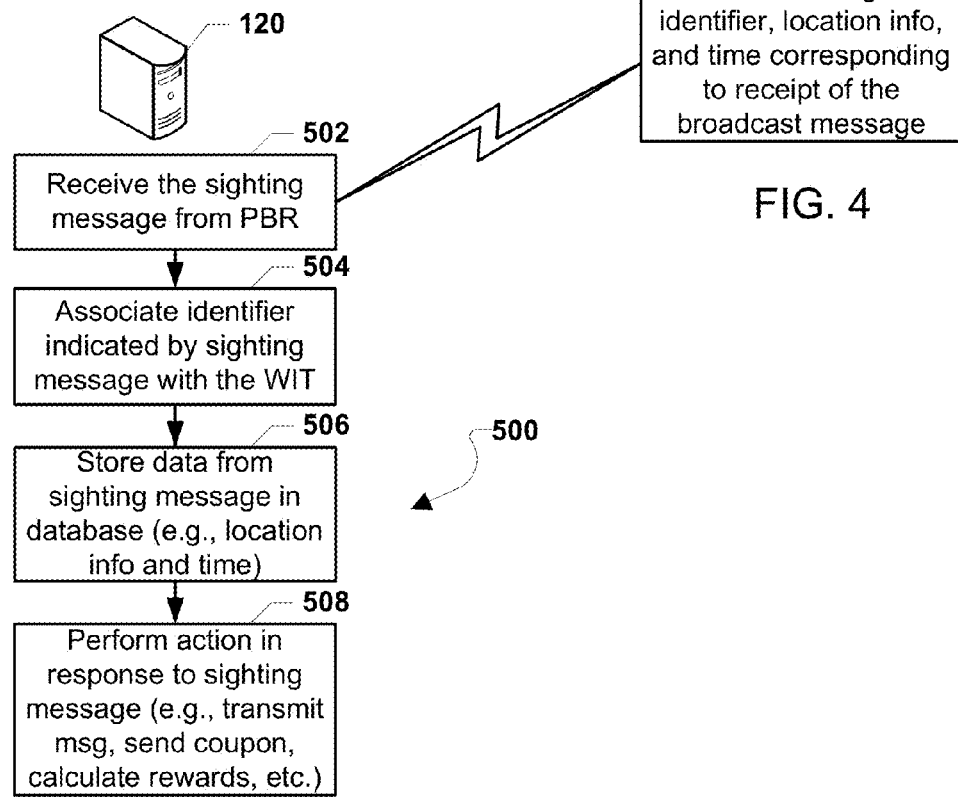
FIG. 4
FIG. 5

PROXIMITY APPLICATION DISCOVERY AND PROVISIONING

RELATED APPLICATIONS

The present application is a continuation-in-part of and claims priority to U.S. patent application Ser. No. 13/833,291, titled "Determining Rewards Based on Proximity of Devices Using Short-Range Wireless Broadcasts," filed Mar. 15, 2013, which is a continuation-in-part and claims priority to U.S. patent application Ser. No. 13/773,379, titled "Platform for Wireless Identity Transmitter and System Using Short-Range Wireless Broadcasts," filed Feb. 21, 2013 which claimed the benefit of priority to U.S. Provisional Application No. 61/601,620, filed Feb. 22, 2012, U.S. Provisional Application No. 61/637,834, filed Apr. 24, 2012, U.S. Provisional Application No. 61/693,169, filed Aug. 24, 2012, U.S. Provisional Application No. 61/670,226, filed Jul. 11, 2012, U.S. Provisional Application No. 61/701,457, filed Sep. 14, 2012, U.S. Provisional Application No. 61/713,239, filed Oct. 12, 2012, U.S. Provisional Application No. 61/716,373, filed Oct. 19, 2012, U.S. Provisional Application No. 61/717,964, filed Oct. 24, 2012, U.S. Provisional Application No. 61/728,677, filed Nov. 20, 2012, and U.S. Provisional Application No. 61/745,395, filed Dec. 21, 2012, U.S. Provisional Application No. 61/745,308, filed Dec. 21, 2012, the entire contents of all of which are hereby incorporated by reference.

BACKGROUND

Cellular and wireless communication devices have seen explosive growth over the past several years. This growth has been fueled by better communications hardware, larger networks, and more reliable protocols. Today's smartphones may include cameras, GPS receivers, Bluetooth® transceivers, and of course the cellular communication capabilities (e.g., LTE, 3G and/or 4G network access) to enable the devices to establish data communication links with the Internet. The various components and capabilities in smartphones are now very affordable, and thus smartphones and other similar mobile devices (e.g., tablets, laptops, etc.) are now very widely deployed in society.

However, the complexity of modern mobile devices may make it difficult for users to install and configure applications and peripheral devices. In particular, setting up a smartphone to interact with sensors or peripheral devices may require numerous operations for downloading applications, authenticating users, requesting authorizations, and entering credentials in order to access related functionalities. For example, in order to permit a friend's tablet mobile device to access a home WiFi router, a homeowner may need to provide the friend a password, as well as set up other access conditions for the friend's tablet (e.g., set individual permissions for accessing devices on a LAN, adjust media access control (MAC) address filtering settings on the router, etc.). As another example, a guest of a house may need to search in an online app store to find the appropriate application (or app) for controlling a nearby thermostat and then may also need to ask the owner of the house for the password to access the thermostat.

SUMMARY

The various embodiments provide systems, devices, non-transitory processor-readable storage media, and methods for improving the provisioning of devices based on proximity. In general, a compact wireless identity transmitter (WIT) associated with a user may be configured to periodically broadcast messages that include a unique and secure identification code via a short-range wireless radio, such as a Bluetooth® Low Energy (LE) transceiver. The wireless identity transmitter may be coupled to, integrated within, emulated by, or otherwise associated with a device, such as a router or an appliance (e.g., a TV, a router, a refrigerator, a thermostat, etc.). For example, the wireless identity transmitter may be located within a Wi-Fi router within a house.

The broadcast messages from the wireless identity transmitter may be received by physically proximate proximity broadcast receivers (PBR), which may be dedicated receivers, mobile devices configured with proximity broadcast receiver software, and stationary receivers, to name just a few examples. The broadcast messages may be received by proximity broadcast receivers when the wireless identity transmitter is within reception range (e.g., within 0 to 25 feet). Because the wireless identity transmitter broadcasts short-range wireless signals, the approximate location of the wireless identity transmitter is provided by the location of the proximity broadcast receivers at the time of receiving the broadcast signals.

The proximity broadcast receivers may relay received broadcast messages, along with other information (e.g., timestamp data, proximity information, etc.), to a central server in the form of sighting messages. Such a central server may use the information received in sighting messages to identify the wireless identity transmitter. For example, the central server may process (e.g., decode, etc.) the secure identification code within the sighting messages to identify the wireless identity transmitter, and use this identity to look up the user associated with the device. The central server may also be able to identify the proximity broadcast receivers (e.g., smartphones configured with a receiver application) based on the received sighting messages, such as by device identifiers included within the sighting message. In various embodiments, the central server may store profiles associated with the users of the wireless identity transmitter, the proximity broadcast receivers, and the devices associated with or connect to these devices. Such profiles may include identifying information about the user and the devices, as well as permissions that control how and when the central server may share any of the profile information.

Proximity broadcast receivers may receive information from the central server for provisioning the device associated with a wireless identity transmitter. In particular, in response to reporting a broadcast message from the wireless identity transmitter to the central server, a proximity broadcast receiver may receive identification information for communicating with the device, such as access credentials (e.g., log-in information, passwords, etc.). The received identification information may be transmitted by the central server to the device or the proximity broadcast receiver only when authorized based on related permissions, such as the rules a user defined for distributing passwords for accessing a Wi-Fi router. Additionally, as the central server may utilize profile information related to the proximity broadcast receiver, the received identification information may be particularly appropriate for the proximity broadcast receiver as well. For example, a smartphone mobile proximity broadcast receiver may receive a URI for downloading the application from an app store dedicated to software for the operating system or platform (e.g., Android, iOS, etc.) running on the smartphone. In this way, the proximity broadcast receiver may receive authorized, relevant information and discover appropriate applications for provisioning nearby devices based upon receiving broadcast messages that are resolved by the central server.

In some embodiments, the proximity broadcast receiver may receive configuration data from the central server that may be transferred to the device to be provisioned. For example, data may be received to configure the device with little user interaction based on the type of device and the pre-stored configuration for a device of that type. In some embodiments, the central server may be configured to transmit authorization requests to devices owned by users associated with the wireless identity transmitter in order to obtain on-demand approvals for the proximity broadcast receiver to provision or access the device.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 3A is a process flow diagram illustrating an embodiment method for broadcasting a secure identifier from a wireless identity transmitter.

FIG. 4 is a process flow diagram illustrating an embodiment method for a proximity broadcast receiver to transmit a sighting message in response to receiving a broadcast message from a wireless identity transmitter.

FIG. 5 is a process flow diagram illustrating an embodiment method for a server to process a sighting message transmitted by a proximity broadcast receiver.

DETAILED DESCRIPTION

Figure 1:
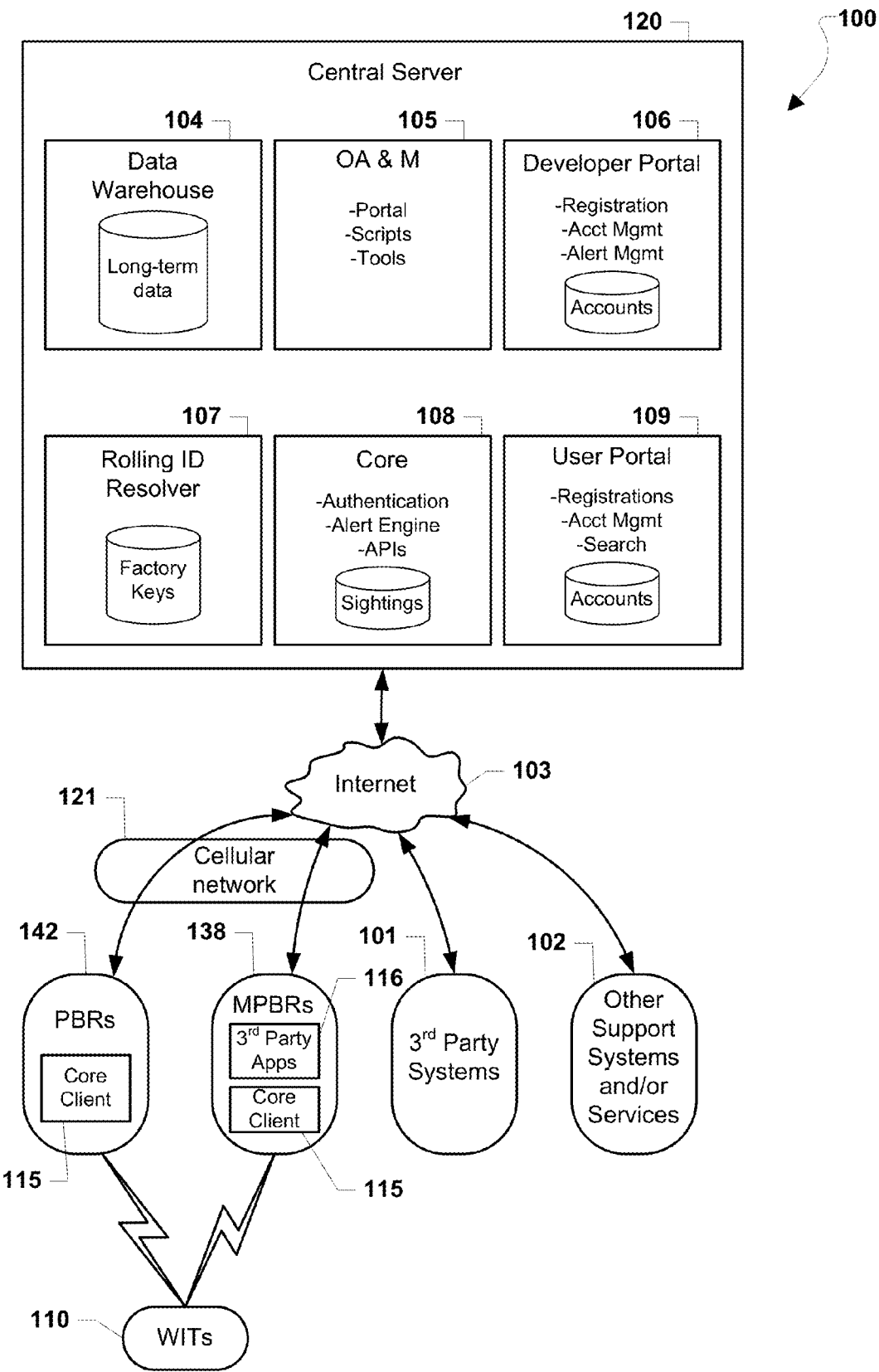
FIG. 1 is a system diagram illustrating network components suitable for use in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "mobile device" is used herein to refer to any one or all of cellular telephones, smartphones (e.g., iPhone®), web-pads, tablet computers, Internet enabled cellular telephones, WiFi enabled electronic devices, personal data assistants (PDA's), laptop computers, personal computers, and similar electronic devices equipped with a short-range radio (e.g., a Bluetooth® radio, a Peanut® radio, a WiFi radio, etc.) and/or a wide area network connection (e.g., an LTE, 3G or 4G wireless wide area network transceiver or a wired connection to the Internet). Reference to a particular type of computing device as being a mobile device is not intended to limit the scope of the claims unless a particular type of mobile device is recited in the claims.

The term "broadcast message" is used herein to refer to short-range wireless broadcast signals broadcast by wireless identity transmitters (defined below) that may include identifiers associated with the wireless identity transmitters and/or their users. Such identifiers may be periodically changed and encrypted, encoded, or otherwise obscured (i.e., rolling identifiers). In various embodiments, broadcast messages may include other identifying information, such as Bluetooth® media access control (MAC) addresses and nonces or counters, which may also be encrypted. Additionally, broadcast messages may include metadata and other data, such as characteristics of the transmitting wireless identity transmitter (e.g., device type), sensor data, and/or commands or other instructions. In various embodiments, broadcast messages may be transmitted via a wireless communication protocol, such as Bluetooth® Low Energy, WiFi, WiFi Direct, Zigbee®, Peanut®, and other RF protocol. In various embodiments, because of the high unreliability of certain short-range transmission channels, broadcast messages may be single packet transmissions limited to a certain size (e.g., 80 bits, 10 bytes, 20 bytes, etc.). For example, the payload of an embodiment broadcast message may be 80 total bits, including 4 bits that indicate battery status information and 76 bits that indicate a rolling identifier. As another example, an embodiment broadcast message may include 20 bits representing a nonce or counter and 60 bits representing a rolling identifier, such as generated with a pseudo-random function or encryption algorithm.

The term "wireless identity transmitter" is used herein to refer to a compact device configured to periodically transmit broadcast messages via short-range wireless transmitters. Wireless identity transmitters may be mobile, such as when carried or affixed to mobile persons or items, or alternatively may be stationary, such as when installed within buildings. Wireless identity transmitters may store and be associated with a unique device identifier (i.e., a "deviceID"), such as a factory ID. In an embodiment, the unique device identifier may be a code 56-bits in length. In various embodiments, for security purposes, this unique device identifier, along with other data (e.g., nonce or counter values), may be encoded, encrypted, or otherwise obfuscated when included within broadcast messages as a "rolling identifier." Wireless identity transmitters may be configured to maintain time (e.g., UTC) information, such as by using a 30 ppm 16 kHz crystal oscillator as a clock. Such time-keeping capabilities may or may not be highly accurate depending on the particular components and requirements of a given wireless identity transmitter. In an embodiment, the wireless identity transmitter may be within or a mobile device, or alternatively, operations may be performed by a mobile device that are similar to the operations of the wireless identity transmitter. For example, a smartphone may execute software that configures that smartphone to utilize its Bluetooth® radio to transmit broadcast messages that include a secured, unique identifier. Wireless identity transmitters are described in more detail below with reference to FIG. 33. In various figures and diagrams of this disclosure, wireless identity transmitters may be referred to as "WIT" or "WITs".

The term "proximity broadcast receiver" is used herein to refer to devices that are configured to receive broadcast messages, such as transmitted by wireless identity transmitters. In various embodiments, proximity broadcast receivers may be stationary devices (or "stationary proximity broadcast receivers") permanently positioned throughout places (e.g., buildings, retail stores, etc.) or alternatively may be mobile devices configured to operate as proximity broadcast receivers (or "mobile proximity broadcast receivers"). For example, a smartphone may be configured to receive broadcast messages and operate as a mobile proximity broadcast receiver. In various embodiments, proximity broadcast receivers (e.g., smartphone mobile proximity broadcast receivers, etc.), may be configured with applications that users may download or that may be incorporated in the device by their manufacturers. By configuring many mobile devices with such an application, a wide spread network of proximity broadcast receivers may be deployed for little or no cost, taking advantage of the popularity of smartphones. Further, stationary proximity broadcast receivers may be deployed in various places, such as throughout retail stores, to supplement the network of smartphones. For example, proximity broadcast receivers may be located coincident to, within, or otherwise within proximity of predefined areas within a place, such as merchandise displays in a retail store. Reference to a particular type of computing device as being a proximity broadcast receiver is not intended to limit the scope of the claims unless a particular type of device is recited in the claims. Further, unless otherwise indicated, references to proximity broadcast receivers throughout this disclosure are not intended to limit any method or system to a particular type of proximity broadcast receiver device (e.g., wireless or stationary). Proximity broadcast receivers are described in more detail below. In various figures and diagrams of this disclosure, proximity broadcast receivers may be referred to as "PBR" or "PBRs," and mobile proximity broadcast receivers are referred to in the figures as "MPBR" or "MPBRs."

The terms "identity transceiver" and "wireless identity transceiver" are used herein to refer to devices that are configured to receive and transmit broadcast messages. In other words, an identity transceiver may function as both a proximity broadcast receiver and an identity transmitter. For example, a smartphone may be configured to broadcast short-range signals that include its unique identifier as well as receive broadcast messages from wireless identity transmitters within proximity. Throughout this disclosure, various operations may be described as being distinctly performed by either a wireless identity transmitter or a proximity broadcast receiver, however, those skilled in the art should appreciate that a device configured to operate as an identity transceiver may be configured to perform any or all of the same operations and thus may be interchangeable with references to either a wireless identity transmitter or a proximity broadcast receiver.

The term "sighting message" is used herein to refer to reports, signals, and/or messages sent by proximity broadcast receivers to a central server in response to receiving broadcast messages from wireless identity transmitters. Sighting messages may be transmissions that include part or all of the information encoded in received broadcast messages, including any obscured or encrypted information, such as identifiers of wireless identity transmitters. Additionally, sighting messages may include metadata and other information (or "associated data"), such as the sending proximity broadcast receivers' identification information (e.g., device ID, third-party affiliations, etc.), whether the proximity broadcast receiver paired with a wireless identity transmitter, transmissions context information (e.g., a code indicating the sighting message is related to an alert or a registered service), information regarding software or applications executing on proximity broadcast receivers (e.g., app IDs), location information, proximity information with respect to known areas within a place, and timestamp data. In an embodiment, sighting messages may also include authentication information (e.g., secret keys, passes, special codes, digital certificates, etc.) that may be used by a central server to confirm the identification (or identification information) of proximity broadcast receivers transmitting the sighting messages. For example, a sighting message may include a code from a hash function that can be decoded by the central server to ensure the sending proximity broadcast receiver is associated with a particular registered service. In various embodiments, sighting messages may be sent immediately after receipt of broadcasts (e.g., when related to an alert), buffered, or scheduled along with other scheduled transmissions.

The terms "permissions" and "permissions settings" are used herein to refer to information that indicates the conditions under which users registered with a central server authorize the central server to share their identification information (e.g., their identities, information about their devices, etc.) or other related user data with various parties, such as merchants, retailers, and other parties associated (or registered) with the central server. Permissions may be set, provided, or otherwise indicated by customers when they register a wireless identity transmitter and/or mobile proximity broadcast receiver with the central server. The central server may check stored permissions related to users as well as profile information related to other parties to determine whether messages that share the user's data are authorized by the user. For example, the central server may compare a characteristic or attribute in a first stored profile with a permission in a second profile to determine whether to share a uniform resource identifier (URI) associated with the second profile (or a device indicated by the second profile) with a device associated with the first profile. In other words, the central server may only transmit a message with identification information or other sensitive information from a stored profile of a registered user if the user has provided permissions that allow such a message.

The term "registered service" may be used herein to refer to a user, party, or service that is registered, authenticated, valid, or otherwise known to a central server and that may be related with sighting messages. For example, registered services may include merchants, retailers, services, stores (e.g., big-box retailers, local coffee shops, etc.), and various other third-parties that are registered with the central server. As another example, a registered service may correspond to a developer user that has registered proximity broadcast receivers with the central server. In some embodiments, registered services may also include known routines, actions, or services managed by the central server, such as particular searches or active alerts, or alternatively applications that may be executing on a mobile device (e.g., a third-party app). In some embodiments, registered users (e.g., users) employing mobile proximity broadcast receivers that transmit sighting messages in response to receiving broadcast messages from others' wireless identity transmitters (e.g., a merchant's stationary identity transmitter positioned within a retail store) may also be considered registered services by the central server.

The various embodiments may utilize a system that includes one or more wireless identity transmitters, one or more proximity broadcast receivers, and a central server. As described above, a wireless identity transmitter may be a compact device configured to transmit a packet with a secured identification code (i.e., a rolling identifier) in a format that can be received by any proximity broadcast receiver within range of the short-range wireless broadcast. Since the wireless identity transmitter relies on relatively short-range wireless signaling (e.g., short-range radio signals, Peanut®, Zigbee®, RF, WiFi, Bluetooth® Low Energy signals, light signals, sound signals, etc.) to transmit broadcast messages that include its identifier, only proximity broadcast receivers within proximity of the transmitter may receive such broadcast messages. Thus, a proximity broadcast receiver's own location may provide an approximate location for the wireless identity transmitter at the time of receipt of a broadcast message. Wireless identity transmitters may be deployed by various parties registered with the central server, such as individual users, government agencies, merchants, retailers, stores, etc. In an embodiment, the broadcast range of wireless identity transmitters may be from three or less to one hundred feet while within a building, such as a retail store.

Each proximity broadcast receiver receiving a broadcast message from the wireless identity transmitter may pass information to a central server for processing, such as by transmitting sighting messages including the rolling identifier of the wireless identity transmitter. Sighting messages transmitted by proximity broadcast receivers to the central server may include part or all of the information encoded in received broadcast messages from proximate wireless identity transmitters, including any rolling, obscured, or encrypted information related to the wireless identity transmitters. Sighting messages may include metadata, header information, or other encodings to indicate various reported data. For example, a sighting message may contain metadata that includes a code for a particular registered user, and may therefore indicate that the sighting message was transmitted by a proximity broadcast receiver within a place associated with the registered user. As another example, a sighting message may contain metadata that includes a code indicating a user's smartphone and therefore the proximity broadcast receiver may be a mobile proximity broadcast receiver belonging to the user. In an alternative embodiment, intermediate devices, such as a local router, server, or other computing device, may receive sighting messages from proximity broadcast receivers and may in turn pass each sighting message to the central server.

Upon receipt of sighting messages, the central server may decode, decrypt, or otherwise access obscured information (e.g., rolling identifiers) within the sighting messages. For example, the central server may decode a broadcast message within a sighting message and identify the user associated with the broadcast message using data stored within a registration database. Based on the location of a proximity broadcast receiver that transmitted a sighting message, the central server may determine the proximity of the related broadcast message, or the approximate proximity. For example, since a stationary proximity broadcast receiver that transmits a sighting message is within proximity of a user's wireless identity transmitter at the time of receiving a broadcast message, the central server may determine the user's wireless identity transmitter is within several feet of the GPS coordinates indicated in the proximity broadcast receiver's sighting message or known to the central server in the case of fixed proximity broadcast receivers. The central server may be configured to perform various operations in response to receiving and processing sighting messages. For example, the central server may transmit return messages to various devices associated with users of proximity broadcast receivers, such as desktops, laptops, smartphones, tablets, etc.

Utilizing the above described framework, various embodiments provide systems, devices, non-transitory processor-readable storage media, and methods for proximity broadcast receivers to provision devices associated with wireless identity transmitters. In various embodiments, a wireless identity transmitter may be coupled to, included within, integrated into, and/or otherwise associated with a device (herein referred to as a "target device"). The target device may be an appliance, a WiFi router, or other similar devices that may be provisioned for use by a user. For example, a Wi-Fi router may include a processor and other components configured to perform operations of a wireless identity transmit in addition to other operations related to Wi-Fi networking. As another example, the wireless identity transmit may be attached to the housing of a refrigerator.

A nearby mobile proximity broadcast receiver (e.g., a smartphone configured to operate as a mobile proximity broadcast receiver, etc.) may receive a rolling identifier or other secure code in a signal broadcast by the wireless identity transmitter. The proximity broadcast receiver may transmit a sighting message including the identifier from the received broadcast signal and other data (e.g., location info, receiver ID, etc.) to a central server, such as via a cellular connection or WiFi network.

In response to receiving the sighting message, the central server may decode the relayed identifier (which may be a rolling identifier as describe below) from the sighting message to identify the wireless identity transmitter, and may identify the proximity broadcast receiver based on data in the sighting message, such as identifying information within a header portion of the message, etc. The central server may match or otherwise associated identifiers of the devices with stored profiles of registered parties. For example, the central server may be configured to determine that the proximity broadcast receiver is related to a first registered user, service, or party (e.g., a retail store, etc.) and that the wireless identity transmitter is related to another registered user, service, or party (e.g., a homeowner user). The target device may be indicated in the stored information associated with the identified wireless identity transmitter. For example, a profile may indicate that the target device (e.g., a router) is owned by the owner of the wireless identity transmitter.

As a further illustration, a mobile proximity broadcast receiver (e.g., a smartphone configured to operate as a proximity broadcast receiver) carried by a user visiting a friend may receive a broadcast message with a rolling identifier from a wireless identity transmitter positioned on top of or included within an appliance within the friend's house, and as a result, may transmit a sighting message to a central server. Upon receiving the sighting message, the central server may determine that the wireless identity transmitter belongs to the friend based on a stored profile that corresponds to the rolling identifier and that the mobile proximity broadcast receiver is associated with the user's stored profile based on an identifier of the proximity broadcast receiver included within metadata in the sighting message. Based on the stored profile that associated with the rolling identifier, the central server may further identify that the appliance is associated with the wireless identity transmitter (e.g., both are owned by the friend).

Based on the identifications of the proximity broadcast receiver and the wireless identity transmitter associated with the target device, the central server may perform look-ups on stored data (e.g., profile information) to determine whether there are any capabilities of the target device that are relevant to the proximity broadcast receiver. In particular, the central server may identify functionalities (e.g., applications, configurations, etc.) that may be required in order for the proximity broadcast receiver to provision or otherwise access the target device. For example, the central server may identify an application (also referred to as "application discovery") that the proximity broadcast receiver may need to download in order to access the target device. The central server may also perform look-ups on the stored data to identify any user-based authorizations, permissions, or rules controlling information to the proximity broadcast receiver and/or access to the target device. Such permissions (e.g., lists of identifiers of approved or known smartphones) may ensure anonymity and control over the target device by defining the particular device manufacture or platform types, user identities, classes, and/or persons that are eligible to access the target device.

When the proximity broadcast receiver (or its identity) is authorized to receive information according to the stored information, the central server may transmit a return message that includes the information authorized to be shared with the proximity broadcast receiver. In various embodiments, the return message may include a link (or URI) for downloading software (e.g., an application or "app") for accessing the target device. Such information may be based on the platform and/or other capabilities of the proximity broadcast receiver, such as its operating system or hardware specifications. For example, the return message may include a URI to a download at an app store for Android or iOS applications.

Further, based on stored authorizations or rules, the central server may transmit credentials (e.g., passwords, etc.) for the proximity broadcast receiver to access the target device, such as via related apps. Credentials may be time-based (e.g., expire after certain amount of time), proximity-based (e.g., expire when proximity broadcast receiver is out of range), access count-based (e.g., expire after number of accesses), and/or permanent (e.g., only expire when revoked). For example, credentials may be provided such that access to the target device is automatically withdrawn after a certain amount of time and/or in response to the proximity broadcast receiver leaving a geofence around a predefined area (e.g., outside of a house). In various embodiments, credentials may be revoked locally on the target device, by a command from an owner's computing device (e.g., smartphone), and/or by the central server via messages over the Internet when the target device is connected to the Internet. In some embodiments, authorizations may grant access credentials to a group of people or devices, such as all of the people and/or smartphones indicated in a contact list (e.g., an address book on a smartphone, etc.).

In various embodiments, the central server may also transmit data to the proximity broadcast receiver that in turn may be passed along or otherwise used to manipulate the target device without requiring much user interaction, such as configuration data or updated information to be installed on the device. For example, the configuration data may include a firmware update, a script, or other useful data for the operations of the target device. In this way, proximity broadcast receivers may be used as proxies of the central server, transmitting data to devices that are not otherwise capable of communicating with the central server.

As an illustration, a houseguest's smartphone may receive a broadcast from a proximity identity transmitter within a nearby thermostat and relay an identifier within the broadcast to a central server in a siting message. The server receiving the sighting message may determine that a stored profile associated with the transmitters identifier indicates the houseguest is authorized to have limited access to the thermostat. In response, the central server may transmit to the smartphone a URI for downloading an app for controlling the thermostat. The smartphone may display a prompt asking the houseguest whether he/she would like to install the app. In response to the houseguest agreeing, the smartphone may automatically download the app using the URI and install the app. As part of this process, the smartphone may automatically and securely configure itself to use relevant information from the server with the app, such as Wi-Fi network credentials, user account information, language and usability preferences, etc. so that it can control the thermostat. For example, after the app is installed and launched, the smartphone may utilize credentials for allowing temperature display and limited temperature adjustment over a local area network (LAN). As another example, after the app is installed and launched, the smartphone may utilize credentials for allowing temperature adjustments, such as by activating a cooling routine. The central server may also send configuration data to the thermostat via the smartphone, such as an encrypted payload (e.g., a binary, a script, a configuration routine, etc.).

As another illustration, a homeowner's smartphone may relay a broadcast from a newly purchased WiFi router and perform authentication steps via an app downloaded based on a URI sent by the server. The WiFi router may send credential information to the server via the smartphone, which in return may send back the homeowner's pre-stored WiFi configuration data (e.g., device Name, SSID, Passwords, DNS settings, IP settings, etc.). In response to receiving a sighting message from a guest's smartphone, the server may determine the smartphone is authorized to access the LAN and/or particular devices on the LAN based on stored profile data. The server may then transmit credentials for accessing the LAN to the smartphone.

The central server may authenticate the identity of the proximity broadcast receiver based on data within sighting messages, such as a device identifier that matches an identity stored within a profile on the central server. However, the user of the proximity broadcast receiver may also need to be authenticated before identification information may be released to the proximity broadcast receiver, as various users may take possession of the device. Therefore, in various embodiments, a two-factor authentication technique may be provided to authenticate the user of the proximity broadcast receiver by transmitting an authentication message prior to delivering otherwise authorized identification information to the proximity broadcast receiver. For example, in response to the central server determining that the proximity broadcast receiver is known (i.e., indicated in a user profile), the central server may transmit a prompt for the current user of the proximity broadcast receiver to enter a personal identification number (PIN) or touch a fingerprint sensor to confirm his/her identity prior to receiving credentials for automatically logging into a nearby WiFi router.

In various embodiments, the central server may be configured to generate various useful data, such as analytics, statistics, trends, and other measurements, based on received sighting messages. For example, based on received sighting messages from a smartphone mobile proximity broadcast receiver, the central server may track the proximity of the smartphone (and thus its user) to a target device (e.g., an appliance) over time and build analytics on the frequency and length of proximity to that target device. Such useful data may be used to determine who uses a target device more frequently and how often the target device might be used, similar to how cookies are used within browser applications on computing devices. Further, such useful data may be valuable to third-parties, such as retailers or other consumer-related companies, as the data may be used to improve user experiences. For example, if the useful data indicates that a user owns a certain brand of smartphone and is near another device of the same brand, the central server may transmit messages that indicate to users that the devices of the same brand may use similar software and/or may be used in combination, etc.

In various embodiments, the proximity broadcast receiver may be configured to display functionalities (e.g., software, apps, etc.) that are related to target devices within proximity at a given time. For example, a proximity broadcast receiver may render a display of all the applications (or apps) that may be loaded or launched to access target devices determined to be nearby based on received broadcast messages. Such displayed functionalities may provide an improved experience for users, as there may be a large number of applications the proximity broadcast receiver may have provisioned over time, and only presenting the applications for nearby target devices may reduce the amount of time it might take a user to access target devices that are nearby at a given time.

In some embodiments, the central server may transmit an authorization message to a device associated with an owner of the target device, requesting the owner's approval to transmit credentials to the proximity broadcast receiver. For example, in response to a houseguest clicking on a Wi-Fi network listed on his smartphone, a dialog box may be rendered on a homeowner's tablet that prompts the homeowner to click 'yes' to automatically provide the houseguest's smartphone the appropriate credentials for logging onto the Wi-Fi network.

As an illustration, a house may include a WiFi access point (e.g., a router) that is coupled to or includes a wireless identity transmitter. A houseguest may bring her Android smartphone into broadcast range of the access point and receive a broadcast message. The smartphone may relay the identifier included in the broadcast message to a central server as a sighting message via a cellular network connection. Such a sighting message may also include various information about the smartphone (e.g., device ID, owner name, etc.), as well as a current location (e.g., GPS coordinates, etc.). The central server may determine that based on the sighting message, the smartphone is within the house and within proximity of the access point, and based on stored profile data related to both the access point and the smartphone, the central server may determine the smartphone is authorized to receive a URI for an application from an Android app store for accessing the access point. The central server may transmit the URI to the smartphone. Upon receipt of the URI, the smartphone may prompt the houseguest to install the app, and after installation, may automatically launch the app. The smartphone may be configured to automatically request such credentials from the central server or alternatively may prompt the houseguest to request access credentials for the access point. The central server may receive the request, and in response, may transmit to a tablet device used by the owner of the house an authorization request for the houseguest's smartphone to be able to access the access point. The tablet device may prompt the owner of the house to allow or deny authorization for the houseguest's smartphone. Such authorization may be for various types of access credentials, such as time-based (e.g., expire after a predetermined period of time, etc.), location-based, permanent, access-based, etc. In response to receiving the authorization (or authorization approval) from the owner's tablet device, the central server may transmit to the houseguest's smartphone credentials to allow access to the local area network and the Internet via the access point, where the credentials may be set to expire based on a time-out, when the smartphone is out-of-range, and/or when a predefined number of accesses of the access point by the smartphone have been exceeded.

The various embodiments provide unique techniques for providing sensitive information for provisioning and otherwise accessing target devices based on proximity and context awareness of devices. As the techniques utilize a central server that evaluates predefined information (e.g., stored profiles of registered users) to identify any authorized data to be distributed in response to receiving relayed messages, proximity broadcast receivers may receive individualized credentials and/or instructions for acquiring appropriate software based on their (or their users') predefined characteristics and relationships. In other words, each user and/or proximity broadcast receiver may receive different information from the central server in response to relaying a secure identifier from a wireless identity transmitter, thus enabling different apps, access privileges, and experiences to be achieved. For example, a houseguest may receive temporary access privileges to a WiFi router in a house; however, the owner of the house may receive full, administrator access privileges to the WiFi router. As another example, regardless of receiving broadcast messages from a nearby appliance in a first apartment unit, a stranger in an adjoining second apartment unit may not be directed to download an app for controlling the appliance.

In various embodiments, a wireless identity transmitter may be configured to periodically generate new identification data (referred to as a rolling identifier) that may be decoded by a central server to reveal the unique device identifier and other identifying information of the wireless identity transmitter. For example, a wireless identity transmitter may be configured to periodically broadcast a Bluetooth® packet including an encoded version of the wireless identity transmitter's device identifier (i.e., deviceID). Such encryption of identifiers indicated in broadcast messages may be required to enable the central server to reliably identify the wireless identity transmitter that sent the broadcast message while forcing a third-party (e.g., passive attacker) to determine the origin of the broadcast message by guessing. For example, if the identifier was static, the third party could sniff the identifier, such as by impersonating a proximity broadcast receiver, and then use the identifier to track the wireless identity transmitter. Rolling identifiers may make such an attack impossible if the third party lacks the means of generating the encrypted identifiers.

Since a single packet broadcast message may not support a payload that can fit a cipher text of a conventional asymmetric key encryption, standard private/public key pair encryption may not be useable in the various embodiments. Additionally, wireless identity transmitters are generally broadcast-only devices, so there is no back channel that is typically required in conventional encryption schemes. Therefore, the central server in various embodiments may process encrypted message payloads by pre-provisioning a shared secret key unique to each wireless identity transmitter. Such secret keys may be associated with each wireless identity transmitter's unique device identifier at the central server and may be used to decode data (e.g., identifiers) encoded by the each wireless identity transmitter.

Performing an embodiment method, a wireless identity transmitter may use a streaming-like encryption algorithm (e.g., AES-CTR) to encrypt its device identifier, shared secret key, and a nonce or counter, broadcasting a payload that includes the encrypted data with and the nonce or counter in the clear. Performing another embodiment method, a wireless identity transmitter may use a pseudo-random function to encrypt the device identifier, shared secret key, and a nonce or counter, broadcasting a payload that includes the encrypted data without the nonce or counter in the clear. Performing another embodiment method, a wireless identity transmitter may use a combination of a streaming-like encryption and pseudo-random function encryption to generate a payload to broadcast. In an embodiment, the wireless identity transmitter and the central server may each have a cryptographically secure pseudo-random number generator or algorithm that is used to generate identifiers on a common time scale so that any given moment, the central server can calculate the identifier being transmitted by a particular wireless identity transmitter.

In various embodiments, the wireless identity transmitter may maintain a nonce or counter (or clock data) that periodically increments to represent the passage of time and that may be used in various encryption methods. When the wireless identity transmitter is powered on (or the battery is replaced), the nonce or counter may be set to a known initial value, such as 0. As the wireless identity transmitter functions, the nonce or counter may increase periodically (e.g., increment by one every several seconds/minutes/hours). If the wireless identity transmitter encounters inconsistent power (e.g., the battery is taken out or replaced), the nonce or counter may reset. Using such a nonce or counter, a wireless identity transmitter may be configured to periodically broadcast messages with encrypted payloads that include changing and encrypted device identification. In an embodiment, an encrypted payload may contain a concatenation of the device's unique identifier (i.e., the deviceID) and a current nonce or counter value for that wireless identity transmitter. In an embodiment, the wireless identity transmitter may encrypt the concatenated data using a secret key. Payloads may be broadcast at varying frequencies and may be received by proximity broadcast receivers or a central server for processing.

In an embodiment, the central server may be configured to identify wireless identity transmitters by matching received encrypted payloads with pre-generated payloads (or model payloads) corresponding to registered wireless identity transmitters. Based on information obtained during registration operations between the central server and wireless identity transmitters, the central server may store unique information about each wireless identity transmitter. For example, the central server may know the secret key, device identifier (or deviceID), and initial nonce or counter value of a wireless identity transmitter based on registration communications. Using such stored information, the central server may generate a series of model payloads that the wireless identity transmitter is expected (or likely) to broadcast within a time period, such as a 24-hour period. If the central server receives a payload that matches any of these model payloads, the central server may determine the identity of the originating wireless identity transmitter, as well as a loosely-accurate nonce or counter value within the wireless identity transmitter. Model payloads may be generated based off of a current, synched nonce or counter for each registered wireless identity transmitter (i.e., current model payloads). In an embodiment, the central server may also adjust for wireless identity transmitter clock skew by keeping a window of model payloads. For example, the central server may generate payloads using nonce or counter values representing times before and after an expected nonce or counter. The central server may also determine the period of the wireless identity transmitter clock by monitoring the change in the received payloads over time. In an embodiment, the central server may track changes of the reported nonce or counter values of a wireless identity transmitter and may report how inaccurate a device clock is for a particular period of time.

Model payloads may also be generated based off of initial nonce or counter values reported by each registered wireless identity transmitter during registration operations (i.e., initial model payloads). When a wireless identity transmitter is powered off and on again (e.g., rest, battery replaced, etc.), the wireless identity transmitter may reset to the original or initial nonce or counter value. If an encrypted payload received at the central server does not match any current model payload, the central server may compare the received encrypted payload to stored initial model payloads. When the central server finds an initial model payload matches the received encrypted payload (e.g., the wireless identity transmitter was reset), the central server may update a database to indicate the corresponding wireless identity transmitter's nonce or counter was reset, thus resynchronizing with the reset wireless identity transmitter's clock.

In a situation in which a wireless identity transmitter pauses for a period of time but does not reset its nonce or counter used for generating encrypted payloads, payloads subsequently generated by the wireless identity transmitter may not match expected payloads stored in the central server (e.g., current model payloads and initial model payloads). To address this situation, the central server may determine that a pause occurred when model payloads and/or nonce or counter values do not match a received encrypted payload. The central server may identify the wireless identity transmitter by performing a brute-force search of all known and/or registered wireless identity transmitters represented in a database and decode the received encrypted payload based on recorded secret keys and device identifications. In an embodiment, the brute-force search may include only wireless identity transmitters that have not broadcast payloads recently received by the central server.

For the purposes of this disclosure, the various embodiment methods for decoding, decrypting, and otherwise accessing obscured identification information (e.g., rolling identifiers) are described as being performed by a central server to associate such information with registered users and/or registered devices. However, those skilled in the art should appreciate that any computing device with authorization may be configured to perform such operations to decipher obscured identification information broadcast by wireless identity transmitters. For example, a mobile proximity broadcast receiver (e.g., a smartphone) employed by a user may utilize the various methods for decrypting, decoding, and otherwise accessing rolling identifiers that are associated with wireless identity transmitters also owned by that user.

Additional precautions may be important to protect against security breaches, such as hacker attacks against databases associated with a central server, as well as to provide registered users (e.g., merchants, parents, children, etc.) peace of mind and confidence their privacy may be fully protected. Such privacy safeguards may be provided to parties registered with embodiment systems by storing identifying information (e.g., names, addresses, financial information, medical information, etc.) separately from other information related to tracking devices and/or proximity information of users. In particular, to avoid unintended leaking of personal information of registered merchants, customers, children, or individuals, embodiment systems may utilize "double-blind" architectures. For example, such a double-blind architecture may use a first unit (e.g., a server, database, or other computing hub) that stores and has access to information related to the proximity information or other location-based data of registered users' devices (e.g., wireless identity transmitters, proximity broadcast receivers, identity transceivers, mobile devices, etc.). In other words, the first unit may access information associated with sighting messages that indicate approximate locations/proximities of various users' devices. However, the first unit may not store uniquely identifying personal information, such as user names, addresses, and/or social security numbers. Instead, a second unit may store the identifying personal information without being configured to access any location/proximity information as used by the first unit. The first and second units may use anonymous identifiers that connect data stored within the two units without indicating the protected information stored in either unit. In an embodiment, the first and second units may be maintained by separate entities (e.g., service providers), and further, at least one of such entities may be trusted by registered users who provide identifying information.

The various embodiments may leverage a large infrastructure of mobile devices already in place. Many modern mobile devices, such as smartphones, are already equipped with multiple radios, including short-range radios such as Bluetooth® radios, and therefore may be configured to perform as mobile proximity broadcast receivers and receive identification codes from a proximate wireless identity transmitter. For example, a customer carrying a smartphone configured to operate as a mobile proximity broadcast receiver (or mobile identity transceiver) may receive broadcast messages from wireless identity transmitters within a retail store. Mobile devices are also often equipped with a clock that may provide a current time and a GPS receiver that may provide a current location whenever a wireless identity transmitter identifier is received. The mobile devices may communicate these identification codes, times, and locations via sighting messages to central servers through longer range network connections, such as a cellular radio connection. Thus, many of the large number of mobile devices already in use or soon to be in use may be incorporated as mobile proximity broadcast receivers to extend the reach of various embodiment systems.

By relying on the long range radios and other services of proximity broadcast receivers to report the location and time of received broadcast message (or "sightings") to a central server, wireless identity transmitters can be relatively small, inexpensive, and simple devices, including little more than a short-range radio, such as a Bluetooth® LE transceiver, and a battery. In various embodiments, wireless identity transmitters may also include additional short-range radios, such as Peanut® radios. In various embodiments, the wireless identity transmitters may not include a user interface, multiple radios, global positioning system (GPS) receiver, or other features common on mobile devices. Embodiment wireless identity transmitters may also consume very little power allowing them to be deployed without needing to be frequently recharged or replaced. These characteristics make them ideal for a wide variety of uses and implementation in a variety of physical configurations. For example, wireless identity transmitters may be easily hidden or incorporated into many different personal objects, such as buttons, watches, shoes, briefcases, backpacks, ID badges, clothing, product packaging, etc.

In further embodiments, wireless identity transmitters and proximity broadcast receivers may be configured to exchange transmissions using various wireless technologies, such as LTE-D, peer-to-peer LTE-D, WiFi, and WiFi Direct. In an embodiment, wireless identity transmitters may be configured to broadcast messages via a WiFi radio such that proximity broadcast receivers with WiFi transceivers may receive the broadcast messages. In such embodiments, wireless identity transmitters may utilize WiFi transmissions to broadcast identification information similar to WiFi access point broadcasts advertisements. For example, a wireless identity transmitter including a WiFi radio may be configured to transmit broadcast messages via WiFi transmissions with low power so that the reception range is limited, thereby providing a short-range radio signal with a range similar to that of Bluetooth® LE transmissions. In utilizing various wireless broadcast technologies and communication protocols with wireless identity transmitters, proximity broadcast receivers with limited capabilities may still be capable of receiving and processing broadcast messages from wireless identity transmitters. For example, a smartphone configured to operate as a mobile proximity broadcast receiver and including a WiFi transceiver but not a Bluetooth® LE radio may receive and process broadcast messages from a wireless identity transmitter configured to broadcast short-range signals with a WiFi radio. In an embodiment, wireless identity transmitters may broadcast over multiple radios, such as a Bluetooth® LE transceiver and a low-power WiFi transceiver, in order to enable more models of proximity broadcast receivers (e.g., more types of smartphones) to receive and relay sightings.

Wireless identity transmitters and proximity broadcast receivers are described throughout this disclosure as exchanging short-range wireless signals that include short-range RF signals, such as Bluetooth®, Bluetooth® Low Energy, Peanut, Zigbee, etc. However, such short-range wireless signals are not limited to short-range RF signals, and wireless identity transmitters may broadcast messages using other forms of wireless signaling, such as infrared light, visible light, vibration, heat, inaudible sound, and audible sound, as well as combinations of radio frequency (RF) signals and non-RF signals. For example, wireless identity transmitters may emit heat signals, such as infrared light, using infrared light-emitting diodes or other components capable of emitting infrared radiation. Additionally, wireless identity transmitters may emit vibration signals using vibration motors and other mechanical components capable of generating controlled vibrations. Wireless identity transmitters may also emit light signals from a number of common emitters, such as light emitting diodes, incandescent lights and projectors. Light signals may be received by light sensors (e.g., cameras) on proximity broadcast receivers, and may include visuals, such as lights, colors, and imagery (e.g., photos, projections, videos, symbols, etc.). Wireless identity transmitters may also or alternatively emit audible or inaudible (i.e., infrasonic or ultrasonic) sound signals from a speaker (e.g., a piezoelectric speaker). Sound signals may be received by a microphone of the proximity broadcast receivers, and may include a variety of sounds, such as beeps, voices, noise, clicks, ultrasounds, tones, and musical notes.

Wireless identity transmitters may be configured to broadcast the various short-range wireless signals in particular sequences, patterns, manners, durations, or manifestations such that proximity broadcast receivers may convert the signals into data in a manner similar to how RF signals (e.g., Bluetooth® LE signals) are interpreted in embodiments described herein. For example, a wireless identity transmitter may broadcast particular sequences of modulating visible or sound signals, such as strings of differing musical notes, changing images, or flashing lights that a proximity broadcast receiver may receive and convert into data that includes an identity of the wireless identity transmitter. In an embodiment, proximity broadcast receivers may convert such wireless signals into data (and vice versa) based on matching sequences of signals with patterns within predefined protocols. As an illustrative example, a wireless identity transmitter affixed to the outside of a child's clothing may periodically emit a sequence of flashes using an embedded light source (e.g., an LED bulb) that may be received, converted to data, and relayed by a proximity broadcast receiver to a central server for determining identification information related to the child. As another example, a wireless identity transmitter within a business establishment may be mounted on the ceiling and may periodically emit a sequence of flashes using an embedded light source that may be received, converted to data, and relayed by a proximity broadcast receiver to a central server to obtain coupons, announcements or customer-incentives tied to the customer being on the premises.

The various embodiments are described within this disclosure as including communication systems for providing intermediary communications between wireless identity transmitters, proximity broadcast receivers (e.g., mobile proximity broadcast receivers and stationary proximity broadcast receivers) and a central server that utilize short-range messaging (such as with Bluetooth® LE signaling) that enables proximity detection based simply on signal reception. However, the various embodiments are not limited to the described communication systems and methods, and other communication systems, protocols, devices, methods and messaging protocols may be used to convey information to a central server to enable identifying when customers are within proximity of predefined areas to enable the central server to distribute relevant marketing information without disclosing identities of customers. For example, transceivers in a retail store may be configured to monitor for WiFi, Zigbee®, Bluetooth®, Peanut®, and/or other radio frequency signaling from customers' mobile devices or wireless broadcasting devices within proximity of predefined areas, and relay proximity information to a central server that delivers coupons to customers. Further, embodiments may not require determining exact locations for wireless identity transmitters and/or proximity broadcast receivers but instead may determine approximate and/or relative locations of devices between each other. Accordingly, references to determining location and/or distance throughout the disclosure may be for the purpose of determining proximity between signaling devices.

FIG. 1 illustrates an exemplary system 100 that may be used in various embodiments. In general, a central server 120 may be configured to receive, store, and otherwise process data corresponding to wireless identity transmitters 110. The central server 120 may be configured to exchange communications with various devices via the Internet 103, such as proximity broadcast receivers 142, mobile proximity broadcast receivers 138, third-party systems 101, and other support systems and/or services 102. The wireless identity transmitters 110 may broadcast messages that may be received by nearby proximity broadcast receivers 142 and/or the mobile proximity broadcast receivers 138 via short-range wireless signals. The proximity broadcast receivers 142, 138 may utilize long-range communications to relay received broadcast messages as sighting messages to the central server 120 via the Internet 103. For example, the proximity broadcast receivers 142 and mobile proximity broadcast receivers may utilize a cellular network 121 to transmit sighting messages to the central server 120. The third-party systems 101 may include merchant servers, retail store computing devices, computing devices associated with emergency services. The other support systems and/or services 102 may include computing devices associated with various technologies, such as computing devices utilized by users to provide registration information, systems that deliver user-relevant content (e.g., Qualcomm Gimbal™), and services that provide location-specific information (e.g., Qualcomm IZat™)

The central server 120 may include several components 104-109 to perform various operations to process data, such as received from proximity broadcast receivers 142, 138, third-party systems 101, or other support systems and/or services 102. In particular, the central server 120 may include a data warehouse component 104 that may store long-term data (e.g., archived user data, past location information, etc.). The central server 120 may also include an operations, administration and management (or OA&M) component 105 that may manage, process and/or store software associated with user portal accesses, scripts, tools (e.g., software utilities, routines, etc.), and any other elements for administering the central server 120. The central server 120 may also include a developer portal component 106 that may store developer account data and perform registration, account management, and alert (or notice) management routines associated with developers, such as vendors or merchants that register to interact with users of wireless identity transmitters 110. The central server 120 may also include a rolling identifier (or ID) resolver component 107 that may store factory keys associated with wireless identity transmitters 110 as well as perform operations, software, or routines to match encrypted, encoded, rolling, or otherwise obfuscated identification information within received sighting messages with affiliated user data. The central server 120 may also include a user portal component 109 that may store user account data and perform registration, account management, and search routines associated with users, such as persons associated with wireless identity transmitters 110. The central server 120 may also include a core component 108 that may process sighting messages, execute an alert or notice engine module, handle application programming interface (API) commands, and exchange data with other components within the central server 120. The core component 108 is described below with reference to FIG. 12.

In various embodiments, the various system components 104-109 may be computing devices, servers, software, and/or circuitry that is included within, connected to, or otherwise associated with the central server 120. For example, the core component 108 may be a server blade or computing unit included within the central server 120. As another example, the data warehouse component 104 may be a remote cloud storage device that the central server 120 communicates with via Internet protocols.

In an embodiment, the proximity broadcast receivers 142 and mobile proximity broadcast receivers 138 may be configured to execute a core client module 115 that may be software, instructions, routines, applications, operations, or other circuitry that enable the proximity broadcast receivers 142, 138 to process received broadcast messages from proximate wireless identity transmitters 110. The core client module 115 may also handle communications between the proximity broadcast receivers 142, 138 and the central server 120, such as transmitting sighting messages and receiving return messages from the central server 120. Further, the mobile proximity broadcast receivers 138 may be configured to execute third-party applications module 116 that may related to performing software instructions, routines, applications, or other operations provided by various third-parties (e.g., merchant apps). In an embodiment, when configured as registered services with the central server 120, the third-party applications module 116 may receive various data from the core client module 115. For example, a third-party application that is registered with the central server 120 may be configured to receive notifications from the core client module 115 when the user of the mobile proximity broadcast receiver 138 enters, remains, and/or leaves a particular place (e.g., a geofence, a retail store, etc.).

In another embodiment, the mobile proximity broadcast receivers 138 may be configured to receive and transmit broadcast messages and may also be referred to as "wireless identity transceivers." For example, a user may employ a smartphone that is configured to receive broadcast messages from nearby wireless identity transmitters 110 as well as broadcast signals that include identifying information associated with the user.

Figure 2:
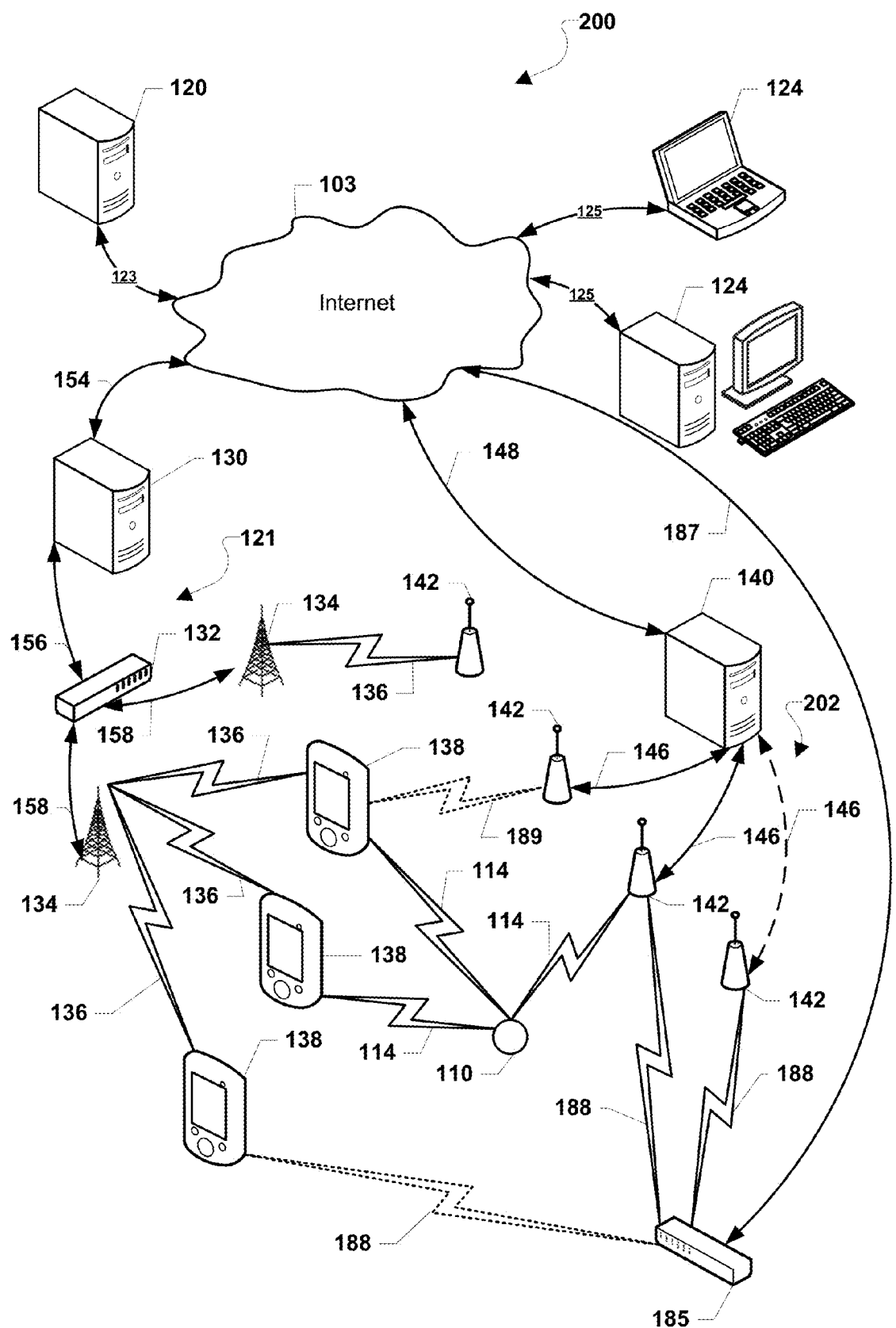
FIG. 2 is a communication system diagram illustrating network components suitable for use in various embodiments.

FIG. 2 illustrates an exemplary communication system 200 that may be used in various embodiments. The communication system 200 effectively enables wireless identity transmitters 110 (e.g., Bluetooth® LE transmitters) to transmit broadcast messages that include identification information to the central server 120 via a plurality of mobile proximity broadcast receivers 138 and/or stationary proximity broadcast receivers 142, without the need to negotiate a direct communication link. Such broadcast messages may be collected automatically by any proximity broadcast receiver within proximity (or broadcast range) of wireless identity transmitters. For example, a mobile proximity broadcast receiver 138 within proximity may receive a broadcast message transmitted by a Bluetooth® radio within the wireless identity transmitter 110.

The communication system 200 may include a wireless identity transmitter 110. The wireless identity transmitter 110 may be coupled with various objects. For example, it may be embedded in a bracelet or object, such as an appliance. The wireless identity transmitter 110 may transmit a short-range wireless signal 114, such as a broadcast message as described above. For example, this short-range wireless signal 114 may be a periodic broadcast of a packet, which includes the wireless identity transmitter's identification code. Alternately, the short-range wireless signal 114 may be an attempt to establish a wireless communication link with any of a plurality of mobile devices 138 that may be acting as proximity broadcast receivers. The short-range wireless signal 114 may be received by proximate proximity broadcast receivers, such as stationary proximity broadcast receivers 142 and/or mobile proximity broadcast receivers 138.

The short-range wireless signal 114 may be according to any of a variety of communication protocols, such as Bluetooth®, Bluetooth® LE®, Wi-Fi, infrared wireless, induction wireless, ultra-wideband (UWB), wireless universal serial bus (USB), Zigbee®, Peanut®, or other short-range wireless technologies or protocols which have or which can be modified (e.g., by restricting transmit power) to limit their effective communication range to relatively short range (e.g., within about 100 meters). In some embodiments, the wireless identity transmitter 110 may use the low energy technology standardized in the Bluetooth® 4.0 protocol (or later versions). For example, in some embodiment systems a wireless identity transmitter 110 may periodically broadcast identification packets configured as an advertiser as described in the Bluetooth® 4.0 protocol, and proximate proximity broadcast receivers 142, 138 may be configured to act as scanners according to that protocol.

The Bluetooth® protocol and Bluetooth® devices (e.g., Bluetooth® LE devices) have a relatively short effective communication range, are widely used in deployed communication and computing devices, have standard advertising or pairing procedures that meets the discovery and reporting needs of various embodiments, and exhibit low power consumption, which make the protocol ideal for many applications of the various embodiments. For this reason, Bluetooth® and Bluetooth® LE protocols and devices are referred to in many of the examples herein for illustrative purposes. However, the scope of the claims should not be limited to Bluetooth® or Bluetooth® LE devices and protocol unless specifically recited in the claims. For example, Peanut® transceivers may be included within wireless identity transmitters 110 and may be used to transmit two-way communications with proximity broadcast receivers 142, 138 also configured to utilize Peanut® short-range radio transmissions.

The communication system 200 may include a plurality of stationary proximity broadcast receivers 142, which may be deployed by authorities, merchants, or various third-parties throughout a region, building, or place. Such stationary proximity broadcast receivers 142 may be designed specifically for wireless identity transmitters 110 (or include such tracking functions in addition to other primary functionality, such as traffic lights, utility transformers, etc.). Stationary proximity broadcast receivers 142 may be located in strategic locations within a locality, such as forming a perimeter about a community and/or being located in high traffic areas (e.g., along aisles of a retail store, at entry ways to buildings, major intersections and highway on-ramps). The stationary proximity broadcast receivers 142 may be in communication with a local area network 202, such as a WiFi network, that may include an Internet access server 140 that provides a connection 148 to the Internet 103. Stationary proximity broadcast receivers 142 may be connected to the local area network 202 by a wired or wireless link 146. In various embodiments, the stationary proximity broadcast receivers 142 may be contained within or located nearby the Internet access server 140. For example, the stationary proximity broadcast receivers 142 may be components within the Internet access server 140 or alternatively, may be placed on top of or to the sides of the Internet access server 140. In an embodiment, stationary proximity broadcast receivers 142 may have additional functionality. For example, stationary proximity broadcast receivers 142 may also function as or be included within cash registers, point-of-sale devices, and/or display units within a retail store.

The communication system 200 may also include one or more mobile devices configured to act as mobile proximity broadcast receivers 138. The mobile proximity broadcast receivers 138 may be typical mobile devices or smartphones communicating with a cellular network 121 via long range wireless links 136 to one or more base stations 134 coupled to one or more network operations centers 132 by a wired or wireless connection 158. Such cellular network 121 may utilize various technologies, such as 3G, 4G, and LTE. The network operations centers 132 may manage voice calls and data traffic through the cellular network 121, and typically may include or may be connected to one or more servers 130 by a wired or wireless connection 156. The servers 130 may provide a connection 154 to the Internet 103. In the various embodiments, the mobile proximity broadcast receivers 138 may be mobile devices configured by an application or other software module to relay reports of received broadcast messages from wireless identity transmitters 110 (i.e., sighting messages) to the central server 120 that is connected to the Internet 103. In an embodiment, stationary proximity broadcast receivers 142 may also communicate with the cellular network 121 via long range wireless links 136 to a base station 134.

As described above, the proximity broadcast receivers 138, 142 may be configured to report contacts (or sightings) with a wireless identity transmitter 110 to a central server 120 via the Internet 103. For example, the proximity broadcast receivers 142 may transmit a sighting message to the central server 120 that includes a rolling identifier corresponding to the identity of a user of the wireless identity transmitter 110. Each time a proximity broadcast receiver 138, 142 receives an identifier from a wireless identity transmitter 110, the identifier may be associated with the time of the connection and the location of the proximity broadcast receiver 138, 142, and this information may be transmitted to the central server 120, such as within a sighting message. In some embodiments, the identifier, the time, and the location of the contact may be stored in the memory of the proximity broadcast receiver 138, 142 (or an intermediary server 130, 140) for later reporting, such as in response to a query message broadcast or multicast by the central server 120. Also, the central server 120 may store location information reported by sighting messages in a database, which may be used for locating, tracking or otherwise monitoring movements of the wireless identity transmitter 110.

In an embodiment, mobile proximity broadcast receivers 138 may be configured to exchange short-range wireless signals 189 with stationary proximity broadcast receivers 142. In other words, a mobile proximity broadcast receiver 138 may be configured to operate as a wireless identity transceiver that is capable of receiving short-range wireless signals 114 (i.e., broadcast messages) from the wireless identity transmitter 110 as well as transmitting short-range wireless signals 189 for receipt by proximity broadcast receivers 142.

In an embodiment, proximity broadcast receivers 138, 142 may transmit wireless signals to a wireless router 185 via a wireless communication link 188, such as part of the local area network 202, which may provide a connection 187 to the Internet 103. For example, the stationary proximity broadcast receivers 142 may transmit sighting messages that include data from broadcast messages transmitted by the wireless identity transmitter 110 to a WiFi wireless router 185.

The central server 120 may also be connected to the Internet 103 via a wired or wireless connection 123, thereby allowing communication between proximity broadcast receivers 142, 138 and the central server 120. As described above, the central server 120 may include a plurality of components, blades, or other modules to process sighting messages and data received from proximity broadcast receivers 142, 138. Further embodiments may provide a direct connection (not shown) between the central server 120 and any of the mobile device network components, such as the network operations centers 132, to more directly connect the proximity broadcast receivers 142, 138 and the central server 120.

The communication system 200 may also include computing terminals 124, such as personal computers at home or work, that are connected to the Internet 103 via wired or wireless connections 125 and through which users may communicate via the Internet 103 with the central server 120. Such terminals 124 may allow users, such as parents, police, fire, medical attendants, and other authorized authorities to register devices (e.g., wireless identity transmitters 110, etc.), access tracking records on the central server 120, and/or to request that the central server 120 initiate a search for a particular wireless identity transmitter 110. In an embodiment, users may use such terminals 124 to register wireless identity transmitters 110, proximity broadcast receivers 142, 138 (e.g., smartphones configured to execute client software associated with the central server), and/or identity transceivers (not shown), such as by accessing web portals and/or user accounts associated with the central server 120. Similarly, various parties may use terminals 124 to register wireless identity transmitters 110, proximity broadcast receivers 142, 138 (e.g., stationary receivers configured to execute client software and relay broadcast to the central server), and/or identity transceivers (not shown).

Based on the location of the proximity broadcast receivers 138, 142 within a place, multiple proximity broadcast receivers 138, 142 may be within the broadcast area of the wireless identity transmitter 110 and may concurrently receive broadcast messages. The central server 120 may detect when proximity broadcast receivers 138, 142 concurrently (or within a certain time period) transmit sighting messages that indicate receipt of broadcast messages from the wireless identity transmitter 110. Such concurrent sighting messages may be used to determine more precise proximity information relating to the wireless identity transmitter 110 at the time of broadcasting.

The communication system 200 may operate in a passive information gathering mode and/or an active search mode. In the passive information gathering mode, proximity broadcast receivers 138, 142 may continuously listen for broadcasts from any wireless identity transmitters 110, and report all identifier reception events via sighting messages (e.g., transmissions including identifiers, time and location) to the central server 120. When no active search is underway (i.e., no one is looking for a particular wireless identity transmitter 110), sightings of wireless identity transmitters 110 or received broadcast messages from wireless identity transmitters 110 may be stored in memory of the proximity broadcast receivers 138, 142 or the central server 120 for access at a later time. In order to protect privacy, such stored data may be stored for a limited period of time, such as a day, a week or a month, depending upon the person or asset being tracked. Then, if a person or asset is discovered to be missing, the stored data may be instantly accessed to locate and track the associated wireless identity transmitter 110, or at least determine its last reported location.

In a modification of the passive tracking mode, each proximity broadcast receiver 138, 142 may store IDs, times and locations corresponding to received broadcast messages (or contacts) from wireless identity transmitters 110 for a limited period of time. Alternatively, such information may be stored in servers 130, 140 connected to such proximity broadcast receivers 138, 142. Then, if a person or asset associated with a wireless identity transmitter 110 is discovered missing, a search can be initiated by the central server 120 querying the proximity broadcast receivers 138, 142 (or servers 130, 140) to download their stored data (e.g., databases indicating contacts with wireless identity transmitters 110) for analysis and storage in a database of the central server 120.

In an embodiment, in order to limit the demands on civilian mobile devices configured to operate as mobile proximity broadcast receivers 138, the passive tracking mode may only be implemented on the stationary proximity broadcast receivers 142. While the fewer number of such devices means the tracking of wireless identity transmitters 110 may be less effective, this embodiment may nevertheless enable receiving broadcast messages and thus the tracking of wireless identity transmitters 110 through high-traffic zones, such as intersections, highway on/off ramps, bus stations, airports, etc.

In the passive information gathering mode/embodiment, a user may use the communication system 200 to request the location of a particular wireless identity transmitter 110, such as by sending a request from a terminal 124 to the central server 120. For example, a mother may log in on her home computer and request the location of the wireless identity transmitter 110 in her child's backpack. The request may include a serial number, code, or other identifier corresponding to the wireless identity transmitter 110. The central server 120 may search the stored identification messages for the serial number, code, or other identifier and return any reported locations matching entered information, along with the times of such locations were reported via sighting messages. In further embodiments, the serial number or code entered by the parent may be cross-referenced with the identifier that the requested wireless identity transmitter 110 communicates in broadcast messages and that are relayed to the central server 120 in sighting messages submitted by proximity broadcast receivers 138, 142. In this manner only an authorized user (i.e., someone who knows the access code, password, or other secret code associated with a particular wireless identity transmitter 110) can obtain information regarding a given wireless identity transmitter 110 even though data is being gathered continuously.

In the active search mode/embodiment, the central server 120 may instruct proximity broadcast receivers 138, 142 to actively search for a particular wireless identity transmitter 110 (i.e., a "targeted" wireless identity transmitter). An active search may be initiated in response to a request received from a terminal 124. Such a request may include the identifier for the particular wireless identity transmitter 110, or an account number/name that is or can be cross-linked to the identifier of the wireless identity transmitter 110. The central server 120 may transmit activation messages, such as via broadcast or multicast, to proximity broadcast receivers 138, 142 that may instruct proximity broadcast receivers 138, 142 to search for a particular wireless identity transmitter 110 and that may include an identifier of the targeted wireless identity transmitter 110 (i.e., target device ID). For example, an activation message corresponding to an active search for a targeted wireless identity transmitter 110 may include a rolling identifier that the wireless identity transmitter 110 changes periodically in an unpredictable manner and that is known to the central server 120. In an embodiment, activation messages transmitted, broadcast or multicast by the central server 120 may be sent only to proximity broadcast receivers 138, 142 within particular sectors or within a given distance of a particular location. Alternatively, the activation messages may identify particular sectors or a distance from a particular location to enable the proximity broadcast receivers 138, 142 to determine whether the activation message is applicable to them based on their own known location. In this manner the search can be focused on a given area, such as a sector encompassing the last known location of the wireless identity transmitter 110 or an eye witness sighting. By focusing the search in this manner, proximity broadcast receivers 138, 142 not within the sector of search need not be activated.

In the active search mode/embodiment, in response to receiving activation messages from the central server 120 that include target device IDs and determining that they are within the identified sector of search, proximity broadcast receivers 138, 142 may configure their short-range radios (e.g., Bluetooth® radio) to listen for broadcast messages having the identifiers. In other words, the proximity broadcast receivers 138, 142 may be considered activated for a search and may or pairing attempts with an identifier look for the identifiers included in the activation message (i.e., target device IDs). In embodiments that do not rely on pairing with the wireless identity transmitter, proximity broadcast receivers 138, 142 matching an identifier within a received broadcast message to a target device ID within an activation message may promptly report the event to the central server 120 via sighting messages transmitted via links 146 or long-range wireless links 136. In embodiments that rely on pairing or an exchange of messages between the wireless identity transmitter and proximity broadcast receivers, proximity broadcast receivers 138, 142 may listen for and only complete communication handshaking or pairing with a device that broadcasts the target device ID, and ignore other pairing attempts. In this alternative embodiment, proximity broadcast receivers 138, 142 may be protected from pairing with unauthorized devices while in the active search mode. Also, proximity broadcast receivers 138, 142 may modify the pairing process in the active search mode to terminate the communication link as soon as the device ID is received, further protecting against pairing with unauthorized devices in the active search mode. In the active search mode/embodiment, proximity broadcast receivers 138, 142 receiving the target device ID may promptly report that event to the central server 120 via a wired or wireless link to the Internet 103. As mentioned above, such a report may include the location of the proximity broadcast receiver 138, 142 and the time when the identifier was received if the report is not transmitted immediately. In the active search mode/embodiment, each sighting message received by the central server 120 may be reported to an interested person or authority, such as in the form of a webpage showing an update location indicator on a map.

Further, in the active search mode/embodiment, an authorized user, such as a police, FBI, fire/rescue or other person of authority may use the communication system 200 to activate a search for a particular wireless identity transmitter 110, such as by using a terminal 124 to provide the central server 120 with the target device ID and search location or sectors to be searched. For example, a mother discovering that her child is missing may call the police and provide them with an identifier of the wireless identity transmitter 110 concealed in her child's clothing. With the search activated, the central server 120 may transmit an alert (or message that indicates a search for a wireless identity transmitter has been activated) to proximity broadcast receivers 138, 142 within the initial targeted search sector. The central server 120 may then activate a webpage that presents a map of the search area and that may be maintained in near-real time so, that as relevant sighting messages are received, reported location information is displayed on the map. Authorized users may then access the website (or other information provided by the server) to coordinate in-person search efforts.

Of course, information gathered and stored in proximity broadcast receivers 138, 142 or in a database of the central server in the passive mode may be used upon initiation of an active search, such as to identify an initial search location or sector, track recent locations and movements, and to provide/display a history of locations reported by sighting messages that may be combined with near-real time search reports.

In another embodiment, the communication system 200 may further include a plurality of wireless identity transmitters (not shown in FIG. 2) that are placed throughout a building. In such a situation, the plurality's broadcast areas may cover a large portion of the enclosed area of such a building. For example, the building may be a retail store and the plurality of wireless identity transmitters may be permanently stationed throughout the sales floor of the building. As a mobile proximity broadcast receiver 138, such as a smartphone carried by a customer, moves throughout the building and within the broadcast areas of the plurality of wireless identity transmitters, the mobile proximity broadcast receiver 138 may receive broadcast messages associated with the building. In another embodiment, the Internet access server 140 may be configured to store, receive, and otherwise process information relevant to the building. For example, the Internet access server 140 may be configured to perform as a local server for a retail store or alternatively a point-of-sale device that is configured to perform software and operations for conducting transaction with customers. For example, the Internet access server 140 may be configured to perform operations related to a customer purchase within a retail store building.

FIG. 3A illustrates an embodiment method 300 for operations to be performed by a wireless identity transmitter 110 (referred to as "WIT" in FIG. 3A). In various embodiments, the operations in method 300 may be performed in combination with the operations described below with respect to FIGS. 4 and 5 that are performed by a proximity broadcast receiver 138 and a central server 120, respectively. In block 302, a wireless identity transmitter 110 may broadcast a message that includes an identifier, such as a broadcast message as described above. For example, the wireless identity transmitter 110 may broadcast a Bluetooth® LE advertising packet that includes a rolling identifier as described herein. This may be accomplished in block 302 by a processor (e.g., a microcontroller) within the wireless identity transmitter 110 determining that it is time to broadcast its identifier, configuring a suitable broadcast message (e.g., an advertisement packet as specified for Bluetooth® LE devices in the Bluetooth® 4.0 protocol), and transmitting that packet via a short-range radio.

In various embodiments, the message broadcast by the wireless identity transmitter (i.e., the broadcast message) may include an identifier segment, such as a rolling identifier. In various embodiments, the broadcast message may also include additional segments, such as a type segment. The type segment may indicate the type of wireless identity transmitter. For example, wireless identity transmitters may be marketed for various purposes, such as child safety devices, dog collars, or security tags for stores. The wireless identity transmitters may have a different type segment based on the intended purpose (e.g., one code for child safety devices, a second code for dog collars, etc.). Type segments may be static and set by manufacturers, while the remaining portion of the identifier may be unique to each device, and may roll as described below. The type segment may also be changed by a user, such as when a wireless identity transmitter is reset for a different purpose or application.

In other embodiments, a broadcast message may also include one or more static or dynamic segments with instructions or commands to be implemented by a proximity broadcast receiver. Such command segments may also be passed along to instruct a central server or other network device. Command segments may be set or static, similar to type segments, or may vary over time based on various conditions, such as pairings or data from one or more proximity broadcast receivers. Such command settings may also be configured by a user of the wireless identity transmitter. Second or additional segments may also indicate the status of the wireless identity transmitter. For example, a second segment may indicate the remaining power or estimated time left before the battery dies. Proximity broadcast receivers or a central server may interpret this status and respond accordingly.

Returning to FIG. 3A, in block 304, the wireless identity transmitter 110 may enter a sleep mode. For example, after broadcasting the broadcast message having the identifier, the wireless identity transmitter 110 may be configured to enter a power conservation state that may continue for a predetermined period of time. In various embodiments, the wireless identity transmitter 110 may sleep for a predetermined time, never sleep, or sleep for varying times determined based on various inputs. In block 306, the wireless identity transmitter 110 may wake up from the sleep mode, such as after the predetermined duration expires. In block 308, the wireless identity transmitter 110 may generate a new device identifier from an algorithm, such as a rolling identifier algorithm. For example, the wireless identity transmitter 110 may generate a rolling identifier using a pseudo-random function or a streaming-like encryption algorithm (e.g., AES-CTR), as described below. The wireless identity transmitter 110 may then return to block 302 to broadcast again. In an embodiment, the broadcast message may contain timing, nonce or counter, count-down, or scheduling information indicating the availability of the wireless identity transmitter for receiving messages. For example, the broadcast message may indicate that the wireless identity transmitter will accept incoming configuration messages within a specified time window. In various embodiments, the operations in blocks 302-308 may be performed by an identity transceiver (e.g., a smartphone configured to operate as both an identity transmitter and a proximity broadcast receiver).

As mentioned above, the algorithm (or rolling identifier algorithm) used in block 308 may generate a rolling identifier which is very difficult to predict or recognize by a device or system that does not know either an identity of the wireless identity transmitter 110 (e.g., a MAC or Bluetooth®

ID), a decode key, and/or the algorithm used to generate the rolling identifier. As discussed below, the central server 120, configured with the algorithm (or a decoding algorithm) or a decode key, and in possession of the wireless identity transmitter 110 identities, can use the rolling identifier to determine a corresponding account or device identity. While method 300 shows the rolling identifier changing with every wake and broadcast cycle as one example, in other embodiments the identifier may be changed less frequently, such as once per minute, once per hour, etc. In such embodiments, the operation of generating a new identifier in block 308 may be performed only at the designated interval, so at other times upon waking (i.e., block 306) the wireless identity transmitter 110 may return to block 302 to broadcast the identifier. Various algorithms for generating rolling identifiers or other encoded identifiers, as well as other decoding algorithms, are discussed below as well as in related application U.S. patent application Ser. No. 13/773,336, entitled "Preserving Security By Synchronizing a Nonce or Counter Between Systems," the entire contents of which are hereby incorporated by reference for purposes of algorithms for generating, transmitting and decoding rolling identifiers and other data.

FIG. 4 illustrates an embodiment 400 with operations that may be implemented in the proximity broadcast receiver 138 (e.g., a smartphone mobile device configured to operate as a mobile proximity broadcast receiver). In block 402, the proximity broadcast receiver 138 may receive the broadcast message from the wireless identity transmitter 110. The proximity broadcast receiver 138 may receive the broadcast message when within proximity of the wireless identity transmitter 110 (i.e., within communication range). When the broadcasted message with included identifier is received, the proximity broadcast receiver 138 may analyze header or metadata within the received broadcast message, as well as parse and evaluate various data within the broadcast message. In an embodiment, the broadcast message may contain encrypted and non-encrypted data that the proximity broadcast receiver 138 may or may not be configured to decrypt or otherwise access. In block 404, the proximity broadcast receiver 138 may transmit a sighting message to the central server 120 including the identifier, location information, and time corresponding to the receipt of the broadcast message. This transmission may be accomplished via a wireless wide area network, such as a cellular data network coupled to the Internet. In various embodiments, the operations in blocks 402 and 404 may be performed by a stationary proximity broadcast receiver, a mobile proximity broadcast receiver, or alternatively, an identity transceiver (e.g., a smartphone configured to operate as both a transmitter and a receiver).

In general, sighting messages may include metadata or header information that may describe received broadcast messages (e.g., message size, indicators of subject matter, etc.), the proximity broadcast receiver 138, such as the proximity broadcast receiver identification (e.g., a code, username, etc.), indications of services with which the proximity broadcast receiver 138 is affiliated regarding the server (e.g., the proximity broadcast receiver 138 participates in a tracking program for a particular vendor, merchant, area, etc.), as well as the conditions at the time of receipt of the broadcast message. For example, the sighting message may include signal strength information of the received broadcast message. In an embodiment, sighting messages may each include codes, flags, or other indicators that describe the general topic, subject matter, or reason for the sighting message. For example, the sighting message may contain a flag that indicates a relation to an active alert.

Additionally, sighting messages may include location information of the proximity broadcast receiver 138. In particular, sighting messages may indicate network-specific information that relates to a location. For example, a sighting message may indicate the cell site (e.g., cell site ID), cellular network tower (e.g., cell tower ID), or other wireless network with which a mobile proximity broadcast receiver was in communication at the time of receipt of the broadcast message. Further, sighting messages may include more refined location information based on data from global positioning systems (GPS) or chips included within the proximity broadcast receiver 138. For example, the proximity broadcast receiver 138 may determine GPS information (i.e., GPS coordinates) of the proximity broadcast receiver 138 at the time of receipt of a broadcast message, including the coordinates in the corresponding sighting message. In an embodiment, sighting messages may also include sensor data from various sensors within the proximity broadcast receiver 138, such as accelerometers, gyroscopes, and magnetometers. Further, sighting messages may include authentication information that may confirm the legitimacy of the sighting message as coming from a known, registered, or otherwise valid proximity broadcast receiver 138. For example, authentication information included in a sighting message may include secret codes, certificates, or hash data that is shared between the proximity broadcast receiver and the central server 120.

In various embodiments, the proximity broadcast receiver 138 may generate sighting messages by appending data and various information to broadcast messages received from the wireless identity transmitter 110. In an embodiment, sighting messages may include the entirety of received broadcast messages or, alternatively, only portions of the received broadcast messages that the proximity broadcast receiver 138 determines to be of significance. For example, the proximity broadcast receiver 138 may extract particular header or metadata information from a broadcast message before generating a corresponding sighting message. As another example, the proximity broadcast receiver 138 may compress, abbreviate, truncate and/or summarize data within the broadcast message. In another embodiment, the proximity broadcast receiver 138 may simply redirect, relay, or retransmit received broadcast messages to the central server.

Sighting messages may be transmitted via a wireless or wired communication link, such as a wireless cellular network, a local area network configured to communicate via Internet protocols, a long-range radio communication link, or a short-range radio. For example, the proximity broadcast receiver 138 may transmit sighting messages over a cellular network via the Internet to the central server. As another example, the proximity broadcast receiver 138 may transmit sighting messages via a wired Ethernet connection.

FIG. 5 illustrates an embodiment method 500 with operations that may be implemented by the central server 120. In block 502, the central server 120 may receive the sighting message from the proximity broadcast receiver 138. In block 504, the central server 120 may associate an identifier indicated by the sighting message with the wireless identity transmitter 110. The central server 120 may associate the identifier within the sighting message with an account registered/created by a user. Associating the identifier with a particular wireless identity transmitter 110 or user account may be accomplished by comparing the identifier with a database of codes corresponding to the wireless identity transmitter 110 or user accounts to determine the database record in which information from the sighting message (e.g., location info) should be stored. Since in some embodiments the wireless identity transmitter 110 identifier changes (rolls) frequently, this process may involve comparing the identifier received in the sighting message to several possible serial codes generated by a pseudo-random number generator algorithm, or applying a reverse algorithm which uses the received identifier as an input and outputs the corresponding account number. In block 506, the central server 120 may store data from the sighting message in a database, such as location information and time data. For example, the central server 120 may determine the location of the proximity broadcast receiver 138 when the broadcast message was received based evaluating the received sighting message, and may store that data in a database linked to the wireless identity transmitter 110 or its user/owner. In various embodiments, the central server may generate various useful data, such as analytics, based on the stored data from various sighting messages received over time. For example, the central server may generate statistics indicating the distances/proximities of various devices to other connectable devices, interactions between devices (e.g., connected, etc.), and relationships between devices (e.g., common owner or user, etc.). In some embodiments, third-parties, such as retailers or other companies, may utilize such useful data to learn more about consumer within stores, such as travel patterns within a store, the distance within consumers come to predefined objects (e.g., WITS within displays, etc.), etc.

In block 508, the central server 120 may perform an action in response to the sighting message, such as transmit a message to a recipient, send a coupon, and/or calculate rewards. In an embodiment, the central server 120 may transmit a return message to a recipient, such as the proximity broadcast receiver 138, that includes instructions, software, or codes indicating how the proximity broadcast receiver 138 may respond to the received broadcast message. For example, the return message may direct the proximity broadcast receiver 138 to transmit a link advertisement message or download software from a particular URI. Recipients of such messages from the central server may include various devices and parties, including computing devices of registered services (e.g., merchants, emergency personnel, etc.), mobile devices of users, and proximity broadcast receivers (e.g., the proximity broadcast receiver 138 that received the broadcast message). In another embodiment, the central server 120 may use the stored data to identify when the wireless identity transmitter 110 enters, is within, and/or leaves a designated area. In other words, the central server 120 may identify when the wireless identity transmitter 110 comes within proximity, stays within proximity, or leaves proximity of a proximity broadcast receiver 138, or vice versa.

Figure 3B:
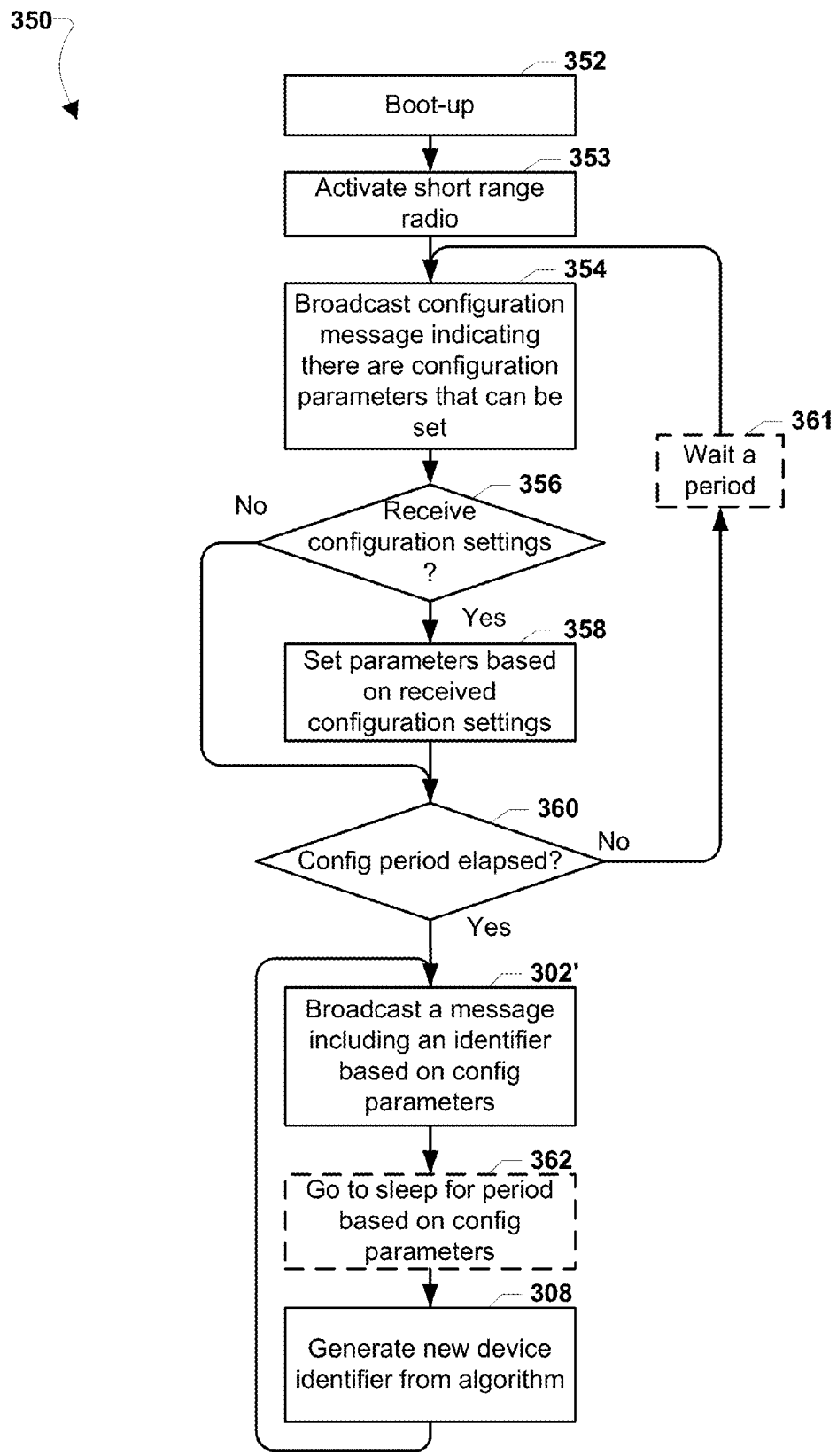
FIG. 3B is a process flow diagram illustrating an embodiment method for a wireless identity transmitter to receive configuration settings after performing boot-up operations.

FIG. 3B illustrates an embodiment method 350 for a wireless identity transmitter (referred to as "WIT" in FIG. 3B) receiving configuration settings after performing boot-up operations. Typically, wireless identity transmitters may only perform one-way communications, broadcasting signals for receipt by proximity broadcast receivers. However, wireless identity transmitters may be configured to selectively engage in two-way communications with other devices with similar short-range wireless signaling capabilities (e.g., Bluetooth® LE transceivers). In particular, upon initialization operations (or "booting-up"), a wireless identity transmitter may be configured to receive incoming short-range wireless communications from proximity broadcast receivers. For example, when a battery is replaced or inserted for the first time, the wireless identity transmitter may accept incoming Bluetooth® packets for a predefined period of time, such as sixty seconds. Alternatively, the wireless identity transmitter may receive incoming messages as part of power-cycling (e.g., receive for the sixty seconds after a reboot of the wireless identity transmitter).

Such incoming short-range wireless communications may include instructions, software, firmware, commands, or other code for setting values for configuration parameters utilized by the wireless identity transmitter for performing various functions. In particular, the incoming communications may include configuration settings (or values) the wireless identity transmitter may use to set or modify established configuration parameters associated with transmitting broadcast messages that include identification information of the wireless identity transmitter. In an embodiment, incoming communications that include configuration settings may be Bluetooth® signals (e.g., setters or getters) that may not require pairing operations between the sender and receiver (i.e., the wireless identity transmitter). In other words, the incoming communications may be non-pairing Bluetooth® advertisements.

Configuration parameters may include the transmit interval for transmitting broadcast messages (i.e., how often the wireless identity transmitter should broadcast packets that include its identity) and the transmit power for transmitting broadcast messages (i.e., what signal strength to use when broadcasting). For example, received configuration settings may vary the intervals (i.e., broadcasting frequency) at which the wireless identity transmitter broadcasts its identifier in a manner configured to facilitate accurate tracking of the wireless identity transmitter while conserving battery power. This may be important as setting transmit power configuration parameters may affect the battery service life of the wireless identity transmitter (e.g., a longer interval may include a longer sleep mode and thus decreased power consumption). In an embodiment, configuration parameters may also include a debug parameter that may be set or modified by a manufacturer or administrative party (e.g., a central server). The debug parameter may be utilized by software or algorithms executed by the wireless identity transmitter and may indicate when the wireless identity transmitter should generate new identifiers to broadcast (e.g., an interval for generating a new rolling identifier or Bluetooth® MAC address identifier). In another embodiment, incoming communications with configuration settings may include commands that instruct the wireless identity transmitter to change the data represented within broadcast messages, such as by entering/exiting an encoded mode. Alternatively, incoming communications may include instructions for the wireless identity transmitter to shorten its broadcast signal range to emulate near field communications (NFC).

In block 352, the wireless identity transmitter may boot-up. In other words, the wireless identity transmitter may be energized, initialized, and otherwise configured to operate from a hibernating, sleep, dormant, or otherwise deactivated state. In various embodiments, the boot-up operations may be performed in response to a user input (e.g., a button press), the insertion of a battery in the wireless identity transmitter, or receiving a short-range wireless signal (e.g., an activation signal). In some embodiments, when the wireless identity transmitter boots, a nonce or counter value may be initialized. For example, the wireless identity transmitter may begin to increment a value that represents the passage of time, starting from a zero value.

In block 353, the wireless identity transmitter's short-range radio may be activated. This activation may be accomplished by a timer or by its processor (e.g., microcontroller)

determining that a duration has expired since the boot-up operations were performed or concurrently with the boot-up operations. In an embodiment, the activation of the short-range radio may be a routine within the boot-up operations in block 352.

In block 354, the wireless identity transmitter may broadcast a configuration message indicating there are configuration parameters that can be set in the wireless identity transmitter. For example, the configuration message may include the wireless identity transmitter's identity (or identifier) as well as an indication that a certain number or type of configuration parameters can be set, modified, or initialized by subsequent short-range wireless signals. In an embodiment, the configuration message may include a list of configuration parameters available to be set, such as the transmit interval.

In an alternative embodiment, the configuration message may include an indicator that the wireless identity transmitter is available to receive configuration settings. In such an embodiment, any responding devices, such as proximate proximity broadcast receivers, may transmit responses (e.g., Bluetooth® LE signals) that request the list of configuration parameters. In response to receiving such a request, the mobile proximity broadcast receiver may transmit a second message that includes the list of configuration parameters.

In determination block 356, the wireless identity transmitter may determine whether configuration settings are received, such as in a short-range wireless signal from a proximate proximity broadcast receiver or identity transceiver. The wireless identity transmitter may monitor the short-range radio to determine whether a response is received from a proximate device. A response may be in the form of a simple response packet or pulse that the wireless identity transmitter microcontroller can recognize, or alternatively, an advertisement according to the Bluetooth® LE protocol. If configuration settings are received (i.e., determination block 356="Yes"), in block 358 the wireless identity transmitter may set parameters based on the received configuration settings. For example, the wireless identity transmitter may set a value that indicates how often it transmits broadcast messages. If no configuration settings are received (i.e., determination block 356="No"), or if the wireless identity transmitter performs the operations in block 358, in determination block 360 the wireless identity transmitter may determine whether a configuration period has elapsed. For example, the wireless identity transmitter may evaluate a counter or timer to determine whether a predefined number of seconds (e.g., 60 seconds) have elapsed since the boot-up operations were performed. If the configuration period has not elapsed (i.e., determination block 360="No"), in optional block 361 the wireless identity transmitter may wait a period, such as a number of milliseconds, seconds, etc., and then may continue with the operations in block 404.

However, if the configuration period has elapsed (i.e., determination block 360="Yes"), in block 302', the wireless identity transmitter may broadcast a message including an identifier based on the configuration parameters. In block 362, the wireless identity transmitter may go to sleep for a period based on the configuration parameters, and as described above, in block 308 may generate a new device identifier from the algorithm. The wireless identity transmitter may then continue with the operations in block 302'.

In alternate embodiments, the wireless identity transmitter may be configured to receive incoming messages from proximity broadcast receivers based on clock timing (or clock signals), detected inputs from a user (e.g., a detected button press), or information within a previously received signal (e.g., a received message from a proximity broadcast receiver may instruct the wireless identity transmitter to become available for subsequent messages at a particular future time).

Figure 6:
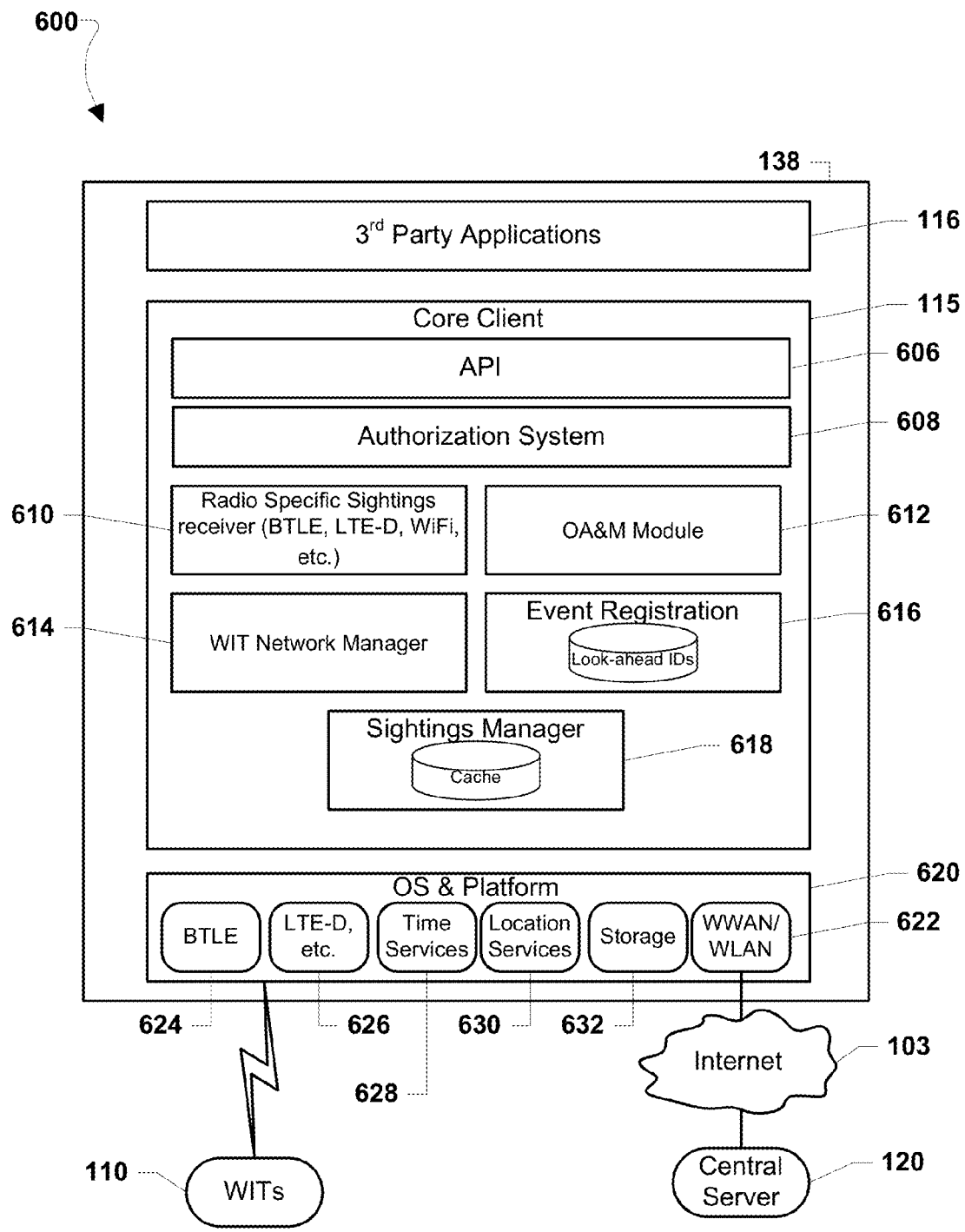
FIG. 6 is a component diagram illustrating various modules within a mobile proximity broadcast receiver suitable for use in various embodiments.

FIG. 6 illustrates various modules within a mobile proximity broadcast receiver 138. As described above, proximity broadcast receivers may include stationary proximity broadcast receivers, such as dedicated devices placed around a building, and mobile proximity broadcast receivers 138, such as mobile devices that are configured to perform operations to receive broadcast messages from wireless identity transmitters 110 and transmit sighting messages over the Internet 103 to a central server 120 via long-range communications (e.g., via WiFi or a cellular network). The various modules and components are described below in the context of elements within a mobile proximity broadcast receiver 138, however in various embodiments, any proximity broadcast receiver, such as a stationary proximity broadcast receiver, may include similar modules and/or components.

The mobile proximity broadcast receiver 138 may include a core client module 115 that may be software, instructions, routines, applications, operations, or other circuitry utilized to process received broadcast messages from proximate wireless identity transmitters 110. The core client module 115 may also handle communications between the proximity broadcast receivers 142, 138 and the central server 120, such as transmitting sighting messages and receiving return messages from the central server 120. For example, the core client module 115 may operate as a background service that performs operations, such as uploading or transmitting sighting messages, without interaction from a user.

The core client module 115 may include an API component 606 that corresponds to application programming interface data, code, or other commands related to broadcast messages and/or sighting messages. For example, the API component 606 may be utilized by a proximity broadcast receiver when listening for Bluetooth® LE advertising packets received from the wireless identity transmitter 110. As another example, the API component 606 may be utilized to register the mobile proximity broadcast receiver 138 to receive notifications, alerts, or other communications corresponding to wireless identity transmitters 110. The core client module 115 may also include an authorization system component 608 for processing received broadcast messages. For example, the mobile proximity broadcast receiver 138 may support oAuth for authorization requests and xAuth for approved communication partners. The core client module 115 may also include a radio specific sightings receiver component 610 (e.g., a component for handling Bluetooth® LE, LTE-D, WiFi, and other communications), an operations, administration, and management module 612, a wireless identity transmitter network manager component 614, an event registration component 616 that relates to stored look-ahead identifiers, and a sightings manager component 618. In an embodiment, the event registration component 616 may store numerous rolling identifiers downloaded from the central server 120 and corresponding to a particular wireless identity transmitter 110, such as a set of rolling identifiers that may match possible rolling identifiers broadcast by the wireless identity transmitter 110 during a certain time window.

Like many modern mobile devices, the mobile proximity broadcast receiver 138 may be configured to execute third-party applications (or "apps"), and thus may include a third-party applications module 116 that may execute, manage, and otherwise perform software instructions and routines related to applications provided by various third-parties (e.g., merchants, developers, etc.). For example, the third-party applications module 116 may receive various data from the core client module 115 to be used by various third-party applications. For illustration purposes, a third-party application related to a department store that is registered with the central server 120 may be configured to receive notifications from the core client module 115 when the user of the mobile proximity broadcast receiver 138 enters, remains, and/or leaves the department store (e.g., a geofence of the store). In an embodiment, for optimization purposes, applications or apps executing via the third-party applications module 116 may register or otherwise be configured to received notifications from the core client module 115 when particular wireless identity transmitters are within proximity, or alternatively, leave proximity. For example, applications may register in advance with the core client module 115 to receive event notifications that indicate whether a particular wireless identity transmitter enters proximity, stays within proximity (e.g., standing nearby and not moving), or leaves proximity of a proximity broadcast receiver, or vice versa.

The mobile proximity broadcast receiver 138 may also include an operating system and platform module 620 for performing various operations and managing circuitry, such as short-range signal receiver circuitry. In particular, the operating system and platform module 620 may include a Bluetooth® Low Energy module 624 for processing communications utilizing Bluetooth® LE protocols, a cellular network module 626 for processing communications corresponding to various cellular and similar long-range wireless networks (e.g., LTE-D, etc.). The operating system and platform module 620 may also include a time services component 628 that may track time and generate timestamp data, a location services component 630 that may maintain low-precision location data or alternatively more precise GPS (or A-GPS) location data, a storage component 632, and a wireless wide area network/wireless local area network component 622 for enabling communications via WiFi or other wireless networks.

In an embodiment, the core client module 115 may request from the central server sets of wireless identity transmitter identifiers (e.g., rolling identifiers of all transmitters on an interested list, identifiers for all transmitters owned by a user, etc.). Such sets may correspond to wireless identity transmitters that are currently in use and are expected to be in use for some period of time.

Figure 7:
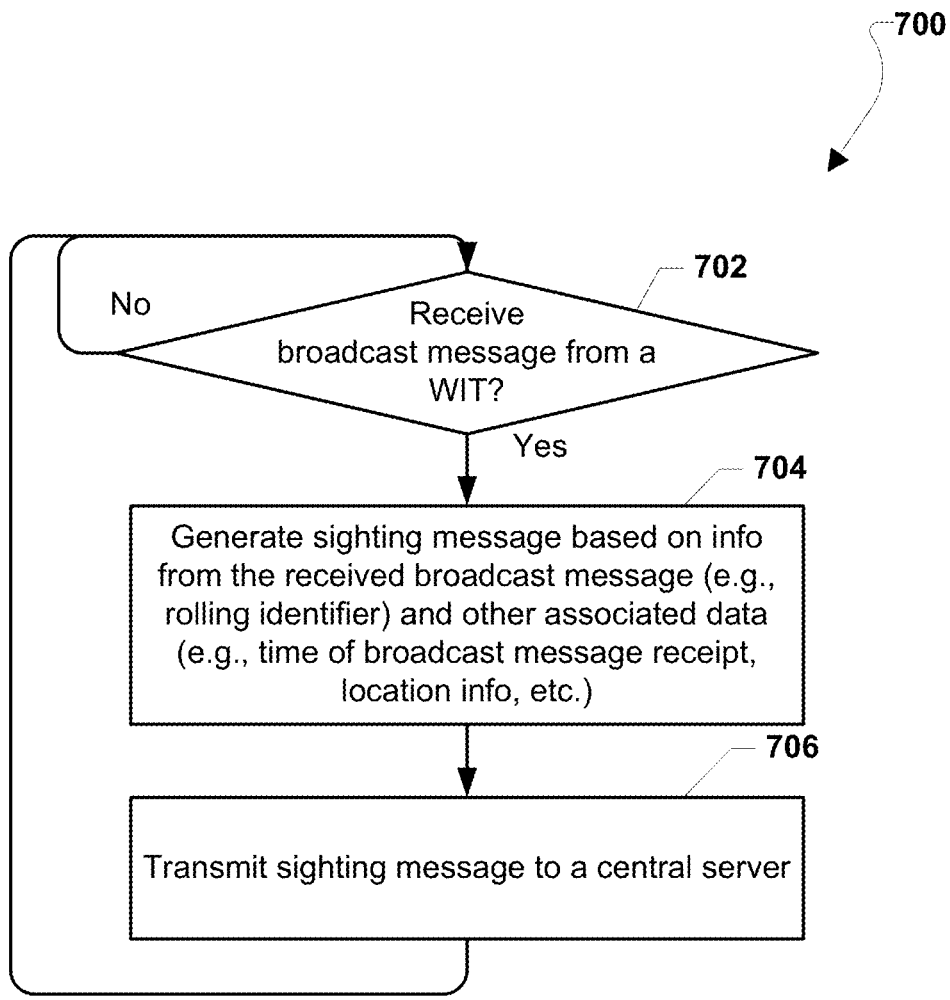
FIG. 7 is a process flow diagram illustrating an embodiment method of a mobile proximity broadcast receiver transmitting a sighting message to relay a wireless identity transmitter's identifier along with other data such as a time or location.

FIG. 7 illustrates an embodiment method 700 that may be implemented on a proximity broadcast receiver, such as a stationary proximity broadcast receiver or a mobile proximity broadcast receiver. In determination block 702, the proximity broadcast receiver may determine whether a broadcast message is received. For example, the proximity broadcast receiver may begin listening for broadcast advertisement packets or pairing attempts by wireless identity transmitters. In some embodiments, the proximity broadcast receiver may continuously be in a monitoring mode, or begin listening for particular identifiers in response to an alert (or search activation message) received from a central server. In embodiments in which pairing takes place, the pairing may be established automatically if the proximity broadcast receiver is set to pair with any wireless identity transmitter without using a key, by using a key saved from a previous pairing with the wireless identity transmitter, or by using a key received from a central server. If the proximity broadcast receiver does not receive a broadcast message (i.e., determination block 702="No"), the proximity broadcast receiver may continue with the operations in determination block 702.

If the proximity broadcast receiver receives a broadcast message (i.e., determination block 702="Yes"), in block 704 the proximity broadcast receiver may generate a sighting message based on information from the received broadcast message and other associated data. In particular, the sighting message may include an identifier specific to the wireless identity transmitter that transmitted the received broadcast message, such as a rolling identifier (i.e., an encoded device identifier), MAC address, or other unique code that may be used to identify the particular wireless identity transmitter. In alternate embodiments, the wireless identity transmitter's identifier may be received as part of a pairing process.

The other associated data may include various information related to the receipt of the broadcast message, such as the time the proximity broadcast receiver received the broadcast message, location information, the proximity broadcast receiver's identification information, related services (e.g., associated merchants), and signal strength information. In other words, the proximity broadcast receiver may associate data about present conditions (e.g., a timestamp, GPS coordinates, Cell ID of the closest base station, etc.) with the broadcast message and/or the wireless identity transmitter's identifier. This data may be stored in any of various types of data structures, such as an array with one or more identifiers associated with timestamps and GPS coordinates from when the sighting corresponding to each identifier occurred. In an embodiment, the sighting message may include authentication data, such as a digital certificate or code, that may be used by a central server to confirm the identity of the proximity broadcast receiver. For example, within the metadata of the sighting message, the proximity broadcast receiver may include a special hash code known only to the proximity broadcast receiver and the central server.

In block 706, the proximity broadcast receiver may transmit the sighting message to a central server, such as via a cellular (e.g., an LTE, 3G, or 4G network) or other network and the Internet as discussed above. Upon reporting a contact event by transmitting the sighting message, the proximity broadcast receiver may promptly return to perform the operations in determination block 702 and await further broadcasts from wireless identity transmitters. This enables the proximity broadcast receiver to continuously report contact events to the central server.

Figure 8:
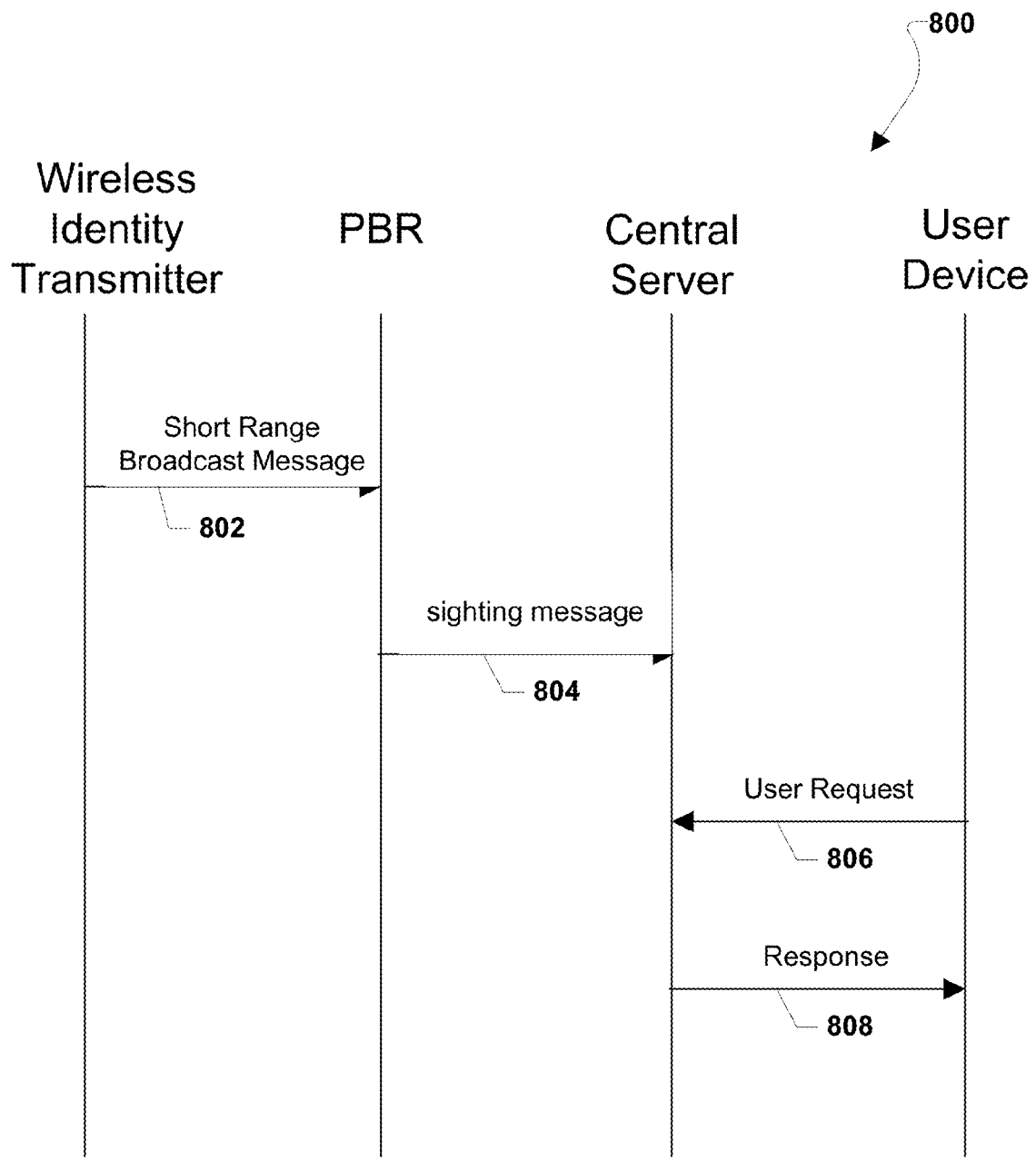
FIG. 8 is a call flow diagram for responding to a user request for a wireless identity transmitter's location in accordance with various embodiments.

FIG. 8 is a call flow diagram 800 illustrating communications during various embodiments. A wireless identity transmitter may transmit a short range broadcast message 802 (e.g., a Bluetooth® LE signal) to a proximity broadcast receiver, such as a mobile proximity broadcast receiver (e.g., a mobile device, cellular phone, etc.) or various other proximity broadcast receivers as discussed above. The broadcast message 802 may contain an identifier for the wireless identity transmitter. The proximity broadcast receiver may transmit (or upload) the wireless identity transmitter's identifier along with any associated data (e.g., timestamp, GPS coordinates, Cell ID, etc.) as a sighting message 804 to a central server 120. The central server 120 may receive the sighting message 804 and store many different identifiers from one or more proximity broadcast receivers.

In some embodiments, identifiers and the associated data may be transmitted (or uploaded) to the central server without any of a user's personal data to protect privacy. In the various embodiments attempting to leverage personal mobile phones, the phone users may opt-in as mobile proximity broadcast receivers. However, these phone users may refuse to opt-in if they fear that personally identifiable data will also be transmitted to the central server. Therefore, an application for uploading received identifiers installed on these personal mobile devices (i.e., mobile proximity broadcast receivers) may prohibit transmission of personal data or other data that may identify the mobile proximity broadcast receivers.

The central server 120 may receive a user request 806 from a user device, such as a terminal 124 or a mobile device, requesting the location of a wireless identity transmitter. This request may be sent by a user after logging into an account associated with a particular wireless identity transmitter. For example, each wireless identity transmitter may be registered with an authenticated user such that a user request 806 for the registered wireless identity transmitter's location can only be transmitted after the authenticated user logs into a secure account.

After receiving a user request 806, the central server 120 may search through the previously reported wireless identity transmitter identifiers that are received via sighting messages to find any matches with the identifier of the requested wireless identity transmitter. Any matches could be reported to the user in a response 808. The response 808 may also include associated data (e.g. timestamp, GPS coordinates, Cell ID) within the sighting message 804. A user may use this associated data to help locate or track the wireless identity transmitter (e.g., a mother could look for a lost child at the latest location reported for the child's wireless identity transmitter).

Figure 9:
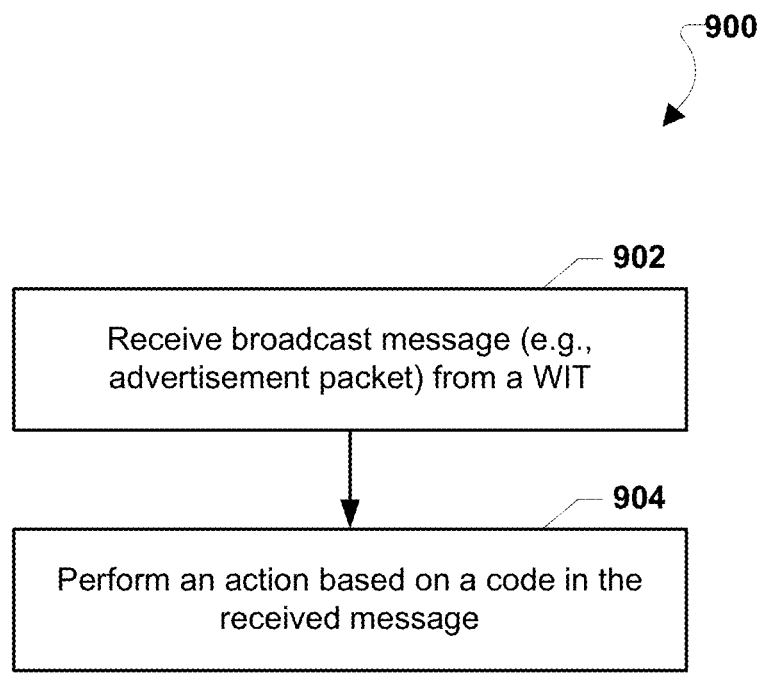
FIG. 9 is a process flow diagram illustrating an embodiment method for a proximity broadcast receiver to perform an action or a code indicated within a received broadcast message.

FIG. 9 illustrates an embodiment method 900 for a proximity broadcast receiver to perform an action based on a type or command segment in a broadcast message. In block 902, a proximity broadcast receiver may receive a broadcast message, such as a broadcast advertising packet, from a wireless identity transmitter (referred to as "WIT" in FIG. 9). In alternate embodiments, this message may be sent over a connection established by pairing or as part of the pairing procedure. The broadcast message may contain an identifier segment, as well as an additional segment or code, such as a type segment or command segment. The proximity broadcast receiver may perform an action based on this code in the received broadcast message in block 904. In various embodiments, this action may include any operation the proximity broadcast receiver is capable of performing. For example, the proximity broadcast receiver may assign different levels of priority to messages or identifiers based on a type segment or command segment (e.g., child safety devices have higher priority than security tags from stores). Received messages or identifiers with higher priority may be transmitted to a central server first or deleted last from a proximity broadcast receiver's local log.

The proximity broadcast receiver may handle the broadcast message or identifier differently based on a type or command segment. For example, the message may be stored locally for a certain time (e.g., various times depending on the value of the segment) prior to being transmitted to a central server. Alternatively, the message or identifier, along with any associated data such as timestamps and GPS coordinates, may be transmitted to multiple locations.

As another example, the proximity broadcast receiver may initiate various communications based on the type and/or command segments. The proximity broadcast receiver may contact particular URIs, transmit an SMS message, initiate a phone call, or establish new network connections. In various embodiments, some of these actions may be optionally disabled to protect user privacy.

In further embodiments, the proximity broadcast receiver may be configured to transmit the additional segment or other message to another network device for the other network device to take some action. For example, the proximity broadcast receiver may forward the message along with associated data to the central server. The central server may perform an action based on the additional segment in the message, such as automatically sending a message to a user without waiting for a user request.

Figure 10:
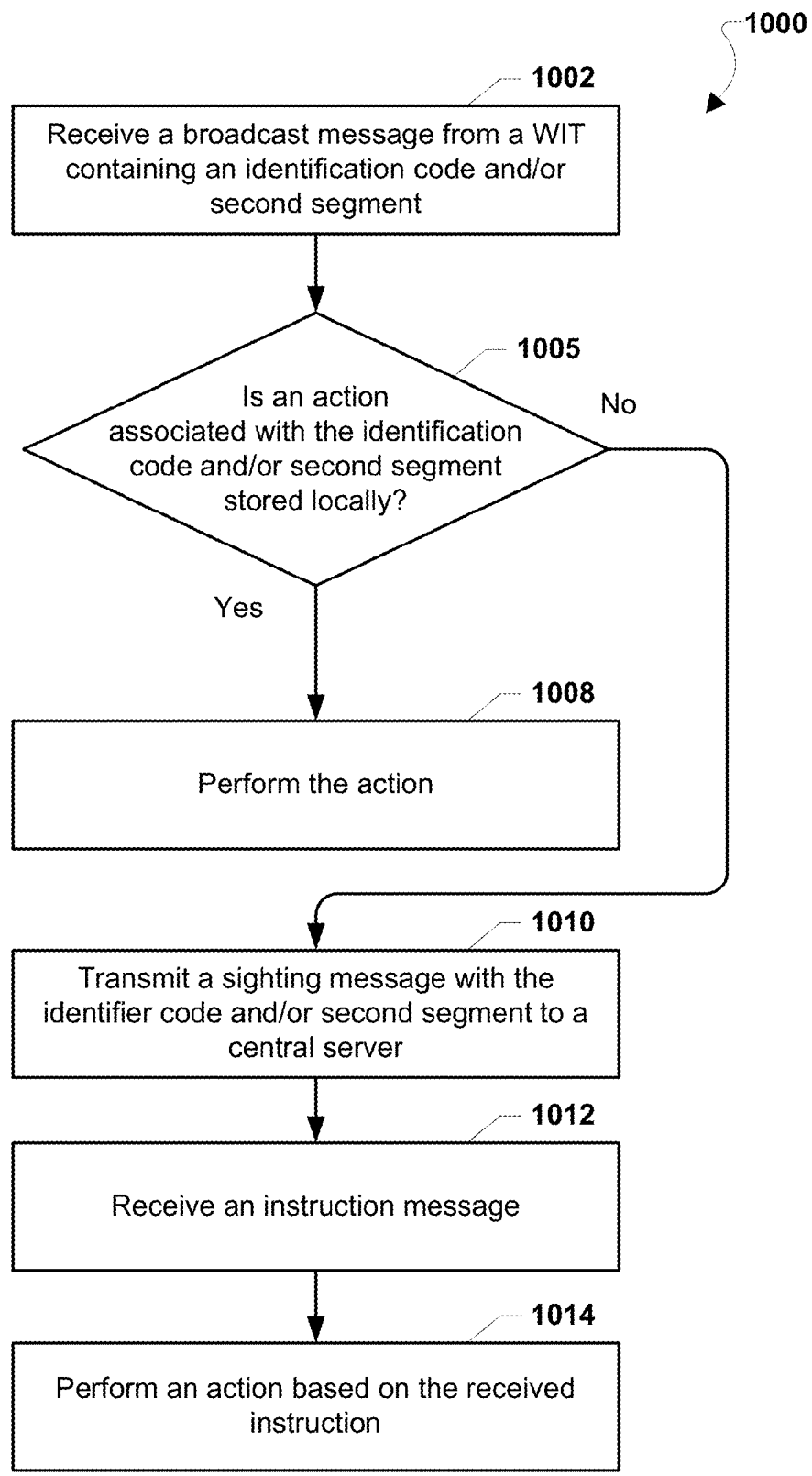
FIG. 10 is a process flow diagram illustrating an embodiment method for a proximity broadcast receiver to receive an instruction from a central server in response to transmitting a sighting message based on proximity to a wireless identity transmitter.

FIG. 10 illustrates an embodiment method 1000 for a proximity broadcast receiver to provide content based on proximity to a wireless identity transmitter. A proximity broadcast receiver may receive a broadcast message from a wireless identity transmitter (referred to as "WIT" in FIG. 10) containing an identification code and/or second segment in block 1002. The proximity broadcast receiver may determine whether an action associated with the identification code and/or second segment is stored locally (e.g., in the proximity broadcast receiver's memory) in determination block 1005. If an associated action is found locally (i.e., determination block 1005=Yes), the action may be performed by the proximity broadcast receiver in block 1008.

If an associated action is not found locally (i.e., determination block 1005=No), the proximity broadcast receiver may transmit a sighting message with the identifier and/or second segment to a central server in block 1010. In an embodiment, the proximity broadcast receiver may transmit a message to another device, such as a user device. The proximity broadcast receiver may receive an instruction message in block 1012. This instruction may be sent by the central server or other device in response to the sighting message with the identifier and/or second segment. In block 1014, the proximity broadcast receiver may perform an action based on the received instruction message, such as access content by going to a web page or other online resource. In alternate embodiments, the proximity broadcast receiver may skip the determination block 1005 and automatically proceed to either transmit a sighting message in block 1010 or attempt to perform an action stored locally.

A proximity-based content publishing system may be used for a wide range of activities. For example, teens may carry a wireless identity transmitter with them that they point to their social networking pages (e.g., Facebook®). When they are proximate to friends, the pages can be quickly accessed on proximity broadcast receivers (i.e., mobile phones configured to operate as mobile proximity broadcast receivers). Realtors may setup a web page for a home and affix to the home's signpost a wireless identity transmitter pointing to the web page so that anyone driving by the home can access that information. Stores may include wireless identity transmitters with products to provide dynamic displays such as links to coupons, customer reports, or additional nutritional information. If a lost dog has a wireless identity transmitter on its collar, instead of trying to wrestle the dog for access to his collar, a proximity broadcast receiver may simply access the wireless identity transmitter and send a message or call the owner.

The various features and alternative actions may enable the system to have flexible and extensible functionality. The functionality could be added later as the actions taken are controlled by applications that may be updated in proximity broadcast receivers over time.

Figure 11:
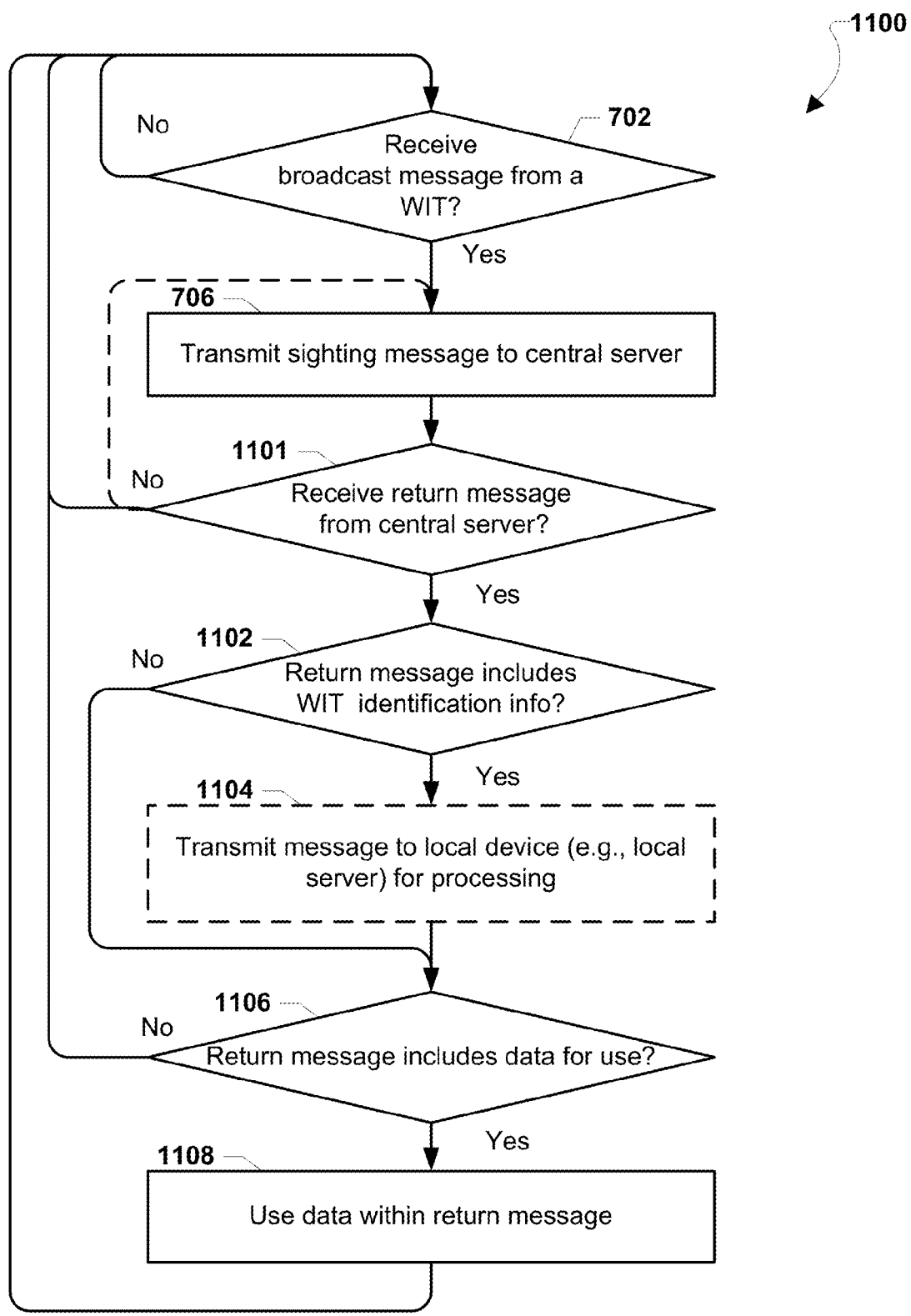
FIG. 11 is a process flow diagram illustrating an embodiment method for a proximity broadcast receiver to transmit a sighting message to and receive a return message from a central server.

FIG. 11 illustrates an embodiment method 1100 for a proximity broadcast receiver relaying a broadcast message to and receiving a return message from a central server.

Proximity broadcast receivers may be mobile (e.g., smartphones) or stationary, and thus may be connected to facilities, such as houses, stores, gyms, schools, etc., and configured to execute various operations relating to those facilities. For example, a proximity broadcast receiver may be contained within equipment that executes software routines. Such proximity broadcast receivers may be configured to execute particular routines in response to receiving broadcast messages from a wireless identity transmitter (referred to as "WIT" in FIG. 11). For example, the proximity broadcast receiver may modify the execution of operations to suit preferences of the user of the wireless identity transmitter.

However, as discussed above, the wireless identity transmitter may obscure, encode, or encrypt data within broadcast messages to protect the privacy and identity of the wireless identity transmitter user. For example, the broadcast messages may not transmit the user's identity in the clear. To determine the identity information related to received broadcast messages, the proximity broadcast receiver may relay the broadcast messages to the central server, which may identify the wireless identity transmitter and its user based on information in the messages (e.g., a disguised, rolled, or encrypted device ID). As discussed above, the central server may store a secret (e.g., a key, code, etc.) to decrypt messages transmitted by the wireless identity transmitter. In response to receiving a sighting message, the central server may transmit a return message to the proximity broadcast receiver including identification information of the wireless identity transmitter.

In an embodiment, the central server may also store additional information relevant to the operations of the facility associated with the proximity broadcast receiver. For example, the central server may be an information hub that stores proprietary information related to the operations of the facility the proximity broadcast receiver is within. As another example, the central server may contain instructions for the proximity broadcast receiver to perform based on the identity of the wireless identity transmitter. Accordingly, the central server may transmit a return message that may not identify the wireless identity transmitter (or its user) related to a sighting message, but may instead includes data relevant to the wireless identity transmitter. In various embodiments, return messages may include or not include either data or identification information based on the preferences of the user of the wireless identity transmitter and/or the services associated with the proximity broadcast receiver. For example, the proximity broadcast receiver may be registered as relating to a trusted service for the user of the wireless identity transmitter, and therefore the central server may transmit return messages that identify the user. As another example, the user of the wireless identity transmitter may have set privacy permissions (or settings) during a registration procedure with the central server that enable anonymous data to be distributed to proximity broadcast receivers. Privacy permissions are further discussed below.

In determination block 702, the proximity broadcast receiver may determine whether a broadcast message is received, such as from a wireless identity transmitter. If no broadcast message is received (i.e., determination block 702="No"), the proximity broadcast receiver may continue with the operations in determination block 702. If a broadcast message is received (i.e., determination block 702="Yes"), in block 706 the proximity broadcast receiver may transmit a sighting message to a central server. For example, the sighting message may include identification information of the wireless identity transmitter as well as associated data, such as the location of the proximity broadcast receiver and a timestamp.

In determination block 1101, the proximity broadcast receiver may determine whether a return message from the central server is received. In an embodiment, the proximity broadcast receiver may record identification information about the sighting message and may compare that information to received messages to find a match. If no return message is received (i.e., determination block 1101="No"), the proximity broadcast receiver may continue with the operations in determination block 702. Alternatively, if no return message is received (i.e., determination block 1101="No"), the proximity broadcast receiver may optionally re-transmit the sighting message to the central server in block 706. In an embodiment, the proximity broadcast receiver may retransmit sighting messages a predefined number of times over a period of time when no return message is received.

When a return message is received (i.e., determination block 1101="Yes"), in determination block 1102 the proximity broadcast receiver may determine whether the return message includes wireless identity transmitter identification information. For example, identification information may include user names, addresses, sensitive information (e.g., social security number, banking information, passwords, etc.), and other data describing the wireless identity transmitter and/or the user of the wireless identity transmitter. If the return message does contain identification information (i.e., determination block 1102="Yes"), in optional block 1104 the proximity broadcast receiver may transmit a message to a local device, such as a local server, for processing. In other words, the proximity broadcast receiver may relay the identification information in the return message to a local device associated with proximity broadcast receiver and/or the facility in which the proximity broadcast receiver is located. For example, the proximity broadcast receiver may transmit the identification information of the wireless identity transmitter to a local computing device of a gym, retail store, a school, or other third-party that may in turn determine instructions for the proximity broadcast receiver based on the identification information. In an embodiment, the local device may store the identification information and/or relate the information to database data for further use with the various related devices of the facility.

If the return message does not include identification information (i.e., determination block 1102="No") or the proximity broadcast receiver transmits a message to the local device in optional block 1104, the proximity broadcast receiver may determine whether the return message includes other data for use, such as by the proximity broadcast receiver or other devices associated with the proximity broadcast receiver in determination block 1106. For example, the return message may include commands or instructions for the proximity broadcast receiver to perform. Additionally, the data may contain configuration data (or configuration information) that may be used by various devices to accommodate the wireless identity transmitter and/or the preferences of the wireless identity transmitter's user. For example, the return message may contain software instructions for the proximity broadcast receiver to use or transfer to the local device, the wireless identity transmitter, or various other associated devices. If the return message includes data for use (i.e., determination block 1106="Yes"), in block 1108 the proximity broadcast receiver may use the data within the return message. For example, the proximity broadcast receiver may execute operations to utilize configuration data from the return message (e.g., set equipment to suit the user's preferences). If the return message does not contain data for use by the proximity broadcast receiver (i.e., determination block 1106="No"), the proximity broadcast receiver may continue with the operations in determination block 702.

As a non-limiting, illustrative example: the proximity broadcast receiver may be connected to a piece of exercise equipment within a fitness facility that is registered with a central server (i.e., the facility relates to a registered service). When the proximity broadcast receiver receives a broadcast message from the wireless identity transmitter carried by a user intending to work-out on the exercise equipment, the proximity broadcast receiver may transmit a sighting message to the central server. The proximity broadcast receiver may receive a return message from the central server that includes data which may be used to configure the exercise equipment to suit the anatomical dimensions and preferences of the user of the wireless identity transmitter without necessarily sharing the user's identity. For example, the proximity broadcast receiver may use the data to adjust the height of the equipment's seat or pedals. As another example, the data may define a workout routine to be executed on the exercise equipment. Alternatively, the return message may include the user's fitness facility identification, which the proximity broadcast receiver may transmit to a local server (e.g., a gym administrative server). The local server may compare the user's fitness facility identification to a local database and in response to the comparison, may transmit personalized configuration instructions to the proximity broadcast receiver and exercise equipment. Other non-limiting but illustrative applications of return message data may include configuring rental cars (e.g., seat positions, settings, etc.) and computer components (e.g., mouse, keyboards, etc.) for personalized use by the user of the wireless identity transmitter.

In an embodiment, return messages may include identification information such as photographic imagery useful to identify the user of the wireless identity transmitter. For example, in response to receiving a return message identifying the user of the wireless identity transmitter, the proximity broadcast receiver may display an image of the user or a sample of the user's handwriting (e.g., a signature). This functionality may be used by emergency personnel, citizens on alert, or merchants when attempting to quickly verify the identity of a person (e.g., a missing child, customer, etc.) equipped with a wireless identity transmitter. In another embodiment, a merchant's proximity broadcast receiver engaged in a business transaction (e.g., a point-of-sale device with an embedded proximity broadcast receiver) may transmit a sighting message including information broadcast by a proximate user's wireless identity transmitter. The resulting return message may include confirmation that the identities of the registered user of the wireless identity transmitter and the user match (i.e., the in-store person matches the user indicated in the central server as relating to the wireless identity transmitter). Additionally, if the identities are the same, the return message may include additional information to assist in the transactions, such as payment information, credit card numbers, or contact information for follow-up communications.

In another embodiment, the return message from the central server may include software instructions and/or data that may cause the proximity broadcast receiver to modify, adjust, remove, activate, or disable components, sensors, features, software, and/or functions of the proximity broadcast receiver. For example, the return message may include software instructions that the proximity broadcast receiver executes upon receiving the return message, or triggers the proximity broadcast receiver to execute a pre-loaded routine or enter a particular operating mode. Such software instructions may define operations the proximity broadcast receiver may execute that configure the proximity broadcast receiver, such as activating (or de-activating) a camera component, a cellular network modem, speaker systems, WiFi transceivers, etc. As another example, the return message may instruct the proximity broadcast receiver, such as a smartphone configured to operate as a mobile proximity broadcast receiver, to execute an application, transmit a message (e.g., email, SMS, short-range radio signal, etc.), or turn itself off Software instructions within such return messages may include timing information that indicates when affected components, sensors, features, software, and/or functions may be configured and/or re-configured. For example, the return message may include instructions that cause the proximity broadcast receiver to disable a microphone for a certain period of time. In an embodiment, the proximity broadcast receiver may be configured to reverse any modifications, adjustments, operating mode selections, or other configurations identified in return message software instructions after a period of time and/or when the proximity broadcast receiver no longer receives broadcast messages from wireless identity transmitters related to the return message. For example, the proximity broadcast receiver may disable the speakers on the proximity broadcast receiver so long as the proximity broadcast receiver receives broadcast messages from the wireless identity transmitter. In another embodiment, the proximity broadcast receiver may modify, adjust, remove, activate, or disable components, sensors, features, software, and/or functions of the proximity broadcast receiver based on information within received broadcast messages. For example, the proximity broadcast receiver may process a received broadcast message and execute detected software instructions that direct the proximity broadcast receiver to disable a sensor, such as a camera.

Figure 12:
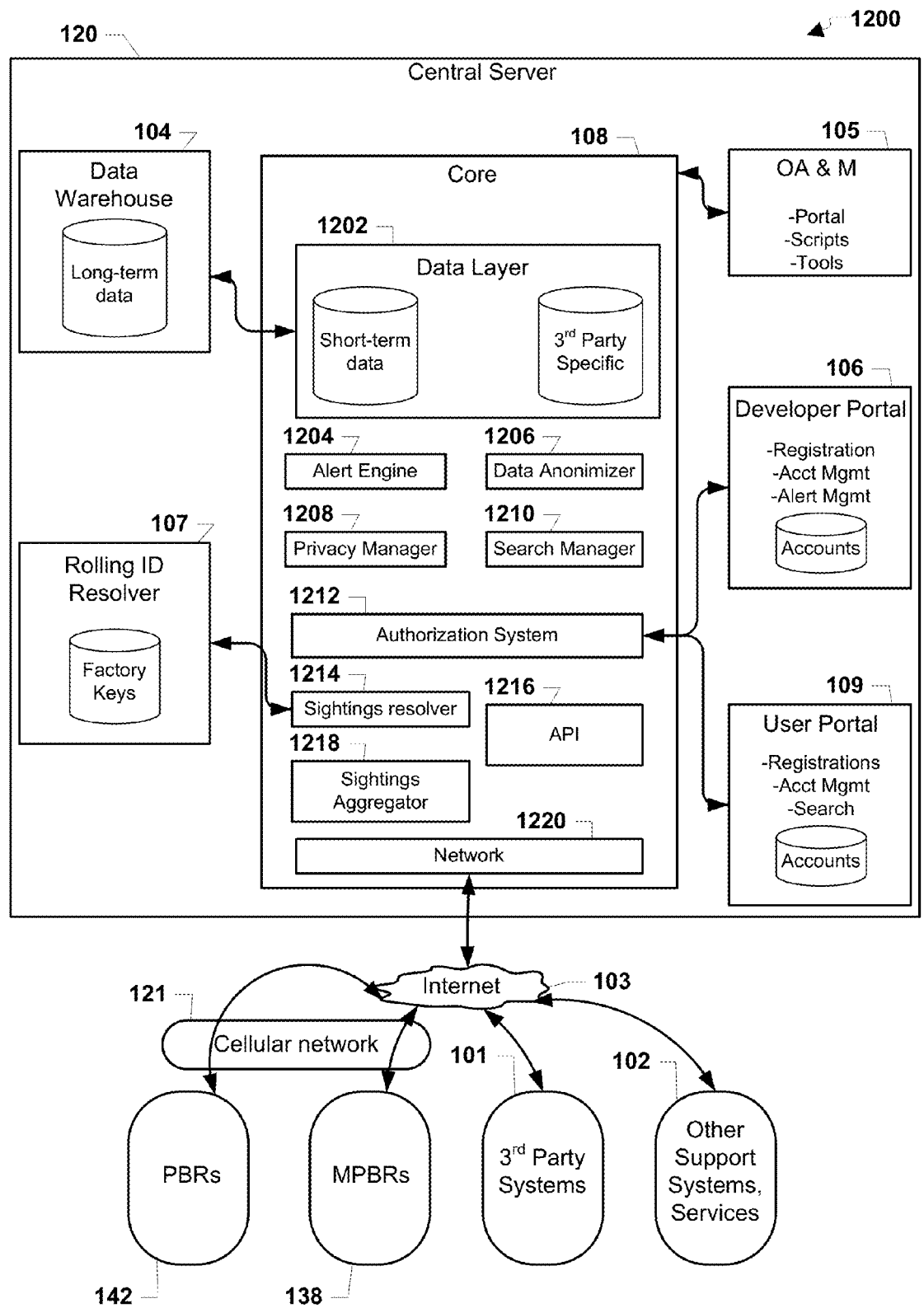
FIG. 12 is a component diagram illustrating various modules within a central server suitable for use in various embodiments.

FIG. 12 illustrates a diagram 1200 of various modules within a central server 120. The various modules and components are described below in the context of modules, components, and/or elements within a central server 120. However, in various embodiments, the central server 120 may include or be connected to individual computing devices, server blades, or other units that may perform the operations associated with the various modules and/or components described below.

As described above with reference to FIG. 1, the central server 120 may be configured to receive, store, and otherwise process data corresponding to wireless identity transmitters. For example, the central server 120 may be configured to exchange communications with various devices via the Internet 103, such as proximity broadcast receivers 142 and mobile proximity broadcast receivers 138 communicating via a cellular network 121, third-party systems 101, and other support systems and/or services 102.

The central server 120 may include several components 104-109 to perform various operations to process data, such as received from proximity broadcast receivers 142, 138, third-party systems 101, or other support systems and/or services 102. In particular, the central server 120 may include a core component 108 that may process sighting messages, execute an alert or notice engine module, handle application programming interface (API) commands, and exchange data with other components within the central server 120. The core component 108 may include a data layer module 1202 that may include units for storing short-term data and third-party specific data. The core component 108 may also include an alert engine module 1204 for generating alert messages for transmissions to proximity broadcast receivers and initiating searches of various target wireless identity transmitters. The core component 108 may further include a data anonimizer module 1206 that may generate generic, anonymous, or otherwise processed data based on privacy policies or profile preferences of users. For example, the data anonimizer module 1206 may strip personal information from return messages transmitted to a proximity broadcast receiver associated with a store so that a customer user of a wireless identity transmitter is not identified to the store, but the fact that the user is within the store is still reported to the store. The core component 108 may also include a privacy manager module 1208 that may maintain privacy permission information for various users. For example, the privacy manager module 1208 may include a database of privacy parameters provided by users at registration. In an embodiment, the data anonimizer module 1206 and/or the privacy manager module 1208 may utilize the permissions described below.

The core component 108 may also include a search manager module 1210 for assisting in organizing and administering searches and an authorization system module 1212. The core component 108 may further include a sightings resolver module 1214 that may be utilized by the central server 120 for identifying wireless identity transmitters associated with broadcast messages reported within received sighting messages from proximity broadcast receivers 142, 138. The core component 108 may include an API module 1216 that may include functions and interfaces for initiating operations, a sightings aggregator module 1218 for compounding various sighting messages over a period for transmissions in consolidated form to merchants, third-parties, and other services. The core component 108 may also include a network module 1220 for transmitting and receiving various communications with devices, such as proximity broadcast receivers 142, 138 and third-party systems 101 via the Internet.

The central server 120 may also include a data warehouse component 104 that may store long-term data (e.g., archived user data, past location information, etc.). The data warehouse component 104 may include various databases for storing information pertinent to users of wireless identity transmitters, such as profile information provided by users via registration websites. The data warehouse component 104 may be configured to exchange data with the data layer module 1202 of the core component 108. The central server 120 may also include an operations, administration, and management component 105 that may process and/or store software associated with user portal accesses, scripts, and tools (e.g., software utilities, routines, etc.). The operations, administration, and management component 105 may be configured to exchange data with the core component 108.

The central server 120 may also include a developer portal component 106 that may store developer account data and perform registration, account management, and alert (or notice) management routines associated with developers, such as vendors or merchants that register to interact with users of wireless identity transmitters 110. The central server 120 may also include a user portal component 109 that may store user account data and perform registration, account management, and search routines associated with users, such as persons associated with wireless identity transmitters. The user portal component 109 and developer portal component 106 may be configured to exchange data with the authorization system module 1212 of the core component 108. The central server 120 may also include a rolling identifier (or ID) resolver component 107 that may store factory keys associated with wireless identity transmitters 110 as well as perform operations, software, or routines to match encrypted, encoded, rolling, or otherwise obfuscated identification information within received sighting messages with affiliated user data. The rolling identifier (or ID) resolver component 107 may be configured to exchange data with the sightings resolver module 1214 of the core component 108.

In various embodiments, the various modules and components, such as the rolling ID resolver component 107, may be performed or otherwise enabled by software instructions, applications, routines, threads, circuitry, or hardware units.

Figure 13:
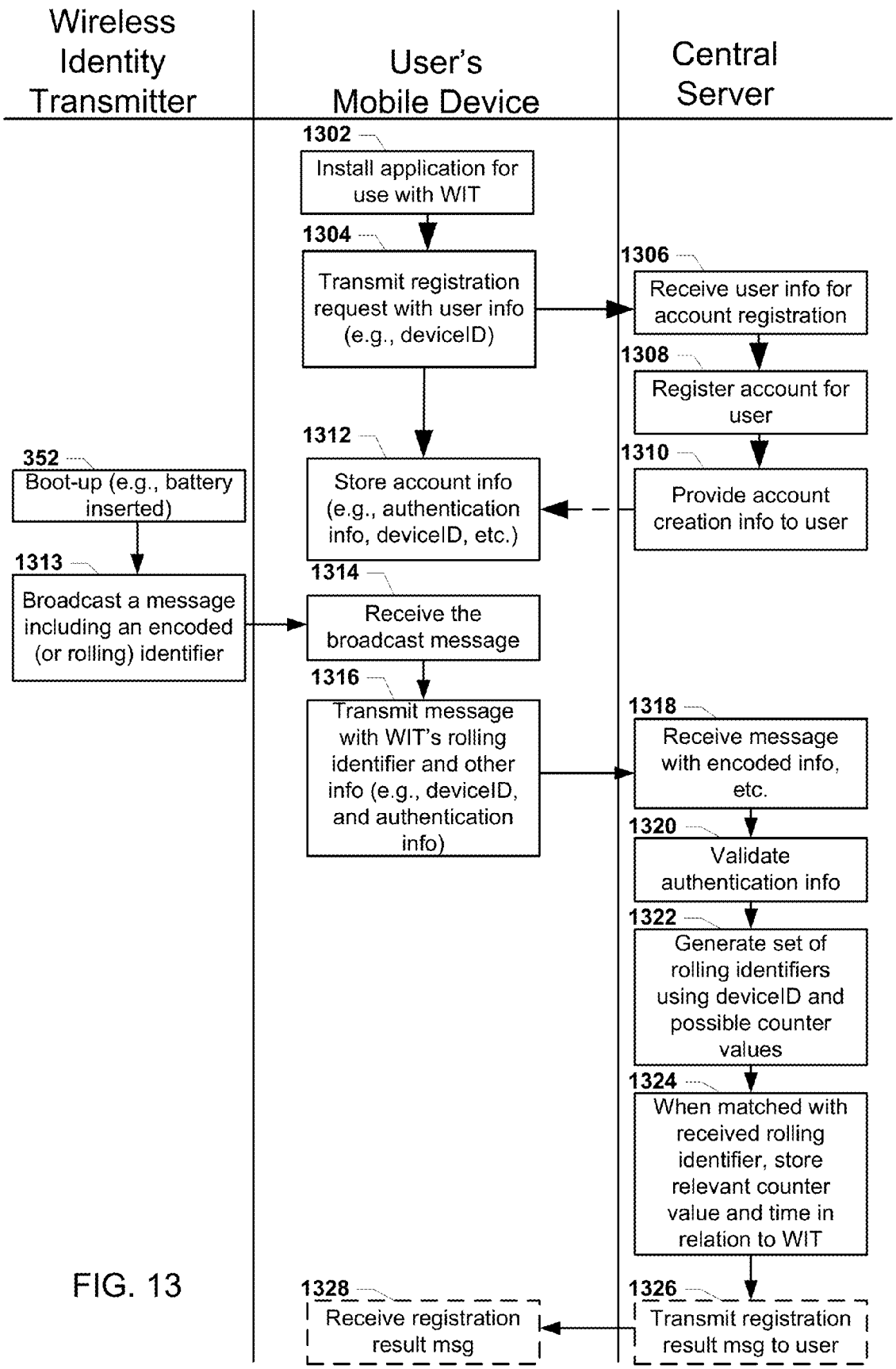
FIG. 13 is a diagram illustrating a registration process suitable for use in various embodiments.

FIG. 13 illustrates a registration process for use in various embodiments. In general, before data related to broadcast messages may be processed by a central server, the central server may require that wireless identity transmitters (and/or proximity broadcast receivers) and their users be registered with the central server. For example, before any tracking, searching, or other location-based activities related to a wireless identity transmitter can be initiated, the central server must be able to determine the users associated with the various wireless identity transmitters circulating in the world. Registration may create links between identifiers transmitted by wireless identity transmitters in broadcast messages, the wireless identity transmitters, and their users. For example, in order to transmit a notification to a missing child's parents that the child has been found, relayed obfuscated (or encoded) identifiers must be matched to account information that indicates the parents' cell phone numbers as stored in relation to a registered user account.

In particular, through registration, a timing mechanism may be synchronized between each wireless identity transmitter and the central server (i.e., a nonce or counter). With such a nonce or counter, a wireless identity transmitter and the central server may encode (or roll) and decode identifiers respectively, keeping the identity associated with the wireless identity transmitter (and its users) concealed and private. The most appropriate time to synchronize such a timing mechanism or nonce or counter may be during a device registration and/or account creation process as described below. For the purpose of FIG. 13, a mobile device, such as a smartphone, is described as being used by a user to perform account creation and registration operations (e.g., the mobile device accesses a web portal to register with the central server, etc.). However, any computing device connected to the Internet and capable of exchanging communications with the central server via a registration web portal or website may be relevant.

In block 1302, a user's mobile device (e.g., an iPhone, Android, tablet device, etc.) may install an application for use with wireless identity transmitters. Such an application (or "app") may execute on the mobile device's processor as a background service or alternatively may be activated for selective use by the user. As described throughout this disclosure, such an application may enable the mobile device to process short-range broadcast messages from proximate wireless identity transmitters, such as by identifying received signals as broadcast messages and relaying sighting messages having location information to the central server in response. In other words, the user's mobile device may be configured to perform operations of a proximity broadcast receiver in addition to other conventional computing activities.

In block 1304, the mobile device may transmit a registration request with user information (e.g., a device identity or "deviceID"). The registration request may be sent to the central server via Internet communications with a web portal, web site, or web server controlled or otherwise accessible by the central server. In other words, the mobile device may invoke the registration process or by providing user information (e.g., device ID) through the installed app by providing the device ID (deviceID) and other information the central server may utilize to bind the registration request to an account. For example, the user's mobile device may access a registration website, receive inputs from the user, and transmit the user input as data to the registration website for use by the central server as described above with reference to FIG. 12. In an embodiment, the user information may include personal information about the user, such as name, address, contact information (e.g., social network sites, cell phone number, email address, telephone number, etc.) age, and other demographic information, as well as identifying information about wireless identity transmitters and/or proximity broadcast receivers that may be associated with the user's account. For example, the user information transmitted to the central server may include the serial number on a wireless identity transmitter and/or a confirmation code produced by the mobile device in response to installing the application with the operations in block 1302. The user information may also include preference information, such as the user's preferred retails stores, product lines, and areas to eat or consume. The user information may further include privacy permissions that indicate how personal information may be distributed or used by the central server. In an embodiment, users may register as anonymous users, such that the central server does not store any identifying information about the users. For example, an account may be registered that is linked to a non-descript post office box, a disposable cellular telephone number, or other contact information that does not directly identify the user or the holder of the account. This may be important for those who may choose to utilize services provided by the central server, but who are concerned about leaked private or identifying information. In block 1312, the user's mobile device may store account information, such as authentication information (e.g., codes, messages) from the central server or device ID associated with an owned wireless identity transmitter.

In block 1306, the central server may receive the user information for account registration. In block 1308, the central server may register an account for the user. For example, the central server may store the user's information, including provided device identifications, in a database of all registered users. In block 1310 the central server may provide account creation information to the user. The account creation information may include an authentication code or other information the user's mobile device may store for future use. For example, the central server may display confirmation of account creation on a website accessible by the user's mobile device or alternatively may transmit a confirmation signal, text message, email, or other communication to the user's mobile device.

In block 352, the wireless identity transmitter may boot-up. When the wireless identity transmitter boots, a nonce or counter value may be initialized. For example, the wireless identity transmitter may begin to increment a value that represents the passage of time, starting from a zero value.

In block 1313, the wireless identity transmitter may broadcast a message (i.e., a broadcast message) that includes an encoded (or rolling) identifier. For example, the wireless identity transmitter may begin transmitting broadcast messages every few seconds. The wireless identity transmitter may generate rolling identifiers with the embodiment methods described below. In general, the broadcast message may include a payload that includes data generated by performing a pseudo-random function. For example, the wireless identity transmitter may perform a pseudo-random function to generate encoded data based on input values of the wireless identity transmitter's device ID, a nonce or counter value, and a secret key, seed, or other value known only to the wireless identity transmitter and the central server. In an embodiment, the pseudo-random function may be a polynomial time computable function that may utilize a randomly selected seed value only known to the wireless identity transmitter and the central server, such that the pseudo-random function may be computationally indistinguishable from a random function defined on the same domain with output to the same range as the pseudo-random function. In an embodiment, the keyed-hash Message Authentication Code (HMAC) or the cipher-based Message authentication Code (CMAC) may be used as the pseudo-random function.

In an embodiment, the wireless identity transmitter may be required to be activated within a predefined number of seconds within the time the mobile device begins the registration process with the operations in block 1304. In other words, once the wireless identity transmitter begins incrementing its nonce or counter value, the user must register with the central server within a certain period. This enables the central server to try at only a certain number of values when trying to determine the nonce or counter value at the wireless identity transmitter during registration.

In an embodiment, the wireless identity transmitter may indicate an initial broadcast by adjusting data within a broadcast message's payload. For example, the wireless identity transmitter may change a bit within a broadcast message that the central server may recognize as indicating an initialization time period for the wireless identity transmitter. If there are initialization indicators within payloads, the central server may expedite comparisons between received payloads and stored payloads by avoiding comparisons to payloads corresponding to already registered (or recognized) wireless identity transmitters within a central server lookup data table.

In block 1314, the user's mobile device may receive the broadcast message. In other words, based on the installed application (or app), the mobile device may function as a mobile proximity broadcast receiver. An installed application may, such as the app installed with the operations in block 1302, may be waiting to receive such a broadcast message in response to initiating registration operations with the central server via the registration request. In block 1316, the mobile device may transmit the wireless identity transmitter's rolling identifier and other information, such as the stored device ID and authentication information. In an embodiment, the mobile device may extract encoded information from the received broadcast message, such as by using text comparison and/or parsing operations. For example, the mobile device may perform a most-significant bit operation.

In block 1318, the central server may receive the message with the encoded information, as well as the authentication information and the device ID. In block 1320, the central server may validate authentication information, such as in the received message from the mobile device. In particular, the central server may compare the authentication information to information generated in the operations in blocks 1308-1310. In block 1322, the central server may generate a set of rolling identifiers using the device ID and possible nonce or counter values. The central server may compare the encoded identifiers of the set with the rolling identifier received from the mobile device. In an embodiment, the central server may compute a set of encoded data by using a pseudo-random function, such as described above, along with the device ID and a number of nonce or counter values. For example, the central server may execute the pseudo-random function with a seed shared with wireless identity transmitters, the device ID indicated by the mobile device, and many nonce or counter values, starting with 0.

In block 1324, when the central server matches the received rolling identifier to one of the rolling identifiers in the generated set, the central server may store relevant nonce or counter value and time in relation to the WIT. The central server may use the nonce or counter value used to generate the matching rolling identifier to sync with the nonce or counter running on the wireless identity transmitter. In an embodiment, the central server may store an indicator that describes the wireless identity transmitter as having been successfully registered and/or synced.

In optional block 1326, the central server may then transmit a registration result message to the user, such as by transmitting a message to the mobile device. The registration result message may indicate whether or not the central server was able to match the received encoded identifier with a generated identifier. In optional block 1328, the mobile device may receive the registration result message. In an embodiment, the registration result message indicates that the registration process failed (e.g., the received broadcast message received by the mobile device did not correspond to the user's wireless identity transmitter), the mobile device may re-attempt the registration by receiving and relaying another broadcast message.

The operations described above, particularly within blocks 1313-1324, assume that message processing operations performed by the various devices, as well as any propagation delay, may be much smaller than the time required to increment (or update) the nonce or counter value at the wireless identity transmitter. This ensures that the nonce or counter values at the wireless identity transmitter and central server do not differ by more than 1.

Figure 14:
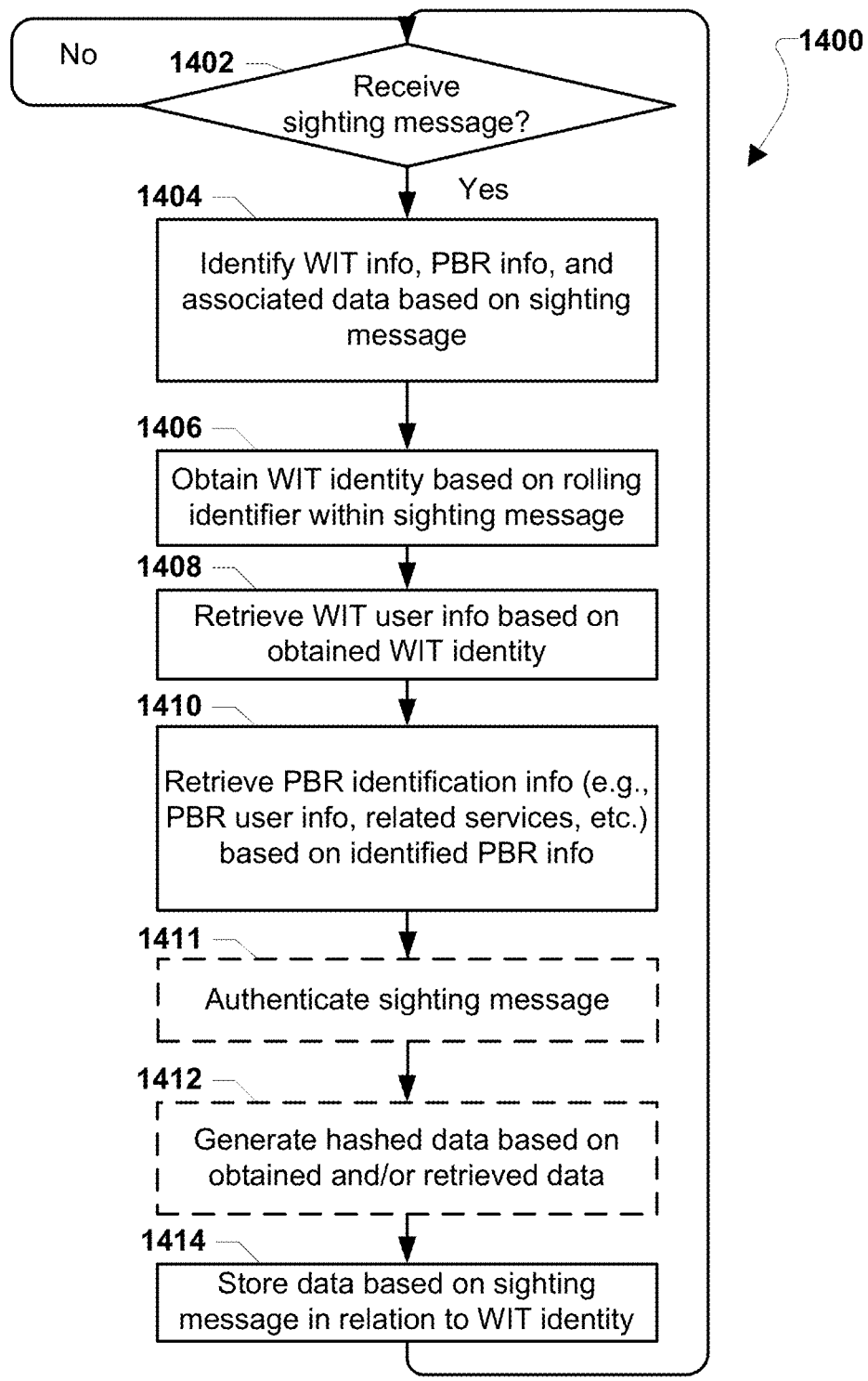
FIGS. 14 and 15 are process flow diagrams illustrating embodiment methods for a central server to process sighting messages received from proximity broadcast receivers.

FIG. 14 illustrates an embodiment method 1400 for a central server to process sighting messages received from proximity broadcast receivers. As described above, the central server may be configured to utilize various modules, components, circuitry, and software to process sighting messages. In determination block 1402, the central server may determine whether a sighting message is received. The central server may evaluate a receiving circuit, buffer, queue or other indicator to determine when messages are received from various devices, such as proximity broadcast receivers. In an embodiment, the central server may utilize a network module as described above to determine whether a sighting message is received. In general, sighting messages may be received via long-range communications, such as packets transmitted via a cellular network over the Internet. If the central server does not receive a sighting message (i.e., determination block 1402="No"), the central server may continue with the operations in determination block 1402.

If the central server receives a sighting message (i.e., determination block 1402="Yes"), in block 1404 the central server may identify wireless identity transmitter information, proximity broadcast receiver information, and associated data based on the sighting message. The central server may evaluate, parse, and otherwise make accessible various data and information segments within the received sighting message. For example, the central server may parse the sighting message to identify an included broadcast message from the wireless identity transmitter. As another example, the central server may identity encoded data corresponding to a wireless identity transmitter identity (i.e., rolling identifier), proximity broadcast receiver identification information (e.g., a receiver ID), location information, timestamp information, sensor data (e.g., accelerometer sensor data, etc.), identifiers of applications (or apps) associated with a proximity broadcast receiver (e.g., a list of installed applications, an identifier for a relevant app executing on the proximity broadcast receiver, etc.). In an embodiment, the central server may perform the operations of block 1404 with a sightings resolver module as described above.

In block 1406, the central server may obtain the wireless identity transmitter identity based on the rolling identifier within the sighting message. The central server may perform operations to decode, descramble, decrypt, or otherwise make accessible the rolling identifier. For example, the central server may perform operations to apply a secret key or decoding algorithm to obtain the identity of the wireless identity transmitter. In an embodiment, the operations of block 1406 may be performed by the central server by way of a rolling ID resolver component as described above. For example, the central server may cause a sightings resolver module to exchange data with the rolling ID resolver component to obtain a decoded wireless identity transmitter identifier. Embodiment operations to identity the wireless identity transmitter based on a sighting message that includes a rolling identifier are described below.

In block 1408, the central server may retrieve the wireless identity transmitter user information based on the obtained wireless identity transmitter identity. For example, the central server may retrieve user account information related to the wireless identity transmitter, such as demographics information, stored data indicating previous behaviors (e.g., travel paths, location history, etc.). In an embodiment, the operations of block 1408 may be performed by the central server by way of an authorization system module as described above. For example, the central server may cause the authorization system module to exchange wireless identity transmitter identity information with a user portal component to obtain user information as saved within user registration databases.

In block 1410, the central server may retrieve proximity broadcast receiver identification information, such as proximity broadcast receiver user information and related services, based on the identified proximity broadcast receiver information. For example, the central server may retrieve a merchant identity associated with the proximity broadcast receiver that transmitted the received sighting message, the tracking services the proximity broadcast receiver is registered to participate in, as well as any other relevant information to the proximity broadcast receiver. The central server may retrieve email addresses, MAC addresses, phone numbers, and other contact information related to a user of related proximity broadcast receiver based on the information within the sighting message. For example, the central server may determine the user contact information associated with a proximity broadcast receiver that may be used for subsequent transmissions from the central server, such as emails or SMS text messages that indicate proximity to an item of interest. In an embodiment, the central server may determine the identity of a user of a smartphone that is configured to perform operations of a mobile proximity broadcast receiver. In an embodiment, the operations of block 1410 may be performed by the central server by way of an authorization system module as described above. For example, the central server may cause the authorization system module to exchange proximity broadcast receiver information with a developer (or user) portal component to obtain information about related registered services (e.g., merchants, stores, vendors, services, etc.) as saved within developer registration databases.

In optional block 1411, the central server may authenticate the sighting message. Based on authentication information within the received sighting message, the central server may perform authentication operations that confirm the legitimacy of the sighting message as coming from a known or otherwise valid proximity broadcast receiver. As described above, sighting messages may include data, such as secret codes, certificates, or hash data, that can be used to confirm the identities of valid proximity broadcast receivers. As third-parties may attempt to spoof proximity broadcast receivers associated with registered services (e.g., a nefarious spammer may attempt to imitate a merchant's store proximity broadcast receiver by sending a fraudulent sighting message), the central server may check for authentication information that confirms the information within the sighting message is useful and related to a registered service (e.g., a registered merchant, a valid developer, or other party that deploys legitimate proximity broadcast receivers). For example, the central server may detect obscured header information within the sighting message that relates to a merchant established within the central server as a registered developer. When the sighting message does not include authentication information expected by the central server, such as a special code that all proximity broadcast receivers within a certain building possess, or does include authentication information that does not match information stored in the central server, the central server may disregard the sighting message and all included information. For example, a sighting message with out-of-date or incomplete authentication information may be disregarded by the central server, or alternatively stored in a list for potentially fraudulent proximity broadcast receivers.

In optional block 1412, the central server may generate hashed data based on the obtained and/or retrieve data. In an embodiment, the operations of optional block 1412 may be performed by the central server by way of a data anonimizer module as described above. In block 1414, the central server may store data based on the sighting message in relation to the wireless identity transmitter identity. For example, the central server may store identified associated data from the sighting message in a database in relation to the wireless identity transmitter's decoded identity. In an embodiment, the operations of block 1414 may be performed by the central server by way of a data layer module as described above.

Figure 15:
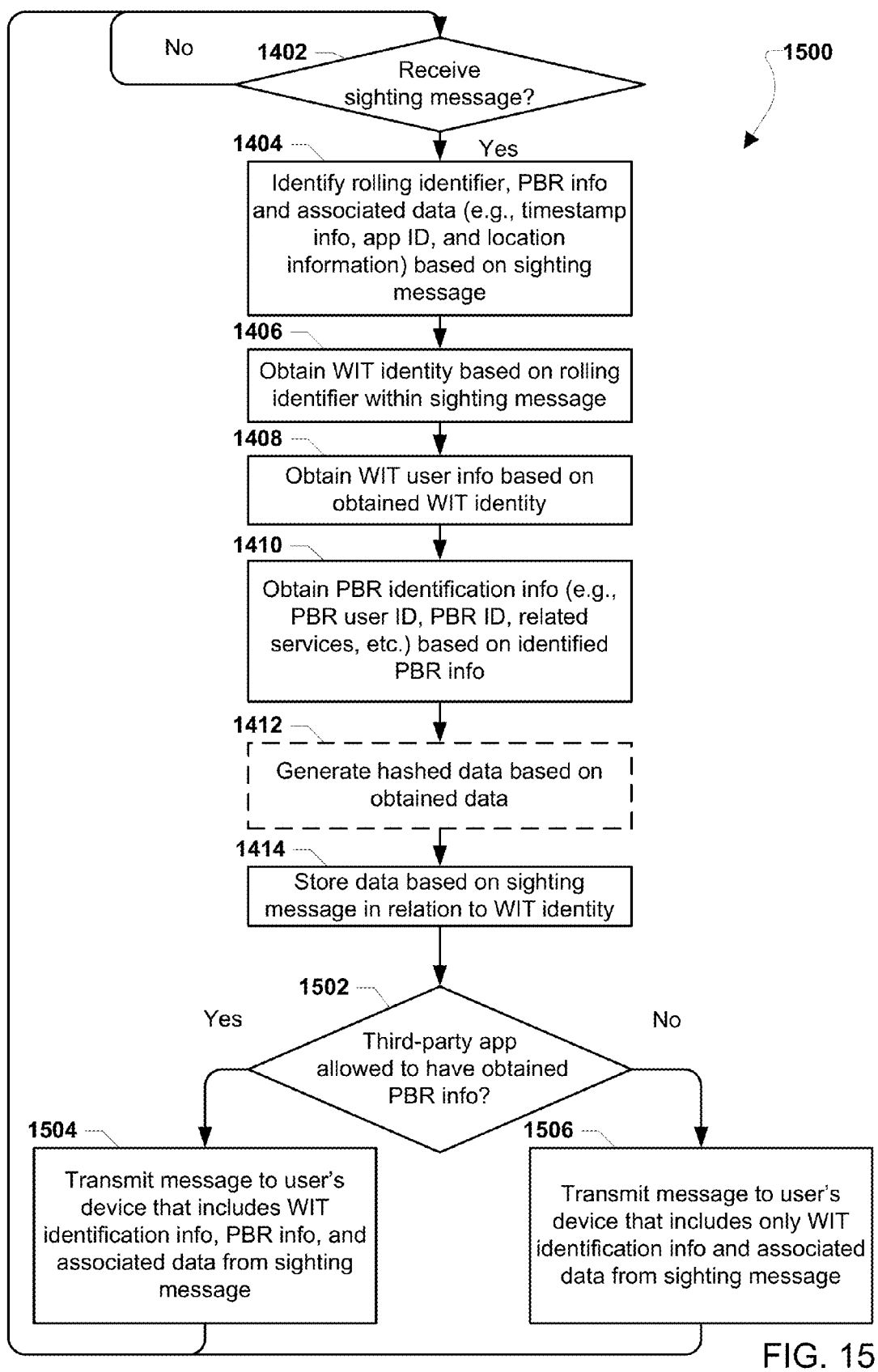

FIG. 15 illustrates an embodiment method 1500 for a central server to process sighting messages received from proximity broadcast receivers. The method 1500 is similar to the method 1400 described above, except that the central server may perform the method 1500 to transmit messages for use by a third-party application executing on mobile device carried by a user. As described above, various messages, such as return messages, alerts (or search activation messages), may be transmitted by the central server to various recipients, such as mobile devices associated with a user. For example, the central server may transmit messages to a user's tablet, smartphone, mobile proximity broadcast receiver, or other computing device. A recipient may also include an application or app executing on a mobile device. In an embodiment, the central server may also transmit messages to other third-party recipients or devices, such registered services that may include emergency medical technicians (EMTs), fire, local police, retail store, merchant computing devices, and ad servers.

Messages transmitted by the central server in response to receiving sighting messages may be transmitted to inform devices, such as a mobile phone or mobile proximity broadcast receiver carried by a user, of the location of proximity of known wireless identity transmitters. For example, when a proximity broadcast receiver, such as a stationary proximity broadcast receiver within a retail store, relays a broadcast message from a wireless identity transmitter associated with a user, the central server may respond by transmitting a message back to a mobile device of the user indicating the user is near the store's proximity broadcast receiver. Further, a third-party application running on the user's device may use information within the message. For example, a retail store app running on a user's smartphone may receive a notice that the user has moved within proximity of a display area within proximity of a retail store building. In various other embodiments, the third-party applications may be utilized to track owned items associated with wireless identity transmitters. For example, a particular third-party application may perform a ring tone when the user is within proximity of a searched for missing child.

In determination block 1402, the central server may determine whether a sighting message is received. If the central server does not receive a sighting message (i.e., determination block 1402="No"), the central server may continue with the operations in determination block 1402. If the central server receives a sighting message (i.e., determination block 1402="Yes"), in block 1404 the central server may identify wireless identity transmitter information, proximity broadcast receiver information, and associated data based on the sighting message. In block 1406, the central server may obtain the wireless identity transmitter identity based on the rolling identifier within the sighting message. In block 1408, the central server may retrieve the wireless identity transmitter user information based on the obtained wireless identity transmitter identity. In block 1410, the central server may retrieve proximity broadcast receiver identification information, such as proximity broadcast receiver user information and related services, based on the identified proximity broadcast receiver information. In optional block 1412, the central server may generate hashed data based on the obtained and/or retrieve data. In block 1414, the central server may store data based on the sighting message in relation to the wireless identity transmitter identity.

In determination block 1502, the central server may determine whether a third-party application (or app) is allowed to have obtained proximity broadcast receiver information. In other words, based on data stored in the central server that is associated with the user of the wireless identity transmitter, the central server may detect any registered services or third-party applications that are associated with the user's devices. For example, the central server may evaluate database information to identify whether the user has installed a third-party application on his/her smartphone that corresponds to a retail store. The proximity broadcast receiver information may include proximity broadcast receiver identification (e.g., an ID code or identifier) and the user identity of the proximity broadcast receiver. In an embodiment, the central server may identify whether third-party applications are allowed such information based on the third-party's developer rights, such as indicated when the third-party registered as a developer or registered service, or alternatively based on the user's permission settings, as described below. In an embodiment, the central server may use application identification information provided within the received sighting message to determine whether the third-party applications on the user's device may receive proximity broadcast receiver information. For example, the sighting message may contain indicators of applications (e.g., app IDs) that correspond to the sighting message and thus are allowed to receive any proximity broadcast receiver information from the central server.

If the third-party app is not allowed to have the obtained proximity broadcast receiver information (i.e., determination block 1502="No"), in block 1506 the central server may transmit a message to the user's device that includes only wireless identity transmitter identification information and associated data from the sighting message. For example, the message transmitted by the central server may include the obtained wireless identity transmitter identity, user information, timestamp data, and location information from the sighting message. If the third-party app is allowed to have the obtained proximity broadcast receiver information (i.e., determination block 1502="Yes"), in block 1504 the central server may transmit a message to the user's device that includes wireless identity transmitter identification information, proximity broadcast receiver information, and associated data from the sighting message. For example, the message transmitted by the central server to the user's smartphone may include indicators of the obtained proximity broadcast receiver identification (e.g., serial code, group affiliation, merchant category, etc.). The central server may then continue with the operations in determination block 1402. In an embodiment, the central server may utilize an alert engine module, such as described above, to transmit and/or generate messages for transmission to various devices.

Figure 16:
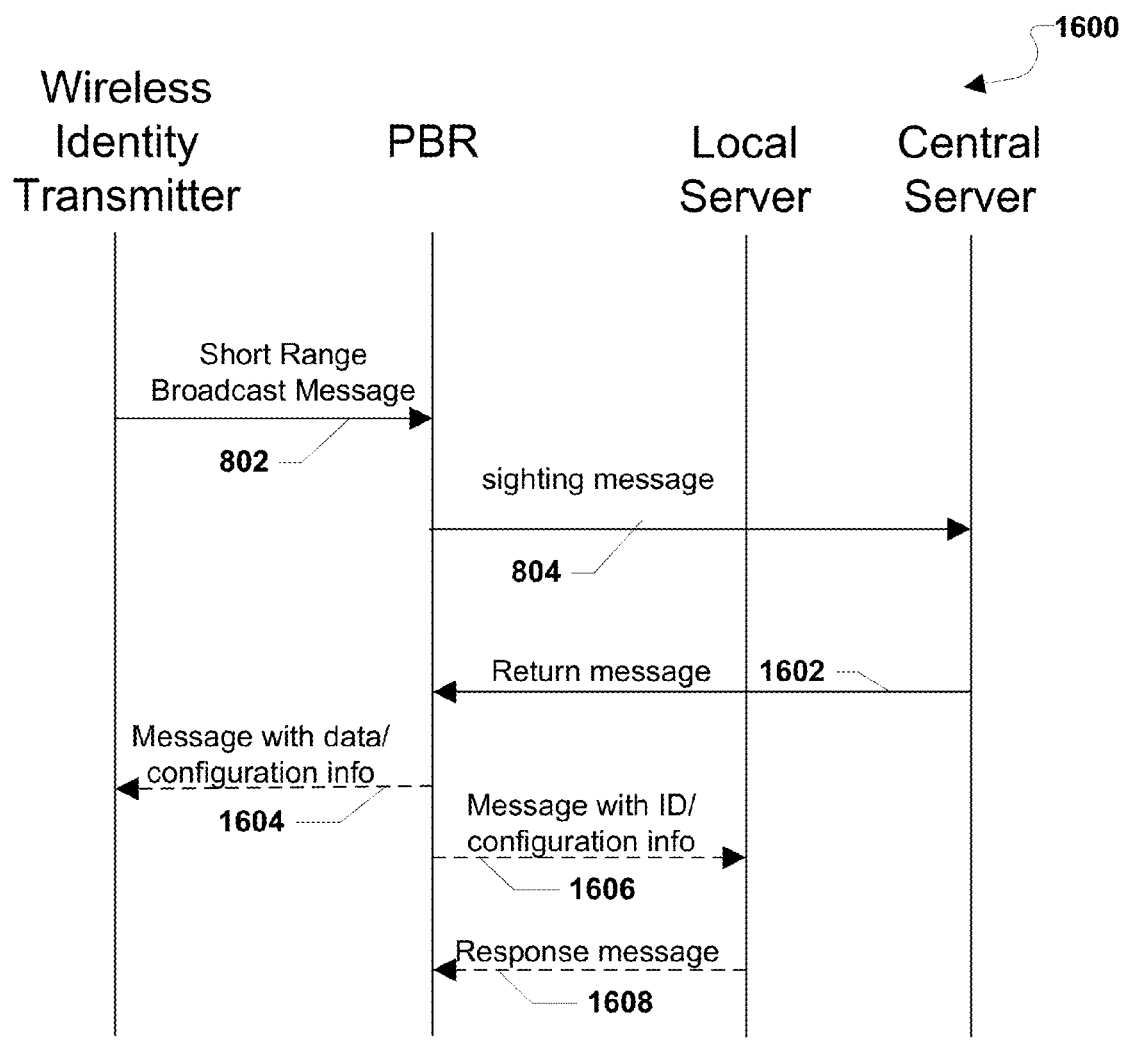
FIG. 16 is a call flow diagram illustrating communications between a wireless identity transmitter, a proximity broadcast receiver, and a central server in accordance with various embodiments.

FIG. 16 illustrates an embodiment call flow diagram 1600 illustrating communications between a wireless identity transmitter, a proximity broadcast receiver, and a central server. As described above, the wireless identity transmitter may periodically transmit a short-range broadcast message 802 via a short-range radio. When within signal range of the broadcast message 802, the proximity broadcast receiver may receive the broadcast message 802 using a similar short-range radio. The broadcast message 802 may be processed by the proximity broadcast receiver and related data may be relayed to the central server as a sighting message 804. In an embodiment, the sighting message 804 may include the broadcast message, identification information of the proximity broadcast receiver and/or the wireless identity transmitter, encrypted information the proximity broadcast receiver is incapable of decoding, and other information related to the reception of the broadcast message 802. In an embodiment, the sighting message 804 may be transmitted over various wireless or wired networks that may be configured to communicate via Internet protocols.

The central server may receive and process the sighting message 804. When the central server determines that the sighting message 804 requires a response based on the information in the sighting messages (e.g., metadata requesting a response, the sighting message relates to a wireless identity transmitter that needs to receive upgraded firmware, etc.), the central server may generate and transmit a return message 1602 to the proximity broadcast receiver. In various embodiments, the return message 1602 may contain configuration information, identification information describing the wireless identity transmitter, or other data as described above. The proximity broadcast receiver may receive and process the return message 1602. Based on the data within the return message 1602, the proximity broadcast receiver may optionally transmit a message 1604 to the wireless identity transmitter that may contain configuration information and other data from the central server. The wireless identity transmitter may selectively accept transmissions such as the message 1604 using operations as described above.

As another option, the proximity broadcast receiver may transmit a message 1606 to a local server based on the return message 1602. The message 1606 may contain wireless identity transmitter identification information, configuration information, software routines, and various other data from the return message 1602 for storage, processing, and otherwise additional use by the local server. Based on the message 1606, the local server may in turn transmit an optional response message 1608 to the proximity broadcast receiver that may include software instructions, configuration data, or other data generated in response to receiving the message 1606.

In an embodiment, the central server may also transmit messages directly to the local server (not shown) that include configuration information and other data. For example, the sighting message 804 from the proximity broadcast receiver may provide the contact information for the local server which the central server may utilize for subsequent communications.

Figure 17:
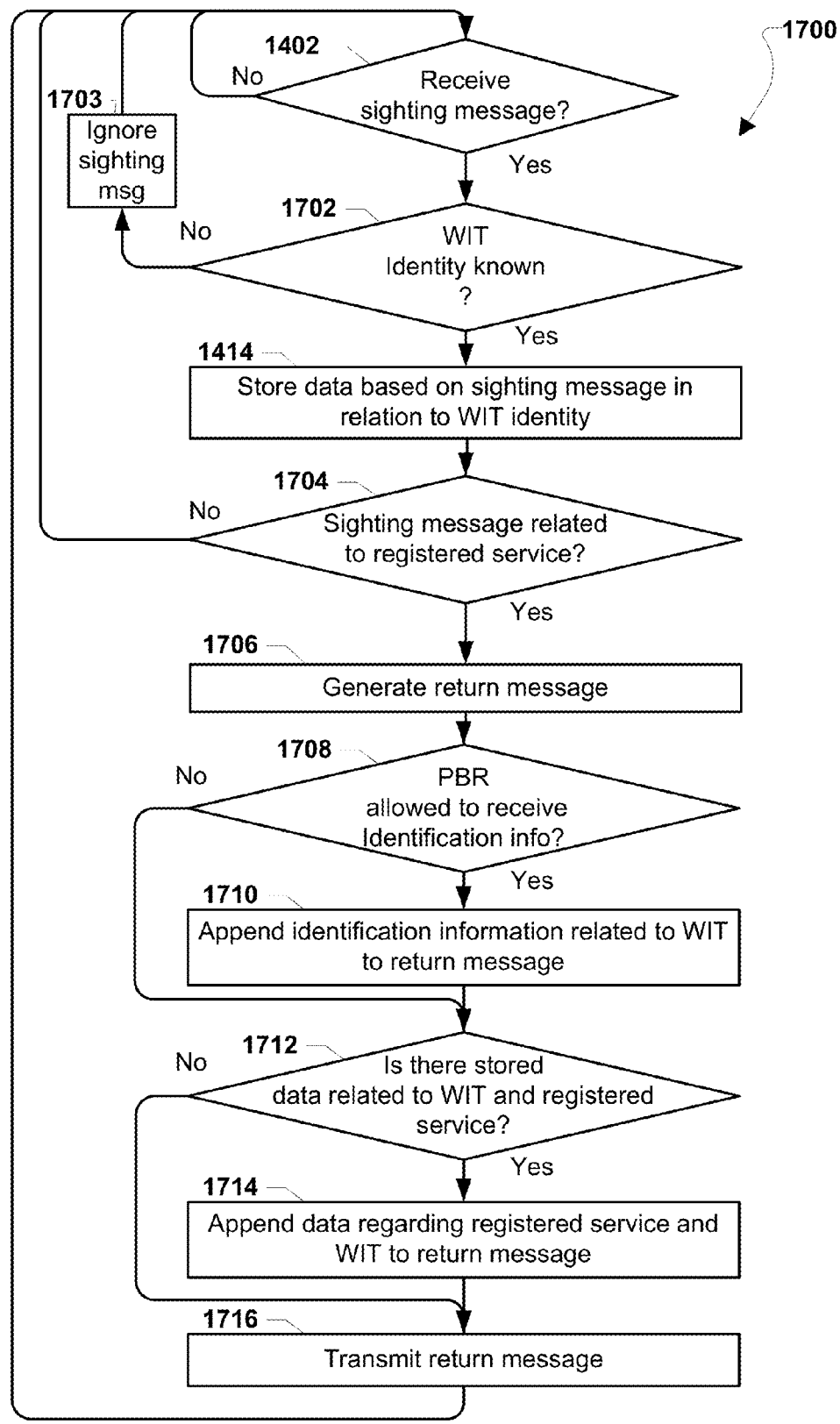
FIG. 17 is a process flow diagram illustrating an embodiment method for a central server to receive sighting messages from a proximity broadcast receiver and transmit return messages including various data.

FIG. 17 illustrates an embodiment method 1700 for a central server to process sighting messages received from a proximity broadcast receiver. In general, based on the information within sighting messages, the central server may identify a wireless identity transmitter (and related user), determine whether there is a relationship between the proximity broadcast receiver and the wireless identity transmitter (i.e., related to a registered service), and transmit return messages with various data and/or information based on the sighting messages. Accordingly, return messages may be provided to proximity broadcast receivers such that no identifying information about the wireless identity transmitter is included. This may enable the proximity broadcast receiver to anonymously personalize equipment, devices, or other facilities, as described above, to benefit the user of the wireless identity transmitter without disclosing his/her identity. For example, a return message from the central server may include a user's configuration data for a piece of equipment but not the user's identity. In an embodiment, the method 1700 may be performed by the central server in connection with the proximity broadcast receiver performing the operations of the method 1100 as described above with reference to FIG. 11. In various embodiments, such return messages may be transmitted to any devices related to received sighting messages and/or the related wireless identity transmitter, such as third-parties (e.g., emergency services, retailers, etc.) or user devices associated with the sighting message.

In determination block 1402, the central server may determine whether a sighting message is received. If no sighting message is received (i.e., determination block 1402="No"), the central server may continue with the operations in determination block 1402. If a sighting message is received (i.e., determination block 1402="Yes"), the central server may determine whether the wireless identity transmitter identity is known in determination block 1702. In other words, the central server may perform the operations in block 1404-1410 as described above with reference to FIG. 14 in order to evaluate, decode, decrypt, and otherwise access the data within the received sighting message to determine whether it includes a wireless identity transmitter identity (or identifier) that is associated with a user registered with the central server and thus authenticated. For example, the central server may decrypt a rolling identifier within the received sighting message to identify a device identifier of a wireless identity transmitter and may match that identifier to stored information representing all registered users and/or devices.

If the wireless identity transmitter is not known (i.e., determination block 1702="No"), the central server may ignore the sighting message in block 1703 and continue to perform the operations in determination block 1402. If the wireless identity transmitter is known (i.e., determination block 1702="Yes"), in block 1414 the central server may store data based on the sighting message in relation to the wireless identity transmitter identity, such as storing location data within the sighting message in a database in relation to the user of the wireless identity transmitter.

In determination block 1704, the central server may determine whether the received sighting message relates to a registered service. In other words, the central server may compare information obtained from the sighting message to lists of registered services to determine whether the sighting message is valid (or authenticated) and corresponding to a third-party, merchant, or other service registered with the central server. To make the determination, the central server may analyze the received sighting message and evaluate any metadata or header information that identifies the proximity broadcast receiver, the subject matter of the sighting message, or other descriptive information regarding the proximity broadcast receiver and/or the wireless identity transmitter that transmitted the broadcast message reported by the sighting message. For example, the sighting message may contain metadata that indicates the sighting message was sent by a proximity broadcast receiver in response to an active alert. Alternatively, the sighting message may contain header information that indicates relevance to a particular vendor facility or service. For example, the sighting message may contain metadata that indicates the proximity broadcast receiver is associated with a particular third-party application (e.g., a retail store app ID). As another example, the central server may evaluate metadata within the sighting message to detect a code that identifies a registered merchant or retail store that is associated with a marketing service or data collection scheme. A sighting message may not relate to a registered service if the transmitting proximity broadcast receiver is not registered, authenticated, or otherwise known to the central server.

If the sighting message is not related to a registered service (i.e., determination block 1704="No"), the central server may continue with the operations in determination block 1402.

If the sighting message does relate to a registered service, such as a valid vendor service or an active alert (i.e., determination block 1704="Yes"), in block 1706 the central server may generate a return message. The return message may include information that indicates the sighting message, the proximity broadcast receiver, related services, time of receipt of the sighting message, and other informational data.

In determination block 1708, the central server may determine whether the proximity broadcast receiver is allowed to receive identification info. In other words, the central server may determine whether the proximity broadcast receiver has permission or is authorized to receive identification information of the wireless identity transmitter. For example, based on metadata within the sighting message indicating that the proximity broadcast receiver is associated with a vendor or a registered service, the central server may determine that the identification of the wireless identity transmitter (or its user) may not be included within the return message. In an embodiment, the central server may evaluate a stored database that describes information permissions based on the identity of the proximity broadcast receiver and its associated services. For example, the database may indicate that the proximity broadcast receiver is associated with a service that is allowed to receive identification information about the wireless identity transmitter. As another example, using user identification information obtained based on the sighting message, the central server may look-up user permissions to identify whether the user authorized user data to be shared with registered services.

If the proximity broadcast receiver is allowed to receive identification information (i.e., determination block 1708="Yes"), the central server may append identification information to the return message in block 1710. For example, the return message may include the username, customer ID, address and/or name of the user of the wireless identity transmitter.

If the proximity broadcast receiver is not allowed to receive identification information (i.e., determination block 1708="No") or if the central server appended identification information to the return message in block 1710, the central server may determine whether there is stored data related to the wireless identity transmitter and the registered service in determination block 1712. The central server may evaluate a database and identify whether the proximity broadcast receiver, its associated devices or services (e.g., a local server), and/or the wireless identity transmitter require data based on the sighting message. Examples of such data may include firmware, software instructions, configuration information, proprietary information (e.g., customer ID), activity information (e.g., information describing recent wireless identity transmitter activities related to the proximity broadcast receiver), or any other relevant information. The central server may query the database using the wireless identity transmitter identification information in combination with the proximity broadcast receiver identification information to detect data within the database that may be included in the return message. For example, the return message may contain personalization information for the user of the wireless identity transmitter to be used by the proximity broadcast receiver. In an embodiment, the database may indicate that the proximity broadcast receiver is associated with a service (e.g., vendor, merchant, etc.) that stores proprietary data within the central server database.

If there is stored data related to the wireless identity transmitter and the registered service (i.e., determination block 1712="Yes"), in block 1714 the central server may append the data regarding registered service and the wireless identity transmitter to the return message. If there is no stored data related to the wireless identity transmitter and the registered service (i.e., determination block 1712="No"), or if data is already appended, in block 1716 the central server may transmit the return message, such as to the proximity broadcast receiver. The central server may then continue to perform the operations in determination block 1402.

Figure 18:
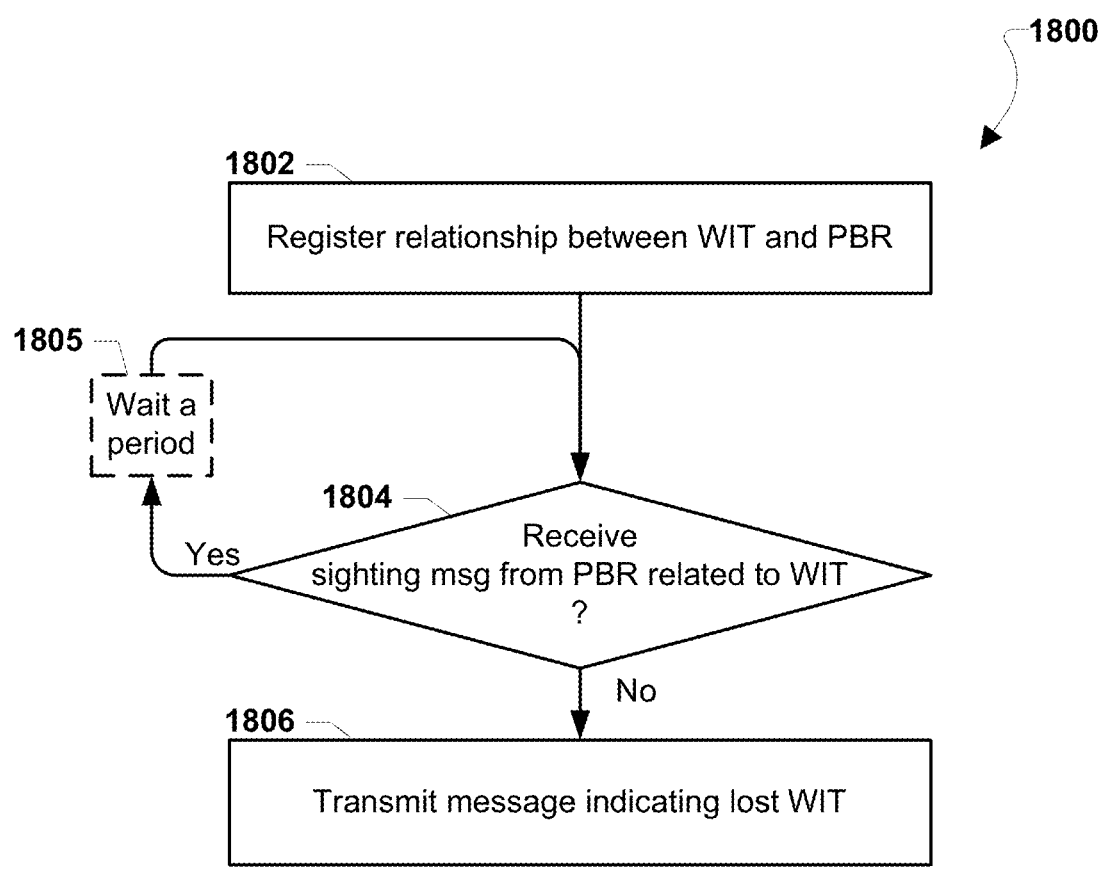
FIG. 18 is a process flow diagram illustrating an embodiment method for a central server to determine whether a proximity broadcast receiver has lost a wireless identity transmitter.

FIG. 18 illustrates an embodiment method 1800 for a central server determining whether a proximity broadcast receiver has lost a wireless identity transmitter. In the central server, the proximity broadcast receiver may be associated with the wireless identity transmitter. For example, the proximity broadcast receiver may be a user's smartphone that is associated with the wireless identity transmitter within an asset (e.g., wallet, purse, luggage, medicine bag, clothing, etc.). In response to failing to receive sighting messages from a proximity broadcast receiver associated with a particular wireless identity transmitter, the central server may be configured to transmit messages, such as warnings, indicating that the wireless identity transmitter (and the object it is connected to) is lost, absent, forgotten, or otherwise non-proximate to the proximity broadcast receiver. This embodiment method 1800 may be useful for leashing certain assets, such as possessions, pets, and children. For example, when a child runs from a parent, broadcast messages from the child's wireless identity transmitter may no longer be received by the parent's proximity broadcast receiver. As a result, the parent's proximity broadcast receiver may not transmit sighting messages to the central server and the central server may determine the child has been lost or run away.

In block 1802, the central server may register a relationship between the proximity broadcast receiver and the wireless identity transmitter, such as by storing information within a database. In various embodiments, each proximity broadcast receiver and wireless identity transmitter may be involved in numerous relationships. Additionally, the relationship information may be stored based on user input data to the central server via a registration web portal (e.g., the user may access a website and indicate all of his/her wireless identity transmitters). During such a registration, the central server may prompt the user to provide conditions under which the central server should transmit messages when wireless identity transmitters are lost or otherwise outside of the proximity of the proximity broadcast receiver. For example, the user may enter configuration data stored by the central server that indicates that if the proximity broadcast receiver does not receive broadcast messages from the wireless identity transmitter between certain hours of the day, the central server should transmit a warning message.

In determination block 1804, the central server may determine whether a sighting message has been received from the proximity broadcast receiver related to the wireless identity transmitter. In other words, based on whether or not such a sighting message is received, the central server may determine whether the wireless identity transmitter is close to the proximity broadcast receiver. The central server may also evaluate sighting messages received over a period to determine whether the wireless identity transmitter is (or has recently been) within proximity of the proximity broadcast receiver. In an embodiment, the central server may determine whether it receives a sighting message for each wireless identity transmitter registered in the relationship. For example, if the registered relationship includes multiple wireless identity transmitters, the central server may expect to receive sighting messages from the proximity broadcast receiver regarding all the wireless identity transmitters. If the central server receives a sighting message related to the wireless identity transmitter (i.e., determination block 1804="Yes"), in optional block 1805 the central server may wait a period and may continue with the operations in determination block 1804. In various embodiments, the central server may perform the operations in determination block 1804 periodically, such as every few seconds, minutes, or hours.

If the central server does not receive a sighting message related to the wireless identity transmitter (i.e., determination block 1804="No"), in block 1806 the central server may transmit a message indicating the wireless identity transmitter is lost. In various embodiments, the central server may transmit such a message to the proximity broadcast receiver, other devices associated with the user of the proximity broadcast receiver (e.g., a smartphone, tablet), and/or any other device relevant to the wireless identity transmitter. For example, the central server may transmit a warning message to a police server when the wireless identity transmitter is lost and associated with a child.

Figure 19:
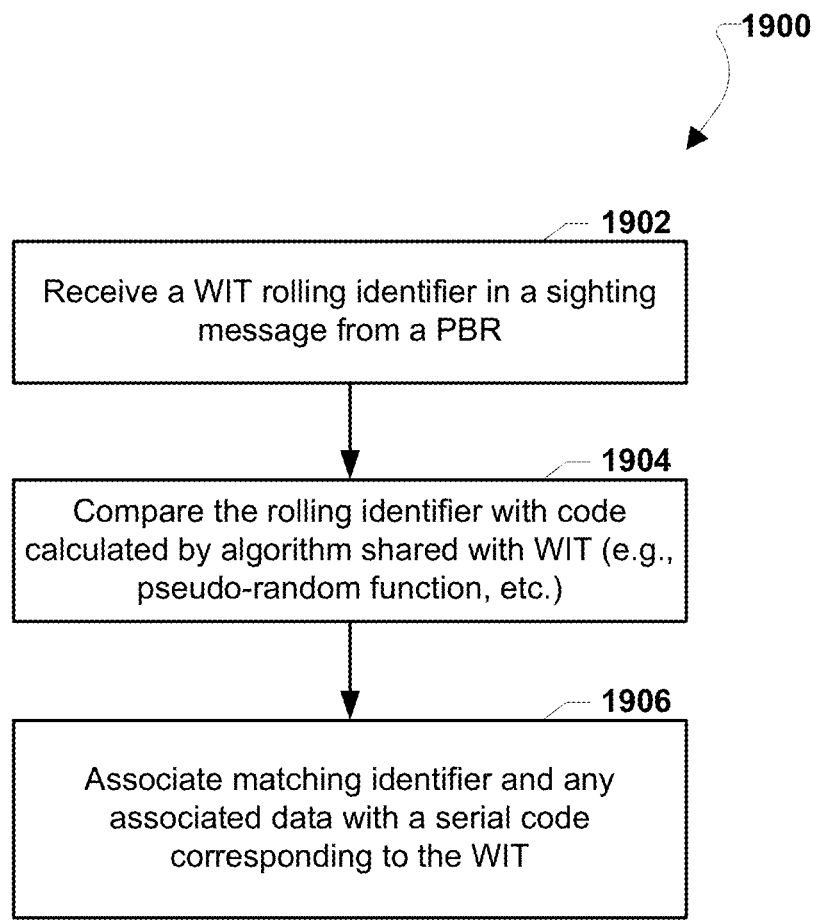
FIG. 19 is a process flow diagram illustrating an embodiment method for a central server to handle a rolling identifier.

FIG. 19 illustrates an embodiment method 1900 that may be implemented within a central server. The method 1900 may be performed by the central server in response to receiving a sighting message from a proximity broadcast receiver that includes encoded, rolling, or otherwise protected data originally broadcast by a wireless identity transmitter. Privacy of users of wireless identity transmitters may be protected by using a rolling or randomly varying identifier for each wireless identity transmitter so the identifier changes with time. New identifiers may be generated periodically or based on certain events, such when a wireless identity transmitter broadcasts an identifier a certain number of times or for a certain time period (e.g., an hour), or after one or more pairings. This rolling of identifiers may be coordinated with the central server so that the wireless identity transmitter may still be tracked. For example, the wireless identity transmitter and the central server may each have a cryptographically secure pseudo-random number generator algorithm that is used to generate identifiers on a common time scale so that any given moment, the central server can calculate the identifier being transmitted by a particular wireless identity transmitter.

Generating rolling identifiers, or other methods of obfuscating identifiers, is important in that it may prevent sniffing attacks from a third party. For example, if the identifier was static, a third party could sniff the identifier, such as by impersonating a proximity broadcast receiver, and then use the identifier to track the wireless identity transmitter. A rolling identifier may hinder such an attack impossible if the third party lacks the pseudo-random number generator or other means of generating the latest rolling identifiers.

In block 1902, the central server may receive a wireless identity transmitter's rolling identifier in a sighting message from a proximity broadcast receiver. In block 1904, the central server may compare the rolling identifier with code calculated by an algorithm shared with the wireless identity transmitter, such as a pseudo-random function or an encryption algorithm with shared secret keys. The algorithm may be software instructions, routines, algorithms, circuitry, or modules that are utilized by the central server to calculate codes that are expected to align with rolling identifiers generated and broadcast by the wireless identity transmitter over a period. In various embodiments, the central server may compare the received identifier with the next several codes in case some identifiers were missed. If the received identifier matches any codes generated or expected by the central server, in block 1906 the central server may associate the matching identifier and any associated data with a serial code corresponding to the wireless identity transmitter. This way, if the central server later receives a user request with the wireless identity transmitter's serial code, such as a request from a parent to locate the wireless identity transmitter carried by a child, then the central server can find all the prior matches and any associated data without having to search for every previous rolling identifier.

In an embodiment, when initiating a search for a target wireless identity transmitter, the central server may use the shared algorithm and information (e.g., key) to generate a target device ID that is transmitted in an alert message. In this embodiment, alert messages may be retransmitted with an updated target device ID whenever the target wireless identity transmitter is scheduled to roll its identifier. Various algorithms for generating rolling identifiers or other encoded identifiers, as well as other decoding algorithms, are discussed below.

FIGS. 20-24C illustrate various embodiment methods for synchronizing a nonce or counter between a wireless identity transmitter and a central server to enable transmitting and receiving obscured information. The wireless identity transmitter may perform various methods for broadcasting messages that include obscured identifiers and data (i.e., payloads) that identify the wireless identity transmitter to the central server and provide a relative reading on the wireless identity transmitter clock. Likewise, the central server may perform various methods for processing obscured information within received messages corresponding to the wireless identity transmitter. As described above, the broadcast messages from the wireless identity transmitter may be sent to the central server directly or through intermediary devices, such as proximity broadcast receivers transmitting sighting messages.

Due to privacy concerns regarding unintended tracking of devices described above, the wireless identity transmitter may obscure information within the transmitted messages through obfuscation measures (e.g., encryption or pseudo-random data generation) known only to the central server and wireless identity transmitter. In an embodiment, the wireless identity transmitter may maintain a clock or timer mechanism that is represented by a nonce or counter value and that may begin once the device is operational (e.g., activated through the insertion of a battery). The clock may be relatively low-quality and therefore may drift unlike more accurate clocks, such as in the central server (e.g., clocks calibrated by periodic atomic clock readings). The counter or nonce may be a non-repeating number generated by the wireless identity transmitter, and may be changed each time wireless identity transmitter encodes its identifier for broadcasting, such as once every hour or even once every broadcast message. In various embodiments, nonces or counters (or counter values) may be encrypted or encoded using pseudo-random functions or other encryptions algorithms (e.g., AES). For example, a wireless identity transmitter may encode a nonce or counter value with an AES-CTR block cipher to create a nonce for use in generating the payload including a rolling identifier of a broadcast message. As another example, a nonce may be generated by applying a linear feedback shift register (LFSR) to a nonce or counter value.

As described throughout the disclosure, the wireless identity transmitter may also store a unique device identification code or number (i.e., a device identifier or 'deviceID') and be pre-provisioned with a per-device shared secret key (or K) which is associated with the unique identifier at the central server. For example, the central server may store the unique device identifier and the secret key in a database and may maintain a table of deviceID and K pairs for all wireless identity transmitters registered with the central server. The central server may use the device identifier and secret key, along with other information such as reported nonce or counter values, to identify, decrypt and otherwise process obscured messages from the wireless identity transmitter. In an embodiment, the device identifier (or deviceID) may be generated sequentially or randomly.

Figure 20:
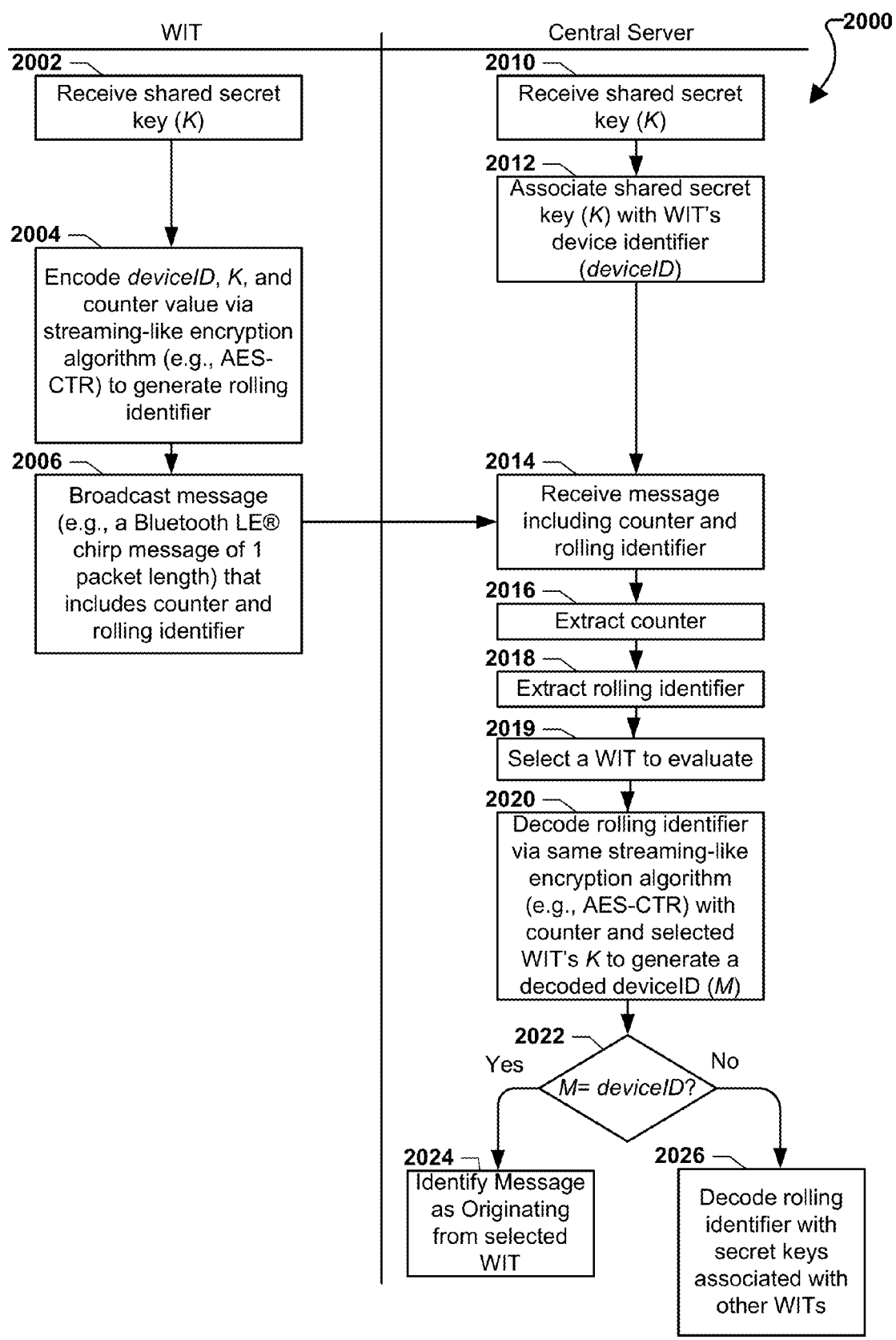
FIG. 20 is a process flow diagram illustrating embodiment operations by a wireless identity transmitter and a central server for transmitting and processing rolling identifiers encrypted with an encryption algorithm.

FIG. 20 illustrates an embodiment method 2000 for a central server to identify a wireless identity transmitter indicated by encrypted data within a message broadcast by the wireless identity transmitter. In block 2002, the wireless identity transmitter may receive a shared secret key (i.e., "K"). In other words, the wireless identity transmitter may be pre-provisioned with a per-device shared secret key (K), such as during manufacturing. In another embodiment, the wireless identity transmitter may receive the secret key in a messages broadcast from a proximate proximity broadcast receiver. The secret key may be associated with the wireless identity transmitter's unique device identifier (i.e., deviceID) at the central server. In an embodiment, the secret key may be a 128 bit secret key.

In block 2004, the wireless identity transmitter may encode the device identifier (deviceID), secret key (K), and a nonce or counter value via a streaming-like encryption algorithm (e.g., AES-CTR encryption) to generate a rolling identifier. "AES-CTR" is one of the confidentiality modes recommended by the National Institute of Standards and Technology for implementations of the Advanced Encryption Standard (AES). In an embodiment, the wireless identity transmitter may include an AES coprocessor that is configured to support the "CTR" mode. In an embodiment, the rolling identifier may be represented by the following equation:

$$\text{Rolling identifier} = (\text{deviceID} \| \text{data}) \text{XOR}(\text{MSB}\_N(\text{AES}\_K(t)))$$

where t is the value of the wireless identity transmitter's nonce or counter (e.g., a 20 bit value), 'XOR' denotes the bitwise exclusive-or operation, 'AES_K( )' is the AES block cipher with key 'K', and 'MSB_N( )' means the 'N' most significant bits (e.g., 60 bits). This rolling identifier may then be included in the broadcast message that is regularly transmitted by the wireless transmitter device. In an embodiment, other device data (e.g., battery level, temperature, etc.) may be transmitted along with the rolling identifier in a broadcast packet.

In a further embodiment, other information may be included within the rolling identifier. Thus, in addition to providing an obscured identifier for the wireless identity transmitter, the rolling identifier field may include obscured data that only the central server can recover. One method for accomplishing this is to concatenate the additional information, such as a few bits to indicate the battery status (bat_stat) to the device identifier (deviceID) and applying the XOR function to the concatenation. The amount of additional information (i.e., number of bits of information) that can be included within (i.e., obscured within the same data field of) the rolling identifier is limited by the length N of significant bits within the rolling identifier field. Thus, if more bits are available in the data portion carrying the rolling identifier, more such data may be included within the encrypted rolling identifier. Since the data that is included within the rolling identifier is likely to change over time, this approach may further obscure the device's identity.

If more data is desired to be transmitted in broadcast messages, some of that data may be carried in the clear or encrypted with the data. There are a number of approaches for including data (e.g., battery state, temperature, etc.) within broadcast messages. In addition to including the data within the rolling identifier as described above, the data may be added by concatenating the data to the end of the rolling identifier as part of the manufacturer specific data payload, either before or after the rolling identifier, as sensor data in the clear. Thus, if there are more bits available in the manufacturer specific data payload they may be used to convey the data in the clear. Alternatively, the data may be encoded using the same key as used to generate the rolling identifier or an alternate key that is known to the server to be associated with the wireless identity transmitter or such data fields. In this alternative, the information in the rolling identifier enables the server to both determine the device's true identifier and the encryption key used to encrypt the other data included in the message. In yet a further embodiment, these options for carrying other data may be combined, such that some of it is included within the rolling identifier, some is carried in the clear and/or some data may be encrypted and included within the broadcast message.

In block 2006, the wireless identity transmitter may then broadcast a message that includes the nonce and the rolling identifier, or simply the rolling identifier (i.e., without a nonce). In an embodiment, the broadcast message may be a single packet length Bluetooth LE® chirp message. In various embodiments, the nonce included in the broadcast message may be 20 bits and the rolling identifier may be 60 bits, so that the entire broadcast message is 80 bits.

As an example embodiment in which the battery status is included within the rolling identifier, the broadcast message (or the payload of the broadcast message) may be represented by the following equation:

$$\text{Payload}=t\|(\text{deviceID}\|\text{bat\_stat})\text{XOR}(\text{MSB}\_N(\text{AES}\_K(t)))$$

where t is the value of the wireless identity transmitter's nonce, which may just be the nonce or counter (e.g., a 20 bit value), 'bat_stat' is the battery status information of the device (e.g., a 4-bit code), '‖' means concatenation, 'XOR' denotes the bitwise exclusive-or operation, 'AES_K( )' is the AES block cipher with key 'K', and 'MSB_N( )' means the 'N' most significant bits (e.g., 60 bits). In other words, the embodiment broadcast message may include the nonce in the clear (i.e., not encrypted) in addition to a rolling identifier that includes a battery level indicator. In another embodiment, the battery level indicator (i.e., bat_stat) may not be encrypted, and may be included in another field of the broadcast message, such as within the service universally unique identifier (UUID) portion of a message.

In another embodiment, the payload may not include a nonce t, in which case the payload may be represented by the following equation:

$$\text{Payload}=(\text{deviceID}\|\text{bat\_stat})\text{XOR}(\text{MSB}\_N(\text{AES}\_K(t))).$$

In block 2010, the central server may receive the shared secret key (K), such as during the account creation operations described above with reference to FIG. 13. For example, the central server may generate the secret key in response to receiving account registration information from the user of the wireless identity transmitter (e.g., deviceID and registration request information). In block 2012, the central server may associate the shared secret key (i.e., K) with the wireless identity transmitter's device identifier (i.e., deviceID). For example, the central server may store the deviceID and K in a data table of registered devices.

In block 2014, the central server may receive a message including the nonce or counter and the rolling identifier. For example, the received message may be a sighting message from a proximity broadcast receiver that includes the information broadcast by the wireless identity transmitter with the operations in block 2006. In block 2016, the central server may extract the nonce or counter from the received message, and in block 2018 may extract the rolling identifier. In block 2019, the central server may select a wireless identity transmitter (i.e., selected wireless identity transmitter) to evaluate. In other words, the central server may obtain a stored deviceID, K, and nonce or counter for a registered wireless identity transmitter known to the central server, such as from the database or data table storing such information for all registered wireless identity transmitters. In block 2020, the central server may decode the rolling identifier via the same streaming-like encryption algorithm (e.g., AES-CTR) with the nonce or counter and the selected wireless identity transmitter's secret key (K) to generate a decoded device identifier (or M). For example, the central server may perform a decoding operation based on the AES-CTR algorithm that uses the rolling identifier as input along with the selected wireless identity transmitter's secret key (K) and the nonce or counter indicated in the received message.

In an embodiment, the decoded device identifier (M) may be represented by the following equation:

$$M=(\text{rolling identifier})\text{XOR}(\text{MSB}\_\{N-a\}(\text{AES}\_K(t))),$$

where t is the value of the wireless identity transmitter's nonce or counter (e.g., a 20 bit value), 'XOR' denotes the bitwise exclusive-or operation, 'AES_K( )' is the AES block cipher with key 'K', and 'MSB_{N−a}' means the 'N−a' most significant bits (e.g., 56 bits when a is 4 bits and N is 60 bits).

In determination block 2022, the central server may determine whether the decoded device identifier (M) and the deviceID match. In other words, the central server may compare the decoded device identifier (M) to the deviceID for the selected wireless identity transmitter whose secret key (K) was used with the AES-CTR algorithm operations to obtain the decoded device identifier (M). If M and the deviceID do match (i.e., determination block 2022="Yes"), in block 2024, the central server may identify the broadcast message as originating from the selected wireless identity transmitter. If M and the deviceID do not match (i.e., determination block 2022="No"), in block 2026 the central server may decode the rolling identifier with secret keys associated with other wireless identity transmitters. For example, the central server may select the next registered wireless identity transmitter and use the corresponding stored pair of a secret key (K) and corresponding deviceID. In this manner, all K and deviceID pairs stored for all registered wireless identity transmitters and/or users of the system may be tried by the central server until a match is found that identifies the originator of the broadcast message.

Figure 21A:
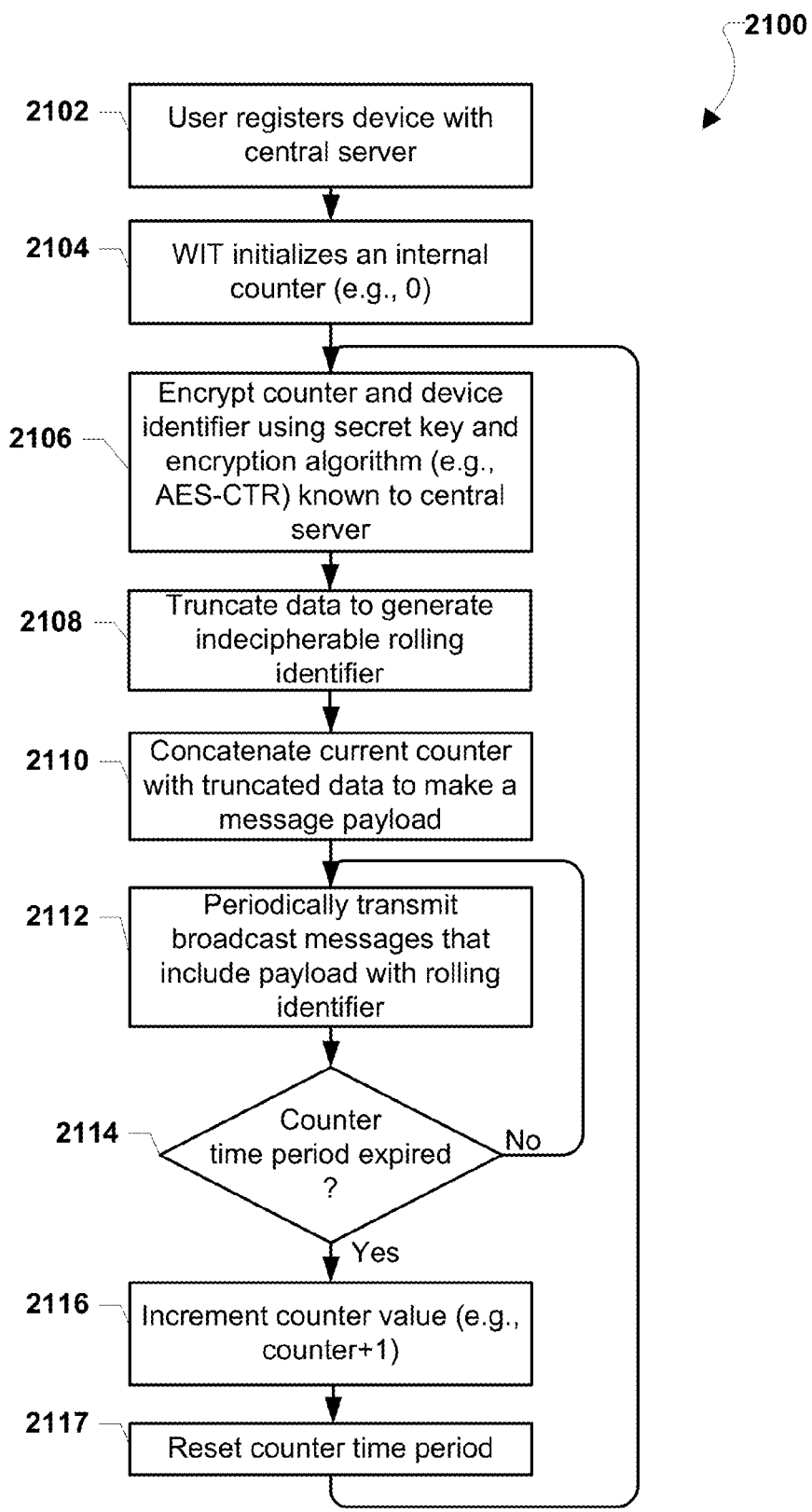
FIG. 21A is a process flow diagram illustrating an embodiment method for a wireless identity transmitter to generate and broadcast rolling identifier payloads using an encryption algorithm.

FIG. 21A illustrates the embodiment method 2100 for a wireless identity transmitter generating and broadcasting an encrypted message (i.e., a rolling identifier) for receipt/use by a central server.

In block 2102, a user of the wireless identity transmitter may register the device with the central server. The services the wireless identity transmitter utilizes may require registrations of all active devices employed by users (e.g., consumers, proprietors, etc.). The registration process may include an initial synchronization with the central server by the user of the wireless identity transmitter. For example, the user of the wireless identity transmitter may register the device with the central server through a Web application, in a mobile device or a PC able to receive wireless identity transmitter messages and operated by the user. The wireless identity transmitter may be required to be registered with the central server within a certain time period from activation of the device. For example, the wireless identity transmitter may be required to be registered within the first 24 hours after the device is initiated (e.g., a battery is placed within the wireless identity transmitter). Registration operations are further described above with reference to FIG. 13.

In block 2104, the wireless identity transmitter may initialize an internal nonce or counter, such as by setting the nonce or counter to a zero value. The nonce or counter initialization may occur due to a triggering event, such as the placement of a battery or power source within the wireless identity transmitter. For example, the nonce or counter may begin incrementing once the wireless identity transmitter is activated or powered on. Alternatively, the initialization may occur in response to registration operations described above. The nonce or counter may begin with '0' (or any other starting value, such as '1') and may be incremented periodically by the wireless identity transmitter. In an embodiment, when the battery of the wireless identity transmitter is replaced (e.g., due to battery failure) or the wireless identity transmitter is otherwise reset/restarted/rebooted, the nonce or counter may return to the initial value (e.g., '0'). The nonce or counter may not repeat the value it represents unless the wireless identity transmitter is reset/restarted/rebooted. In an alternative embodiment, during initialization of the nonce or counter, the wireless identity transmitter may read from flash memory a predefined initial nonce or counter value. For example, the wireless identity transmitter may initialize the nonce or counter with a value set at a factory or updated by an installed application.

In an embodiment, the counter or nonce may be initialized and adjusted in a random or pseudo-random fashion using methods well known in the art. The nonce or counter may be a pseudo-randomly generated value that can be replicated in both the wireless identity transmitter and the central server. In another embodiment, the nonce or counter may be generated by the wireless identity transmitter using a linear feedback shift register (LFSR) with a proper period configured to create nonce or counter values that do not repeat during the lifetime of the device. Such nonces or counters derived from the LFSR may also be pseudo-random.

In block 2106, the wireless identity transmitter may encrypt the concatenated data using a secret key and encryption algorithm known to the central server. For example, the wireless identity transmitter may encode the nonce or counter and/or the device identifier (i.e., deviceID) using an AES-CTR block cipher. The encryption algorithm may utilize the secret key for encryption and decryption purposes, as the secret key is known by both the central server and wireless identity transmitter. The encryption algorithm may result in encrypted (or encoded) data of a certain size. For example, using the AES-CTR cipher, the wireless identity transmitter may generate encoded data of 128-bits. In an embodiment, the wireless identity transmitter may generate encrypted data represented by the following equation:

$$(\text{deviceID} \| \text{bat\_stat}) \text{XOR}(\text{MSB\_}N(\text{AES\_}K(t))),$$

where t is the value of the wireless identity transmitter's nonce or counter (e.g., a 20 bit value), 'bat_stat' is the battery status information of the wireless identity transmitter (e.g., a 4-bit code), '||' means concatenation, 'XOR' denotes the bitwise exclusive-or operation, 'AES_K( )' is the AES block cipher with key 'K', and 'MSB_N( )' means the 'N' most significant bits (e.g., 60 bits). In other words, the embodiment broadcast message may include the nonce or counter in the clear (i.e., not encrypted) in addition to a rolling identifier that includes a battery level indicator.

In another embodiment, the encrypted data may be represented by the following equation:

$$(\text{deviceID})\text{XOR}(\text{AES\_}K(t))$$

where deviceID is a unique device identifier, t is the value of the wireless identity transmitter's nonce or counter (e.g., a 20 bit value), 'XOR' denotes the bitwise exclusive-or operation, 'AES_K( )' is the AES block cipher with key 'K', and 'MSB_N( )' means the 'N' most significant bits (e.g., 60 bits).

Due to the limited communication capabilities of the wireless identity transmitter, the payload of broadcast messages (e.g., the payloads supported by Bluetooth LE broadcast packets) may not be able to contain the entire encrypted message, but instead only include a portion of an encrypted piece of data. Accordingly, in block 2108, the wireless identity transmitter may truncate data to generate an indecipherable rolling identifier. In other words, by truncating the encrypted data, the wireless identity transmitter may create an identifier to be put in a broadcast message (or payload) such that the identifier's size may be supported by the utilized communication format, such as Bluetooth LE. For example, the wireless identity transmitter may truncate the encrypted data to fit within an 80-bit payload maximum size. When encrypted data is truncated, the decryption of that data within the central server may be impossible. However, the incomplete encrypted data may still be used by the central server as described below with reference to FIG. 21B. In an embodiment, truncation may be accomplished with a function, such as a most-significant-bit operation. In another embodiment, the truncated data may be represented by the following equation:

$$\text{TRUNC}(\text{deviceID XOR AES\_}K(t)),$$

where t is the value of the wireless identity transmitter's nonce or counter (e.g., a 20 bit value), 'XOR' denotes the bitwise exclusive-or operation, 'AES_K( )' is the AES block cipher with key 'K', and 'TRUNC ( )' denotes a truncation operations that may create a certain number of bits or bytes (e.g., 56 bits or 7 bytes).

In block 2110, the wireless identity transmitter may concatenate the current nonce or counter with the truncated data to make a message payload. For example, the wireless identity transmitter may combine the current wireless identity transmitter system clock value (e.g., 20 bits long) with the unique identification code of the wireless identity transmitter truncated to be 60 bits long. In an embodiment, the payload may include both encrypted data and unencrypted data (or "in the clear" data). For example, the payload may contain many bits representing the encrypted and/or truncated data and several other bits that represent the battery status of the wireless identity transmitter or a nonce or counter value.

In block 2112, the wireless identity transmitter may periodically transmit broadcast messages that include the payload with the rolling identifier, such as by broadcasting via short-range wireless communication techniques as described above. The frequency of transmissions of the broadcast messages may vary dependent upon system configurations, user settings, or any other source of scheduling and timing relevant for wireless identity transmitters communicating via radio signals. For example, the wireless identity transmitter may broadcast the rolling identifier every few seconds.

In determination block 2114, the wireless identity transmitter may determine whether a predefined nonce or counter time period has expired. This nonce or counter time period may be set in a similar manner as the broadcast frequency periodicity as described above. For example, the manufacturer or may establish the nonce or counter time period using various techniques, such as hard-coding variables within the wireless identity transmitter's processor circuitry.

If the nonce or counter time period has not expired (i.e., determination block 2114="No"), the wireless identity transmitter may continue with the operations in block 2112. For example, the wireless identity transmitter may broadcast the payload via short-range radio transmissions at a frequency of a few seconds for a time period of many minutes.

If the device determines the nonce or counter time period has expired (i.e., determination block 2114="Yes"), in block 2116 the wireless identity transmitter may increment the nonce or counter value, such as by adding 1. In block 2117, the wireless identity transmitter may reset the nonce or counter time period. For example, after a nonce or counter time period has expired, the wireless identity transmitter may increase the nonce or counter by a value of 1 and reset the nonce or counter time period to 0. The wireless identity transmitter may continue with the operations in block 2106 (e.g., the wireless identity transmitter may create a new payload and broadcast it for another nonce or counter time period).

Figure 21B:
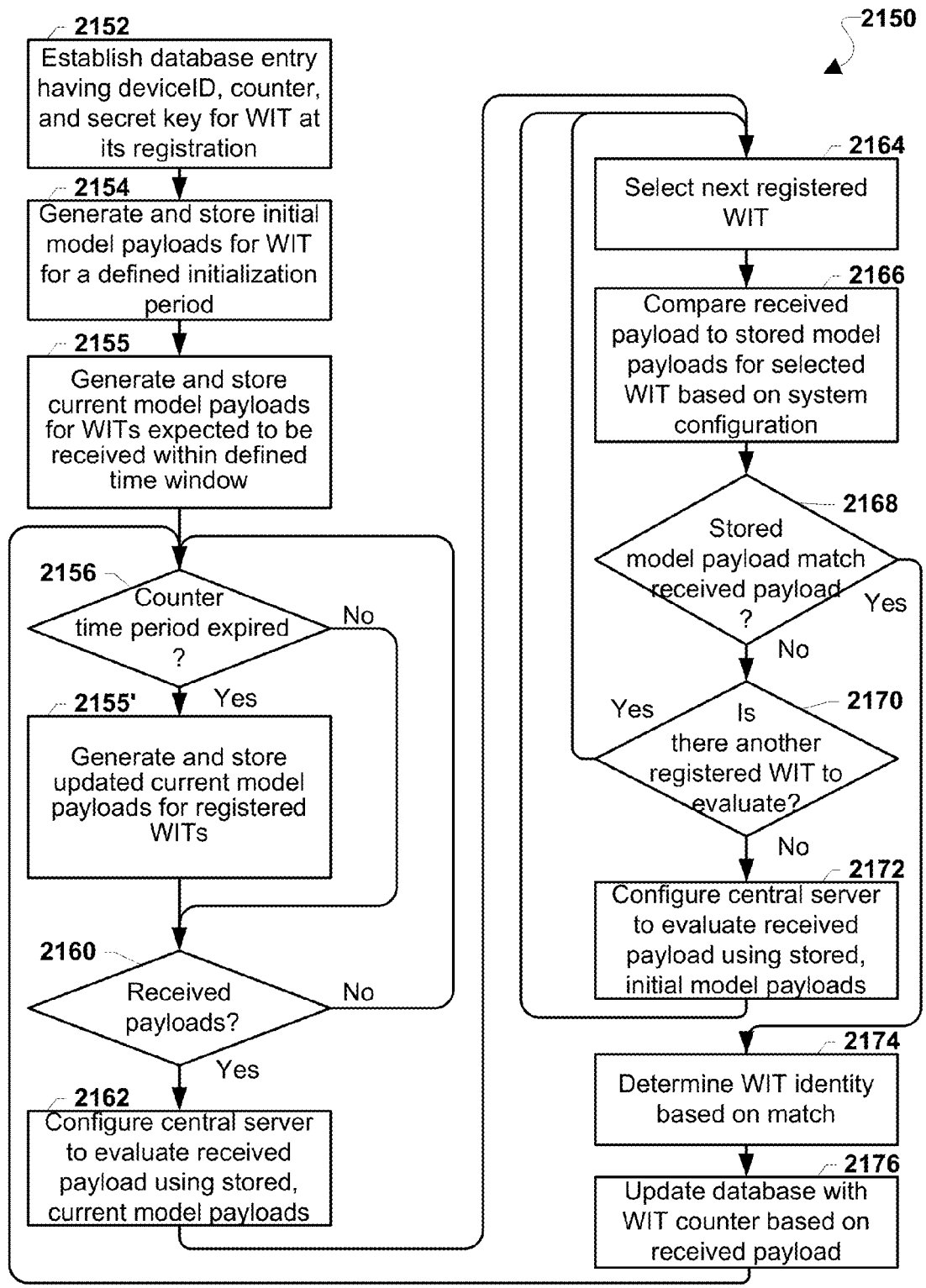
FIG. 21B a process flow diagram illustrating an embodiment method for a central server to receive and handle rolling identifier payloads using an encryption algorithm.

FIG. 21B illustrates an embodiment method 2150 for a central server receiving messages and syncing timing nonce or counters based on payload information. In block 2152, the central server may establish a database entry having the device identifier (i.e., deviceID), nonce or counter, and secret key data for the wireless identity transmitter at its registration. The central server may maintain a database containing data records for each wireless identity transmitter associated with the central server and/or the central server's affiliated services. The database may be populated with information obtained via registration operations described above. Thus, there may be a data record for each wireless identity transmitter associated with the central server, and each record may contain information that represents a particular device's identification, its current nonce or counter (e.g., clock value), and a secret key associated with the wireless identity transmitter. In an embodiment, the secret key may be unique to each wireless identity transmitter registered with the central server. In an embodiment, the central server may also store the initial nonce or counter value for each wireless identity transmitter registered with the central server.

In various embodiments, when a wireless identity transmitter is registered, the central server may store the initial nonce or counter value for the wireless identity transmitter. Dependent upon the time between the activation of the wireless identity transmitter (e.g., when the battery was inserted and the device became operational) and the registration of the device, the initial nonce or counter for the wireless identity transmitter may or may not be 0. For example, if the registration of the wireless identity transmitter with the central server occurred several hours after a user inserted a battery in the wireless identity transmitter, the initial nonce or counter may not be 0. In an embodiment, the central server may also indicate the registration status of the wireless identity transmitter by setting a registration flag or other indicator and may store information describing wireless identity transmitters that have yet to be registered in the database. In an embodiment, the central server may maintain a database with initial values provided for all known wireless identity transmitter whether or not they have been registered. For example, based on manufacturing records, the central server may contain a database having information about every wireless identity transmitter created.

The central server may generate and store model payloads using operations similar to those described above with reference to blocks 2106-2110. Model payloads may be payloads the central server expects to receive from the wireless identity transmitter based on stored secret key, device identifier (deviceID), and nonce or counter information. For example, for each registered wireless identity transmitter, the central server may create a model payload by concatenating the device's deviceID to a nonce or counter value, encrypting the concatenated data using an encryption protocol that employs the secret key for the wireless identity transmitter, and truncating the encrypted data. Each model payload may be stored in a central server data table (or lookup table) in relation to the corresponding deviceID and nonce or counter values used to generate the respective model payloads. For example, for each model payload for each wireless identity transmitter, the central server may store in the data table the model payload, a time offset value (e.g., −2, −1, 1, 2, etc.), and the nonce or counter, all in relation to the deviceID of the wireless identity transmitter.

In block 2154, the central server may generate and store initial model payloads for the wireless identity transmitter for a defined initialization period. For example, starting at the initial nonce or counter value (e.g., 0 or a pseudo-random value known to the device and the central server), the central server may generate model payloads using nonce or counter values that are the same, lower, and/or higher than the actual initial nonce or counter of a wireless identity transmitter such that these model nonces or counters cover the initialization period. In an embodiment, the initialization period may be an hour, several hours, days, etc.). The central server may store the initial model payloads for use in the event of a registration/reset/reboot of a wireless identity transmitter.

In block 2155, the central server may also generate and store current model payloads for wireless identity transmitters expected to be received within a defined time window. To account for possible clock drift in wireless identity transmitters, the central server may generate and store model payloads for the defined time window (or time period) by using multiple derivative nonce or counter values that represent a range of possible nonces or counters. In other words, derivative nonce or counter values may be offsets to the current nonce or counter value stored for a wireless identity transmitter. For example, the central server may generate model payloads for derivative nonce or counter values that are lower and higher than the currently stored nonce or counter value in the database. A derivative nonce or counter value may be the result of an offset value (e.g., −2, −1, 1, 2, etc.) added to the stored nonce or counter value for a wireless identity transmitter. The central server may generate model payloads to represent the stored nonce or counter value and derivative nonce or counter values that incrementally represent the window time period. For example, the model payloads may represent nonces or counters increasing by a small time value, such as an hour, and covering a large period of time, such as multiple hours. As another example, the central server may store a payload corresponding to the current nonce or counter value stored for a wireless identity transmitter, a payload corresponding to the previous nonce or counter value for the device, and a payload corresponding to the next nonce or counter value for the device.

In an embodiment, the first generated current model payloads for a given wireless identity transmitter may be identical to the initial model payloads for the wireless identity transmitter as both sets of payloads may be generated by the central server based on the same initial nonce or counter values. In an embodiment, the initialization period may coincide with the defined time window. For example, the initialization period may involve a similar number of days, hours, minutes, etc. as the defined time window.

In determination block 2156, the central server may determine whether a nonce or counter time period has expired. The central server may initialize the evaluation of a nonce or counter time period at an arbitrary time or, alternatively, upon the receipt of a wireless identity transmitter registration. The nonce or counter time period may be the same period of time used by the wireless identity transmitters as described above with reference to determination block 2114.

If the nonce or counter time period has expired (i.e., determination block 2156="Yes"), in block 2155' the central server may generate and store updated current model payloads for registered wireless identity transmitters. The updated current model payloads may replace the previous current model payloads and may be based on the stored nonce or counter value in each respective wireless identity transmitter's database record.

If the nonce or counter time period has not expired (i.e., determination block 2156="No") or if the nonce or counter time period has expired and the central server has generated updated current model payloads, in determination block 2160, the central server may determine whether any payloads have been received. In an embodiment, payloads may be delivered directly from wireless identity transmitters or alternatively indirectly from proximity broadcast receivers via sighting messages which include (or relay) rolling identifier payloads from proximate wireless identity transmitters to the central server. If no payloads have been received (i.e., determination block 2160="No"), the central server may continue with the operations in determination block 2156.

If a payload has been received (i.e., determination block 2160="Yes"), in block 2162, the central server may be configured to evaluate the received payload using stored, current model payloads, such as the current model payloads stored for each registered wireless identity transmitter. As described above, the central server may maintain two sets of stored model payloads for each registered wireless identity transmitter, an initial model payload set that may include model payloads based on the initial nonce or counter and derivative nonce or counter values that span the initialization period, and a current model payload set that is based on the current nonce or counter value stored within the database record for each wireless identity transmitter. In an embodiment, the central server may set a system variable indicating the central server should compare the received payload to stored, current model payloads. The system variable may be set to direct the central server to evaluate either the current or initial model payloads for wireless identity transmitters.

In blocks 2164-2172, the central server may perform an operational loop in which the central server compares the received payload (i.e., data broadcast by the wireless identity transmitter) to stored model payloads for all registered wireless identity transmitters until a match is found. In block 2164, the central server may select a next registered wireless identity transmitter. The central server may determine the next registered device based on the database of registered wireless identity transmitters and may sequentially iterate through each device during the operations in blocks 2164-2172. In block 2166, the central server may compare the received payload to the stored model payloads for the selected wireless identity transmitter based on the system configuration, such as the configuration set in the operations in block 2162. For example, based on the system variable set to 'current' with the operations in block 2162, the central server may compare the received payload to stored current model payloads for the selected wireless identity transmitter. Based on the form of the encrypted data of the received payload, the comparison may be a pattern-matching routine in which the central server compares the data of the model payloads against the received payload. For example, the central server may compare the bit values for the stored and received payloads.

In determination block 2168, the central server may determine whether any of the stored model payloads match the received payload. If none of the stored model payloads match the received payload (i.e., determination block 2168="No"), in determination block 2170, the central server may determine whether there is another registered wireless identity transmitter to evaluate. In other words, the central server may determine whether the stored model payloads of all registered wireless identity transmitters have been evaluated. If there is another registered wireless identity transmitter to evaluate (i.e., determination block 2170="Yes"), the central server may continue by selecting the next registered wireless identity transmitter with the operations in block 2164.

If the central server has evaluated the stored model payloads of all registered wireless identity transmitters (i.e., determination block 2170="No"), in block 2172, the central server may be configured to evaluate the received payload using stored, initial model payloads, such as the initial model payloads stored for each registered wireless identity transmitter at the time of the devices' registration. For example, the central server may set a system variable indicating the central server should compare the received payload to stored, initial model payloads for evaluated registered wireless identity transmitters (e.g., the system variable may be set to 'initial'). The operational loop may then continue with the operations in blocks 2164-2168 wherein the central server may select each registered wireless identity transmitter and compare the initial model payloads of that selected device to the received payload.

If the central server does find a match between the received payload and any of the stored model payloads (current or initial) of a registered wireless identity transmitter (i.e., determination block 2168="Yes"), in block 2174, the central server may determine a wireless identity transmitter identity based on the match. In other words, the central server may identify the wireless identity transmitter corresponding to the received payload based on the identification information (e.g., deviceID) stored in relation to the matching stored model payload. In block 2176, the central server may update the database with the identified wireless identity transmitter's nonce or counter based on the received payload. Based on the database record corresponding to the matching stored model payload, the central server may determine the derivative nonce or counter value corresponding to the received payload and may update the stored nonce or counter value to represent the derivative nonce or counter value, thus syncing the identified wireless identity transmitter's nonce or counter and the central server nonce or counter. In an embodiment, the central server may also store in the database the central server nonce or counter (or time) at which the central server received the received payload.

In an embodiment, the central server may maintain a list (or data table) of recently received messages and the corresponding wireless identity transmitter identification. For example, the central server may record within a data table the deviceID and payload information for messages received within a certain period. The central server may compare any subsequently received payload to the data table to determine whether the subsequently received payload is redundant based on recently received payloads from the same wireless identity transmitter. For example, a subsequently received payload may represent a certain nonce or counter value from a particular wireless identity transmitter that was already received and processed by the central server a few minutes ago. This may expedite the method 2150 process and decrease search times for the operations in blocks 2164-2172. In an embodiment, the central server may expunge (or clear) the data table of recently identified payloads and wireless identity transmitters and may schedule the clearing operations similarly as described in block 2176 (e.g., the recent data table may be cleaned every time the nonce or counter time period is determined to be expired).

Figure 22:
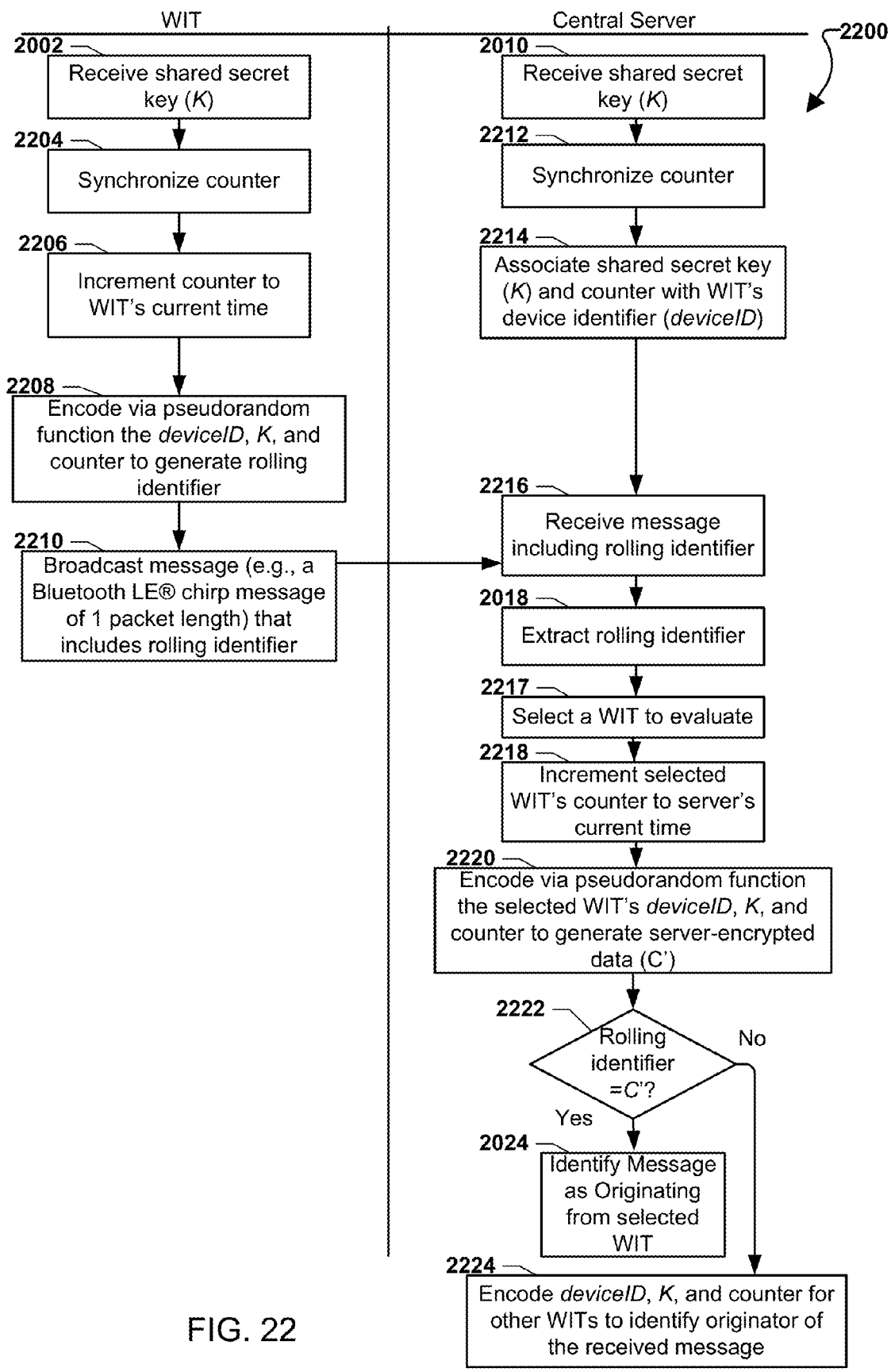
FIG. 22 is a process flow diagram illustrating embodiment operations by a wireless identity transmitter and a central server for transmitting and processing rolling identifiers using a pseudo-random function.

FIG. 22 illustrates another embodiment method 2200 for a central server to identify a wireless identity transmitter indicated by encrypted data within a message broadcast by the wireless identity transmitter. In the operations of the method 2200, nonce or counter values may never be included in broadcast messages to increase the security with which wireless identity transmitters transmit their identities. For example, as nonce or counter values may differ among different wireless identity transmitters, an attacker with the ability to capture a broadcast message may be able to easily predict values within future broadcast messages from the wireless identity transmitter. However, without nonce or counter data transmitted in the clear, nefarious snoopers may be better thwarted from following broadcasts from a particular wireless identity transmitter.

In block 2002, the wireless identity transmitter may receive a shared secret key (i.e., "K"). For example, each wireless identity transmitter may be pre-provisioned with a per-device shared secret key which is associated with the wireless identity transmitter's unique device identifier (or deviceID) at the central server. In block 2204, the wireless identity transmitter may synchronize a nonce or counter. The nonce or counter may be synchronized with the central server upon registration of the wireless identity transmitter at the central server. The synchronized nonce or counter value may also be associated with the deviceID and K in a data table stored in the central server (e.g., a table with stored pairs of IDs and K values).

In block 2206, the wireless identity transmitter may increment the nonce or counter to the wireless identity transmitter's current device time. For example, the nonce or counter may be incremented after a predefined number of seconds (e.g., one second, one hour, etc.). As another example, every 3600 seconds the wireless identity transmitter may increment the nonce or counter by one value. In this manner, the nonce or counter value may change to the current time as counted by the oscillator on the wireless identity transmitter. In block 2208, the wireless identity transmitter may encode via a pseudo-random function the device identifier (i.e., deviceID), the shared secret key (i.e., K), and the nonce or counter to generate a rolling identifier. In this manner, the rolling identifier may be generated as the nonce or counter value changes. In an embodiment, the pseudo-random function may be a polynomial time computable function with a seed ('s') and input variable ('x'), such that when the seed is randomly selected and not known to observers, the pseudo-random function (e.g., PRF(s, x)) may be computationally indistinguishable from a random function defined on the same domain with output to the same range. For example, the Keyed-Hash Message Authentication Code (HMAC) or the Cipher-Based Message Authentication Code (CMAC) may be used as the pseudo-random function.

In block 2210, the wireless identity transmitter may broadcast a message (e.g., a Bluetooth LE chrp message of 1 packet length) that includes the rolling identifier. In an embodiment, the broadcast message (or the payload of the broadcast message) may be represented by the following equation:

$$\text{Payload} = \text{MSB\_}N(\text{PRF}(K,(\text{deviceID}\|t)))$$

where t is the value of the wireless identity transmitter's nonce or counter, '∥' means concatenation, 'PRF( )' is the pseudo-random function, and 'MSB_N( )' means the 'N' most significant bits (e.g., 80 bits). In other words, the wireless identity transmitter may intentionally obscure (or skew) the device identifier and the nonce or counter information, thus the broadcast message's payload may not include either the device identifier or the nonce or counter information in the clear.

In block 2010, the central server may receive the shared secret key (K). In block 2212, the central server may synchronize a nonce or counter. For example, the nonce or counter may be set to represent a value included in a previous message related to the wireless identity transmitter, such as a registration message. In block 2214, the central server may associate the shared secret key (i.e., K) and nonce or counter with the wireless identity transmitter's device identifier (i.e., deviceID). For example, the central server may store the deviceID, K, and nonce or counter in a data table of registered devices (e.g., in a tuple record of a database). In an embodiment, the central server may also store an indicator or flag indicating whether each wireless identity transmitter has been registered or activated.

In block 2216, the central server may receive a message including the rolling identifier. For example, the received message may be a sighting message from a proximity broadcast receiver that includes the rolling identifier broadcast by the wireless identity transmitter with the operations in block 2210. In block 2018, the central server may extract the rolling identifier, such as by parsing the received message to identify the payload of the rolling identifier.

In block 2019, the central server may select a wireless identity transmitter (i.e., selected wireless identity transmitter) to evaluate. In other words, the central server may obtain a stored deviceID, K, and nonce or counter for a registered wireless identity transmitter known to the central server, such as from the database or data table storing such information for all registered wireless identity transmitters. In block 2218, the central server may increment the selected wireless identity transmitter's nonce or counter to the server's current time. In an embodiment, the central server may then increment the stored nonce or counter value to account for the time that has elapsed since the stored nonce or counter value was synchronized. As an example, the central server may compare the time of receipt of the message with the operations in block 2216 to the central server's current time (e.g., via a central server clock or time mechanism). Based on a known periodicity that wireless identity transmitters may increment their individual nonces or counters (e.g., once every hour), the central server may increment the selected nonce or counter value to account for the time difference.

In an embodiment, the central server may only increment the selected nonce or counter an amount that represents the time between broadcasts by a wireless identity transmitter. In other words, the central server may not increment the selected nonce or counter to include the time between receiving the message within the operations in block 2216 and the time a proximity broadcast receiver received the broadcast message. For example, the proximity broadcast receiver may have buffered broadcast messages before relaying sighting messages to the central server. The central server may calculate this time difference based on metadata within the message received with the operations in block 2216. For example, a sighting message from a proximity broadcast receiver may indicate when a broadcast message was received. Thus, the amount the selected nonce or counter is incremented may be based on when the proximity broadcast receiver actually received the broadcast message and not when the message from the proximity broadcast receiver was received by the central server.

In block 2220, the central server may encode via a pseudo-random function the selected wireless identity transmitter's device identifier, secret key, and nonce or counter to generate a server-encrypted data (i.e., C'). The pseudo-random function may be the same pseudo-random function utilized in the operations in block 2208. In an embodiment, the generated server-encrypted data may be represented by the following equation:

$$C'=MSB\_N(PRF(sel\_K,(sel\_deviceID\|sel\_t))),$$

where sel_K is the value of the selected wireless identity transmitter's secret key, sel_deviceID is the value of the selected wireless identity transmitter's unique device identifier, sel_t is the value of the selected wireless identity transmitter's nonce or counter, '∥' means concatenation, 'PRF ( )' is the pseudo-random function, and 'MSB_N( )' means the 'N' most significant bits (e.g., 60 bits, 74 bits, 80 bits, etc.).

In determination block 2222, the central server may determine whether the generated server-encrypted data (C') is the same as the received rolling identifier. In other words, the central server may compare the received rolling identifier to the generated server-encrypted data to determine whether they match. If the rolling identifier and the generated server-encrypted data match (i.e., determination block 2222="Yes"), in block 2024 the central server may identify the received message as originating from the selected wireless identity transmitter (e.g., corresponding to the selected wireless identity transmitter's unique identifier).

If the rolling identifier and the generated data do not match (i.e., determination block 2222="No"), in block 2224 the central server may encode device identifiers, secret keys, and nonces or counters for other wireless identity transmitters to identify the originator of the received message. In other words, the central server may select the next stored deviceID, nonce or counter, and K group from the database, increment that selected nonce or counter value, encode the selected deviceID, nonce or counter, and K, and compare the generated encoded data to the received rolling identifier until a match is found and the identity of the originator of the rolling identifier in the received message is known.

In an embodiment, when the wireless identity transmitter's battery has been removed and re-installed, the latest nonce or counter value may be persisted in the non-volatile memory of the wireless identity transmitter, so that the nonce or counter value can be read back from the non-volatile memory of the wireless identity transmitter when the battery is removed and then put back in. Alternatively, if no non-volatile memory is available or is not used, the wireless identity transmitter may fall back to the initial nonce or counter value after a battery re-installation. The central server may be required to be modified slightly to accommodate such a "counter synchronization". More specifically, in addition to trying values greater than the largest nonce or counter value for the pre-computed counter or nonce list, the central server may also try values, such as (counter+i) where i=0, . . . , n, when a "counter synchronization" is performed. In this case, a wireless identity transmitter user may need to be informed that the battery needs to be re-installed when "counter synchronization" fails multiple times.

Figure 23A:
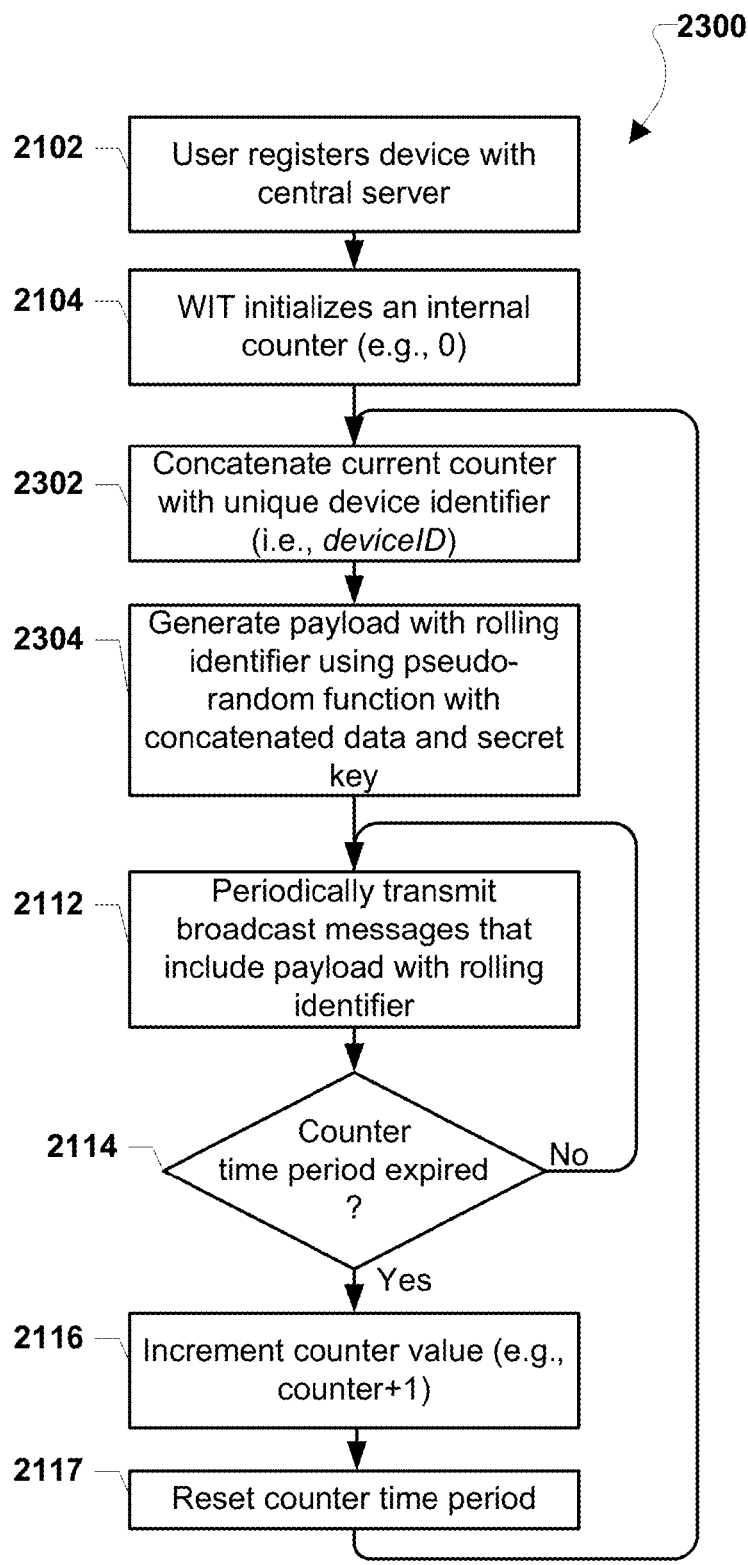
FIG. 23A is a process flow diagram illustrating an embodiment method for a wireless identity transmitter to generate and broadcast rolling identifier payloads using a pseudo-random function.

FIG. 23A illustrates an embodiment method 2300 for a wireless identity transmitter employing a pseudo-random function to generate a rolling identifier for broadcasting. The operations in the method 2300 may be similar to the embodiment method 2100 described above. However, instead of encrypting data, such as a nonce or counter value, with an AES-CTR encryption algorithm, the method 2300 may generate payloads based on the application of a pseudo-random function. As described above, the pseudo-random function and secret keys for each wireless identity transmitter may be known to both the corresponding wireless identity transmitter and a central server so that both may generate similar payloads based on similar data.

In block 2102, a user of the wireless identity transmitter may register the device with the central server. In block 2104, the wireless identity transmitter may initialize an internal nonce or counter, such as by setting the nonce or counter to a zero value. In block 2302, the wireless identity transmitter may concatenate the current nonce or counter with the wireless identity transmitter's unique device identifier (i.e., deviceID). In block 2304, the wireless identity transmitter may generate a payload with a rolling identifier using pseudo-random function with the concatenated data and the secret key. For example, the pseudo-random function may take as inputs the concatenated data (i.e., the deviceID+nonce/counter) and may use the secret key for the wireless identity transmitter as a randomness seed variable. The payload with the rolling identifier may include the output data from the pseudo-random function. In an embodiment, the payload with the rolling identifier may also include in-the-clear information regarding other aspects of the wireless identity transmitter. For example, the wireless identity transmitter may append to the payload several bits (e.g., 4 bits) of information which describe the battery status of the wireless identity transmitter. In an embodiment, the pseudo-random function may be a polynomial time computable function that is computationally indistinguishable from a random function defined on the same domain with output to the same range as the pseudo-random function. For example, the keyed hash Message Authentication Code (HMAC) or the Cipher-based Message Authentication Code (CMAC) may be used as the pseudo-random function. In an embodiment, the wireless identity transmitter may or may not perform a truncation operation to the generated rolling identifier payload. For example, the payload with the rolling identifier may be the result of performing a most-significant-bit operation on the results of the pseudo-random function.

In block 2112, the wireless identity transmitter may periodically transmit broadcast messages that include the payload with the rolling identifier, such as by broadcasting via short-range wireless communication techniques as described above. In determination block 2114, the wireless identity transmitter may determine whether a predefined nonce or counter time period has expired. If the nonce or counter time period has not expired (i.e., determination block 2114="No"), the wireless identity transmitter may continue with the operations in block 2112. If the device determines the nonce or counter time period has expired (i.e., determination block 2114="Yes"), in block 2116 the wireless identity transmitter may increment the nonce or counter value, such as by adding 1. In block 2117, the wireless identity transmitter may reset the nonce or counter time period, and may continue with the operations in block 2302.

Figure 23B:
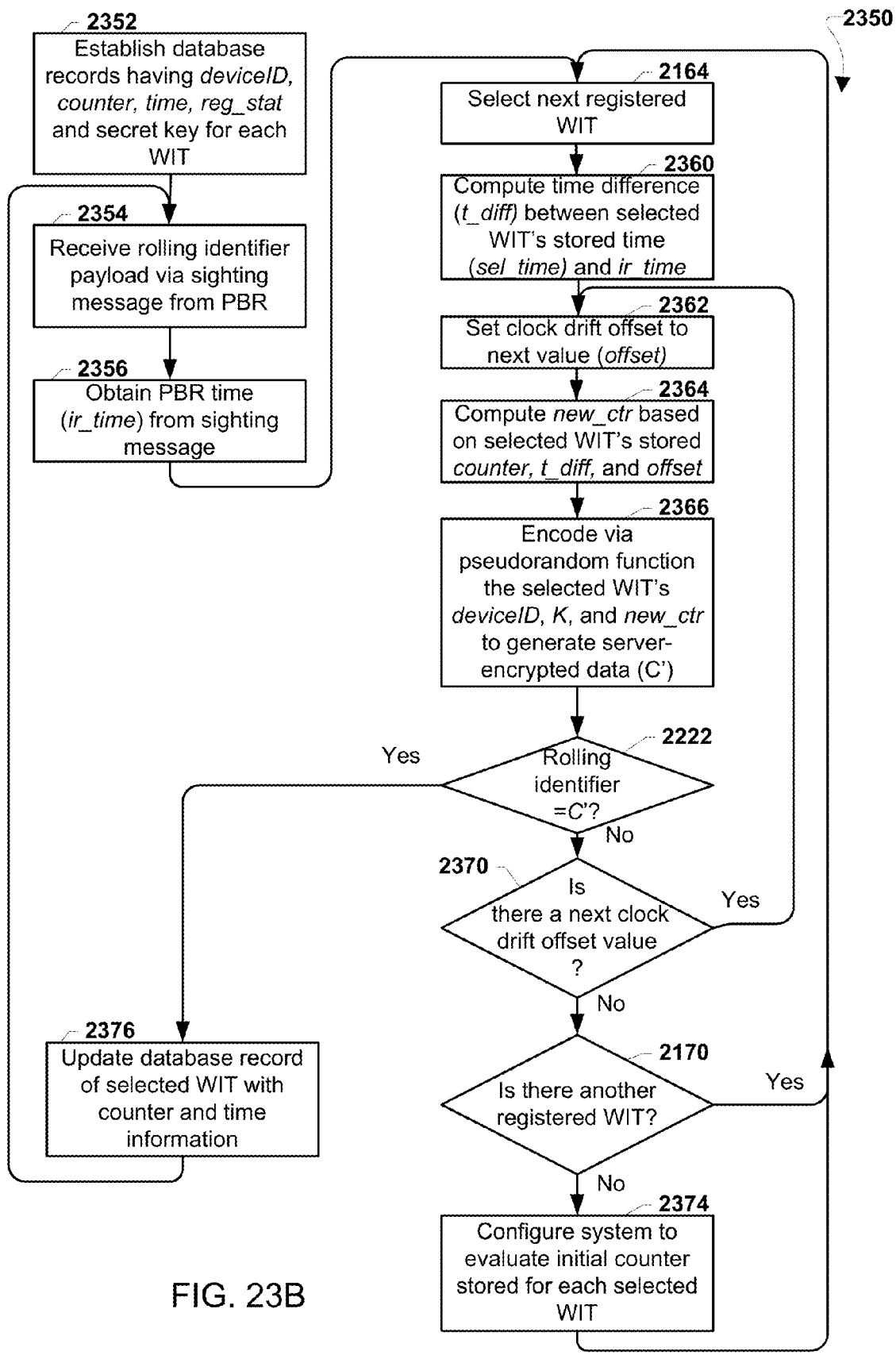
FIG. 23B a process flow diagram illustrating an embodiment method for a central server to receive and handle rolling identifier payloads using a pseudo-random function.

FIG. 23B illustrates an embodiment method 2350 for a central server responding to received messages containing pseudo-random function rolling identifiers. The embodiment method 2350 operations may be similar to the operations described above with reference to FIG. 21B, with the exception that the central server may compare outputs of a pseudo-random function with time-synchronized information stored in the central server to match payloads in messages received from wireless identity transmitters.

In block 2352, the central server may establish database records having device identifier (i.e., deviceID), nonce or counter, time, registration status (i.e., 'reg_stat'), and secret key (i.e., 'K') information for each wireless identity transmitter in a system. The time may indicate the last time the central server received a message corresponding to a particular wireless identity transmitter (e.g., a sighting message relaying a broadcast message), or in other words, the central server clock value at the moment when the nonce or counter value for a wireless identity transmitter was received/recorded in the database. It may be assumed that the period between when a wireless identity transmitter broadcasts a message with a rolling identifier (or rolling identifier payload) and when the central server receives the rolling identifier is very short. Thus, the stored nonce or counter and time values may be assumed to create a roughly accurate clock status of a wireless identity transmitter.

Additionally, once a wireless identity transmitter transmits registration information, the central server may indicate a valid registration by setting a registration flag in the database for the wireless identity transmitter (e.g. 'reg_stat'). The central server may query the database for all wireless identity transmitter records where the reg_stat indicates a valid registration has been conducted and may create data tables that include only registered wireless identity transmitters based on the reg_stat values.

In block 2354, the central server may receive a rolling identifier payload via a sighting message from a proximity broadcast receiver. The sighting message may have time information appended to the payload that describes the time at which the proximity broadcast receiver encountered the payload via a broadcast message from the respective wireless identity transmitter. For example, a payload may be received by a smartphone proximity broadcast receiver which in turn may append its own system clock reading to the payload information and transmit the data to the central server as a sighting message. The time measurement provided by the proximity broadcast receiver may be approximately synchronized with the central server system time. In an embodiment, the proximity broadcast receiver may append other additional information to the sighting message, such as location information (e.g., GPS coordinates) of the proximity broadcast receiver. In block 2356, the central server may obtain a proximity broadcast receiver time (i.e., 'ir_time') from the sighting message, such as indicated within the sighting message. For example, the central server may parse the sighting message and extract a time value indicating when the proximity broadcast receiver received a broadcast message that corresponds to the rolling identifier payload.

In blocks 2164-2374, the central server may perform an operational loop in which the central server may evaluate all registered wireless identity transmitters stored within the central server's database to find a device record that matches the received rolling identifier payload. In block 2164, the central server may select a next registered wireless identity transmitter. For example, the central server may iteratively select the next wireless identity transmitter represented in a data table of all wireless identity transmitters that have the reg_stat variable set to indicate registration occurred. The central server may sequentially iterate through such a data table or list for each device during the operations in blocks 2164-2374. In an embodiment, the central server may access a stored database record corresponding to the selected registered wireless identity transmitter that contains the current values for the information established with registration operations in block 2352.

In block 2360, the central server may compute the time difference (i.e., 't_diff') between the time indicated in the sighting message (ir_time) and the time stored within the database record of the selected registered wireless identity transmitter (i.e., 'sel_time'). For example, the t_diff value may be a non-zero or a zero value. This time difference may be a measure of the expected elapsed time between instances of the central server receiving payloads from the selected wireless identity transmitter.

In block 2362, the central server may set a clock drift offset (i.e., 'offset') to a next value. In general, the central server may account for possible wireless identity transmitter clock drift (e.g., inaccurate device system clock readings) by setting the clock drift offset value. The clock drift offset values may represent offsets that, when applied to nonce or counter values, may represent nonces or counters lower, the same, or higher than an expected nonce or counter value. In other words, the clock drift offsets may represent time before, during, or after the time represented by the current nonce or counter for the selected registered device. The clock drift offset value may be one of a sequence of clock drift offset values. In an embodiment, the clock drift offset value may be 0. In an embodiment, possible clock drift offset values may include numbers within a set {−N, . . . , −1, 0, 1, . . . , N}, where N is an arbitrary number.

In block 2364, the central server may compute an expected nonce or counter value (i.e., 'new_ctr') using the selected wireless identity transmitter's stored nonce or counter value, the computed time difference (i.e., t_diff) and the set offset value (i.e., offset). As described above, the nonce or counter may be stored within the selected registered wireless identity transmitter database record. For example, the central server may calculate new_ctr by adding the clock drift offset value to the sum of the t_diff value and the stored nonce or counter value.

In determination block 2366, the central server may encode via a pseudo-random function the selected wireless identity transmitter's device identifier, secret key, and computed nonce or counter (i.e., new_ctr) to generate a server-encrypted data (i.e., C'). The pseudo-random function may be the same pseudo-random function utilized by a wireless identity transmitter as described above with reference to FIG. 23A.

In determination block 2222, the central server may determine whether the generated server-encrypted data (C') is the same as the received rolling identifier. In other words, the central server may compare the received rolling identifier to the generated server-encrypted data to determine whether they match. If the rolling identifier and the generated server-encrypted data match (i.e., determination block 2222="Yes"), the central server may identify the received message as originating from the selected wireless identity transmitter (e.g., corresponding to the selected wireless identity transmitter's unique identifier). In an embodiment, the secret key (K) may be the seed value of the pseudo-random function. In an embodiment, the central server may concatenate the selected wireless identity transmitter's deviceID and the computed new_ctr value and provide that concatenated data to the pseudo-random function. The pseudo-random function may return (or output) encrypted data having a similar structure as received rolling identifier payload.

If the rolling identifier, such as received in the sighting message, and the generated server-encrypted data (i.e., C') match (i.e., determination block 2222="Yes"), in block 1276 the central server may update the database record of the selected wireless identity transmitter with the nonce or counter and time information, such as the new_ctr and the ir_time. For example, the central server may update the database record's time value to represent the time of receipt of the payload within the proximity broadcast receiver (e.g., ir_time) and may also update the stored nonce or counter value to represent the new_ctr value. The central server may continue with the operations in block 2354.

If the rolling identifier, such as received in the sighting message, and the generated server-encrypted data (i.e., C') do not match (i.e., determination block 2222="No"), the central server may determine whether there is a next clock drift offset value in determination block 2370. In other words, the central server may determine whether new_ctr values have been computed using all possible clock drift offset values (e.g., -1, 0, 1, etc.). If there is a next clock drift offset value (i.e., determination block 2370="Yes"), the central server may continue with the operations in block 2362. However, if there is not a next clock drift offset value (i.e., determination block 2370="No"), in determination block 2170, the central server may determine whether there is another registered wireless identity transmitter to evaluate. If there is another registered wireless identity transmitter to evaluate (i.e., determination block 2170="Yes"), the central server may continue with the operations in block 2164. However, if there is no other registered wireless identity transmitter (i.e., determination block 2170="No"), in block 2374 the central server may configure the system to evaluate initial nonce or counter values stored for each registered wireless identity transmitter. In an embodiment, the registration database described above may further include data that represents the initial nonce or counter value corresponding to each registered wireless identity transmitter. This initial nonce or counter value may be used if/when the various wireless identity transmitters are rebooted or otherwise reset their nonces or counters. For example, a wireless identity transmitter may operate and deliver payloads describing non-initial nonces or counters for a period of time before resetting its internal nonce or counter due to battery replacement. In such a scenario, the wireless identity transmitter may broadcast messages that include rolling identifier payloads based on reset nonce or counter information.

In another embodiment, the operations in block 2374 may be performed for individual registered selected devices during the operational loop in blocks 2362-2370, wherein the stored nonce or counter value in block 2364 may be replaced with the initial stored nonce or counter value. For example, once the central server determines a selected registered wireless identity transmitter's stored nonce or counter value with the various clock drift offset values cannot be used to generate encrypted data that matches the received rolling identifier payload, the central server may evaluate the initial stored nonce or counter value of the selected wireless identity transmitter before selecting the next registered wireless identity transmitter.

Figure 24A:
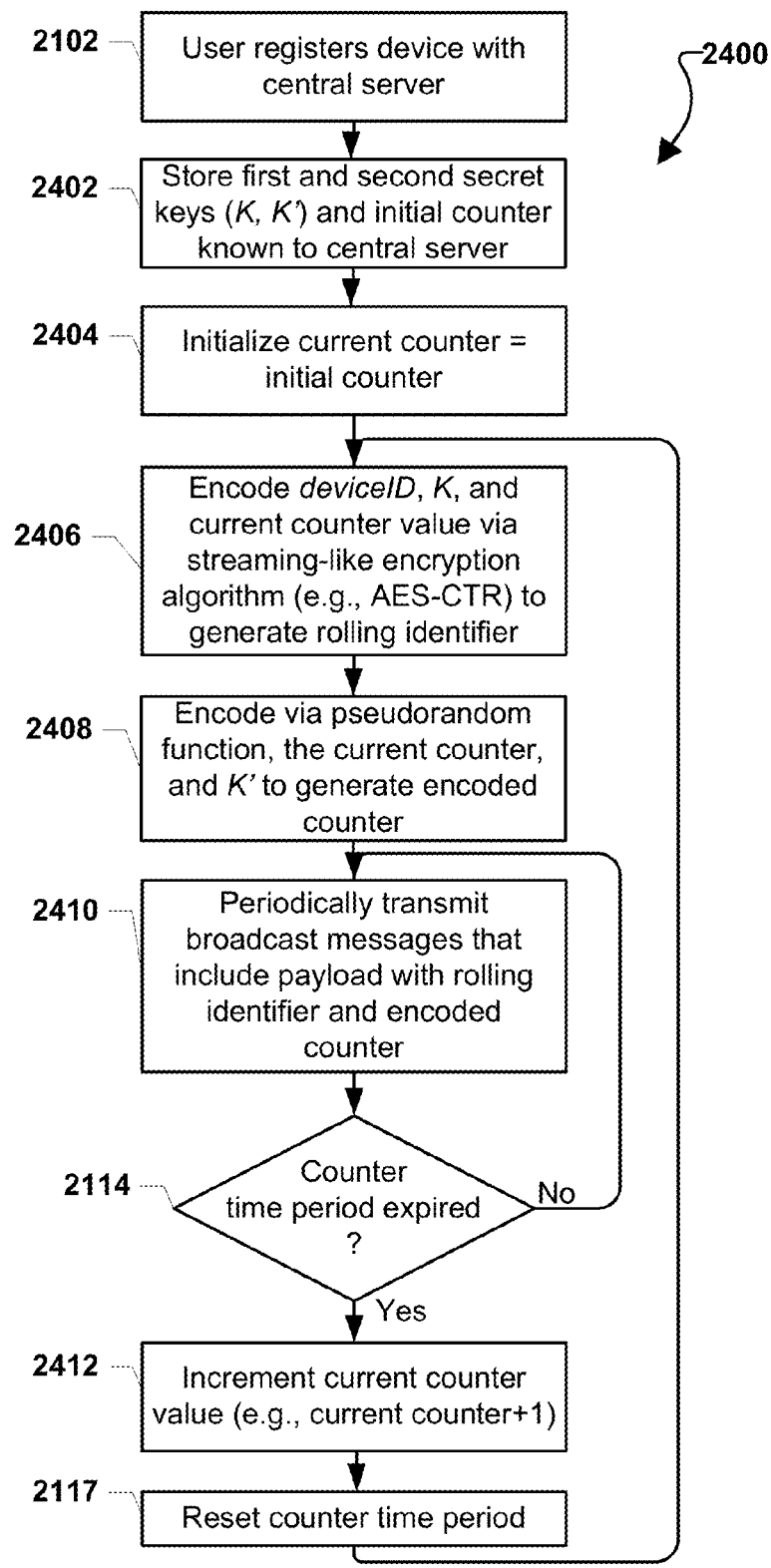
FIG. 24A is a process flow diagram illustrating an embodiment method for a wireless identity transmitter to generate and broadcast messages with rolling identifiers and encoded nonces or counters.

FIG. 24A illustrates an embodiment method 2400 for a wireless identity transmitter generating and broadcasting messages with rolling identifiers and encoded nonces or counters. The method 2400 may have operations performed by a wireless identity transmitter that are similar to those described above with reference to FIGS. 20, 21A, 22, and 23A. However, the method 2400 may involve broadcasting messages that include a rolling identifier (i.e., an encoded device identifier) as well as an encoded nonce or counter that may be evaluated separately by the central server with the operations described below with reference to FIG. 24B. In this manner, the wireless identity transmitter's nonce or counter value (or nonce) may not be sent in the clear in the payload of the broadcast message.

In block 2102, a user of the wireless identity transmitter may register the device with the central server. For example, the wireless identity transmitter may provide the unique device identifier (i.e., deviceID) to a central server for storage in a database of registered wireless identity transmitters. In block 2402, the wireless identity transmitter may store a first secret key (K) and a second secret key (K') and an initial nonce or counter that are known to the central server. For example, these values may be shared between the central server and the wireless identity transmitter during registration operations described in this disclosure. In block 2404, the wireless identity transmitter may initialize a current nonce or counter by setting it to the value of the initial nonce or counter value.

Similar to as described above with reference to FIG. 20, in block 2406, the wireless identity transmitter may encode the device identifier (deviceID), the first secret key (K), and the current nonce or counter via a streaming-like encryption algorithm (e.g., AES-CTR) to generate a rolling identifier. In block 2408, the wireless identity transmitter may encode via a pseudo-random function, the current nonce or counter, and the second secret key (K') to generate an encoded counter or nonce. In an embodiment, the encoded nonce or counter may be represented by the following equation:

$$\text{Encoded nonce/counter} = \text{MSB\_}M(\text{PRF}(K',t)),$$

where 'K'' is a per-device second secret key (usually different from the first per-device secret key K), 't' is the current nonce or counter, PRF ( )' is the pseudo-random function, and 'MSB_M( )' means the 'M' most significant bits (e.g., 20 bits).

In block 2410, the wireless identity transmitter may periodically transmit broadcast messages that include the payload with the rolling identifier and the encoded nonce or counter. In determination block 2114, the wireless identity transmitter may determine whether a predefined nonce or counter time period has expired. If the nonce or counter time period has not expired (i.e., determination block 2114="No"), the wireless identity transmitter may continue with the operations in block 2410. If the device determines the nonce or counter time period has expired (i.e., determination block 2114="Yes"), in block 2412 the wireless identity transmitter may increment the current nonce or counter value, such as by adding 1. In block 2117, the wireless identity transmitter may reset the nonce or counter time period and may continue with the operations in block 2406.

Figure 24B:
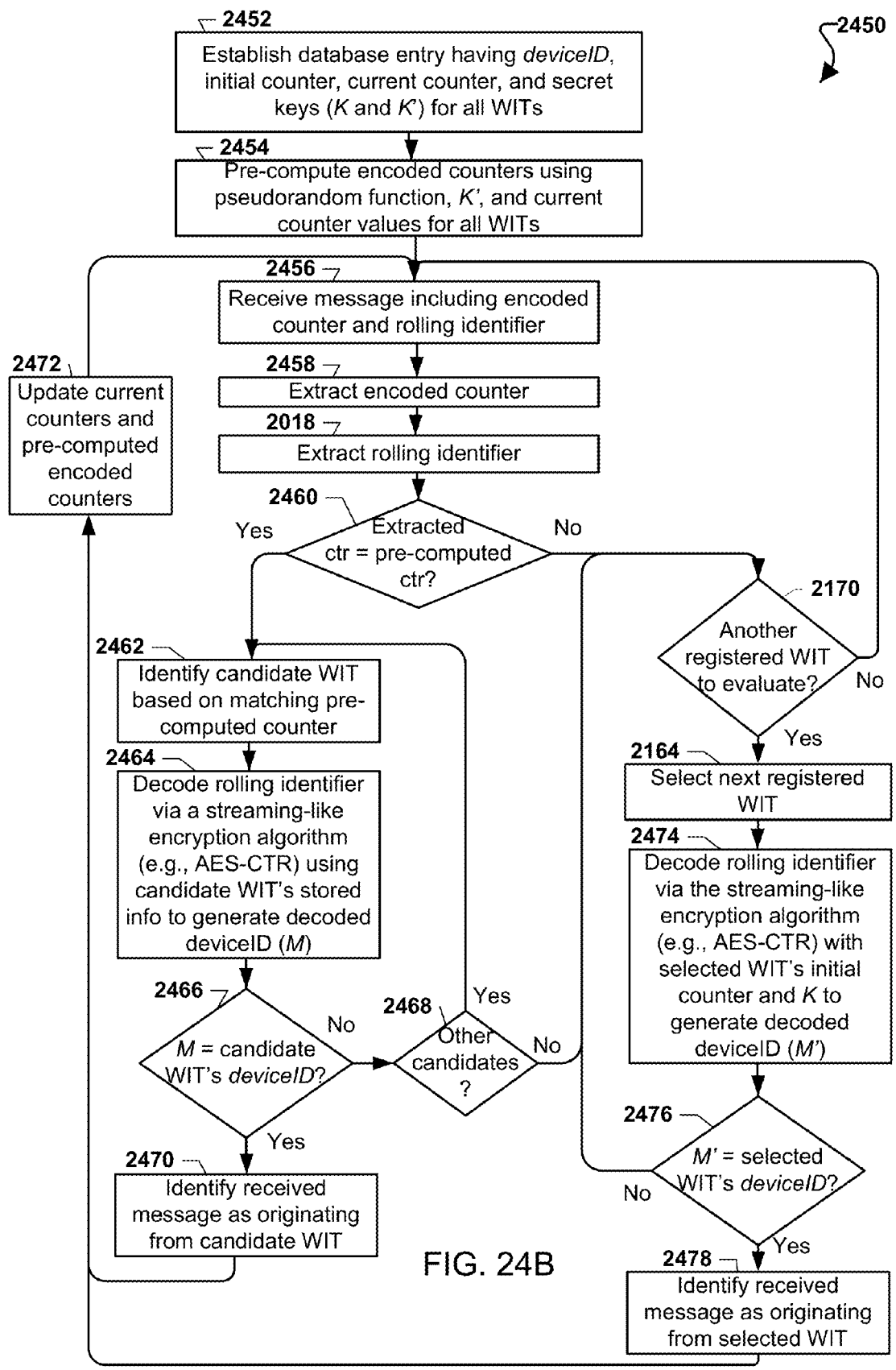
FIGS. 24B-24C are process flow diagrams illustrating embodiment methods for a central server receiving and handling messages including rolling identifiers and encoded nonces or counters.

FIG. 24B illustrates an embodiment method 2450 for a central server receiving and handling messages including rolling identifiers and encoded nonces or counters. The central server may perform the operations of method 2450 in combination or response to a wireless identity transmitter performing the method 2400 described above. The method may include two passes: a first pass wherein the central server attempts to identify a wireless identity transmitter based on an encoded nonce or counter within a received message (e.g., a sighting message), and a second pass wherein the central server attempts the identification based on a rolling identifier to within the received message In block 2452, the central server may establish a database entry having a device identifier (i.e., deviceID), initial nonce or counter, current nonce or counter, and secret keys (K and K') for all wireless identity transmitters in the system. The current nonce or counter values may be the same as the initial nonces or counters at the time of registration of wireless identity transmitters. In block 2454, the central server may pre-compute encoded nonces or counters using a pseudo-random function, the second secret key (K'), and current nonce or counter values for all wireless identity transmitters. For example, the central server may generate a plurality of encoded nonce or counter values for each registered wireless identity transmitter, such as one based on the current nonce or counter value, another based on a value one larger than the current counter value, etc. In an embodiment, the central server may pre-compute 24 encoded nonce or counters for each registered wireless identity transmitter. In an embodiment, the central server may store a separate list (or data table) of the pre-computed encoded nonces or counters for all registered wireless identity transmitters that also includes the device identifiers associated with each stored pre-computed encoded nonce or counter.

In block 2456, the central server may receive a message including an encoded nonce or counter and a rolling identifier, such as within a sighting message transmitted by a proximity broadcast receiver. In block 2458, the central server may extract an encoded nonce or counter from the received message, and in block 2018 may extract a rolling identifier from the received message. In determination block 2460, the central server may determine whether the extracted nonce or counter (or 'ctr') matches any of the pre-computed nonce or counters. For example, the central server may compare the encoded nonce or counter value extracted from the received message to the plurality of central server-encoded nonce or counter values for each registered wireless identity transmitter to identify any matches. If the extracted nonce or counter matches a pre-computed nonce or counter (i.e., determination block 2460="Yes"), in block 2462 the central server may identify a candidate wireless identity transmitter based on the matching pre-computed nonce or counter. In other words, the central server may identity the candidate as the deviceID stored in relation to the pre-computed nonce or counter in a data table in the central server. In block 2464, the central server may decode the rolling identifier via a streaming-like encryption algorithm (e.g., the same AES-CTR wireless identity transmitters use when performing the operations in FIG. 24A) using the candidate wireless identity transmitter's stored information (e.g., deviceID, secret key, etc.) to find a decoded device identifier (or M). In determination block 2466, the central server may determine whether the decoded device identifier (M) matches the candidate wireless identity transmitter's deviceID. Such a match may enable the central server to identify the wireless identity transmitter associated with that received rolling identifier without decoding the rolling identifier or the encoded nonce or counter value. If the deviceID and decoded identifier (M) match (i.e., determination block 2466="Yes"), in block 2470 the central server may identity the received message as originating from the candidate wireless identity transmitter. In block 2472, the central server may update current nonces or counters and pre-computed encoded nonces or counters. For example, the database entry for the wireless identity transmitter identified as the originator of the received message may be updated with new current nonce or counter information as well as new pre-computed encoded nonces or counters. Additionally, any stored lists of pre-computed encoded nonces or counters may have older pre-computed encoded nonces or counters removed at the same time newly computed encoded nonces or counters corresponding to the identified wireless identity transmitter are added to the list. In another embodiment, if the wireless identity transmitter identified as the originator of the received message is indicated in the central server's database as "not activated" (i.e., a flag is not set), then the central server may also adjust the database to reflect that the identified wireless identity transmitter is now activated (e.g., set a flag). The central server may then continue with the operations in block 2456.

If the deviceID and decoded identifier (M) do not match (i.e., determination block 2466="No"), in determination block 2468, the central server may determine whether there are other candidates, such as other registered wireless identity transmitters that have not been evaluated by the central server. If there are other candidates (i.e., determination block 2468="Yes"), the central server may continue with the operations in block 2462, such as by identifying the next wireless identity transmitter to evaluate regarding the rolling identifier.

If there are no other candidates (i.e., determination block 2468="No"), or if the extracted nonce or counter does not match the pre-computed nonce or counter (i.e., determination block 2460="No"), the central server may attempt to identify the originator of the received message by comparing the extracted rolling identifier to information associated with all registered wireless identity transmitters in the system. Thus, in determination block 2170 the central server may determine whether there is another registered wireless identity transmitter to evaluate. For example, the central server may iteratively use information of all registered wireless identity transmitters. If there is not another (i.e., determination block 2170="No"), the central server may continue with the operations in block 2456.

If there is another (i.e., determination block 2170="Yes"), in block 2164 the central server may select the next registered wireless identity transmitter. In block 2474, the central server may decode the rolling identifier via the streaming-like encryption algorithm (e.g., AES-CTR) with the selected wireless identity transmitter's initial nonce or counter and first secret key (K) to find a decoded device identifier (M'), similar to as described above. In determination block 2476, the central server may determine whether the decoded device identifier (M') matches the selected wireless identity transmitter's deviceID. If the identifiers do not match (i.e., determination block 2476="No"), the central server may continue with the operations in determination block 2170. However, if the identifiers match (i.e., determination block 2476="Yes"), in block 2478 the central server may identify the received messages as originating from the selected wireless identity transmitter, and may continue with the operations in block 2472.

Figure 24C:
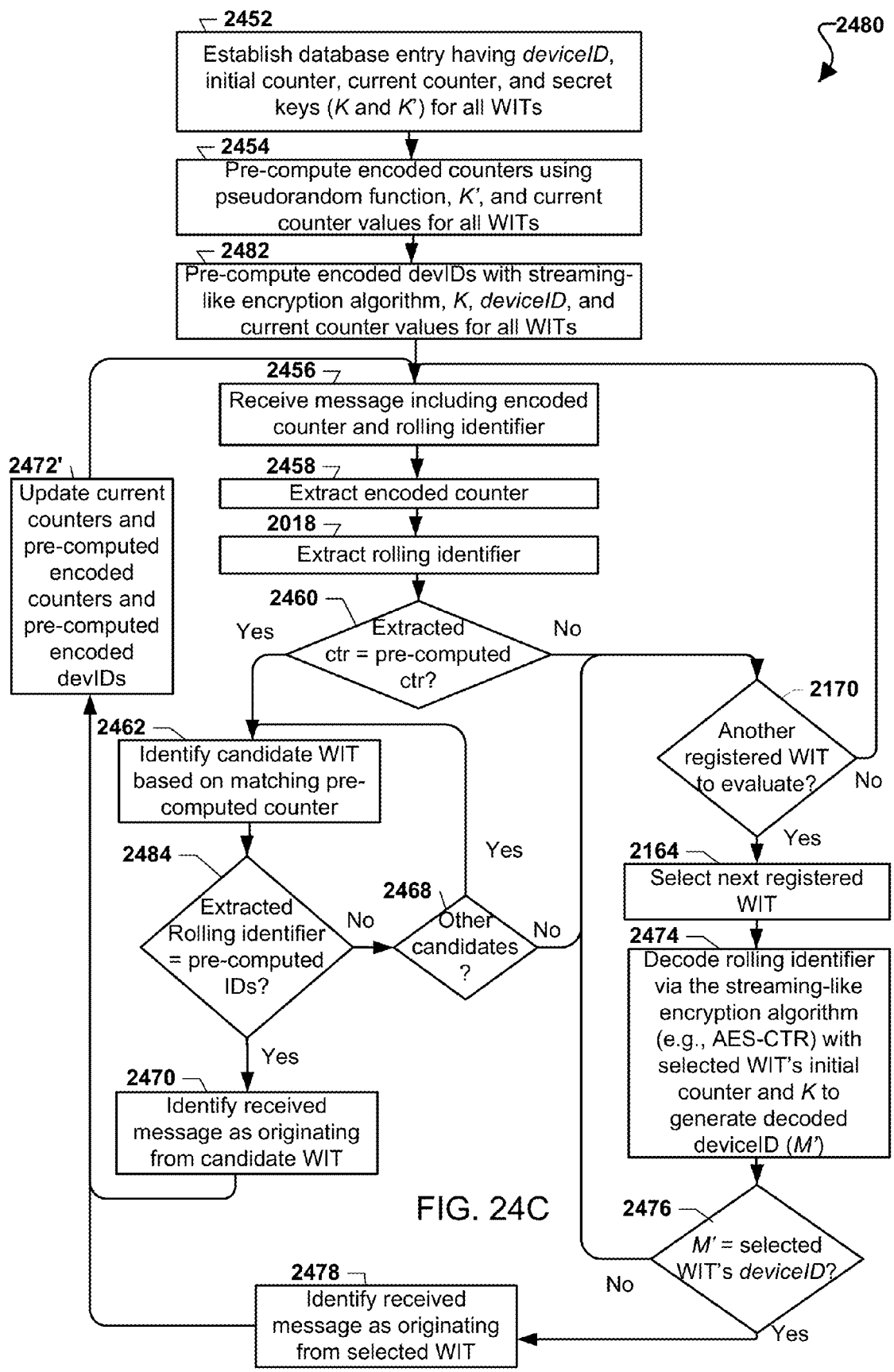

FIG. 24C illustrates an embodiment method 2480 for a central server receiving and handling messages including rolling identifiers and encoded nonces or counters. The operations of method 2480 are similar to the operations of method 2450, except that rather than perform a two pass process as discussed above in FIG. 24B, the central server may perform method 2480 as a one pass process. In particular, the central server may generate both a plurality of central server encrypted nonce or counter values for each registered wireless identity transmitter and a plurality of central server-encrypted device identifiers (i.e., deviceID). The central server may use the data stored in the database for each wireless identity transmitter (e.g., deviceID, K, K', initial nonce or counter, and current nonce or counter) and the plurality of pre-computed nonce or counter values for each device to encode a plurality of central server encrypted nonce or counter values and a plurality of server encrypted device IDs. When the central server receives the sighting message including the rolling identifier and encoded nonce or counter, the central server may compare the plurality of central server encrypted nonce or counter values and the plurality of central server encoded device IDs to the rolling identifier and encoded nonce or counters obtained from the received sighting message. The device identifier of the wireless identity transmitter that originated the rolling identifier may then be identified based entirely on matching the pre-computed nonce or counter values and device identifiers without requiring actual decoding of the rolling identifier itself In block 2452, the central server may establish a database entry having a device identifier (i.e., deviceID), initial nonce or counter, current nonce or counter, and secret keys (K and K') for all wireless identity transmitters in the system. In block 2454, the central server may pre-compute encoded nonces or counters using a pseudo-random function, the second secret key (K'), and current nonce or counter values for all wireless identity transmitters. In block 2482, the central server may pre-compute encoded device identifiers with a streaming-like encryption algorithm (e.g., AES-CTR block cipher), the device identifier, current nonce or counter, and the first secret key (K) for all wireless identity transmitters. In other words, the central server may generate a plurality of encoded device identifiers for each registered wireless identity transmitter, such as by using the current nonce or counter and predefined offset nonce or counter values, or alternatively, only a single encoded device identifier based only on the current nonce or counter stored within the central server.

In block 2456, the central server may receive a message including an encoded nonce or counter and a rolling identifier, such as within a sighting message transmitted by a proximity broadcast receiver. In block 2458, the central server may extract an encoded nonce or counter from the received message, and in block 2018 may extract a rolling identifier from the received message. In determination block 2460, the central server may determine whether the extracted nonce or counter (or 'ctr') matches any of the pre-computed nonces or counters. If the extracted nonce or counter matches a pre-computed nonce or counter (i.e., determination block 2460="Yes"), in block 2462 the central server may identity a candidate wireless identity transmitter based on the matching pre-computed nonce or counter. In determination block 2484, the central server may determine whether the extracted rolling identifier matches any of the pre-computed identifiers, such as the pre-computing device identifiers for the candidate wireless identity transmitter.

If the extracted rolling identifier does match any of the pre-computed identifiers for the candidate wireless identity transmitter (i.e., determination block 2484="Yes"), in block 2470 the central server may identity the received message as originating from the candidate wireless identity transmitter. In block 2472', the central server may update current nonces or counters and pre-computed encoded nonces or counters and pre-computed encoded device identifiers. For example, the database entry for the wireless identity transmitter identified as the originator of the received message may be updated with new current nonce or counter information as well as new pre-computed encoded nonces or counters and pre-computed encoded device identifiers. Additionally, any stored lists of pre-computed encoded nonces or counters may have older pre-computed encoded nonces or counters or encoded device identifiers removed at the same time newly computed encoded nonces or counters or device identifiers corresponding to the identified wireless identity transmitter are added to the list. In another embodiment, if the wireless identity transmitter identified as the originator of the received message is indicated in the central server's database as "not activated" (i.e., a flag is not set), then the central server may also adjust the database to reflect that the identified wireless identity transmitter is now activated (e.g., set a flag). The central server may then continue with the operations in block 2456.

If the extracted rolling identifier does not match any of the pre-computed identifiers for the candidate wireless identity transmitter (i.e., determination block 2484="No"), in determination block 2468, the central server may determine whether there are other candidates, such as other registered wireless identity transmitters that have not been evaluated by the central server. If there are other candidates (i.e., determination block 2468="Yes"), the central server may continue with the operations in block 2462, such as by identifying the next wireless identity transmitter to evaluate regarding the rolling identifier.

If there are no other candidates (i.e., determination block 2468="No"), or if the extracted nonce or counter does not match the pre-computed nonce or counter (i.e., determination block 2460="No"), the central server may attempt to identify the originator of the received message by comparing the extracted rolling identifier to information associated with all registered wireless identity transmitters in the system. Thus, in determination block 2170 the central server may determine whether there is another registered wireless identity transmitter to evaluate. For example, the central server may iteratively use information of all registered wireless identity transmitters. If there is not another (i.e., determination block 2170="No"), the central server may continue with the operations in block 2456.

If there is another (i.e., determination block 2170="Yes"), in block 2164 the central server may select the next registered wireless identity transmitter. In block 2474, the central server may decode the rolling identifier via the streaming-like encryption algorithm (e.g., AES-CTR) with the selected wireless identity transmitter's initial nonce or counter and first secret key (K) to find a decoded device identifier (M'). In determination block 2476, the central server may determine whether the decoded device identifier (M') matches the selected wireless identity transmitter's deviceID. If the identifiers do not match (i.e., determination block 2476="No"), the central server may continue with the operations in determination block 2170. However, if the identifiers match (i.e., determination block 2476="Yes"), in block 2478 the central server may identify the received messages as originating from the selected wireless identity transmitter, and may continue with the operations in block 2472'.

Figure 25:
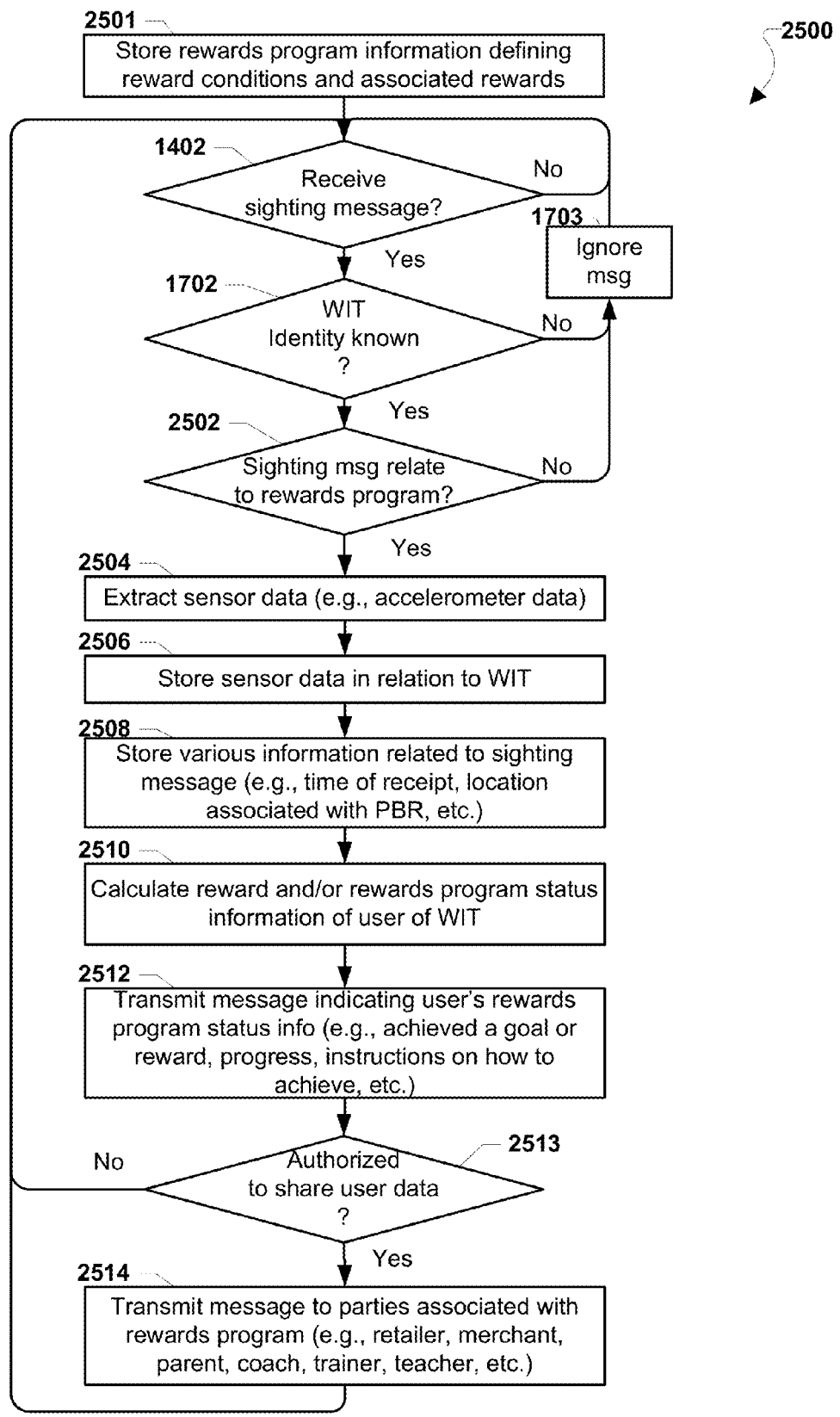
FIG. 25 is a process flow diagram of an embodiment method for a central server to calculate rewards program information in response to receiving sighting messages related to a wireless identity transmitter.

FIG. 25 illustrates an embodiment method 2500 for a central server calculating rewards information in response to receiving sighting messages related to a wireless identity transmitter. The central server may calculate or otherwise determine rewards in response to receiving sighting messages that indicate the user's behavior. In particular, the user's wireless identity transmitter may include various sensors, such as an accelerometer configured to measure motion data. The wireless identity transmitter may include sensor data within broadcast messages that are delivered to the central server via a sighting message from a proximity broadcast receiver. Once detected within the sighting message, the central server may use the sensor data to calculate rewards information related to a rewards program maintained by the central server. For example, accelerometer data indicating a high amount of motion may be used to estimate a child's activity for a period of time. Based on the activity, the central server may calculate that the child has earned a 'congratulations' SMS message reward for meeting a certain daily activity level prescribed by a fitness rewards program.

In block 2501, the central server may store rewards program information defining reward conditions and associated rewards. In particular, the central server may store conditions for operating a rewards program that may be executed as a service, process, thread, or other routine via the central server. Such conditions may include windows of time, geographical areas (e.g., GPS coordinates), and periodicity (e.g., a certain number of times for every hour, day, week, etc.), and may be linked or associated with various prizes, incentives, or benefits. For example, a first coupon may be associated with a first geofence condition within a restaurant (e.g., a geofence at the entry), and a second coupon may be associated with a second geofence condition within the restaurant (e.g., a geofence at a bar within the restaurant). Such reward program information may be provided by registered services, users, or various parties that intend to influence the behavior of users registered (or known) within the central server. The stored reward program information may also include equations and/or rule sets for calculating rewards for the rewards program. For example, the stored information may indicate that a single reward credit (e.g., an hour of television time) may be awarded to a user of a wireless identity transmitter when that wireless identity transmitter is detected within proximity of the user's junior high school during school hours. In an embodiment, the central server may store information that indicates how often or how many times a particular award may be awarded to a user. For example, the central server may store rules that indicate each unique user may only ever receive a single coupon when entering a certain area within a shopping mall or amusement park.

In determination block 1402, the central server may determine whether a sighting message is received, as described above. The central server may evaluate a receiving circuit, buffer, queue or other indicator to determine when messages are received from various devices, such as proximity broadcast receivers. In an embodiment, the central server may utilize a network module as described above to determine whether a sighting message is received. In general, sighting messages may be received via long-range communications, such as packets transmitted via a cellular network over the Internet. As described above, the central server may receive a sighting message from a proximity broadcast receiver in response to the proximity broadcast receiver receiving a broadcast message from the wireless identity transmitter. Such as proximity broadcast receiver may include a smartphone carried by the user of the wireless identity transmitter, a stationary proximity broadcast receiver positioned around a place (e.g., home, school, daycare, etc.), a parent's smartphone, etc., and the wireless identity transmitter may be carried by a child, elderly person, pet, or other individual to track. If the central server does not receive a sighting message (i.e., determination block 1402="No"), the central server may continue with the operations in determination block 1402.

If the central server does receive a sighting message (i.e., determination block 1402="Yes"), in determination block 1702 the central server may determine whether the wireless identity transmitter identity is known as described above. In other words, the central server may perform the operations to determine whether the sighting message indicates a wireless identity transmitter identity (or identifier) that is associated with a user registered with the central server. If the wireless identity transmitter is not known (i.e., determination block 1702="No"), in block 1703 the central server may ignore the sighting message and continue to perform the operations in determination block 1402. If the wireless identity transmitter is known (i.e., determination block 1702="Yes"), in determination block 2502 the central server may determine whether the sighting message relates to a rewards program, such as a program related to the rewards program information stored with the operations in block 2501. For example, the central server may compare the identification information of the wireless identity transmitter (e.g., decrypted/decoded rolling identifier) to a list of users that have registered to participate in an activity rewards program. Alternatively, the central server may determine whether the sighting message is related to a rewards program based on metadata which indicates the rewards program (e.g., a metadata code that indicates affiliation with a particular merchant's rewards program). In an embodiment, the central server may also authenticate the received sighting message based on metadata within the sighting message (e.g., metadata identifying the proximity broadcast receiver that transmitted the sighting message).

If the message does not relate to the rewards program (i.e., determination block 2502="No"), the central server may continue with the operations in block 1703. However, if the message relates to the rewards program (i.e., determination block 2502="Yes"), in block 2504 the central server may extract sensor data, such as from metadata indicated within from the sighting message or otherwise encoded or encrypted within the sighting message. For example, the central server may detect that the sighting message includes a broadcast message that indicates accelerometer sensor data, thermometer sensor data, and/or pulse sensor data within its payload. In block 2506, the central server may store the extracted sensor data in relation to the wireless identity transmitter, for example, by storing the sensor data in a database entry that is linked to the user or the device identifier of the user's wireless identity transmitter. As another example, the central server may maintain a database for the rewards program that stores sensor data for each registered user. As described above, in block 2508, the central server may also store various information related to the sighting message, such as the time of receipt of the sighting message, and location information (e.g., GPS coordinates) of the proximity broadcast receiver at the time of receipt of the broadcast message. In an embodiment, the central server may generate statistical information, such as median, mean, minimum, and maximum values for reported sensors of the wireless identity transmitter, and may also calculate trending information for the sensor data based on particular time periods (e.g., months, years, days, daytime, nighttime, etc.) and conditions (e.g., sensor data reported while at school, inside, outside, in room, etc.). In other embodiments, the central server may maintain statistical information for any devices associated with the rewards program. For example, the central server may generate statistics that indicates how many devices achieved rewards within a period.

In block 2510, the central server may calculate a reward and/or a rewards program status information of the user associated with the wireless identity transmitter. The central server may calculate the reward and/or reward status information by comparing some or all of the user's information stored within the database to the stored reward program information. For example, the central server may compare the user's current stored sensor data to stored program threshold values to determine whether a reward was achieved. The reward program status information (or status) may be an assessment of the user's progress towards a certain goal or achievement. For example, the central server may calculate how close the user is to completing his daily target of physical activity as prescribed by a fitness rewards program (e.g., a percentage of completion). As another example, the central server may calculate status information that indicates the user's activity for the month is worse than the previous month.

In an embodiment, the central server may determine rewards and/or indicators of progress based on the stored sensor data received for the user over a period of time. Based on the stored rewards program information, the central server may attribute a certain amount of rewards for certain levels of calculated progress towards a goal for a certain period of time. For example, the user may be awarded several reward "points," coupons, or privileges for completing an activity goal for the day. As another example, the central server may award additional rewards when a user's activity data occurs outside of the house as opposed to within the user's room.

In block 2512, the central server may transmit a message indicating the user's rewards program status information. For example, upon receiving sensor data related to the rewards program, the central server may transmit a message to the smartphone of the user. The message may be an email, SMS text message, telephonic message, or other procedurally generated communication. The message may include indications of the progress or status towards achieving a goal or reward (e.g., "You're 50% done exercising!" or "You've almost earned that cookie!"), statistics of the user's performance in relation to time periods or conditions, information about the variables used to calculate the status, and instructions on how to achieve goals, rewards, or how to be awarded more rewards points. In an embodiment, the message may also include indications of achieved rewards, such as coupons, prizes, encouraging messages, benefits, accolades, special offers, and other incentives for the user to continue using the rewards program. For example, based on meeting an activity goal for the day, the user may receive an email indicating an award of an extra hour of television use in his/her house. As another example, for jumping up and down for a period of time during gym class, the child may get a school pass to eat lunch outside. In an embodiment, the message may be accessed, rendered, and otherwise utilized by applications, software, and/or services executing on the user's mobile device. For example, the message may be formatted so that a retail store app running on the user's smartphone may display a store coupon to the user.

In determination block 2513, the central server may determine whether it is authorized to share the user's data, such as the user's identity and/or rewards program status information. In other words, based on permissions settings associated with the user, the central server may determine whether the user should be anonymous or identified to other parties related to the rewards program (e.g., a merchant, a parent, etc.). The central server may base this determination on permissions information stored in the central server with relation to the user, such as within a profile linked to the user's identity (or the identity of the user's wireless identity transmitter). For example, the user may have indicated during a registration process that he/she only authorizes the central server to share his reward program status with his/her parents. If the central server is not authorized to share user data (i.e., determination block 2513="No"), the central server may continue with the operations in determination block 1402. This authorization determination is important as it may enable the central server to anonymously distribute rewards to users, such as anonymously transmitting coupons, promotions, discounts, or other attractive information to customers without identifying the customers to merchants associated with the rewards.

If the central server is authorized to share the user's data (i.e., determination block 2513="Yes"), in block 2514, the central server may also transmit a message to parties associated with the rewards program. Such parties may include the retailer or merchant that developed the reward program to distribute coupons, or alternatively support parties related to the user. Support parties may include any persons indicated in the central server that may need to be informed of the user's reward program status, such as a caregiver, a parent, a teacher, a coach, and a trainer. For example, if the rewards program regards physical activity of children in school, the central server may send a message to a gym teacher indicating information about the user's participation in the rewards program. The message may include the user's reward program status information, such as indicators of the user's progress towards achieving a goal or prize as well as any rewards the user has received (e.g., codes of coupons or privileges the user has received). In an embodiment, the message may also include instructions on how to assist the user achieve the rewards program goals. For example, the gym teacher may receive a text message indicating that he/she should go encourage the user who is not active during gym class. The central server may continue with the operations in determination block 1402.

Figure 26:
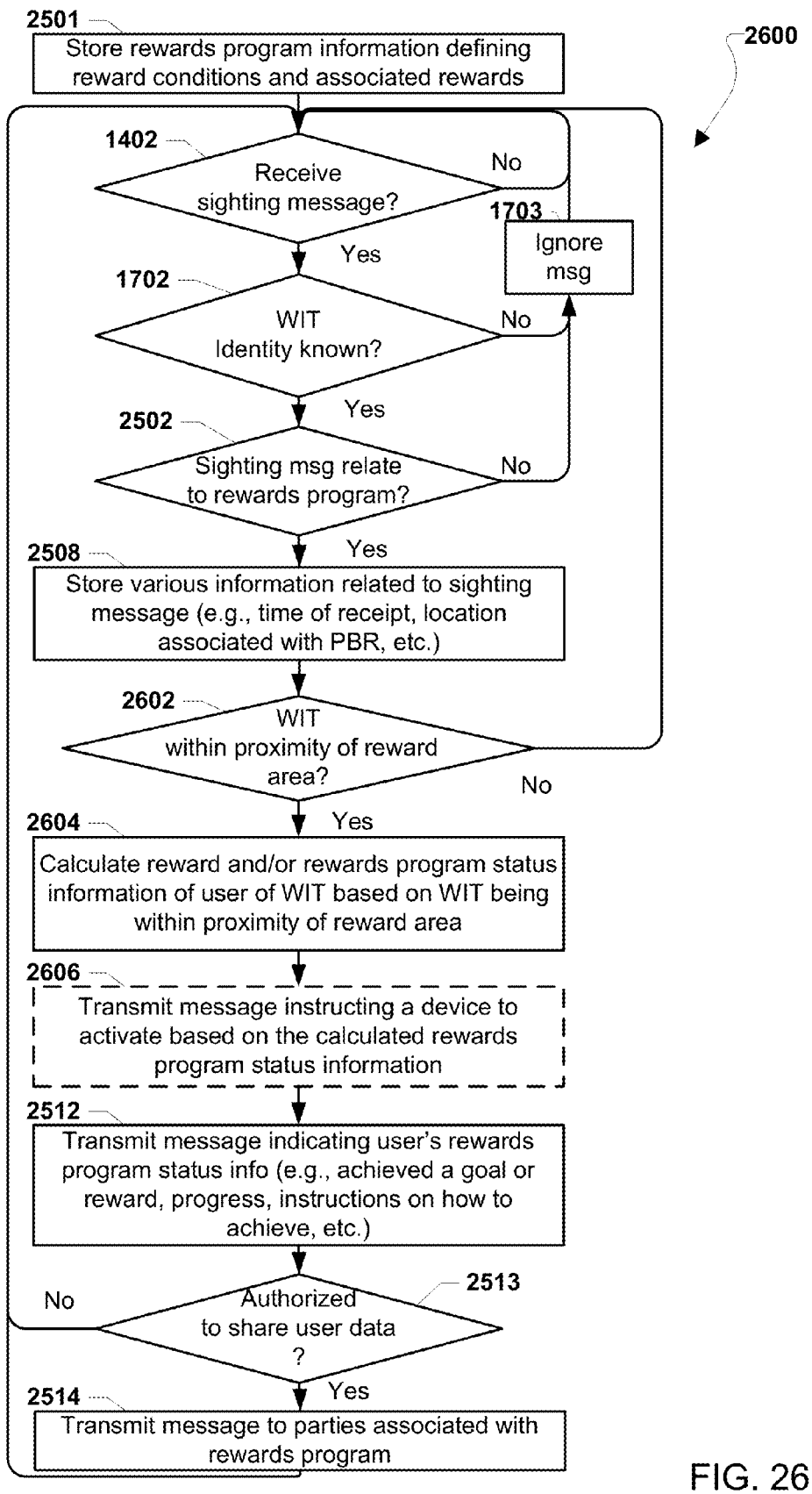
FIG. 26 is a process flow diagram of an embodiment method for a central server to calculate rewards program information in response to receiving sighting messages related to a wireless identity transmitter within proximity of a reward area.

FIG. 26 illustrates an embodiment method 2600 for a central server calculating rewards in response to receiving sighting messages related to a wireless identity transmitter within proximity of a reward area. The method 2600 is similar to the method 2500 described above, except the method 2600 may be performed to provide, calculate, otherwise assign rewards (e.g., coupons, prizes, information, messages, etc.) based on a user being within proximity of a predefined area (i.e., a reward area). For example, a reward program maintained by the central server may indicate that there is a prize associated with a reward area within a retail store, such that any customer walking within proximity of the area may receive a coupon, promotion, or other enticing offer. Reward areas may be particular aisles or end caps within a retail store, a school, a library, a church, a particular room within a house, or any other place associated with a rewards program. Rewards may be calculated and transmitted to users when a predefined geofence is broken or simply when a proximity broadcast receiver receives broadcast messages from the user's wireless identity transmitter while within a reward area. Such proximity-based rewards may drive and direct foot traffic within customer environments, as well as encourage other user behaviors. For example, a parent may configure a rewards program for his/her children that provides credits (or an allowance) for using with home electronics (e.g., iPads, tablets, television, Internet devices, etc.) when the children go to certain places (e.g., school, the library, grand mom's house, the garbage can, etc.).

In block 2501, the central server may store rewards program information defining reward conditions and associated rewards. The reward conditions may indicate reward areas that are associated with particular rewards, such that when a user is within proximity of a reward area, the associated reward may be earned, awarded, or otherwise achieved. Reward areas may be defined by data identifying certain places, such as geofence information, GPS coordinates, and/or unique identities of proximity broadcast receivers within certain places. In an embodiment, the central server may store a data table that links various sets of GPS coordinates with different prizes, coupons, or benefits. For example, the central server may store a reward program data table that links a store coupon (i.e., a reward) with GPS coordinates corresponding to the store's entrance (i.e., a reward area). Further, various conditions may be combined in relation to particular rewards. For example, the central server may store a reward program data table that links allowance credits for a child to the geofence coordinates of the child's school and the hours of school operation (i.e., allowance may be awarded the child when he/she visits the school during school hours).

In determination block 1402, the central server may determine whether a sighting message is received. If the central server does not receive a sighting message (i.e., determination block 1402="No"), the central server may continue with the operations in determination block 1402. If the central server does receive a sighting message (i.e., determination block 1402="Yes"), in determination block 1702 the central server may determine whether the wireless identity transmitter identity is known. If the wireless identity transmitter is not known (i.e., determination block 1702="No"), in block 1703 the central server may ignore the sighting message and continue to perform the operations in determination block 1402. If the wireless identity transmitter is known (i.e., determination block 1702="Yes"), in determination block 2502 the central server may determine whether the sighting message relates to a rewards program. If the message does not relate to the rewards program (i.e., determination block 2502="No"), the central server may continue with the operations in block 1703.

However, if the message relates to the rewards program (i.e., determination block 2502="Yes"), in block 2508, the central server may also store various information related to the sighting message, such as the time of receipt of the sighting message, and location information (e.g., GPS coordinates) of the proximity broadcast receiver at the time of receipt of the broadcast message. In determination block 2602, the central server may determine whether the wireless identity transmitter is within proximity of a reward area. As described above, since sighting messages are transmitted by proximity broadcast receivers within proximity (or broadcast range) of wireless identity transmitters, the central server may determine whether the wireless identity transmitter is within proximity of the reward area by comparing the location information of the proximity broadcast receiver that transmitted the received sighting message to known reward area locations as stored with the operations of block 2501. In an embodiment, the central server may compare location information within the received sighting message (e.g., metadata indicating the proximity broadcast receiver's GPS coordinates) to a list of locations corresponding to reward areas associated with the reward program. In another embodiment in which stationary proximity broadcast receivers are deployed, the central server may compare stored location information of such stationary proximity broadcast receivers to known reward areas to determine whether the received sighting message corresponds to a rewards area. In an embodiment, the central server may determine the wireless identity transmitter is within proximity of (or near to) a reward area when the distance between the location of the proximity broadcast receiver that transmitted the sighting message is within a proximity threshold to the reward area.

In various embodiments, the central server may utilize additional information when determining whether the wireless identity transmitter is near a reward area. In particular, the central server may estimate the position of the wireless identity transmitter as within a circular area of the proximity broadcast receiver that transmitted the sighting message. The circular area may have a radius equal to the wireless identity transmitter's average broadcast range. The central server may also evaluate signal strength information describing the broadcast message reported within the sighting message to determine more precise proximity information of the wireless identity transmitter. For example, based on known capabilities of the proximity broadcast receiver and the signal strength of the associated broadcast message, the central server may determine that the wireless identity transmitter was within a certain distance from the proximity broadcast receiver at the time of transmitting the broadcast message within the sighting message. In an embodiment, the central server may use received signal strength indication (or "RSSI") information from within the sighting message to determine approximate distance of the wireless identity transmitter to the proximity broadcast receiver. In an embodiment, the central server may also employ schematics or other floor plan or blueprint data to determine more precise location information of the proximity broadcast receiver and thus the wireless identity transmitter. For example, the central server may determine that the wireless identity transmitter is located to the east or south side of the proximity broadcast receiver based on a floor plan that indicates the proximity broadcast receiver is surrounded by exterior walls to the north and west. In an embodiment, the central server may perform the operations to determine more precise location information for the wireless identity transmitter. For example, the central server may compare information within concurrent sighting messages to define a precise location of a wireless identity transmitter within a place. In another embodiment, the central server may utilize dead reckoning and other estimation routines or algorithms to determine whether the customer (and the wireless identity transmitter) may be near a reward area in the near future. For example, the central server may evaluate recent movement patterns of the customer to determine within a few seconds he/she may be in front of a product display within a retail store.

Returning to FIG. 26, if the wireless identity transmitter is not within proximity of a reward area (i.e., determination block 2602="No"), the central server may continue with operations in determination block 1402. However, if the wireless identity transmitter is within proximity of a reward area (i.e., determination block 2602="Yes"), in block 2604, the central server may calculate a reward and/or rewards program status information of the user of the wireless identity transmitter based on the wireless identity transmitter being within proximity of a reward area. The central server may evaluate the stored reward conditions and associated rewards to find a reward matching the reward area proximate to the user's wireless identity transmitter. For example, the central server may determine that a coupon for twenty minutes of Internet access via a private network may be awarded to the user because the user's wireless identity transmitter was within proximity of a kiosk reward area within a shopping mall. As another example, the central server may determine that another award (e.g., an additional dollar of allowance) may be awarded to the user because the user's wireless identity transmitter was within proximity of a proximity broadcast receiver within a schoolhouse during the morning of a non-holiday weekday.

In an embodiment, when the wireless identity transmitter is determined to be within proximity of a plurality of reward areas, the central server may identify rewards for all reward areas. Alternatively, the central server may identify a reward corresponding to the closest predefined area. For example, the central server may determine the reward area that the wireless identity transmitter is closest to based on signal strength information within the received sighting message (or concurrent sighting messages).

In optional block 2606, the central server may transmit a message instructing a device to activate based on the calculated rewards program status information. In other words, the central server may transmit a message to a device associated with the rewards program and/or the user (or the wireless identity transmitter) that includes instructions for activating software, a routine, or functionality to enable a reward. For example, the message may be a signal to a family television, a tablet (e.g., an iPad), wireless router, telephone, or laptop that unlocks the device for use by the user for a certain period of time. In another embodiment, the message may be sent to a display device within the reward area and that may include instructions for the display device to render information related to a reward the user has earned/achieved. For example, the message may instruct an LCD display at the end cap of a retail store aisle to render a coupon code. In another embodiment, the message may include a signal or instructions that activate a scratch-off element in a user interface.

In block 2512, the central server may transmit a message indicating the user's rewards program status information. For example, the central server may transmit a SMS text message to the mobile device associated with the user indicating that the user has been awarded a coupon for entering a reward area. As another example, the central server may transmit a message that indicates the user needs to go to another place/area in order to achieve a coupon.

In determination block 2513, the central server may determine whether it is authorized to share the user's data, such as the user's identity and/or rewards program status information. In other words, based on permissions settings stored for the user, the central server may determine whether the user should be anonymous or identified to other parties related to the rewards program (e.g., a merchant, a parent, etc.). If the central server is not authorized to share user data (i.e., determination block 2513="No"), the central server may continue with the operations in determination block 1402. If the central server is authorized to share the user's data (i.e., determination block 2513="Yes"), in block 2514, the central server may also transmit a message indicating the user's status information to parties associated with the rewards program. The central server may continue with the operations in determination block 1402.

For illustration purposes, the central server may be configured to perform the method 2600 to enable a scavenger hunt (or treasure hunt) rewards program. The scavenger hunt rewards program may be developed by a merchant registered with the central server to encourage foot traffic within a retail store associated with the merchant. The central server may store location information for a list of reward areas within the retail store. The reward areas may include proximity broadcast receivers configured to receive and relay broadcast messages from wireless identity transmitters of customers as they walk within proximity. The central server may also store information provided by the merchant that indicates particular coupons for each of the reward areas within the retail store, as well as a condition that indicates the rewards program is only active on Black Friday. Further, the rewards program stored information may include a condition that indicates a special coupon is to be awarded a customer who walks within proximity of all of the reward areas. For example, a customer who visits each reward area during Black Friday may receive a coupon offering a very deep discount on a high-profile product within the retail store. Thus, during Black Friday, the central server may transmit messages to a customer's mobile device that indicate coupons awarded to the customer based on his/her proximity to reward areas within the retail store. The central server may further transmit messages to the customer's mobile device that indicate other reward areas within the retail store that have not been visited, encouraging the customer to continue exploring to possibly receive more and better coupons.

FIGS. 27A-27B and 28A-28C illustrate exemplary scenarios in which a smartphone mobile proximity broadcast receiver 138 (referred to below as a mobile device 138) may provision target devices based on broadcast messages received from wireless identity transmitters 110 associated with the target devices. As a user may carry the mobile device 138 wherever he/she goes, the mobile device 138 may be available to provide interactions between the user and various nearby devices that are registered with or otherwise known to a central server as described above. For example, when carried near a registered computing device belonging to another user, the mobile device 138 may automatically execute software (e.g., an app) and/or perform operations related to the nearby computing device using "public" data (e.g., data authorized to be shared by the central server). In various embodiments, the mobile device 138 may utilize one or more wide area network transceivers (e.g., a WiFi radio for logging onto local area network access points, a cellular network radio for logging on cellular network access points, etc.), as well as one or more short-range transceivers for receiving short-range signals, such as a Bluetooth radio.

Figure 27A:
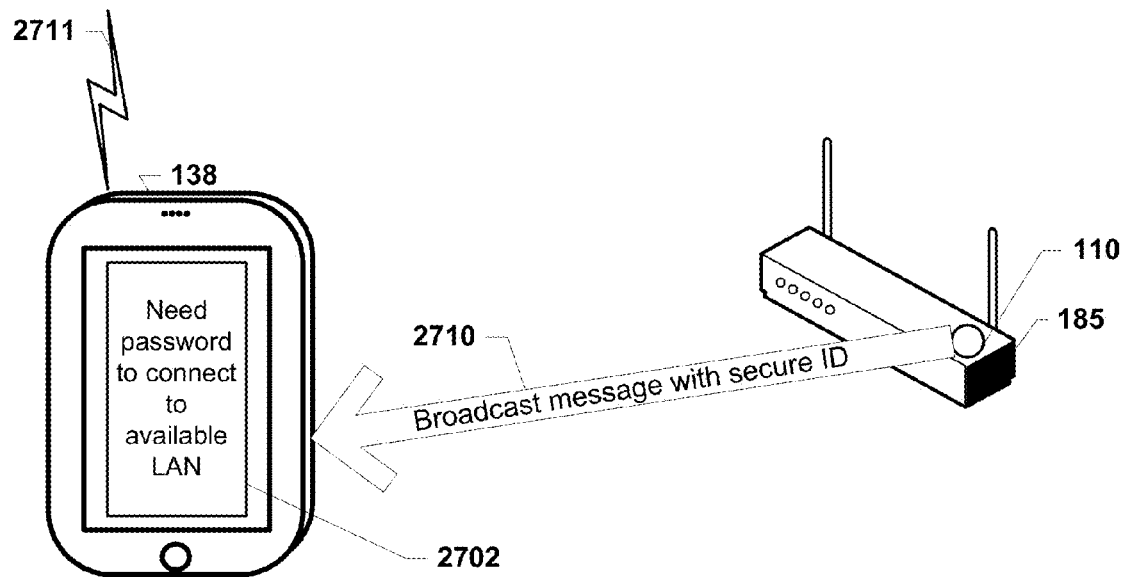
FIGS. 27A-27B are diagrams that illustrate a proximity broadcast receiver (e.g., a mobile device) provisioning a router associated with a wireless identity transmitter in accordance with various embodiments.
Figure 27B:
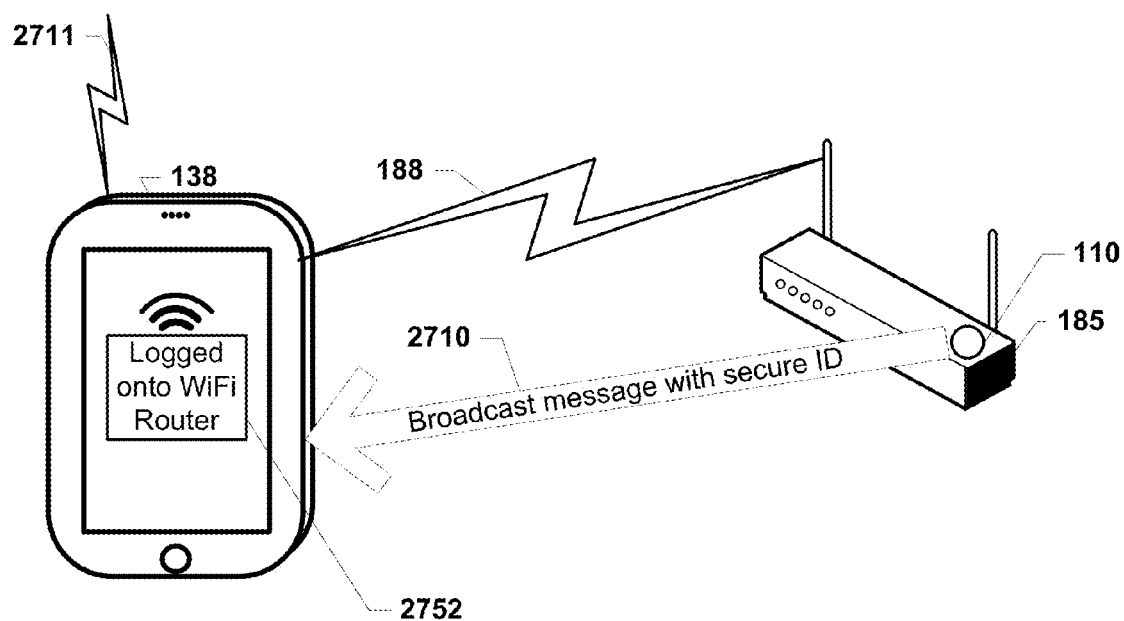

FIGS. 27A-27B illustrate the mobile device 138 provisioning a router 185 associated with the wireless identity transmitter 110, such as a WiFi router. In various embodiments, the router 185 may include circuitry and/or otherwise be configured to operate as a wireless identity transmitter 110 (i.e., periodically broadcast messages including a secure identifier, etc.), or alternatively the wireless identity transmitter 110 may be a separate device that is simply affixed to the router 185. Further, the mobile device 138 may utilize a wireless connection 2711 (e.g., a cellular network connection, etc.) for exchanging data with remote devices, such as a central server (not shown).

As shown in FIG. 27A, the mobile device 138 may be within an area that has an available network (e.g., a local area network) for which the router 185 may serve as a wireless access point. The mobile device 138 may receive data signals from the router 185 (e.g., WiFi), such as signals indicating a service set identification (SSID) and security protocols of the network (e.g., Wi-Fi Protected Access (WPA), etc.). However, the mobile device 138 may not be capable of connecting to the network via the router 185 without approved credentials. Accordingly, the mobile device 138 may display a message 2702 that indicates a password is needed to log-on to the network via the router 185.

When within proximity (or broadcast range) of the wireless identity transmitter 110 associated with the router 185, the mobile device 138 may receive a broadcast message 2710 including a secure identifier via short-range wireless signals. For example, the mobile device 138 may receive Bluetooth LE packets that are periodically broadcast by the wireless identity transmitter 110 and that include a rolling identifier. As described above, data from such a broadcast message 2710 may be automatically relayed over the Internet via the wireless connection 2711 by the mobile device 138 to a central server (not shown in FIG. 27A) as sighting messages. In response to receiving such sighting messages, the central server may perform operations for identifying information related to the wireless identity transmitter 110 and/or the mobile device 138. In particular, the central server may identify log-in credentials for the network associated with the router 185 and transmit these credentials back via a return message to the mobile device 138 over the wireless connection 2711. FIG. 27B illustrates the mobile device 138 connected to the router 185 via a wireless communication link 188 in response to receiving such a return message from the central server. Further, the mobile device 138 may display a message 2752 indicating the connection to the local area network via the router 185.

In some embodiments, the wireless identity transmitter 110 may be configured to disable the transmission of the broadcast message 2710 via the short-range signals, such as in response to the mobile device 138 connecting to the router 185.

In some embodiments, new target devices may be provisioned based on proximity. As an illustration, a user may install in his/her house a new router 185 (e.g., a WiFi access point) that includes a wireless identity transmitter 110, as shown in FIGS. 27A-27B. As the router 185 is new, it may not be pre-associated with the user. In other words, the central server may not store profile information that links the router 185 to the user and/or his various devices, such as the mobile device 138. As a default factory configuration, the router 185 may be initially configured to block internal and external Internet access as well as provide only limited wireless access. Upon activation (e.g., plugging into a power outlet, etc.), the router 185 may begin periodically transmitting broadcast messages via the included wireless identity transmitter 110. The mobile device 138 carried by the user may receive a broadcast message 110 with a secure identifier and transmit via the cellular network connection 2711 a sighting message to a central server. The central server may process the sighting message, decode the secure identifier, and identify the router 185 based on the decoded identifier. The central server may determine that the identifier is a new access point in the user's home, such as by comparing stored profile data with location information and other data within the sighting message (e.g., the identifier of the mobile device 138, GPS coordinates, etc.). In response, the central server may transmit to the user's mobile device 138 an app store URI corresponding to an app for communicating with the router 138. The mobile device 138 may prompt the user to install the app, and after installation, may automatically launch the app. The app may step the user through an initial authentication with the router 138. After the initial authentication of the user, the router 138 may send credential information to the mobile device 138 for relaying to the central server for storage in a profile associated with the user. For example, the central server may link the router 138 device identifier (e.g., MAC address, etc.) with the user and/or the location of the user's house. The central server may transmit to the mobile device 138 the user's standard WiFi configuration data (e.g., device name, SSID, Passwords, DNS settings, IP settings, etc.) that has been stored by the central server in the user's profile. The mobile device 138, via the app, may transmit the WiFi configuration data to the router 185, which in turn may connect to the Internet after being configured with the configuration data. If necessary, the app may also configure the mobile device 138 to access the router 185 (e.g., store SSID, WiFi password, admin credentials, etc.).

FIGS. 28A-28D illustrate a mobile device 138 provisioning an appliance 2802 (i.e., a refrigerator) based on broadcast messages received from a wireless identity transmitter 110 coupled to the appliance 2802. Although the appliance 2802 is shown as a refrigerator in FIGS. 28A-28D, it should be appreciated that the appliance 2802 may be any smart device or smart appliance, such as a television, stereo, washing machine, dish washer, etc., and thus should not be considered limited to refrigerators.

In various embodiments, the appliance 2802 may include circuitry and/or otherwise be configured to operate as a wireless identity transmitter 110 (i.e., periodically broadcast messages including a secure identifier, etc.), or alternatively the wireless identity transmitter 110 may be a separate device that is simply affixed to or included within the appliance 2802. Further, the appliance 2802 may include various components for communicating and processing data. In particular, the appliance 2802 may include a processor (not shown in FIGS. 28A-28D) and a display unit 2810, such as an LED display or monitor, coupled to the processor. For example, the display unit 2810 may be a screen that is used to render a read-out of the current temperature within the appliance 2802.

The appliance 2802 may also include a transceiver and antenna 2804 coupled to the processor for exchanging data via wireless signals. The appliance 2802 may be configured to connect via a wireless communication link 2806 to a router 185 which may serve as a wireless access point for a local area network. The appliance 2802 may thus be capable of exchanging communications with other devices on the local area network. Similarly, the mobile device 138 may communicate via a wireless communication link 188 with the router 185. The mobile device 138 and/or the appliance 2802 may have already performed various log-in procedures to access the local area network via the router 185. In various embodiments, the appliance 2802 and the mobile device 138 may be configured to directly exchange data via wireless signals 2811, such as via WiFiDirect, Bluetooth, and/or other protocols and related components.

Figure 28A:
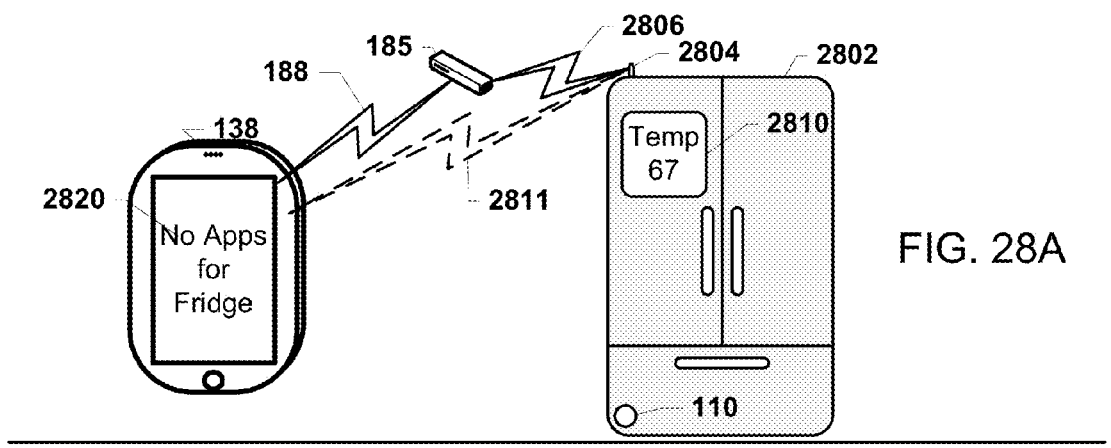
FIGS. 28A-28D are diagrams that illustrate a proximity broadcast receiver (e.g., a mobile device) provisioning an appliance based on broadcast messages received from a wireless identity transmitter coupled to the appliance in accordance with various embodiments.

In FIG. 28A, the mobile device 138 may not be configured to interface with the appliance 2802. For example, the mobile device may not have installed the appropriate software (e.g., apps) and/or the credentials (e.g., login, password, etc.) needed to communicate with the software executing on the appliance 2802. In that case, the mobile device 138 may display a message 2820 indicating that no apps are available for interacting with the appliance 2802.

Figure 28B:
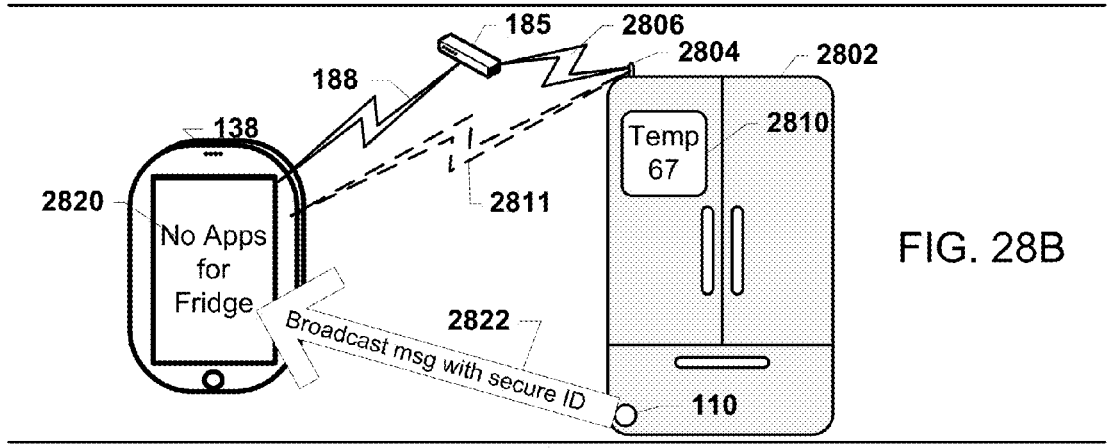

In FIG. 28B, the mobile device 138 may receive a broadcast message 2822 including a secure identifier via the short-range wireless signals from the wireless identity transmitter 110 associated with the appliance 2802. As described above, such a broadcast message 2822 may be a periodically broadcast Bluetooth LE packet with the secured identifier (e.g., rolling code, etc.) related to the appliance 2802. As described above, data from such a broadcast message 2822 may be automatically relayed by the mobile device 138 as sighting messages over the Internet to a central server (not shown in FIG. 28B). For example, the mobile device 138 may transmit the sighting messages to the central server via the router 185 or alternatively via a cellular network connection (not shown in FIGS. 28A-28D).

In response to receiving the sighting messages, the central server may perform operations for identifying information related to the wireless identity transmitter 110 and/or the mobile device 138. In particular, the central server may identify software (or an app) for interfacing with the appliance 2802, and may transmit a return message to the mobile device 138 (i.e., routed via the router 185 or delivered via a cellular network connection, etc.) that indicates instructions on how to acquire and/or configure such software. For example, the return message may indicate an application store (or "App Store") location, uniform resource identifier (URI), uniform resource locator (URL), an Internet protocol (IP) address, or other data source name or location for downloading software for accessing the appliance 2802. As another example, the return message may include a port number, a format, a protocol, a username, and/or password for accessing the appliance 2802. The return message may include information appropriate for the mobile device 138, such as an application store location for applications designed for use by the particular operating system running on the mobile device 138 (e.g., iOS, Android, etc.).

Figure 28C:
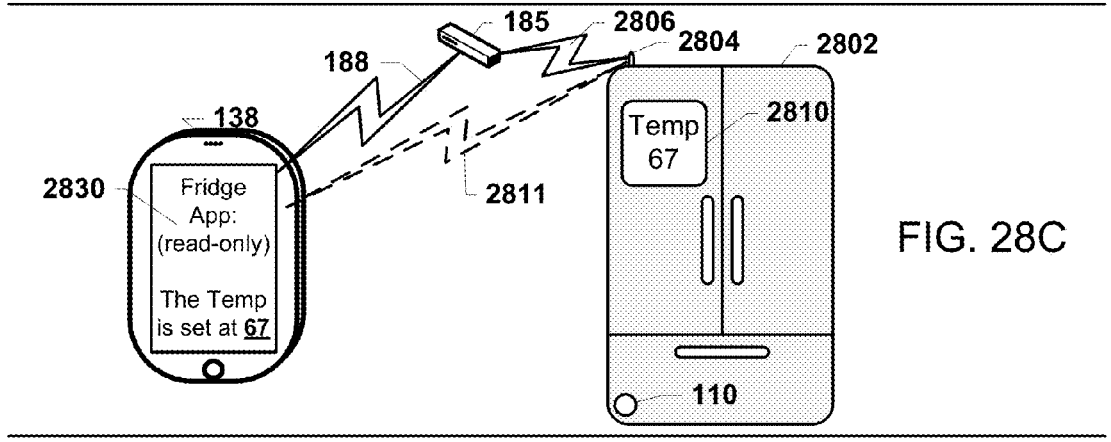

FIG. 28C illustrates the mobile device 138 executing software 2830 configured for interfacing with the appliance 2802 in response to receiving such a return message from the central server. In particular, the software 2830 may be an app configured only to receive information from the appliance 2802. In other words, based on the information received in the return message, the mobile device 138 may only be enabled to execute an application that can query or otherwise receive information from the appliance 2802, but that may not command the appliance 2802 to change its configurations or operating state. For example, the software 2830 may provide the mobile device 138 "read-only" access to the data and actions of the appliance 2802, such as information for rendering a current temperature measurement (e.g., "the temp is set to 67"). The information received from the appliance 2802 for use with the software 2830 may be received via transmissions over the local area network and the router 185 or alternatively directly through the wireless signals 2811 between the mobile device 138 and the appliance 2802. In some embodiments, the mobile device 138 may only be capable of receiving information from the appliance 2802 due to the software 2830 being configured only to provide "read-only" access or alternatively due to the credentials provided in the return message only enabling "read-only" access to the appliance 2802.

Figure 28D:
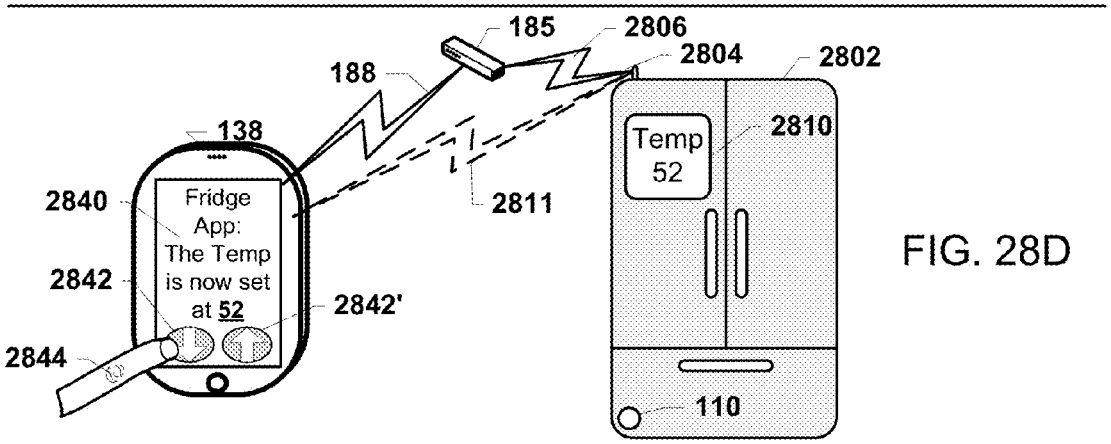

As an alternative example, FIG. 28D illustrates the mobile device 138 executing software 2840 configured for interfacing with the appliance 2802 in response to receiving such a return message from the central server. In particular, the software 2840 may be an app configured to receive information and/or provide commands to the appliance 2802. In other words, based on the information received in the return message, the mobile device 138 may be enabled to execute an application that can fully control the operations of the appliance 2802. For example, the software 2840 may include graphical user interface elements 2842, 2842' that may cause an increase or decrease (e.g., from 67 degrees to 52 degrees, etc.) in the temperature within the appliance 2802 and that may be controlled via touch inputs via a user's finger 2844. The information received from the appliance 2802 for use with the software 2840 and/or the commands from the mobile device 138 to control the appliance 2802 may be exchanged via transmissions over the local area network and the router 185 or alternatively directly through the wireless signals 2811 between the mobile device 138 and the appliance 2802.

In the following descriptions, wireless identity transmitters may be referred to as associated with separate target devices and vice versa. For example, a wireless identity transmitter may be coupled to an appliance as described above. However, in various embodiments, target devices and their associated wireless identity transmitters may be the same device.

FIGS. 29A-30A illustrate embodiment operations for provisioning a target device that includes, is coupled to, or is otherwise associated with a wireless identity transmitter. As illustrated above with reference to FIGS. 27A-28D, a proximity broadcast receiver (e.g., a mobile device configured to operate as a mobile proximity broadcast receiver, etc.) may receive broadcast messages from nearby target devices that may be provisioned, and in response to relaying data from those messages to a central server, may receive information and/or software for provisioning the nearby target devices. By transmitting information to the central server for resolution, proximity broadcast receivers may be capable of acquiring identification information only when authorized, thereby protecting the anonymity of target devices that may be provisioned, as well as maintaining exclusivity in the set of devices and/or users that may provision such target devices. In other words, the central server may control the provisioning of target devices associated with wireless identity transmitters by providing information only when authorized. For example, a mobile device may only be able to identify that a nearby target device (e.g., refrigerator, router, etc.) is capable of being provisioned as well as receive the password or app for provisioning the nearby target device when the mobile device (or its user) is pre-authorized based on data stored at the central server.

The embodiment methods 2900 and 3000 for provision target devices may be independently performed by a proximity broadcast receiver (e.g., a smartphone configured to operate as a mobile proximity broadcast receiver) and a central server, respectively. In various embodiments, the methods 2900, 3000 may be performed concurrently and in combination. It should be appreciated that the operational blocks of the methods 2900, 3000 are visually arranged in FIGS. 29-30 to provide a better illustration of the interconnected nature of the proximity broadcast receiver and the central server; however, no timing or other dependence should be inferred that is not expressly indicated in the following descriptions.

The method 2900 may be similar to the methods 700 and 1100 described above with reference to FIGS. 7 and 11, respectively. In particular, the operations in blocks 702, 706, 1101-1102 of the method 2900 may be similar to the operations in blocks 702, 706, 1101-1102 of the method 1100, except the method 2900 may include operations for provisioning target devices based on information received from the central server. Further, the method 3000 may be similar to the methods 1400 and 1700 described above with reference to FIGS. 14 and 17, respectively. In particular, the operations in blocks 1402, 1702, 1704', 1708, 1706' of the method 3000 may be similar to the operations in blocks 1402, 1702, 1704, 1708, 1706 of the method 1700.

Figures 29, 30:
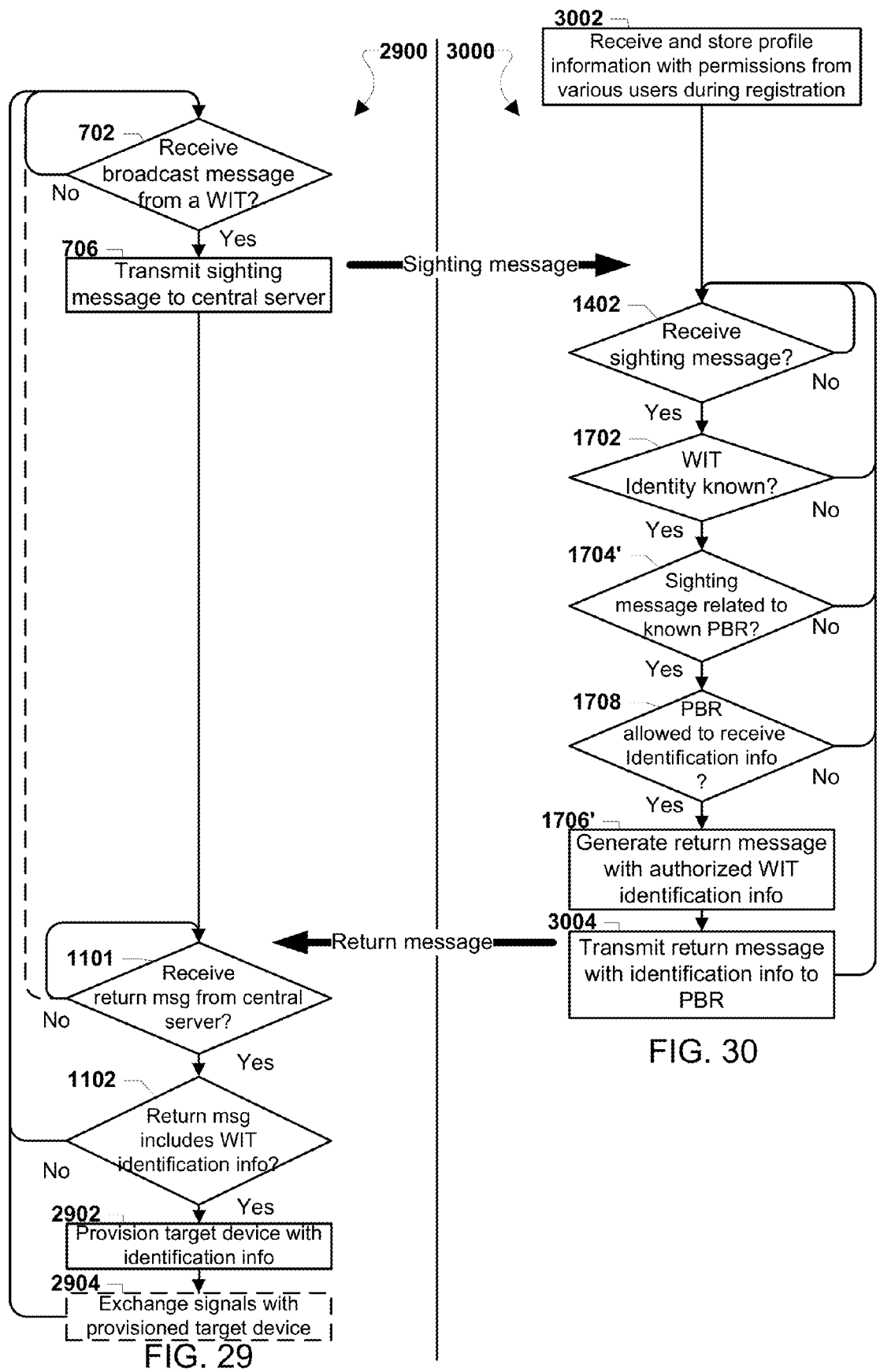
FIG. 29 is a process flow diagram that illustrates an embodiment method for a proximity broadcast receiver to provision a device associated with a wireless identity transmitter.
FIG. 30 is a process flow diagram that illustrates an embodiment method for a central server to process sighting messages from a proximity broadcast receiver and transmit data for use in provisioning a device.

Referring to FIG. 30, in block 3002, the processor of the central server may receive and store profile information with permissions from various users during registration, such as described above with reference to FIG. 13. For example, the central server may receive profile information via a web portal that indicates the owner of a wireless identity transmitter, his/her contact information, the identifiers of devices associated with the owner (e.g., wireless identity transmitters, proximity broadcast receivers, laptops, smartphones, etc.), the type of devices owned by the owner (e.g., mobile device, desktop, WIT, PBR, etc.), and other information related to the owner. The profile information for each of the various parties may be stored as a profile or as data entries within a database. In various embodiments, a profile may be linked to or associated with the unique identity (i.e., device identifier or deviceID) of a user.

The stored profile information may include information (referred to as "identification information") that may be used to access, contact, or otherwise interface with registered wireless identity transmitters, proximity broadcast receivers, and/or target devices associated with profiles. Identification information may include a non-obscured identity of the wireless identity transmitter, as well as information for accessing the wireless identity transmitter and/or its associated target devices. For example, the identification information may include an SSID of an access point as well as a log-in password, and/or the location of a data source for downloading software (e.g., App Store location for downloading an app, network address, etc.) for accessing the access point.

As described above, the profile information of the various parties may also include permission information (or profile permissions) that indicates how and when profile information may be authorized for distribution to others. For example, the permission information may indicate the identity of any party, merchant, or other entity that may receive particular portions of data stored in a user's profile. In some embodiments, the profile permissions may indicate whether certain portions of profile information are public or private. For example, the central server may store permission information that indicates that a user's name is private information not to be shared at large, and another permission setting that indicates the user's home router password may be shared with only devices known to be owned by friends and family. In some embodiments, each piece of profile data may have a tag, rule, flag, or indicator that indicates whether the central server may transmit that data to a particular device, a group of devices, another user, or other characteristics that define an authorized user. For example, the stored permissions for a particular user may indicate that the central server may only share profile information (e.g., a router log-in password, etc.) with other devices that are known to be within a certain location (e.g., the user's house, etc.). In various embodiments, the stored profile information may be categorized, such as personal data and device data, and each category may be associated with different permissions.

Referring to FIG. 29 and as described above, in determination block 702, the processor of the proximity broadcast receiver may determine whether a broadcast message is received from a wireless identity transmitter. For example, the proximity broadcast receiver may evaluate an incoming message buffer to determine whether a Bluetooth advertisement packet that includes a rolling identifier of a wireless identity transmitter has been received. In response to determining that a broadcast message has not been received (i.e., determination block 702="No"), the proximity broadcast receiver may continue to monitor for reception of a broadcast message in determination block 702. In response to determining that a broadcast message has been received (i.e., determination block 702="Yes"), the processor of the proximity broadcast receiver may transmit a sighting message to the central server based on the received broadcast message from the wireless identity transmitter in block 706. For example, the proximity broadcast receiver may transmit the sighting message that includes its identification as well as data from the received broadcast message (e.g., a rolling identifier, etc.) via a cellular network connection to the central server.

Returning to FIG. 30 and as described above, in determination block 1402, the processor of the central server may determine whether a sighting message is received, such as the sighting message transmitted by the proximity broadcast receiver with the operations in block 706 of FIG. 29. In response to determining that a sighting message is not received (i.e., determination block 1402="No"), the central server may continue to monitor for reception of a sighting message in determination block 1402.

In response to determining that a sighting message is received (i.e., determination block 1402="Yes"), the processor of the central server may determine whether the wireless identity transmitter is known based on the received sighting message in determination block 1702. For example, the central server may decode a rolling identifier within the received sighting message to determine a device identifier and evaluate stored profile information to determine whether any of the stored profiles relate to the device identifier (e.g., find a profile that indicates the device identifier has been registered). In response to determining that the wireless identity transmitter indicated by the received sighting message is not known (i.e., determination block 1702="No"), the central server may return to monitoring for reception of another sighting message in determination block 1402.

In response to determining that the wireless identity transmitter indicated by the sighting message is known (i.e., determination block 1702="Yes"), the processor of the central server may determine whether the sighting message is related to a known proximity broadcast receiver in determination block 1704', similar to operations in determination block 1704 described above with reference to FIG. 17. In other words, the central server may evaluate the received sighting message to detect the identity of the proximity broadcast receiver that transmitted the received sighting message, and may use that identity to identify a stored profile that relates to the identity. When there is a matching profile (i.e., a profile that includes the identity of the proximity broadcast receiver as indicated in the sighting message, etc.), the proximity broadcast receiver may be considered known by the central server and thus an authenticated proximity broadcast receiver. For example, the sighting message may include metadata that indicates the sighting message was transmitted by a device within a house location that has previously registered a profile with the central server via a registration portal. In response to determining that the sighting message is not related to a known proximity broadcast receiver (i.e., determination block 1704'="No"), the central server may return to monitoring for reception of another sighting message in determination block 1402.

In response to determining that the sighting message is related to a known proximity broadcast receiver (i.e., determination block 1704'="Yes"), the processor of the central server may determine whether the proximity broadcast receiver is allowed (or authorized) to receive identification information related to the wireless identity transmitter associated with the sighting message in determination block 1708 as described above. For example, the central server may determine whether the proximity broadcast receiver is authorized to receive SSIDs, "App Store" locations for related software (e.g., URIs, etc.), access codes, and or other information for a router target device related to the wireless identity transmitter indicated in the sighting message. The central server may identify any such authorized identification information by comparing the profile information related to the proximity broadcast receiver (e.g., user identity, device type, relationship to target device, etc.) to profile information related to the wireless identity transmitter (e.g., permissions, etc.). For example, the central server may compare the type of operating system the proximity broadcast receiver runs with a list of approved operating systems stored in relation to the target device associated with the wireless identity transmitter. With such a comparison of profiles, the central server may identify information from the profile information related to the wireless identity transmitter that is authorized to be shared. In various embodiments, the central server may determine that the proximity broadcast receiver may be authorized to receive information based on a proximity threshold (e.g., 1 meter, etc.) and/or a signal strength threshold for sighting messages.

As an illustration, the central server may identify a first profile associated with the wireless identity transmitter (or its user) indicated by the received sighting message, such as by performing a lookup in a profile database using the wireless identity transmitter's decoded rolling identifier from the sighting message. The first profile may include identification information that includes a web address for downloading an application for interfacing with an appliance (e.g., a refrigerator, etc.), a first password to log-into the appliance using the application to obtain "read-only" access (e.g., only receive measurement data, not provide control commands, etc.), and a second password to log-into the appliance using the application to obtain "full" access for controlling the appliance's functions. The central server may identify a second profile associated with the proximity broadcast receiver that transmitted the received sighting message, such as by performing a lookup in the profile database using the proximity broadcast receiver's device identifier included in the sighting message. The central server may evaluate information from the second profile (e.g., the owner of the proximity broadcast receiver, the type of device associated with the second profile, whether the owner is a friend or family member, etc.) and the permissions stored with the various information of the first profile to determine whether any identification information is authorized to be shared with the proximity broadcast receiver and/or the owner of the proximity broadcast receiver. In response, the central server may determine that the proximity broadcast receiver is authorized to receive the information that includes the web address for downloading the application and the first password to log-into the appliance using the application to obtain "read-only" access.

In response to determining that the proximity broadcast receiver is not allowed (or authorized) to receive identification information (i.e., determination block 1708="No"), the central server may return to monitoring for reception of another sighting message. In response to determining that the proximity broadcast receiver is allowed (or authorized) to receive identification information (i.e., determination block 1708="Yes"), the processor of the central server may generate a return message in block 1706' with identification information related to the known wireless identity transmitter that is authorized to be shared with the proximity broadcast receiver. For example, the generated return message may include all the public profile information from the profile associated with the wireless identity transmitter indicated by the sighting message. In some embodiments, the identification information may include credentials for accessing the target device to be provisioned by the proximity broadcast receiver, such as usernames, passwords, PINs, etc. Further, the operations in block 1706' may be similar to as described above with reference to blocks 1706-1714 in FIG. 17. In block 3004, the processor of the central server may transmit the return message with the authorized identification information to the proximity broadcast receiver, and may continue with the operations in determination block 1402 for monitoring for subsequent incoming sighting messages.

Returning to FIG. 29, as described above, in determination block 1101, the processor of the proximity broadcast receiver may determine whether the return message from the central server is received, such as by monitoring an incoming message buffer for messages including formatting used in return messages. In response to determining that the return message has not been received (i.e., determination block 1101="No"), the proximity broadcast receiver may continue with the operations in determination block 1101, or in some embodiments, may continue monitoring for incoming broadcast messages from wireless identity transmitters in determination block 702.

In response to determining that the return message has been received (i.e., determination block 1101="Yes"), the processor of the proximity broadcast receiver may determine whether the return message includes the identification information related to the wireless identity transmitter in determination block 1102, such as by evaluating the return message to identity any data that may be used for interfacing with a target device associated with the wireless identity transmitter. In response to determining that the return message does not include the identification information (i.e., determination block 1102="No"), the proximity broadcast receiver may continue monitoring for incoming broadcast messages from wireless identity transmitters in determination block 702.

In response to determining that the return message does include the identification information (i.e., determination block 1102="Yes"), the processor of the proximity broadcast receiver may provision the target device associated with the wireless identity transmitter using the identification information from the return message in block 2902. For example, the proximity broadcast receiver may use the received identification information to log-into a router or download an application for accessing a nearby appliance associated with the wireless identity transmitter. In optional block 2904, the processor of the proximity broadcast receiver may exchange signals with the provisioned target device. For example, the proximity broadcast receiver may transmit commands to control the provisioned target device, such as activation commands, deactivation commands, commands for querying operating status information, and/or commands to cause a change in behavior of the provisioned target device. The proximity broadcast receiver may then continue with the operations for monitoring for and processing incoming broadcast messages in determination block 702.

Figure 31A:
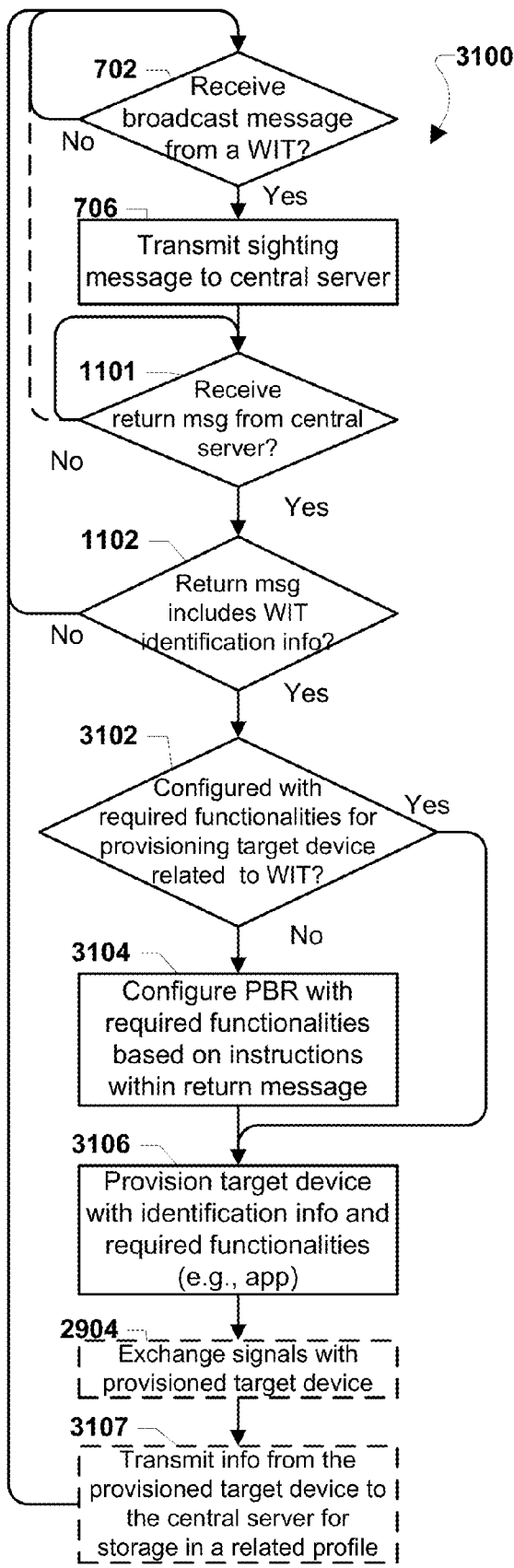
FIG. 31A is a process flow diagram that illustrates an embodiment method for a proximity broadcast receiver to establish functionalities to provision a device in response to receiving a return message from a central server.

FIG. 31A illustrates an embodiment method 3100 for a proximity broadcast receiver to establish functionalities to provision a target device in response to receiving a return message from a central server. The method 3100 is similar to the method 2900 described above, except that the method 3100 includes operations for determining whether the proximity broadcast receiver requires further configurations and/ or capabilities in order to provision the target device. For example, in response to receiving a return message which includes a Bluetooth address of an appliance to be provisioned, the proximity broadcast receiver may activate a Bluetooth radio. In various embodiments, return messages from the central server may include instructions or commands that guide the proximity broadcast receiver in establishing functionalities for provisioning target devices. For example, a return message may include a script that may be executed by the proximity broadcast receiver to configure an application for communicating with a nearby router device.

The operations in blocks 702-1102 may be as described above. In response to determining that a return message is received that includes identification information related to a received broadcast message (i.e., determination block 1102="Yes"), the processor of the proximity broadcast receiver may determine whether it is configured with the required functionalities for provisioning a target device associated with the wireless identity transmitter in determination block 3102. In particular, based on specifications or other informative data indicating the required functionalities for provisioning the target device, the proximity broadcast receiver may determine whether software required to interface with the target device is available (i.e., installed software) on the proximity broadcast receiver, as described in more detail below with reference to FIG. 31B. For example, the identification information of the return message may indicate a type of software (e.g., app), a data source for obtaining the software (e.g., a URI), and/or instructions to be performed by the proximity broadcast receiver in order to establish the required functionalities for provisioning and/or accessing the target device. In some embodiments, the required functionalities may include activated radios and/or other communication units, such as cameras and/or lights. For example, the proximity broadcast receiver may determine whether it has or has activated a Bluetooth radio when the return message indicates Bluetooth messages are required for provisioning the target device.

In response to determining that the proximity broadcast receiver is not configured with the required functionalities for provisioning a device associated with the wireless identity transmitter (i.e., determination block 3102="No"), the processor of the proximity broadcast receiver may configure the proximity broadcast receiver with (or establish) the required functionalities based on instructions within return message in block 3104. For example, the proximity broadcast receiver may activate a component (e.g., a radio, a thread, a routine, an application, etc.) and/or implement a configuration or setting adjustment. As another example, the proximity broadcast receiver may download, install, and/or execute an application indicated in the received return message. In various embodiments, the proximity broadcast receiver may configure (or establish) the required functionalities by executing a script, set of instructions, or other commands included within the received return message. For example, the proximity broadcast receiver may execute a series of commands for turning on and setting-up a particular radio, application, and/or setting.

In response to determining that the proximity broadcast receiver is configured with the required functionalities for provisioning the target device associated with the wireless identity transmitter (i.e., determination block 3102="Yes"), or if the operations in block 3104 are performed, the processor of the proximity broadcast receiver may provision the target device with the identification information from the return message and using the required functionalities in block 3106, such as by logging-in or otherwise accessing the device using a particular app and/or a password. The proximity broadcast receiver may perform the operations in optional block 2904 as described above.

In optional block 3107, the processor of the proximity broadcast receiver may transmit information, such as information received from the provisioned target device (e.g., target device identifier, confirmation code, settings, etc.), to the central server for storage in a related profile. For example, the device identifier of the provisioned target device may be relayed to the central server for storing in a profile associated with a user in order to identify the provisioned target device as being a new device now owned by the user. The proximity broadcast receiver may continue receiving subsequent broadcast messages in determination block 702 for.

Figure 31B:
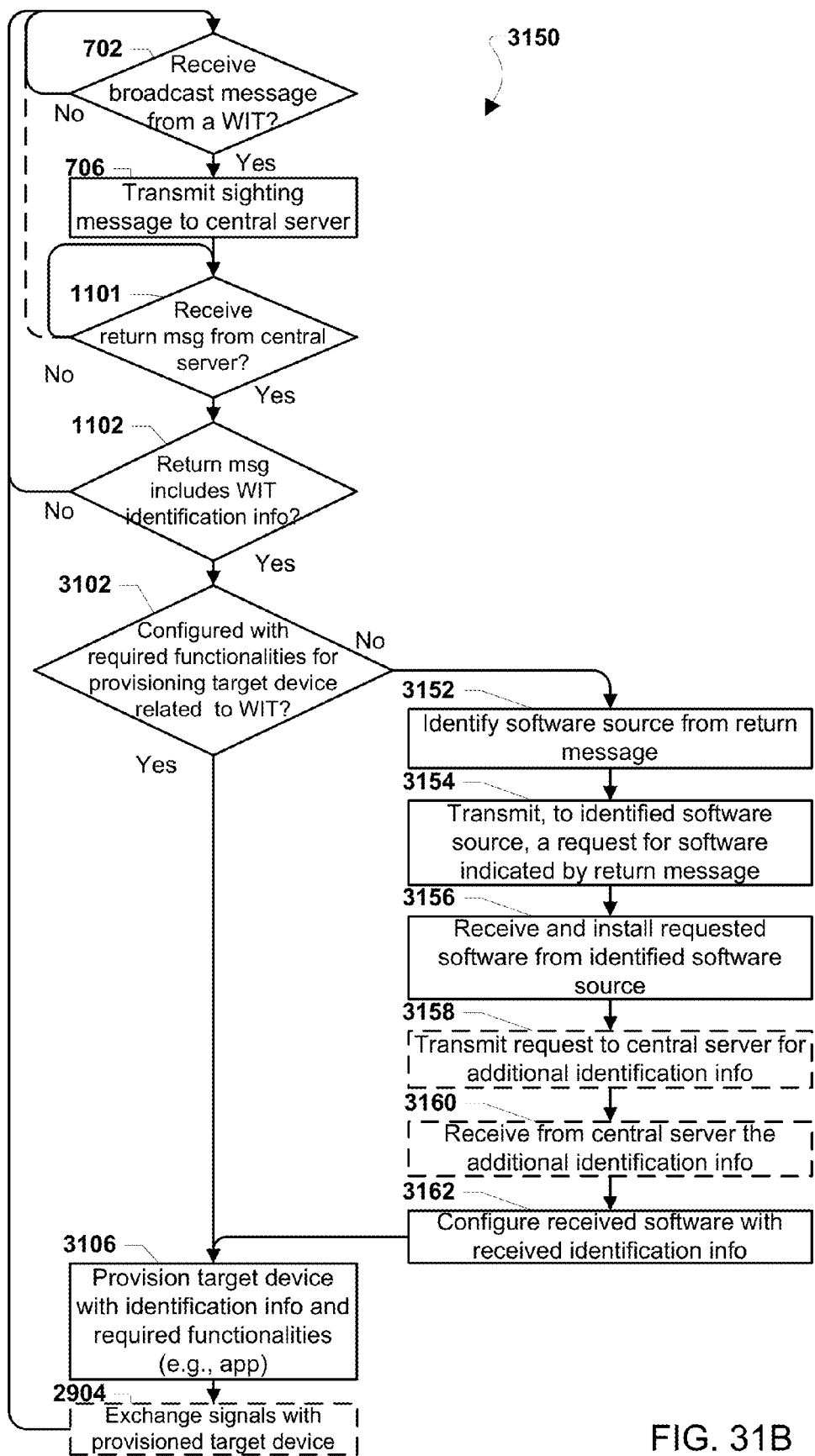
FIG. 31B is a process flow diagram that illustrates an embodiment method for a proximity broadcast receiver to request software from a data source in order to establish functionalities to provision a device in response to receiving a return message from a central server.

FIG. 31B illustrates an embodiment method 3150 for a proximity broadcast receiver to request software from a data source in order to configure the proximity broadcast receiver with (or establish) functionalities to provision a target device in response to receiving a return message from a central server. The method 3150 is similar to the method 3100 described above, except that the method 3150 includes particular operations for obtaining software from a remote source in order to have the required functionalities for provisioning the target device. For example, in response to receiving a return message which includes a URI address, the proximity broadcast receiver may request and receive a data file from an application server.

The operations in blocks 702-1102 and 3102 may be as described above. In response to determining that the proximity broadcast receiver is not configured with the required functionalities for provisioning the target device related to the wireless identity transmitter (i.e., determination block 3102="No"), the processor of the proximity broadcast receiver may identify a software source from the return message in block 3152. For example, the proximity broadcast receiver may parse the return message to identify a URI, URL, IP address, an "App Store" name, or other information that indicates a location for obtaining an application used for interfacing with the target device to be provisioned. In some embodiments, the return message may further include log-in and/or account information associated with the software source, such as a user name and password for accessing an application server or protected folder on a network drive.

In block 3154, the processor of the proximity broadcast receiver may transmit to the identified software source a request for software indicated by return message. For example, the proximity broadcast receiver may transmit a message via IP protocols that requests the download of a particular application or "app" from an App Store. Such a request may include other information for validating such a request, such as account information, payment information, and/or other data that may be used by the software source to verify the request. In block 3156, the processor of the proximity broadcast receiver may receive and install the requested software from identified software source. In some embodiments, the proximity broadcast receiver may decompress, unzip, or otherwise convert the received software in order to make it accessible for installation and/or configuration.

In various embodiments, the proximity broadcast receiver may be configured to receive more than one message from the central server that includes information that may be used to provision target devices. For example, a first return message may include a URI to an app, and a second return message may include credentials for using with the app. Thus, in optional block 3158 the processor of the proximity broadcast receiver may transmit a request to the central server for additional identification information for use with the received software. In various embodiments, such a request may be transmitted via the received software, such as via messages formatted by the software. In optional block 3160, the proximity broadcast receiver may receive the requested additional identification information from the central server. For example, the proximity broadcast receiver may receive log-in and/or password credentials for use with an installed application.

In block 3162, the processor of the proximity broadcast receiver may configure the received software based on information received from the central server, such as by logging in with credentials indicated in the return message. The proximity broadcast receiver may configure the software with various settings provided in the return message received with the operations in determination block 1101 and/or the additional identification information received in optional block 3160, such as communication settings (e.g., ports, destination addresses, proxy server information, active protocols, etc.) and log-in information (e.g., username, password, etc.). The proximity broadcast receiver may continue with the operations in block 3106.

Figure 31C:
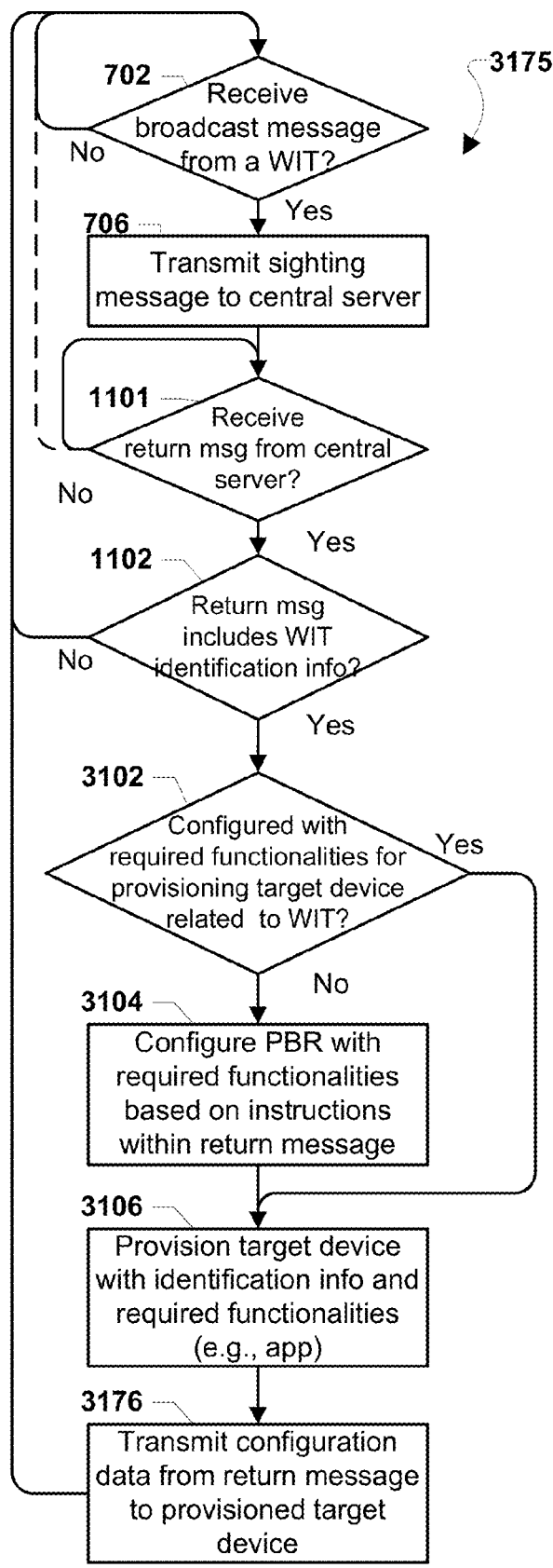
FIG. 31C is a process flow diagram that illustrates an embodiment method for a proximity broadcast receiver to transmit configuration data to a provisioned device.

FIG. 31C illustrates an embodiment method 3175 for a proximity broadcast receiver to transmit configuration data to a provisioned target device. The method 3175 is similar to the method 3100 described above, except that the method 3175 also includes operations for transmitting configuration data to the target device once provisioned. This technique may be useful in distributing patches, updates, and/or other data from the central server to various target devices associated with parties registered with the central server. For example, the configuration data may include updated code that may be installed on a provisioned target device to delimit the type and/or frequency of accesses by external devices (e.g., other proximity broadcast receivers, etc.) to the provisioned target device. In other words, regardless of whether the target device is connected to the Internet, configuration data from a central server may be provided to the target device via the proximity broadcast receiver acting as a proxy.

The operations in blocks 702-3106 are as described above. In block 3176, the processor of the proximity broadcast receiver may transmit configuration data from the return message to the provisioned target device. For example, the proximity broadcast receiver may transfer configuration files and/or commands that may be executed by the provisioned target device in order to change its behavior. In some embodiments, the configuration data may include settings that may be implemented by the provisioned target device to enable the proximity broadcast receiver to have more or less control over the provisioned target device. For example, the configuration data may cause the provisioned target device to increase or decrease the functions that are available via an application, such as an app executing on the proximity broadcast receiver. As another example, the configuration data may include instructions that cause the provisioned target device to revoke credentials used by the proximity broadcast receiver based on an elapsed time, proximity, and/or number of accesses. In some embodiments, the configuration data may cause the provisioned target device to prevent simultaneous devices from accessing, interfacing with, and/or controlling the provisioned target device. The proximity broadcast receiver may continue with the operations in determination block 702.

Figure 31D:
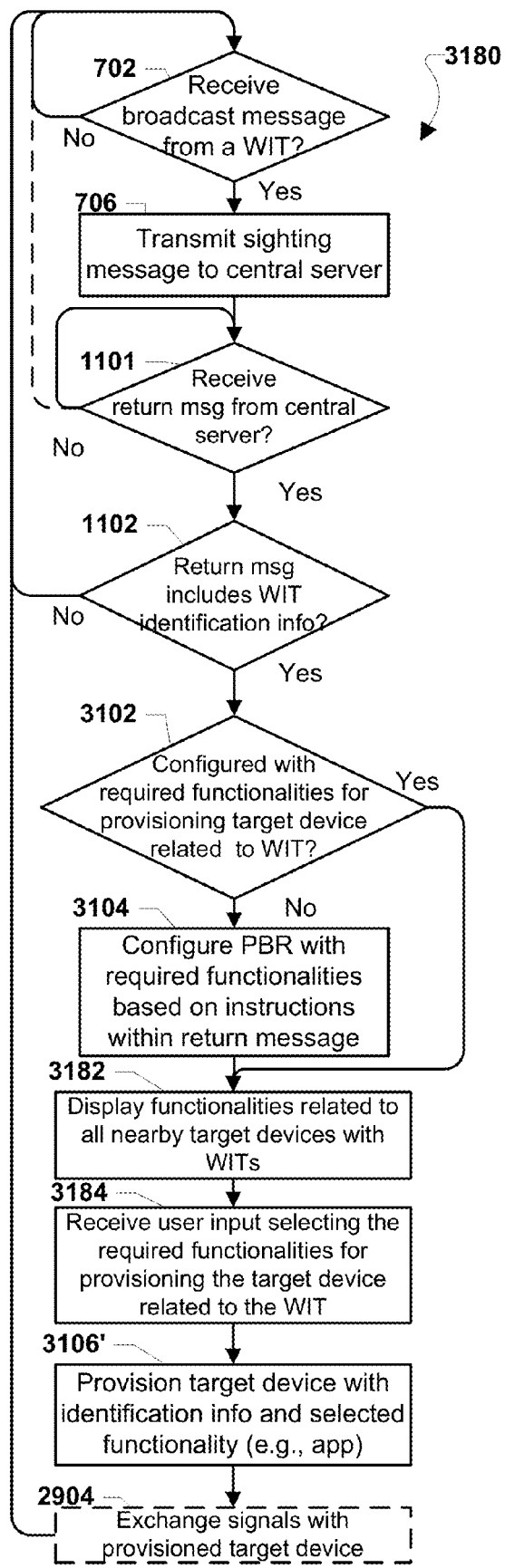
FIG. 31D is a process flow diagram that illustrates an embodiment method for a proximity broadcast receiver to display available functionalities to be used with nearby devices.

FIG. 31D illustrates an embodiment method 3180 for a proximity broadcast receiver to display functionalities available for use with nearby target devices. The method 3180 is similar to the method 3100 described above, except that the method 3180 also includes operations for rendering information indicating what functionalities of the proximity broadcast receiver may be used at a given time based on the proximity to related target devices. For example, a display of a first installed application and a second installed application may be rendered on the proximity broadcast receiver in response to receiving broadcast messages from a first wireless identity transmitter associated with a refrigerator and a second wireless identity transmitter associated with a thermostat. In other words, the proximity broadcast receiver may be configured to indicate the functionalities of the receiver that are relevant based on current proximities to various target devices. In some embodiments, the proximity broadcast receiver may utilize a smart folder or screen that updates based on received broadcast messages such that the contents of the folder or screen only include indicators of functionalities related to nearby target devices.

The operations in blocks 702-3106 are as described above. In response to determining that the proximity broadcast receiver is configured with the required functionalities for provisioning the target device related to the wireless identity transmitter (i.e., determination block 3102="Yes") or when the operations in block 3104 have been performed, the processor of the proximity broadcast receiver may display the functionalities related to all nearby target devices associated with wireless identity transmitters in block 3182. Over a period of time (e.g., a period of seconds, etc.), the proximity broadcast receiver may receive a plurality of broadcast messages from a plurality of nearby wireless identity transmitters, and as the broadcast messages are transmitted via short-range wireless signals (e.g., Bluetooth, etc.), may identify that the transmitters are nearby.

Figure 31E:
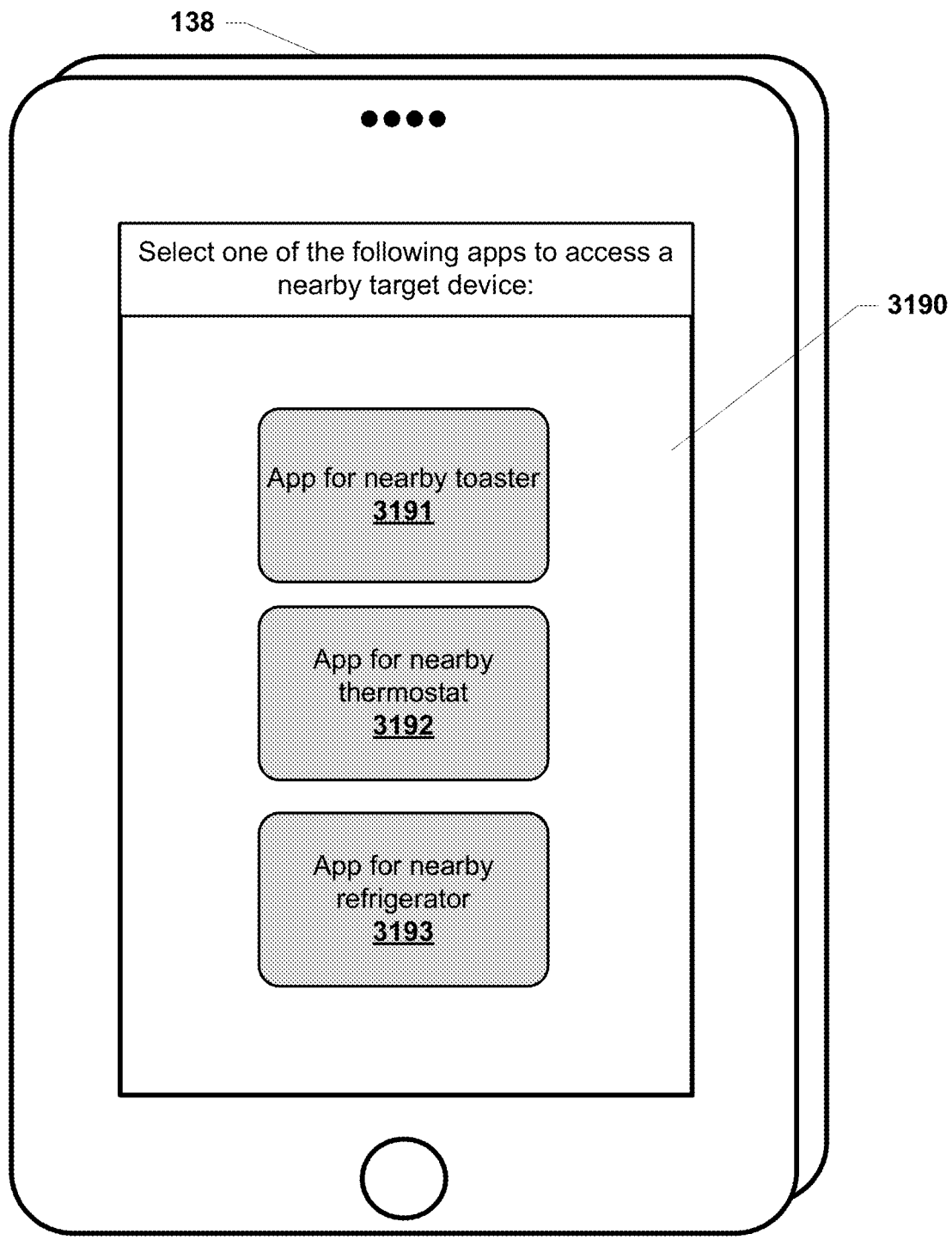
FIG. 31E is a diagram that illustrates an exemplary display of available software (e.g., apps) that may be selected for accessing nearby devices associated with wireless identity transmitters suitable for use in various embodiments.

If the proximity broadcast receiver is configured with functionalities (e.g., software) for the target devices associated with the nearby transmitters, the display may be updated to represent these functionalities. For example, the proximity broadcast receiver may render a display of graphical elements that represent a plurality of functionalities (e.g., applications) for all appliances that are nearby and that the proximity broadcast receiver is authorized to access. FIG. 31E illustrates an example of such a display. In various embodiments, for user convenience, the proximity broadcast receiver may also be configured to display functionalities (e.g., apps, etc.) for target devices that are within proximity and that may or may not have previously been provisioned by the proximity broadcast receiver.

In block 3184, the proximity broadcast receiver may receive a user input selecting the required functionalities for provisioning the target device related to the wireless identity transmitter that transmitted the received broadcast message in determination block 1402. For example, the user input may select an app to launch. The proximity broadcast receiver may continue with the operations in 3106' for provisioning the target device with the selected functionality, and may continue with the operations in optional block 2904 for exchanging signals with the provisioned target device.

FIG. 31E illustrates an exemplary display 3190 of available software that may be selected for accessing nearby target devices associated with wireless identity transmitters. As described above with reference to FIG. 31D, a proximity broadcast receiver 138 may be configured to render the display 3190 that shows the various applications installed (or otherwise accessible) on the proximity broadcast receiver 138. The display 3190 may prompt the user of the proximity broadcast receiver 138 to select one of a first button 3191 (e.g., a graphical user interface (GUI) button) for launching a first app for accessing a nearby toaster device, a second button 3192 for launching a second app for accessing a nearby thermostat device, and a third button 3193 for launching a third app for accessing a nearby refrigerator device.

Figure 31F:
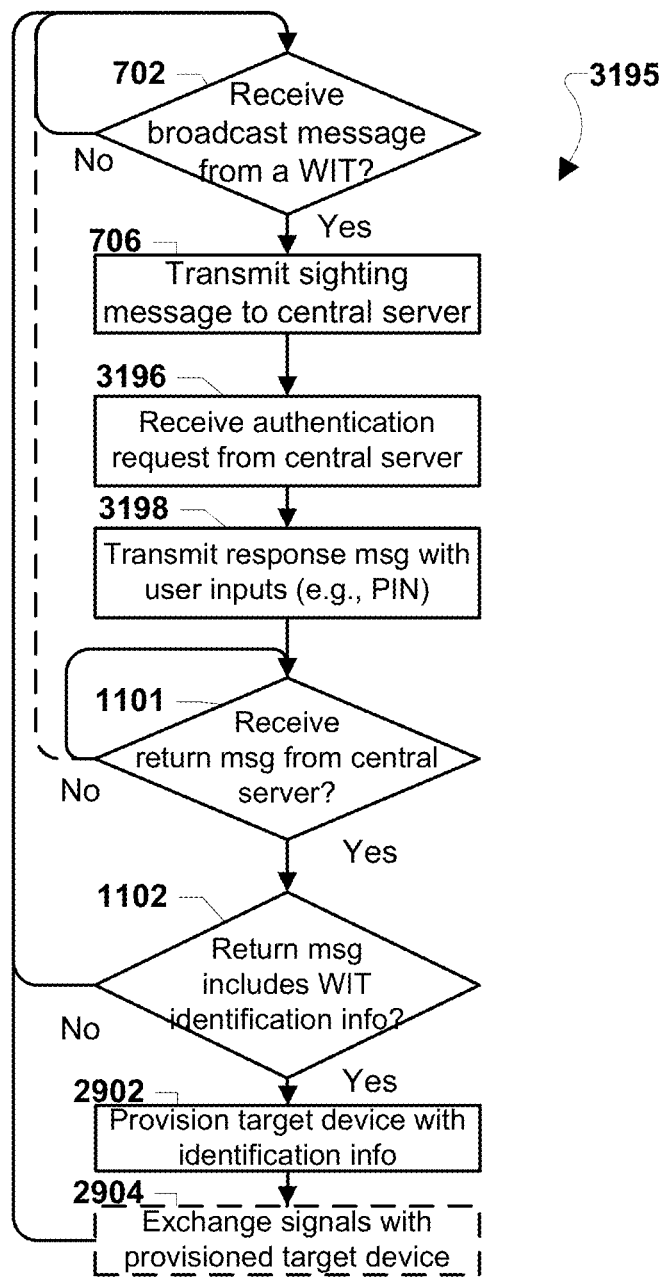
FIG. 31F is a process flow diagram that illustrates an embodiment method for a proximity broadcast receiver to transmit additional authentication information when requested by a central server.

FIG. 31F illustrates an embodiment method 3195 for a proximity broadcast receiver to transmit additional authentication information when requested by a central server. The method 3195 is similar to the method 2900 described above, except that the method 3195 also includes operations for transmitting additional messages to the central server in response to receiving requests for authentication information. With this technique, the proximity broadcast receiver may be authorized to receive identification information from the central server only after providing additional verifying information, further ensuring anonymity and data security is maintained by the central server.

The operations in blocks 702-2904 are as described above. In response to transmitting the sighting message with the operations in block 706, in block 3196, the processor of the proximity broadcast receiver may receive an authentication request from the central server, such as a prompt for a PIN or other information that may be provided by a user to verify his/her identity and thus whether he/she is authorized to receive identification information related to the wireless identity transmitter that sent the received broadcast message. In this way, a two-factor (or two-step) authentication process may be implemented such that information from sighting messages alone may not cause the central server to transmit identification information and/or other data needed to provision nearby target devices. In block 3198, the processor of the proximity broadcast receiver may transmit a response message to the authentication request that includes user inputs, such as a PIN received via user inputs on a touchscreen coupled to the proximity broadcast receiver (e.g., a smartphone touch screen). The proximity broadcast receiver may continue to monitor for subsequent messages from the central server in determination block 1101. For example, after transmitting the authentication message, the proximity broadcast receiver may wait for a subsequent return message that includes identification information and/or information needed to provision a target device.

Figure 32A:
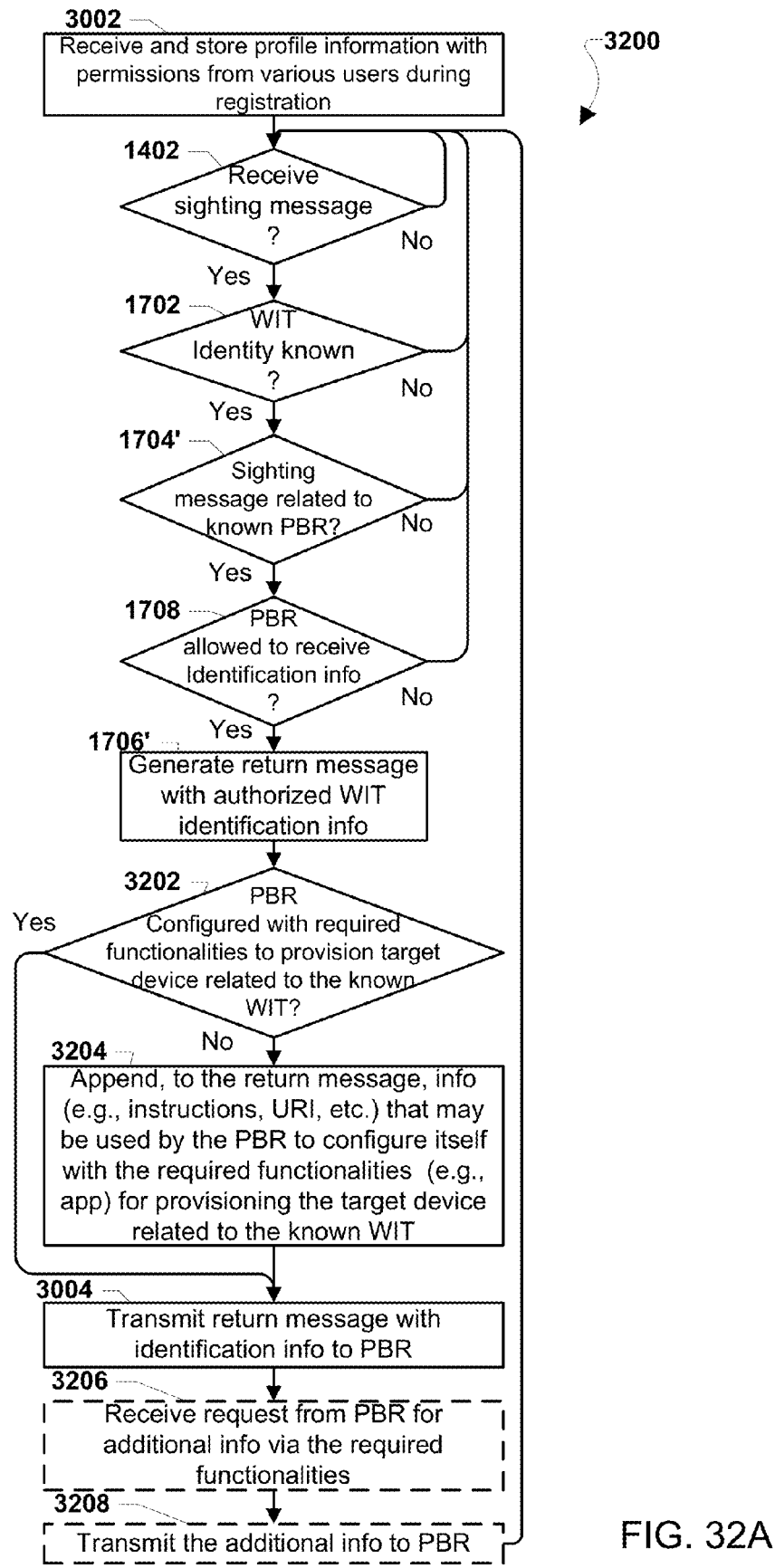
FIG. 32A is a process flow diagram that illustrates an embodiment method for a central server to transmit a message to a proximity broadcast receiver that is authorized to receive identification information associated with a wireless identity transmitter.

FIG. 32A illustrates an embodiment method 3200 for a central server to transmit a message to a proximity broadcast receiver that is authorized to receive identification information associated with a wireless identity transmitter and a target device. The method 3200 is similar to the method 3000 described above, except that the method 3200 also includes operations for transmitting data (e.g., instructions, scripts, commands, etc.) that may cause the proximity broadcast receiver to obtain and/or configure functionalities for provisioning target devices. For example, in addition to including identification information (e.g., device identifier, login credentials, etc.), the central server may transmit a return message that includes a URI to an application for accessing an appliance associated with a wireless identity transmitter. In this way, applications appropriate for both nearby target devices and proximity broadcast receivers may be discovered by the central server, enabling proximity broadcast receivers to seamlessly obtain the appropriate applications for provisioning, controlling, and/or communicating with the nearby target devices.

The operations in blocks 3002, 1402-1706' are as described above. In determination block 3202, the processor of the central server may determine whether the proximity broadcast receiver that transmitted the received sighting message is configured with the required functionalities to provision the target device associated with the known wireless identity transmitter. This determination may be based on information stored within the profile related to the wireless identity transmitter identified with the operations in determination block 1702 and information stored within the profile related to the proximity broadcast receiver identified with the operations in determination block 1704'. In particular, the central server may compare requirements information for accessing the target device associated with the wireless identity transmitter, such as required applications, communication protocols, scheduling specifications, etc., with information indicating the current capabilities of the proximity broadcast receiver (e.g., installed programs, available networking capabilities, etc.). Such requirements and current capabilities information may be received by the central server during registration procedures of the respective devices (or their users) and/or on a periodic basis. For example, the proximity broadcast receiver may be configured to periodically update data within its profile information stored on the central server that indicates the applications that are currently installed on the proximity broadcast receiver. As another example, the proximity broadcast receiver may be configured to periodically update data within its profile information that indicates the configurations, settings, and/or other operating parameters of installed applications (e.g., time last used, etc.).

The central server may determine that the required functionalities are not available at the proximity broadcast receiver when the profile information related to the proximity broadcast receiver is missing functionalities indicated as required in the profile associated with the wireless identity transmitter. For example, when the wireless identity transmitter's profile indicates an "App A" is required to interface with an associated target device (e.g., an appliance), the central server may determine that the proximity broadcast receiver does not include the require functionalities when its related profile indicates only "App B" is loaded on the proximity broadcast receiver. As another example, when the wireless identity transmitter's profile indicates a Bluetooth connection is required to interface with an associated target device, the central server may determine that the proximity broadcast receiver does not include the require functionalities when its related profile indicates the proximity broadcast receiver's Bluetooth radio is currently deactivated.

In response to determining that the proximity broadcast receiver is not configured with the required functionalities to provision the target device related to the known wireless identity transmitter (i.e., determination block 3202="No"), in block 3204 the processor of the central server may append, to the return message, information that may be used by the proximity broadcast receiver to configure itself with the required functionalities for provisioning the target device associated with the known wireless identity transmitter. For example, the information may include instructions, scripts, commands, codes, or other information that may be used by the proximity broadcast receiver to download, install, load, configure, and/or activate software (e.g., an application, an app, etc.) related to the target device. As another example, the information may include instructions to be performed by the proximity broadcast receiver to activate or configure a radio for communicating with the target device to be provisioned. As another example, the information may include URL, URI, network addresses, file paths, and other location information for accessing data on remote data sources (e.g., application servers, websites, etc.).

In response to determining that the proximity broadcast receiver is configured with the required functionalities to provision the target device related to the known wireless identity transmitter (i.e., determination block 3202="Yes"), or when the operations of block 3204 are performed, the central server may continue transmitting the return message to the proximity broadcast receiver in block 3004 as described above.

In various embodiments, the central server may transmit multiple return messages in response to determining that the proximity broadcast receiver is authorized to receive the identification information (i.e., determination block 1708="Yes"). For example, the central server may transmit a first return message to the proximity broadcast receiver that indicates a URI for downloading an app and a second return message that includes the credentials for logging onto the target device associated with the app. In various embodiments, such multiple return messages may be transmitted in response to receiving multiple messages from proximity broadcast receivers. For example, a first return message with a URI for an app may be transmitted in response to receiving a first sighting message from a proximity broadcast receiver, and a second return message with credentials to be used with the app may be transmitted in response to receiving a second sighting message from the same proximity broadcast receiver.

In optional block 3206 the processor of the central server may receive a request from the proximity broadcast receiver via the required functionalities (e.g., an app or other software acquired by the proximity broadcast receiver based on a URI provided by the central server) for additional information (or identification information) to be used with the functionalities. For example, the request may be for additional credentials and/or configuration information for setting up an application for communicating with the target device. In optional block 3208, the processor of the central server may transmit the requested additional information to the proximity broadcast receiver. For example, the central server may transmit password credentials for use with an application. The central server may continue with the operations in determination block 1402.

As an illustration, a house sitter's smartphone proximity broadcast receiver may receive a broadcast message from a thermostat in a house, and in response may transmit a first sighting message to the central server. In response to determining that the smartphone is within proximity (or a proximity threshold) of the thermostat and that the house's owner has previously indicated that the smartphone is authorized to access the thermostat, the central server may transmit a first return message that includes an app store URI for a thermostat app. After the smartphone downloads, installs, and launches the thermostat app, the smartphone may transmit to the central server a request for the app to access to the thermostat's functions (e.g., temperature display and limited temperature adjustment access, etc.). Preconfigured to allow smartphones within proximity to the thermostat (e.g., within 1 meter) to access to temperature display and adjust the temperature (e.g., within 3 degrees higher or lower of an existing program, etc.), the central server may transmit credentials to allow the smartphone to receive temperature display data and have limited temperature adjustment functions via local access with the app (e.g., only over a local connection/LAN and not via the Internet).

Figure 32B:
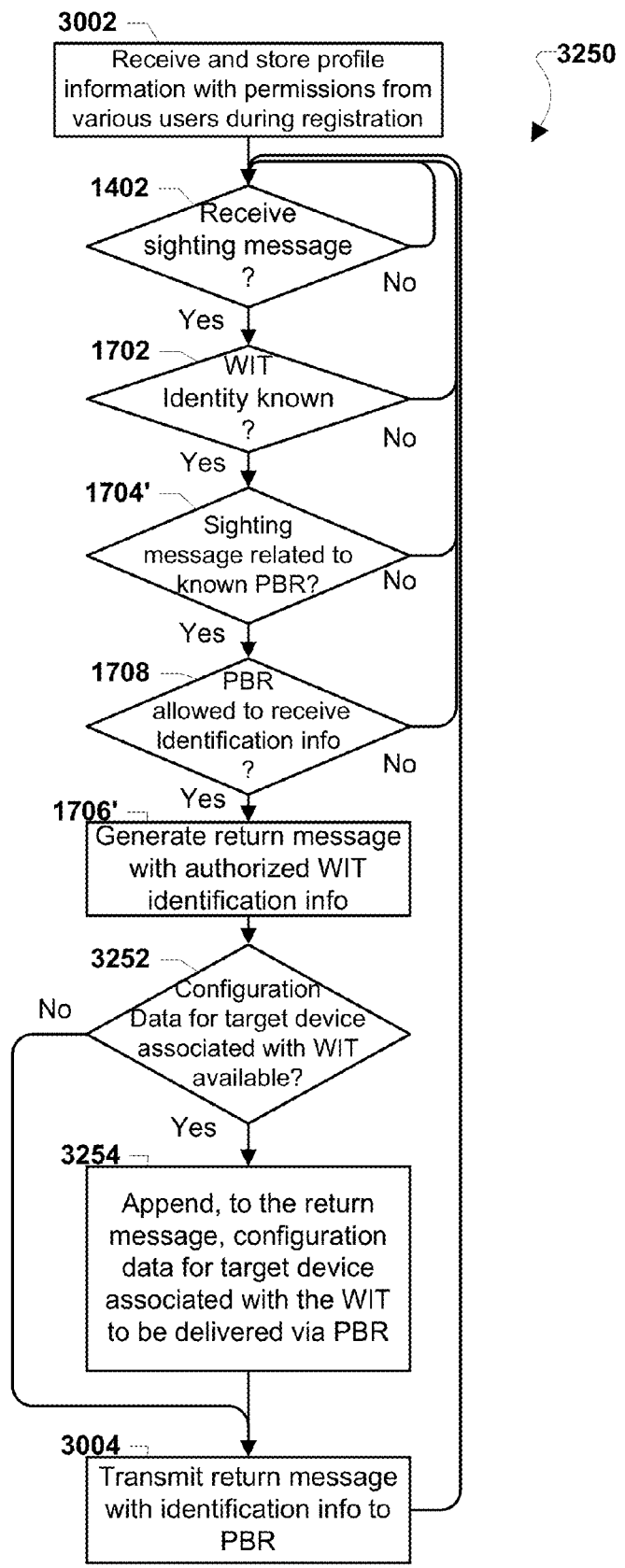
FIG. 32B is a process flow diagram that illustrates an embodiment method for a central server to transmit a message with configuration data for a device associated with a wireless identity transmitter that is within proximity to a proximity broadcast receiver.

FIG. 32B illustrates an embodiment method 3250 for a central server to transmit a message with configuration data for a target device to a proximity broadcast receiver authorized to receive identification information. The method 3250 is similar to the method 3000 described above, except that the method 3250 also includes operations for transmitting configuration data (e.g., instructions, scripts, commands, etc.) that may be delivered via the proximity broadcast receiver to the target device associated with a nearby wireless identity transmitter. For example, the configuration data may include settings, instructions, and/or codes that the proximity broadcast receiver may transmit to a provisioned target device in order to change the behavior of that provisioned target device. This technique may be useful in distributing patches, updates, and/or other data from the central server to various devices associated with parties registered with the central server, especially when those various devices are not in direct communication with the central server. For example, the configuration data may include updated code that may be transmitted to a provisioned target device by the proximity broadcast receiver using a particular application.

The operations in blocks 3002, 1402-1706' are as described above. In determination block 3252, the processor of the central server may determine whether configuration data for the target device associated with the known wireless identity transmitter is available. For example, the central server may identify update information is available when an update flag or other indicator has been set within the profile information associated with the known wireless identity transmitter. In response to determining that the configuration data for the target device associated with the known wireless identity transmitter is available (i.e., determination block 3252="Yes"), in block 3254 the processor of the central server may append to the return message the configuration data for the target device associated with the wireless identity transmitter to be delivered via the proximity broadcast receiver. The configuration data may be a payload, binary, software, code(s), instruction(s), and/or any other data that may cause a change in the target device to be provisioned by the proximity broadcast receiver.

In response to determining that the configuration data for the device associated with the known wireless identity transmitter is not available (i.e., determination block 3252="No"), or when the operations in block 3254 have been performed, the central server may continue transmitting the return message to the proximity broadcast receiver in block 3004 as described above, and continue with the operations in determination block 1402.

Figure 32C:
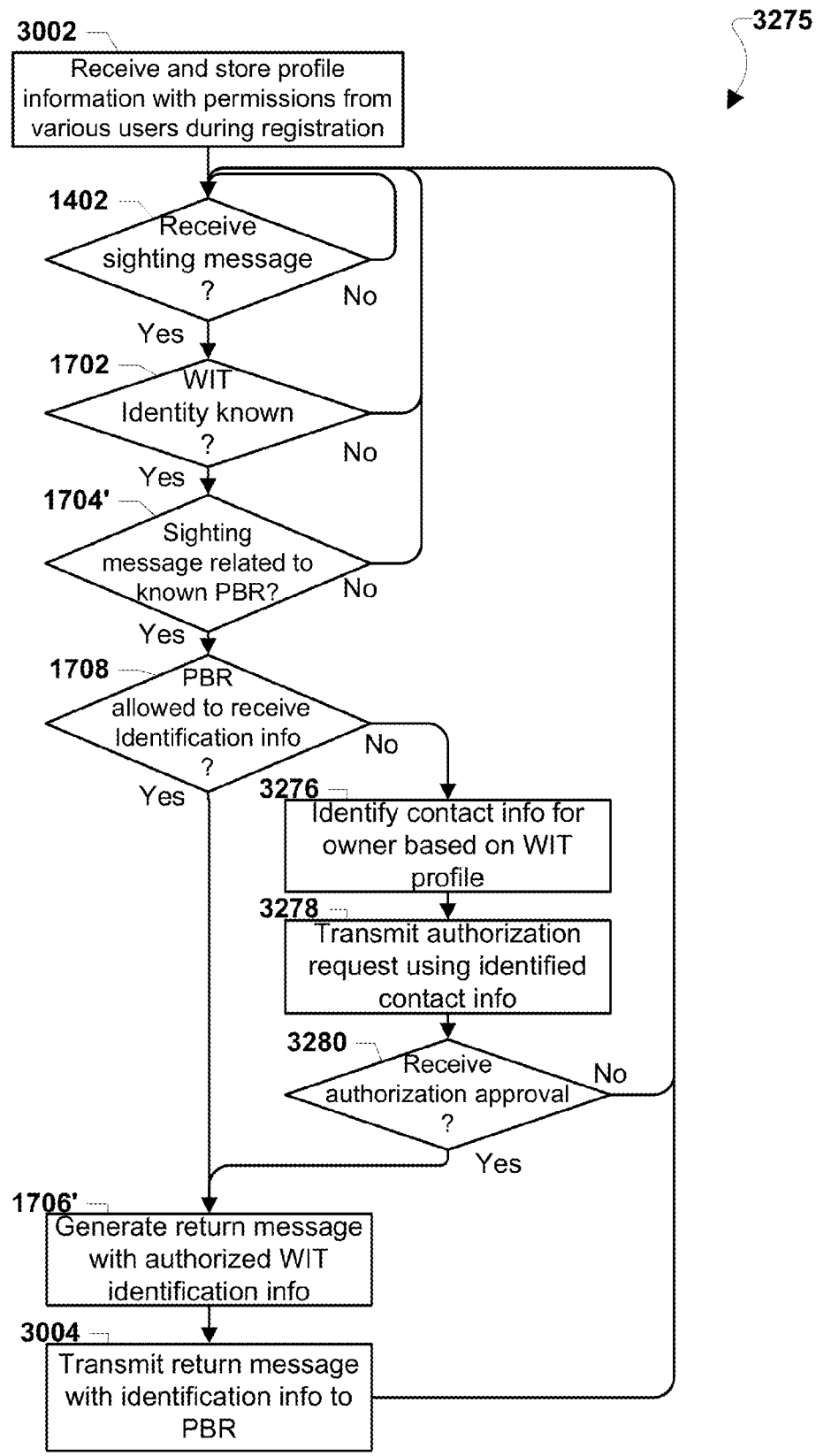
FIG. 32C is a process flow diagram that illustrates an embodiment method for a central server to receive authorization from a user to transmit a message with identification information to a proximity broadcast receiver.

FIG. 32C illustrates an embodiment method 3275 for a central server to receive an authorization from a user to transmit a message with identification information to a proximity broadcast receiver. The method 3275 is similar to the method 3000 described above, except that the method 3275 also includes operations for transmitting request messages to user devices associated with wireless identity transmitters (and thus the target devices to be provisioned) in order to receive on-demand authorizations for proximity broadcast receivers to provision the target devices. In other words, when a proximity broadcast receiver is not otherwise authorized to provision and/or access a target device (e.g., an appliance, a router, etc.), the central server may contact the owner of the target device to request authorization for the proximity broadcast receiver. For example, when a proximity broadcast receiver is not predefined as an authorized user of a router, the central server may transmit a message (e.g., SMS/MMS text, email, automated phone call, etc.) to the smartphone of the router's owner asking whether the owner will allow the proximity broadcast receiver to log onto the router.

The operations in blocks 3002, 1402-1708 are as described above. In response to determining that the proximity broadcast receiver is not allowed (or not authorized) to receive identification information related to the wireless identity transmitter (i.e., determination block 1708="No"), in block 3276 the processor of the central server may identify contact information (i.e., a contact address) for an owner of the wireless identity transmitter and/or the target device the proximity broadcast receiver is attempting to provision based on the profile information associated with the known wireless identity transmitter. For example, the central server may identify an email address or mobile phone number at which the owner of the wireless identity transmitter may be contacted for authorizations. In block 3278, the processor of the central server may transmit an authorization request to the owner's user device using the identified contact information. For example, the central server may transmit an email to a smartphone carried by the owner of the target device, indicating that the proximity broadcast receiver is not currently authorized but may be allowed to provision the target device.

In determination block 3280, the processor of the central server may determine whether an authorization approval is received from the owner of the wireless identity transmitter. For example, the central server may monitor an incoming message buffer to identify any received messages that include a code or other indicator that corresponds with a similar code or indicator for the authorization request. Further, the central server may evaluate any received messages from owner devices to determine whether the messages include approvals or authorizations or rejections. For example, the central server may determine that a message was received in response to the transmitted authorization request based on an included identifier within the received message, and further may determine whether authorization has been given based on a rejection code (e.g., "approve", "disapprove", etc.) included within the received message.

In response to determining that the authorization approval has not been received (i.e., determination block 3280="No"), the central server may continue with the operations in determination block 1402. In response to determining that the authorization approval has been received (i.e., determination block 3280="Yes"), the central server may continue with the operations in block 1706' for generating a return message with the authorized identification information, and transmitting the return message to the proximity broadcast receiver in block 3004 as described above.

Figure 32D:
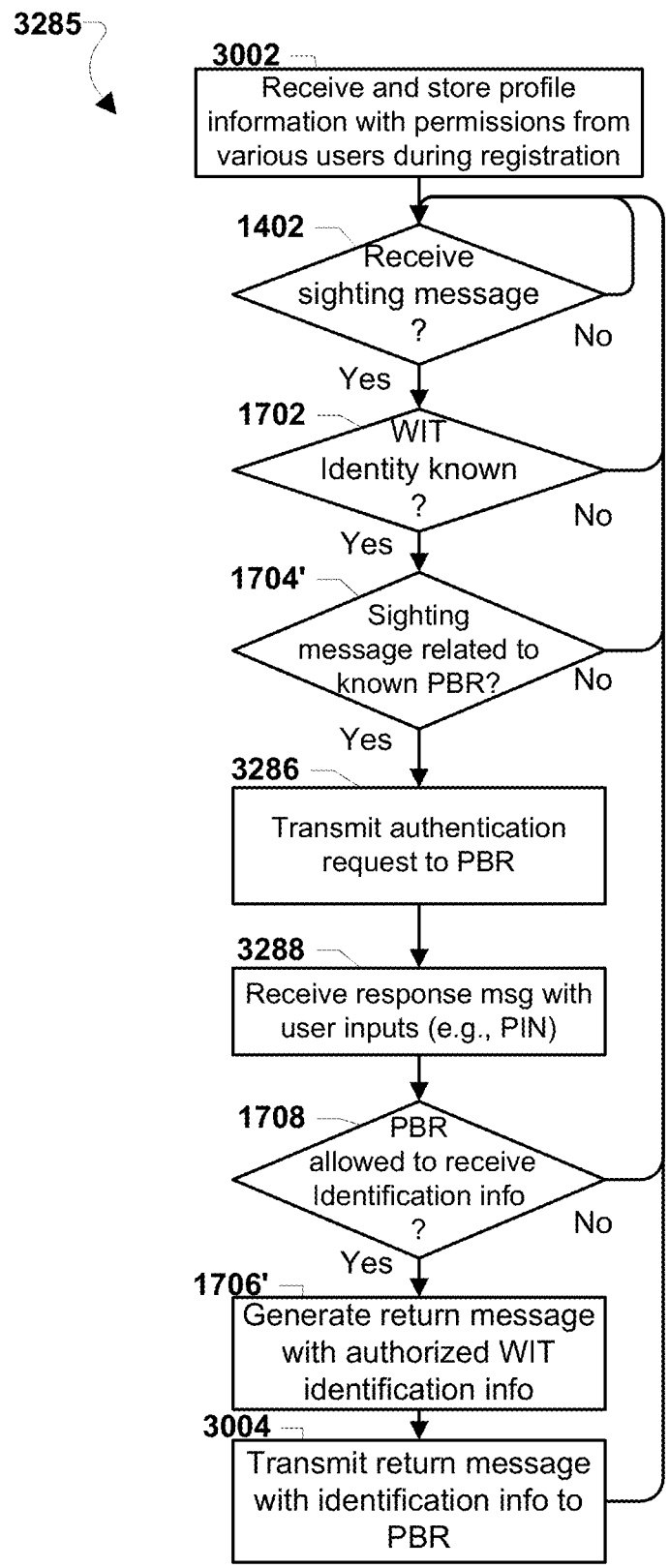
FIG. 32D is a process flow diagram that illustrates an embodiment method for a central server to request additional authentication information from a proximity broadcast receiver.

FIG. 32D illustrates an embodiment method for a central server to request additional authentication from a proximity broadcast receiver. The method 3285 is similar to the method 3000 described above, except that the method 3285 also includes operations for transmitting authentication request messages to a proximity broadcast receiver. In other words, the central server may conduct a two-factor authentication process to ensure the user of the proximity broadcast receiver is authorized to receive identification information. As smartphones may be stolen or otherwise used by parties other than the owners, the method 3285 may be important to ensure that not only is an authorized device receiving sensitive information, but also that the authorized device has not been acquired by an unknown or potentially nefarious party that may misuse the sensitive information.

The operations in blocks 3002, 1402-3004 are as described above. In response to determining that the received sighting message is related to a known proximity broadcast receiver (i.e., determination block 1704'="Yes"), the processor of the central server may transmit an authentication request to the proximity broadcast receiver in block 3286. The authentication request may prompt the user of the proximity broadcast receiver to respond with information that verifies his/her identity. For example, the request may be a SMS text message or an email that asks the user of the proximity broadcast user to respond with a secret code, PIN, or other data that only the actual owner of the proximity broadcast receiver would know. In block 3288, the processor of the central server may receive a response message to the authentication request with user inputs from the proximity broadcast receiver. For example, the authentication message may include a PIN entered by the user of the proximity broadcast receiver. Similar to embodiments described above, in determination block 1708 the central server may determine whether the proximity broadcast receiver is allowed to receive the identification information related to the wireless identity transmitter. In particular, the central server may evaluate the received authentication message to determine whether the included authentication information matches stored data within the profile information of the proximity broadcast receiver. For example, the central server may compare a first PIN received in the authentication message to a second PIN stored within the profile of the user of the proximity broadcast receiver.

As described above, in response to determining that the proximity broadcast receiver is allowed to receive the identification information (i.e., determination block 1708="Yes"), the central server may generate a return message in block 1706', and in response to determining that the proximity broadcast receiver is not allowed to receive the identification information (i.e., determination block 1708="No"), the central server may determine whether other sighting messages are received in determination block 1402.

Figure 33:
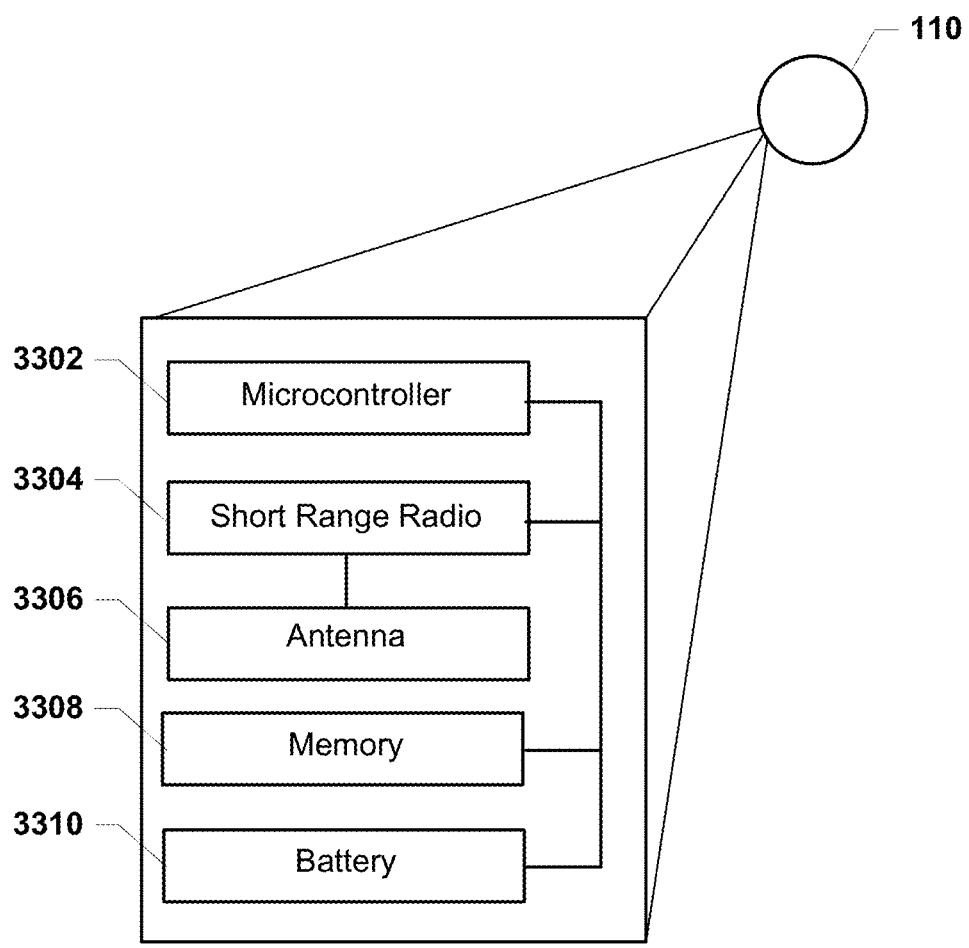
FIG. 33 is a component block diagram of a wireless identity transmitter in accordance with various embodiments.

FIG. 33 illustrates components of an exemplary wireless identity transmitter 110. The wireless identity transmitter 110 may include a microcontroller 3302, a short-range radio 3304 (e.g., a Bluetooth® radio or transceiver) coupled to an antenna 3306, a memory 3308, and a battery 3310. Although these components are shown linked by a common connection, they may be interconnected and configured in various ways. For example, a wireless identity transmitter 110 may be configured such that the microcontroller 3302 may determine when to transmit a message based on the contents of the memory 3308. In an embodiment, the microcontroller 3302 may be a Bluetooth® system-on-chip unit. The memory 3308 may also include one or more messages or message portions to be transmitted by the short-range radio 3304 via the antenna 3306 based on commands from the microcontroller 3302. The battery 3310 may supply power as needed by the other components. Also, in some implementations the microcontroller 3302, the short-range radio 3304 and/or the memory 3308 may be integrated together as a single integrated circuit. Since these components may be microchips of standard or off-the-shelf configuration, they are represented in FIG. 33 as blocks consistent with the structure of an example embodiment.

The wireless identity transmitter 110 may be coupled with or built into various objects, such as a bracelet or an appliance. For example, an exemplary wireless identity transmitter 110 may be in a form easily attached to a strap, such as a watchband or dog collar. Alternate embodiments may incorporate a wireless identity transmitter 110 into any other mobile objects that may need tracking.

The wireless identity transmitter 110 may conserve power by periodically entering a power saving mode or going to sleep, such as regularly alternating between sleeping and broadcasting of the packet with the wireless identity transmitter 110's identification code. Various embodiments may include different cycles of broadcasting and sleeping, such as some embodiments broadcasting more or less frequently, such as waking and broadcasting every few seconds or minutes between periods of sleep.

In an embodiment, the battery 3310 may be a replaceable coin cell battery. In another embodiment, the wireless identity transmitter 110 may utilize the antenna 3306 to receive update software, instructions, or other data for storage and use in configuration operations, such as configuring transmission intervals and/or transmissions power. The wireless identity transmitter 110 may also store and execute software, algorithms, instructions, code, or other routines for generating rolling codes or identifiers, as described above. In an embodiment, the wireless identity transmitter may not maintain time (e.g., UTC) information, but may instead use a 30 ppm 16 kHz crystal as a clock. Such use of a crystal as a clock may create a timing drift of approximately 40 seconds per year.

Figure 34:
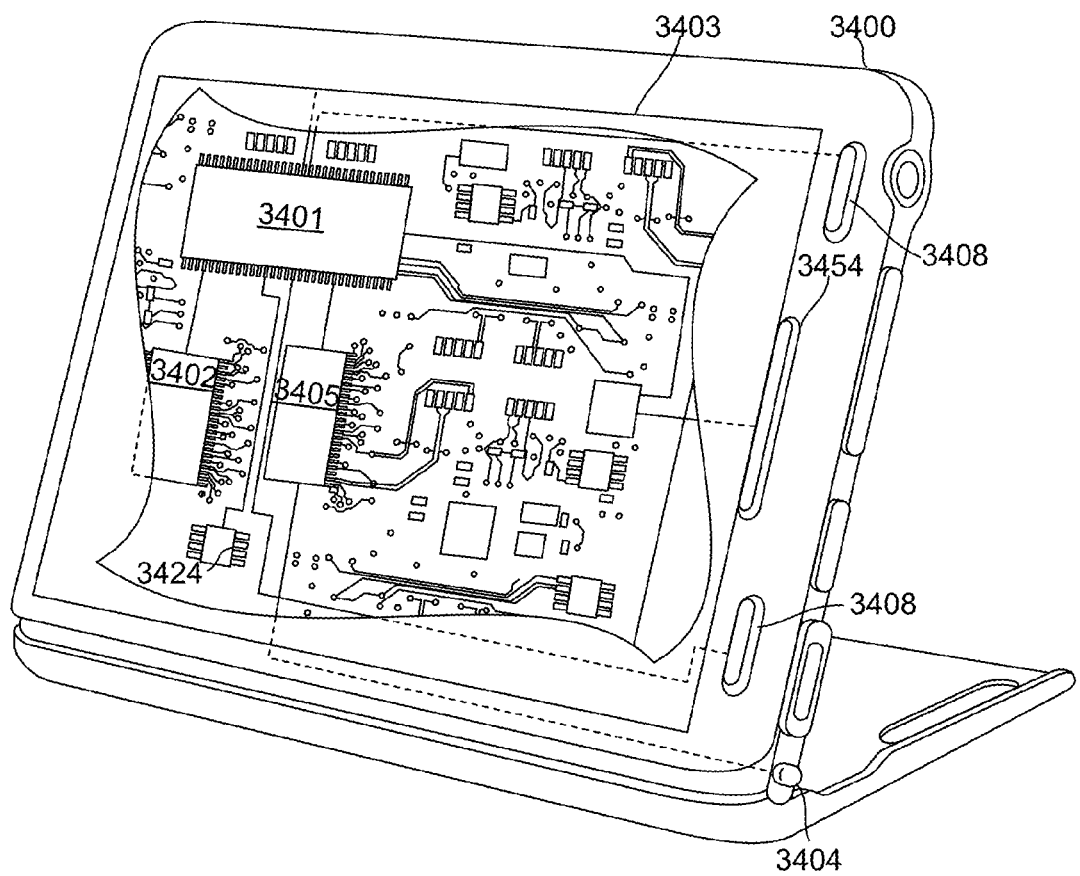
FIG. 34 is a component block diagram of a mobile device suitable for use in various embodiments.

FIG. 34 is a system block diagram of a smartphone type mobile device suitable for use with various embodiments. A smartphone 3400 may include a processor 3401 coupled to internal memory 3402, a display 3403, and to a speaker 3454. Additionally, the smartphone 3400 may include an antenna 3404 for sending and receiving electromagnetic radiation that may be connected to a wireless data link and/or cell telephone transceiver 3405 (i.e., a long-range transceiver) coupled to the processor 3401 and capable of communicating over a wide area wireless communication network. Smartphones may include a separate short-range wireless transceiver 3424 capable of communicating or pairing with wireless identity transmitters. Smartphones 3400 typically may also include menu selection buttons or rocker switches 3408 for receiving user inputs.

Figure 35:
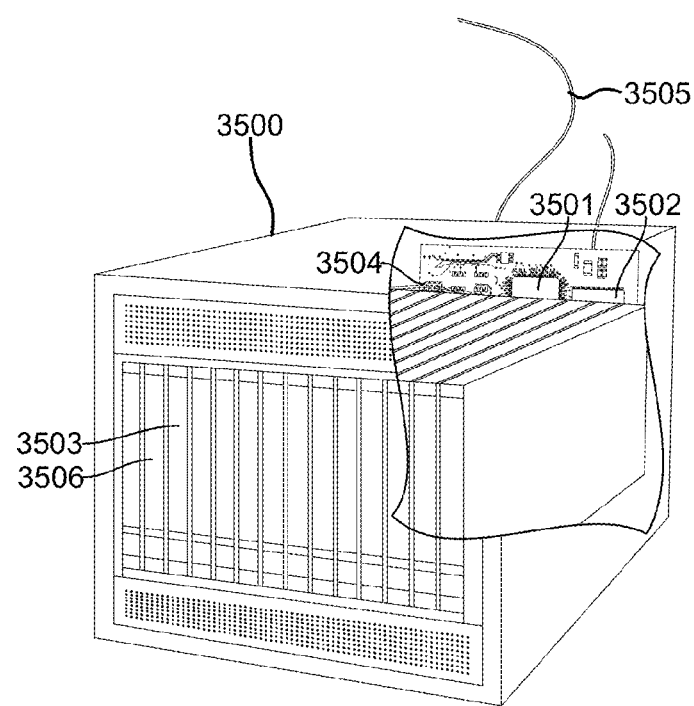
FIG. 35 is a component block diagram of a server device suitable for use in various embodiments.

FIG. 35 is a system block diagram of a server 3500 suitable for implementing the various embodiments of this disclosure. The server 3500 may be a commercially available server device. Such a server 3500 typically includes a processor 3501 coupled to volatile memory 3502 and a large capacity nonvolatile memory, such as a disk drive 3503. The server 3500 may also include a floppy disc drive, compact disc (CD) or DVD disc drive 3506 coupled to the processor 3501. The server 3500 may also include network interfaces, such as network access ports 3504, coupled to the processor 3501 for establishing data connections with a network 3505, such as a local area network coupled to other broadcast system computers and servers.

The processors 3401, 3501 may be any programmable microprocessor, microcomputer or multiple processor chip or chips that can be configured by processor-executable instructions or software instructions (applications) to perform a variety of functions, including the functions of the various embodiments described below. In some mobile proximity broadcast receivers, multiple processors 3401 may be provided, such as one processor dedicated to wireless communication functions and one processor dedicated to running other applications. Typically, software applications may be stored in the memory 3402, 3502 before they are accessed and loaded into the processor 3401, 3501. The processor 3401, 3501 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module, which may reside on a tangible, non-transitory processor-readable storage medium. Tangible, non-transitory processor-readable storage media may be any available media that may be accessed by a computer or processor. By way of example, and not limitation, such non-transitory processor-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory processor-readable media. Additionally, the operations of a method or algorithm may reside as one or any combination or set of codes and/or instructions (e.g., stored processor-executable instructions) on a tangible, non-transitory machine readable medium and/or processor-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for a proximity broadcast receiver to provision devices associated with wireless identity transmitters, comprising:
   receiving a broadcast message including a secure identifier from a wireless identity transmitter;
   transmitting to a central server a sighting message that includes the secure identifier and an identity of the proximity broadcast receiver;
   receiving from the central server a return message that includes identification information related to the received broadcast message and that is authorized to be distributed to the proximity broadcast receiver based on data stored on the central server; and
   provisioning a device associated with the received broadcast message based on the identification information from the received return message.

2. The method of claim 1, wherein the identification information includes one or more of credentials for accessing the device and information indicating required functionalities for provisioning the device.

3. The method of claim 2, wherein the required functionalities include one or more of installed software and an activated radio, and
   wherein the information indicating the required functionalities includes one or more of a uniform resource identifier (URI) and instructions to be performed by the proximity broadcast receiver.

4. The method of claim 2, further comprising:
   determining whether the proximity broadcast receiver is configured with the required functionalities for provisioning the device; and
   configuring the proximity broadcast receiver with the required functionalities in response to determining that the proximity broadcast receiver is not configured with the required functionalities for provisioning the device.

5. The method of claim 4, wherein configuring the proximity broadcast receiver with the required functionalities in response to determining that the proximity broadcast receiver is not configured with the required functionalities comprises:
   identifying a software source from the received return message;
   transmitting, to the identified software source, a request for software indicated by the received return message;
   receiving the software from the identified software source; and
   installing the received software.

6. The method of claim 5, further comprising configuring the installed software based on the identification information.

7. The method of claim 1, wherein the received return message includes configuration data for the provisioned device, and
   the method further comprising transmitting the configuration data to the provisioned device.

8. The method of claim 1, wherein;
   the received broadcast message is one of a plurality of broadcast messages received by the proximity broadcast receiver from a plurality of nearby wireless identity transmitters; and
   the method further comprises displaying a plurality of functionalities in response to receiving the plurality of broadcast messages from the plurality of nearby wireless identity transmitters.

9. The method of claim 1, further comprising:
   receiving from the central server a request for additional authentication; and
   transmitting to the central server an authentication message including a personal identification number (PIN),
   wherein receiving from the central server the return message that includes the identification information comprises receiving from the central server the return message that includes the identification information in response to transmitting the authentication message.

10. The method of claim 1, wherein:
    the proximity broadcast receiver is a smartphone;
    the provisioned device is one of an appliance and a router; and
    the wireless identity transmitter is the provisioned device.

11. A method for a central server to control provisioning of devices associated with wireless identity transmitters, comprising:
    receiving, by the central server from a proximity broadcast receiver, a sighting message that includes a secure identifier of a wireless identity transmitter;
    determining whether the proximity broadcast receiver is authorized to receive identification information for provisioning a device associated with the wireless identity transmitter based on stored profile information corresponding to the secure identifier and the proximity broadcast receiver in response to receiving the sighting message; and
    transmitting a return message including the identification information for provisioning the device in response to determining that the proximity broadcast receiver is authorized to receive the identification information.

12. The method of claim 11, wherein the identification information includes at least one of an instruction, a script, a command, a URI, and a code for causing the proximity broadcast receiver to obtain software related to the device.

13. The method of claim 11, wherein the identification information includes credentials related to the device, wherein the credentials include at least one of a username and a password.

14. The method of claim 11, further comprising:
    transmitting an authorization request to a user device associated with the device in response to determining that the proximity broadcast receiver is not authorized to receive the identification information for provisioning the device;
    determining whether an authorization approval is received from the user device in response to transmitting the authorization request; and
    transmitting the return message including the identification information for provisioning the device in response to determining that the authorization approval is received from the user device.

15. The method of claim 11, further comprising:
    transmitting to the proximity broadcast receiver an authentication request;
    receiving a response message in response to transmitting the authentication request; and determining whether a user of the proximity broadcast receiver is authenticated based on the received response message, wherein transmitting the return message including the identification information for provisioning the device in response to determining that the proximity broadcast receiver is authorized to receive the identification information comprises transmitting the return message including the identification information for provisioning the device in response to determining that the proximity broadcast receiver is authorized to receive the identification information and in response to determining that the user of the proximity broadcast receiver is authenticated based on the received response message.

16. A computing device, comprising:

a processor configured with processor-executable instructions to perform operations comprising:

receiving a broadcast message including a secure identifier from a wireless identity transmitter;

transmitting, to a central server, a sighting message that includes the secure identifier and an identity of the computing device;

receiving, from the central server, a return message that includes identification information related to the received broadcast message and that is authorized to be distributed to the computing device based on data stored on the central server; and provisioning a device associated with the received broadcast message based on the identification information from the received return message.

17. The computing device of claim 16, wherein the identification information includes one or more of credentials for accessing the device and information indicating required functionalities for provisioning the device.

18. The computing device of claim 17, wherein the required functionalities include one or more of installed software and an activated radio, and wherein the information indicating the required functionalities includes one or more of a uniform resource identifier (URI) and instructions to be performed by the computing device.

19. The computing device of claim 17, wherein the processor is configured with processor-executable instructions to perform operations further comprising:

determining whether the computing device is configured with the required functionalities for provisioning the device; and configuring the computing device with the required functionalities in response to determining that the computing device is not configured with the required functionalities.

20. The computing device of claim 19, wherein the processor is configured with processor-executable instructions to perform operations such that configuring the computing device with the required functionalities in response to determining that the computing device is not configured with the required functionalities comprises:

identifying a software source from the received return message;

transmitting, to the identified software source, a request for software indicated by the received return message;

receiving the software from the identified software source; and installing the received software.

21. The computing device of claim 20, wherein the processor is configured with processor-executable instructions to perform operations further comprising configuring the installed software based on the identification information.

22. The computing device of claim 16, wherein;

the received broadcast message is one of a plurality of broadcast messages received by the computing device from a plurality of nearby wireless identity transmitters; and wherein the processor is configured with processor-executable instructions to perform operations further comprising displaying a plurality of functionalities in response to receiving the plurality of broadcast messages from the plurality of nearby wireless identity transmitters.

23. The computing device of claim 16, wherein the processor is configured with processor-executable instructions to perform operations further comprising:

receiving, from the central server, a request for additional authentication; and transmitting, to the central server, an authentication message including a personal identification number (PIN), and wherein the processor is configured with processor-executable instructions to perform operations such that receiving, from the central server, the return message that includes the identification information comprises receiving from the central server the return message that includes the identification information in response to transmitting the authentication message.

24. The computing device of claim 19, wherein:

the computing device is a smartphone;

the provisioned device is one of an appliance and a router; and the wireless identity transmitter is the provisioned device.

25. A computing device, comprising:

a processor configured with processor-executable instructions to perform operations comprising:

receiving, from a proximity broadcast receiver, a sighting message that includes a secure identifier of a wireless identity transmitter;

determining whether the proximity broadcast receiver is authorized to receive identification information for provisioning a device associated with the wireless identity transmitter based on stored profile information corresponding to the secure identifier and the proximity broadcast receiver in response to receiving the sighting message; and transmitting a return message including the identification information for provisioning the device in response to determining that the proximity broadcast receiver is authorized to receive the identification information.

26. The computing device of claim 25, wherein the identification information includes at least one of an instruction, a script, a command, a URI, and a code for causing the proximity broadcast receiver to obtain software related to the device.

27. The computing device of claim 25, wherein the identification information includes credentials related to the device, wherein the credentials include at least one of a username and a password.

28. The computing device of claim 25, wherein the return message includes configuration data to be transmitted by the proximity broadcast receiver to the device.

29. The computing device of claim 25, wherein the processor is configured with processor-executable instructions to perform operations further comprising:

transmitting an authorization request to a user device associated with the device in response to determining that the proximity broadcast receiver is not authorized to receive the identification information for provisioning the device;

determining whether an authorization approval is received from the user device in response to transmitting the authorization request; and transmitting the return message including the identification information for provisioning the device in response to determining that the authorization approval is received from the user device.

* * * * *